(12) United States Patent
Suzuki et al.

(10) Patent No.: US 7,254,878 B2
(45) Date of Patent: Aug. 14, 2007

(54) APPARATUS FOR AND METHOD OF MANUFACTURING FILM

(75) Inventors: Chiaki Suzuki, Minamiashigara (JP); Yasuhiro Sekizawa, Minamiashigara (JP); Kenichi Imoto, Minamiashigara (JP); Nobuyasu Akiyoshi, Minamiashigara (JP)

(73) Assignee: Fujifilm Corporation, Tokyo (JP)

( * ) Notice: Subject to any disclaimer, the term of this patent is extended or adjusted under 35 U.S.C. 154(b) by 462 days.

(21) Appl. No.: 10/304,857

(22) Filed: Nov. 27, 2002

(65) Prior Publication Data

US 2003/0115836 A1 Jun. 26, 2003

(30) Foreign Application Priority Data

Nov. 28, 2001 (JP) ............................. 2001-362962
Nov. 28, 2001 (JP) ............................. 2001-363009
Nov. 28, 2001 (JP) ............................. 2001-363052

(51) Int. Cl.
G01M 17/00 (2006.01)
B23P 19/00 (2006.01)

(52) U.S. Cl. ..................... 29/407.01; 29/806; 53/118; 53/430

(58) Field of Classification Search ............... 29/806, 29/407.01; 53/118, 430
See application file for complete search history.

(56) References Cited

U.S. PATENT DOCUMENTS

| | | | |
|---|---|---|---|
| 3,714,761 A | | 2/1973 | Herford et al. |
| 4,551,367 A | * | 11/1985 | Nagatani et al. ............ 206/454 |
| 5,044,144 A | * | 9/1991 | Foote et al. .................. 53/456 |
| 5,048,262 A | * | 9/1991 | Kakuda ........................ 53/401 |
| 5,606,842 A | * | 3/1997 | Sakamoto et al. ............. 53/54 |
| 5,669,205 A | | 9/1997 | Rice et al. |
| 5,725,170 A | * | 3/1998 | Yamaguchi .............. 242/348.1 |
| 5,743,482 A | | 4/1998 | Suzuki et al. |
| 6,021,697 A | * | 2/2000 | Yamamoto et al. ............ 83/13 |
| 6,044,623 A | * | 4/2000 | Karaki et al. ................. 53/430 |
| 6,079,654 A | * | 6/2000 | Sasou et al. ............. 242/348.1 |
| 6,092,352 A | | 7/2000 | Tanaka |
| 6,116,820 A | * | 9/2000 | Suzuki et al. ................. 406/31 |
| 6,128,885 A | * | 10/2000 | Karaki et al. ................. 53/430 |
| 6,129,303 A | * | 10/2000 | Karaki et al. ............ 242/523.1 |

(Continued)

FOREIGN PATENT DOCUMENTS

| | | |
|---|---|---|
| JP | 62-264161 | 11/1967 |
| JP | 47026127 | 10/1972 |
| JP | 52-115215 | 9/1977 |
| JP | 58-71737 | 5/1983 |
| JP | 60-53868 | 11/1985 |
| JP | 1-285937 | 11/1989 |

(Continued)

OTHER PUBLICATIONS

On-line translation of JP 09-090571.*
On-linr English translation of JP 10217046A.*

*Primary Examiner*—Essama Omgba
(74) *Attorney, Agent, or Firm*—Sughrue Mion, PLLC

(57) ABSTRACT

A supply unit supplies a film strip from a film roll, and a winding unit cuts off a film strip into a fixed-length film and winds the fixed-length film around a spool to produce a wound-film assembly. An assembling unit introduces the wound-film assembly into a one-open-sided cartridge, and mounts and crimps a cap on the one-open-sided cartridge to produce a wound-film-loaded cartridge. After a pullout resistance of the film and a film length to be exposed are inspected, the wound-film-loaded cartridge is unloaded as a product.

28 Claims, 98 Drawing Sheets

U.S. PATENT DOCUMENTS

| | | | |
|---|---|---|---|
| 6,145,279 A * | 11/2000 | Karaki et al. | 53/430 |
| 6,182,419 B1 * | 2/2001 | Karaki et al. | 53/430 |
| 6,317,951 B1 * | 11/2001 | Karaki et al. | 29/402.01 |
| 6,367,727 B1 * | 4/2002 | Sasou et al. | 242/348.1 |
| 6,372,065 B1 * | 4/2002 | Tabuchi et al. | 156/64 |
| 6,398,153 B1 * | 6/2002 | Karaki et al. | 242/523.1 |
| 6,438,323 B1 * | 8/2002 | DeCecca et al. | 396/6 |
| 6,704,999 B2 * | 3/2004 | Karaki et al. | 29/714 |
| 6,948,237 B2 * | 9/2005 | Ishii et al. | 29/806 |
| 7,165,320 B2 * | 1/2007 | Ishii et al. | 29/806 |

FOREIGN PATENT DOCUMENTS

| | | | |
|---|---|---|---|
| JP | 4-81747 | | 3/1992 |
| JP | 6-82196 | | 10/1994 |
| JP | 06295018 A | * | 10/1994 |
| JP | 7-187353 | | 7/1995 |
| JP | 7-117467 | | 12/1995 |
| JP | 9-005947 | | 1/1997 |
| JP | 9-68779 | | 3/1997 |
| JP | 09-090571 | | 4/1997 |
| JP | 9-905714 | | 4/1997 |
| JP | 9-297375 | | 11/1997 |
| JP | 10-20454 | | 1/1998 |
| JP | 10-20455 | | 1/1998 |
| JP | 2777668 | | 5/1998 |
| JP | 10-186587 | | 7/1998 |
| JP | 10-207017 | | 8/1998 |
| JP | 10-212028 | | 8/1998 |
| JP | 10217046 A | * | 8/1998 |
| JP | 11-10590 | | 1/1999 |
| JP | 11052521 A | * | 2/1999 |
| JP | 11052522 A | * | 2/1999 |
| JP | 11-59990 | | 3/1999 |
| JP | 11-63962 | | 3/1999 |
| JP | 11-72879 | | 3/1999 |
| JP | 11-109562 | | 4/1999 |
| JP | 11-109563 | | 4/1999 |
| JP | 11-133555 | | 5/1999 |
| JP | 11-212218 | | 8/1999 |
| JP | 11-265043 | | 9/1999 |
| JP | 2001-281808 | | 10/2001 |
| JP | 2001-343304 | | 12/2001 |
| JP | 2002-265036 | | 9/2002 |
| JP | 2003162036 A | * | 6/2003 |
| JP | 2003162037 A | * | 6/2003 |

* cited by examiner

APPARATUS FOR AND METHOD OF MANUFACTURING FILM

BACKGROUND OF THE INVENTION

1. Field of the Invention

The present invention relates to an apparatus for and a method of manufacturing a film by winding a fixed-length film around a spool to produce a wound-film assembly, inserting the wound-film assembly into a cartridge case, and mounting a cap on an open end of the cartridge case thereby to produce a wound-film-loaded cartridge.

2. Description of the Related Art

For manufacturing a photographic photosensitive film housed in a cartridge, it is usually necessary to carry out successive processes of cutting a film strip into a fixed-length film, winding the fixed-length film around a spool to produce a wound-film assembly, inserting the wound-film assembly into a cartridge case, and mounting a cap on an open end of the cartridge case. Heretofore, since these processes are carried out by respective manufacturing apparatus, a sufficiently light-shielded environment needs to be provided when semi-finished products are transferred between any two of the manufacturing apparatus, and a substantial cost is required to construct a facility for creating such a light-shielded environment.

A film production system made up of those manufacturing apparatus is necessarily large in size, and suffers various problems due to the large size. For example, the large-size film production system results in an increase in the cost of air-conditioning equipment required for the system, and takes up a correspondingly large floor space and involves an increase in the running cost. The time required for the large-size film production system to produce photographic photosensitive films is extended by the large equipment size, tending to lower the production efficiency.

In order to alleviate the above drawbacks, there has been developed an apparatus having a cartridge component supply means, a spool supply means, a cap supply means, a film feed means, a measuring means for measuring a length by which a film is fed, a cutting means for cutting a film, a spool/cap replacing means, a cartridge component replacing means, and a crimping means for crimping a cap fitted over a cartridge component (for details, see Japanese laid-open patent publication No. 9-90571).

The constituent elements of the developed apparatus are so aggregated that the apparatus is of a relatively compact structure for manufacturing films encased in cartridges. However, it has been pointed out that the apparatus suffers little freedom in adding a device for automatically supplying cartridge components and dividing itself into a plurality of units, and hence it is difficult to design the apparatus in a flexible layout to meet needs at the apparatus installation site. In addition, the apparatus is designed for use at a fixed position within a given facility, and is not based on any idea whatsoever of portability that allows the apparatus to be installed at any desired location.

SUMMARY OF THE INVENTION

It is a general object of the present invention to provide an apparatus for manufacturing a film, which can be constructed in a compact arrangement, can easily be changed in apparatus layout, and can be installed at any desired location, and a method of manufacturing a film on such an apparatus.

A major object of the present invention is to provide an apparatus for and a method of manufacturing a high-quality cartridge loaded with a wound film at a reduced cost.

An object of the present invention is to provide an apparatus for and a method of manufacturing a high-quality cartridge loaded with a wound film at a high speed by automatically supplying components.

Another object of the present invention is to provide an apparatus for and a method of manufacturing a film while making adjustments easy for the production of the film.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
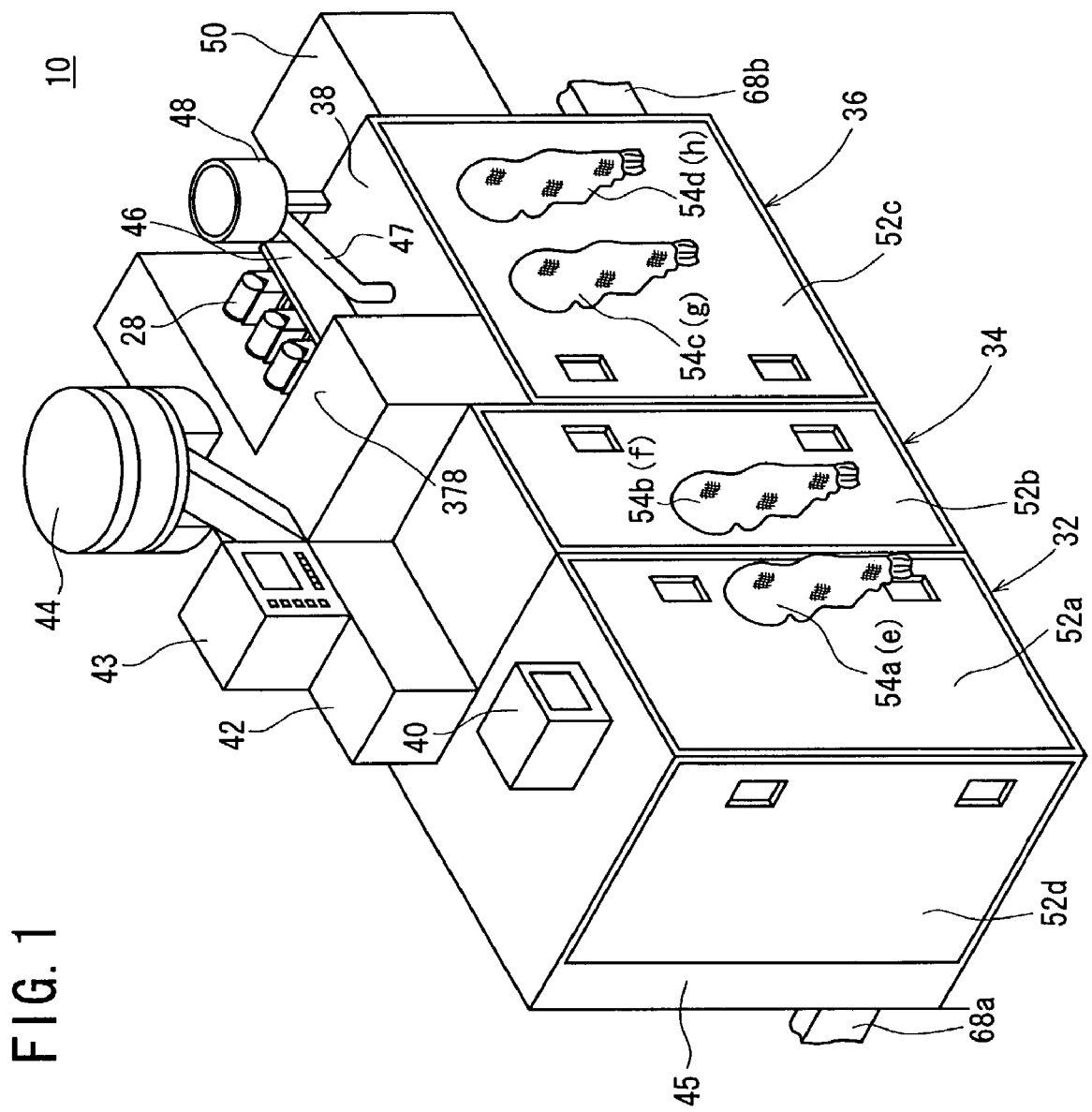
FIG. 1 is a perspective view of a film manufacturing apparatus according to a first embodiment of the present invention.
Figure 2:
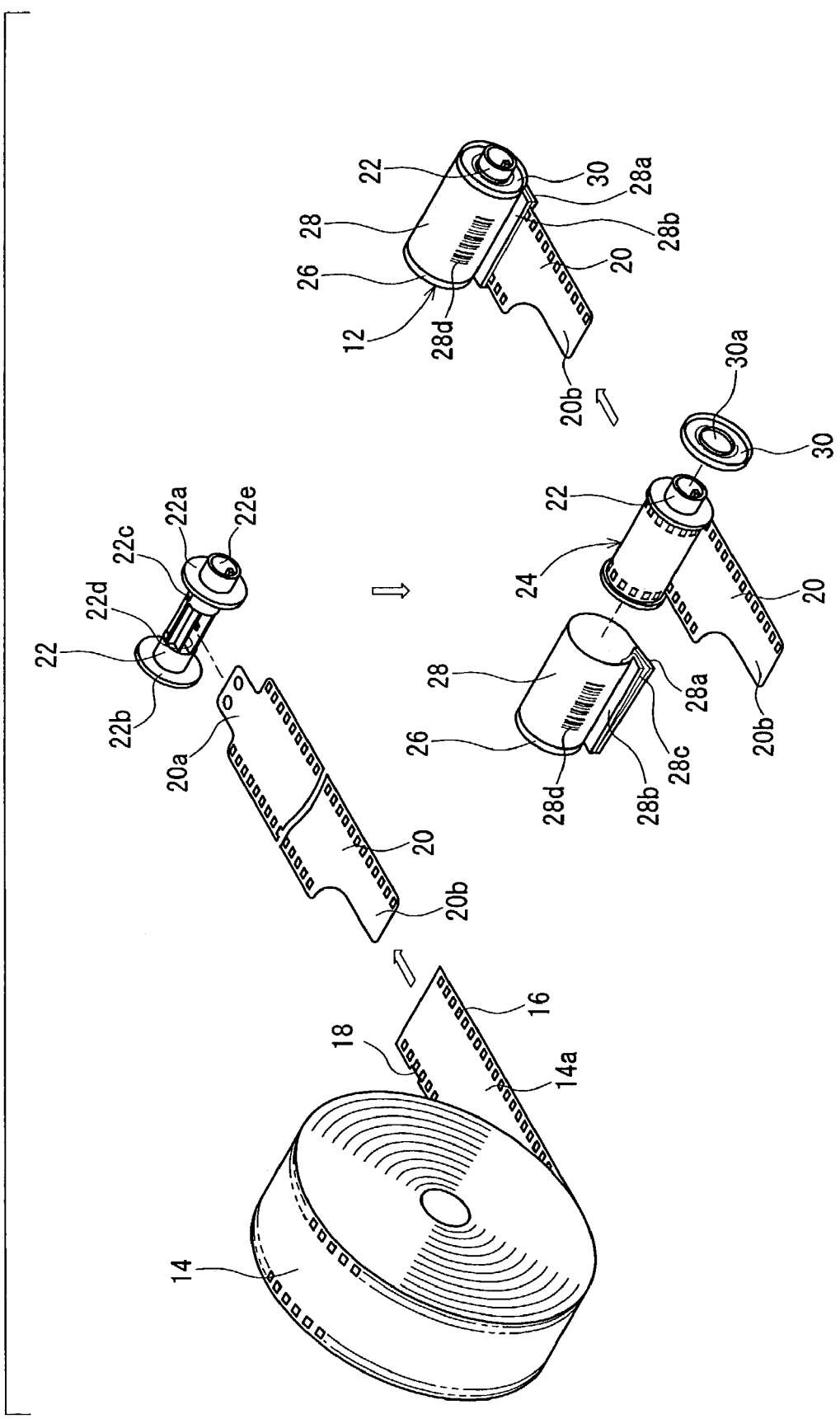
FIG. 2 is a schematic perspective view illustrating a process of manufacturing a wound-film-loaded cartridge on the film manufacturing apparatus according to the first embodiment.

FIG. 1 is a perspective view of a film manufacturing apparatus 10 according to a first embodiment of the present invention. The film manufacturing apparatus 10 manufactures a wound-film-loaded cartridge 12 as shown in FIG. 2. As shown in FIG. 2, an unexposed film roll 14 carries a latent image as a side print and has a succession of perforations 16 defined in each of opposite sides thereof and a plurality of notches 18 defined in one longitudinal edge thereof at spaced intervals each having a given length depending on a film size (film length). A film strip 14a unwound from the film roll 14 is cut into a given length as a fixed-length film 20, which is then wound around a spool 22, thereby producing a wound-film assembly 24. The wound-film assembly 24 is then inserted into a one-open-sided cartridge case 28 with a cap 26 mounted on one end thereof, and a cap 30 is mounted on the other end of the cartridge case 28, thus producing a wound-film-loaded cartridge 12.

The film manufacturing apparatus 10 which manufactures the wound-film-loaded cartridge 12 in the above manner basically comprises a supply unit 32 for supplying a film roll 14, a winding unit 34 for winding a film strip 14a unwound from the film roll 14 around a spool 22 thereby to produce a wound-film assembly 24, and an assembling unit 36 for inserting the wound-film assembly 24 into a one-open-sided cartridge case 28 and mounting a cap 30 on the cartridge case 28 thereby to assemble a wound-film-loaded cartridge 12.

The supply unit 32, the winding unit 34, and the assembling unit 36 are surrounded by a light-shielding housing 38. A control console 45 for controlling the film manufacturing apparatus 10 in its entirety is disposed behind the supply unit 32. A display monitor 40 for monitoring internal mechanisms of the film manufacturing apparatus 10 is mounted on an upper panel of the supply unit 32. The display monitor 40 may comprise a CRT display unit or a head-mount display unit which allows the operator to confirm displayed images regardless of the operator's attitude.

A spool delivery device 42 for delivering spools 22 to the winding unit 34 is mounted on an upper panel of the winding unit 34. The spool delivery device 42 is supplied with spools 22 from a spool feeder 44. A control console 43 used by the operator to control the film manufacturing apparatus 10 is mounted on top of the spool delivery device 42.

A cartridge delivery device 46 for delivering one-open-sided cartridges 28 to the assembling unit 36 is mounted on an upper panel of the assembling unit 36. A hopper 48 for supplying caps 30 to a cap feeder (described alter on) in the assembling unit 36 through a cap supply passage 47 is mounted on top of the assembling unit 36. A wound-film-loaded cartridge unloader 50 is mounted on a side panel of the assembling unit 36 for unloading manufactured wound-film-loaded cartridges 12 from the film manufacturing apparatus 10.

Depending on the number of wound-film-loaded cartridges 12 manufactured by the film manufacturing apparatus 10, spools 22 may be directly supplied to the spool delivery device 42 manually by the operator, and the spool feeder 44 may be dispensed with.

Figure 3:
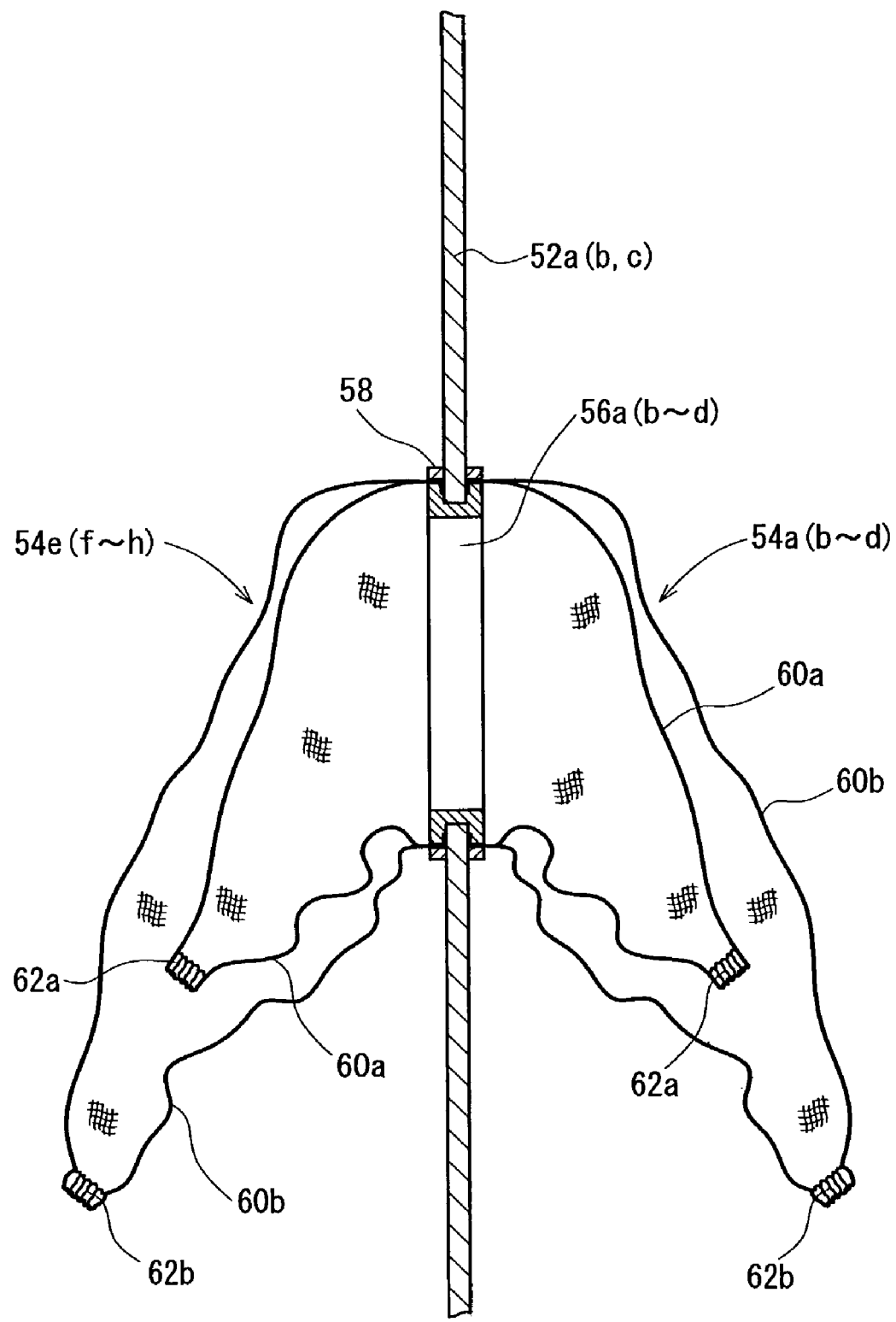
FIG. 3 is a cross-sectional view of a light-shielding bag means of the film manufacturing apparatus according to the first embodiment.

Doors 52a through 52c are mounted on the front side of the housing 38 in alignment with the supply unit 32, the winding unit 34, and the assembling unit 36, respectively. These doors 52a through 52c can be opened to gain access to the supply unit 32, the winding unit 34, and the assembling unit 36 for maintenance and servicing. As shown in FIG. 3, the doors 52a through 52c support respective light-shielding bag means 54a through 54h thereon for allowing the operator to make adjustments in the supply unit 32, the winding unit 34, and the assembling unit 36 in a light-shielded condition. Another door 52d is mounted on a lateral side of the supply unit 32 to allow a light-shielded magazine (described later on) housing film rolls 14 to be supplied to the supply unit 32.

The supply unit 32 and the assembling unit 36 have respective ducts 68a, 68b connected to an external air-conditioning facility for supplying and discharging air that is controlled at a constant temperature and a constant humidity. One of the ducts 68a, 68b may supply controlled air and the other of the ducts 68a, 68b may discharge controlled air through a discharge filter.

The light-shielding bag means 54a through 54h are mounted on edges of working holes 56a through 56d defined in the doors 52a through 52c by brackets 58. The light-shielding bag means 54a through 54d are disposed outside of the film manufacturing apparatus 10, whereas the light-shielding bag means 54e through 54h are disposed inside of the film manufacturing apparatus 10. Each of the light-shielding bag means 54a through 54h is of a double-walled structure comprising an inner bag 60a and an outer bag 60b disposed around the inner bag 60a. The inner and outer bags 60a, 60b have openings closed by rubber bands 62a, 62b, respectively, to prevent external light from entering the inner and outer bags 60a, 60b.

Figure 4:
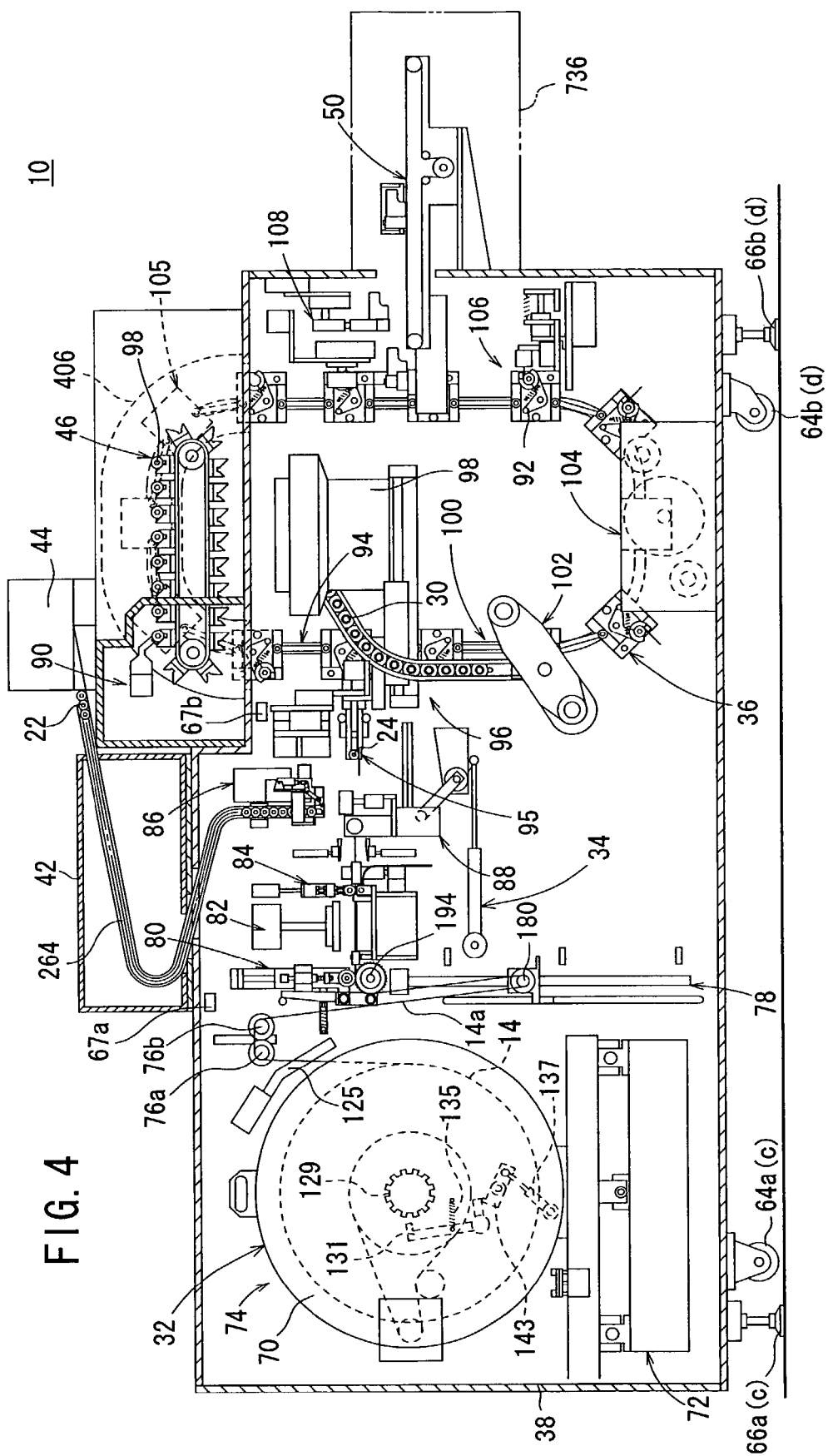
FIG. 4 is an elevational view showing internal structural details of the film manufacturing apparatus according to the first embodiment.

FIG. 4 is an elevational view showing internal structural details of the film manufacturing apparatus 10. Casters 64a through 64d (moving means) for moving the film manufacturing apparatus 10 are mounted on a lower panel of the housing 38. Jack bolts 66a through 66d for fixing the film manufacturing apparatus 10 in a desired position are mounted on the lower panel of the housing 38 near the casters 64a through 64d, respectively. Monitoring cameras 67a, 67b for monitoring the interior of the film manufacturing apparatus 10 are disposed respectively in the winding unit 34 and the assembling unit 36. The monitoring cameras 67a, 67b comprise night-vision cameras capable of capturing images of the interior of the film manufacturing apparatus 10 with infrared radiation which does not adversely affect photosensitive films. Images captured by the monitoring cameras 67a, 67b are displayed on the display monitor 40 which is mounted on top of the housing 38.

The supply unit 32 comprises a support mechanism 72 supporting thereon a light-shielded magazine 70 which holds a film roll 14 in a light-shielded fashion therein, and a feed-out mechanism 74 for rotating the film roll 14 to feed out a film strip 14a unwound therefrom. The film strip 14a unwound from the film roll 14 is supplied by two rollers 76a, 76b into the winding unit 34.

The winding unit 34 comprises a buffer mechanism 78 for regulating the rate at which the film strip 14a is supplied from the supply unit 32, a feed mechanism 80 for feeding the film strip 14a by a fixed length, a cutting mechanism 82 for cutting the film strip 14a into a fixed-length film 20, an inserting mechanism 84 for inserting a leading end 20a of the fixed-length film 20 into a spool 22, a spool supply mechanism 86 for supplying a spool 22, and a winding mechanism 88 for winding the fixed-length film 20 around the spool 22 to produce a wound-film assembly 24.

The assembling unit 36 comprises a cartridge supply mechanism 90 disposed in an upper region for supplying a one-open-sided cartridge 28 from the cartridge delivery device 46, a delivery mechanism (conveyance mechanism) 94 for holding a one-open-sided cartridge 28 or a wound-film-loaded cartridge 12 which has been supplied with a pallet 92 and delivering the pallet 92 along a circulatory path, a transfer mechanism 95 for transferring a wound-film assembly 24 supplied from the winding mechanism 88 of the winding unit 34 to the assembling unit 36, a loading mechanism 96 for assembling the wound-film assembly 24 transferred by the transfer mechanism 95 into a one-open-sided cartridge 28, a cap supply mechanism 100 for supplying a cap 30 from a cap feeder 98 that is disposed centrally in the assembling unit 36, a mounting mechanism 102 for temporarily mounting the cap 30 on the one-open-sided cartridge 28, a crimping mechanism 104 for crimping the cap 30 on the one-open-sided cartridge 28 thereby to produce a wound-film-loaded cartridge 12, an inspecting mechanism 106 for inspecting a pullout resistance of the fixed-length film 20 in the wound-film-loaded cartridge 12 and a length of the fixed-length film 20 which is exposed out of (protruding from) the wound-film-loaded cartridge 12, a removing mechanism 108 for removing the wound-film-loaded cartridge 12 from the delivery mechanism 94 and supplying the wound-film-loaded cartridge 12 to the wound-film-loaded cartridge unloader 50, and a discharge mechanism 105 for discharging the cap 30, the one-open-sided cartridge 28, or the wound-film-loaded cartridge 12 if it is left on the pallet 92. These mechanisms of the assembling unit 36 are arranged successively in the direction along which the pallet 92 is moved by the delivery mechanism 94.

Each of the above mechanisms in the film manufacturing apparatus 10 will be described in detail below.

Figure 5:
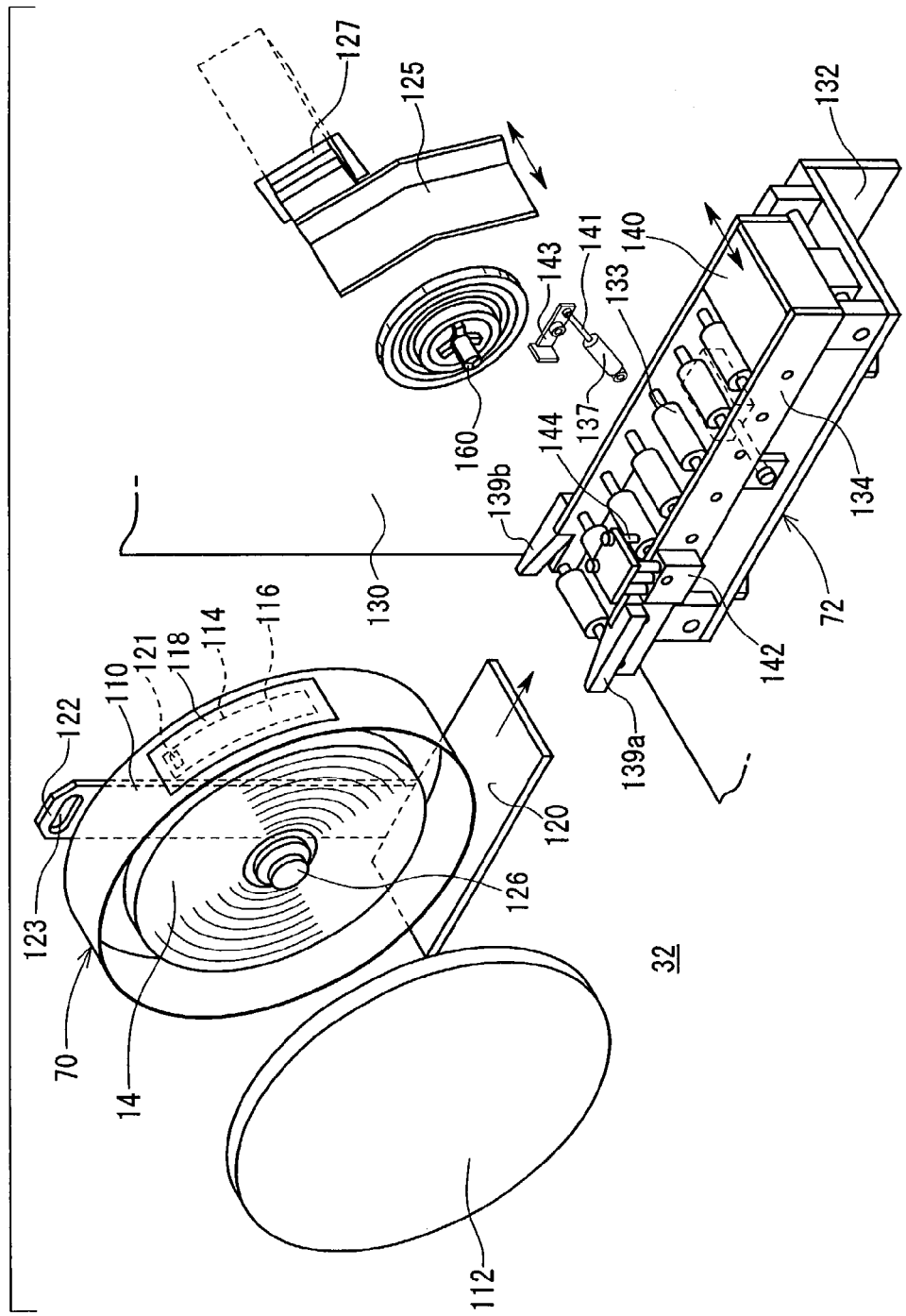
FIG. 5 is a perspective view of a supply unit according to the first embodiment.
Figure 6:
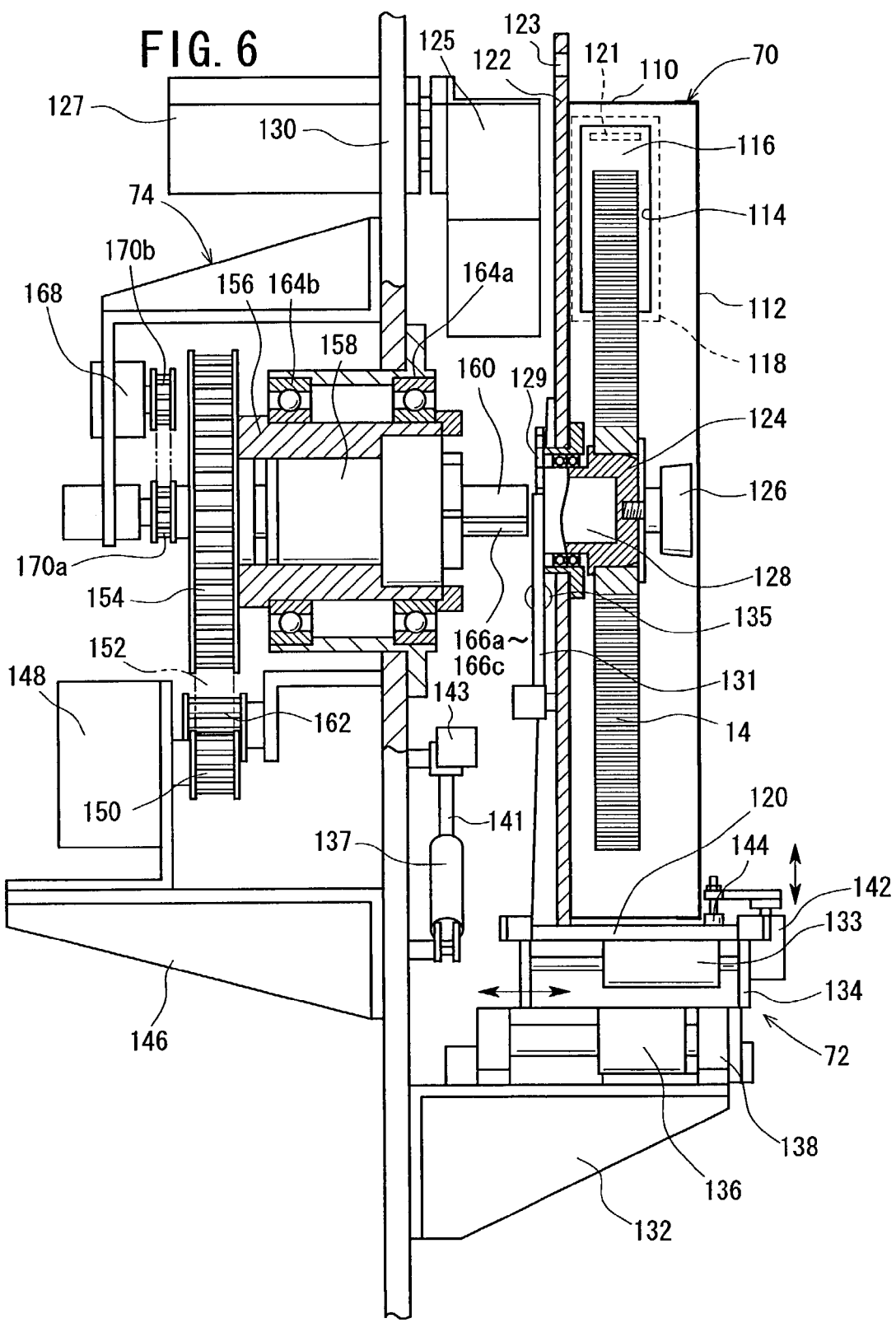
FIG. 6 is a sectional front elevational view of the supply unit according to the first embodiment.

FIGS. 5 and 6 shows the light-shielded magazine 70 supplied to the supply unit 32 and the support mechanism 72 which supports the light-shielded magazine 70.

The light-shielded magazine 70 comprises a casing 110 storing the film roll 14 therein and a lid 112 mounted on the casing 110. The casing 110 has an opening 114 defined in a circumferential wall thereof for drawing the film strip 14a from the film roll 14. A shutter 116 is slidably mounted on the circumferential wall of the casing 110 over the opening 114 and has a handle 121 which can be moved to slide the shutter 116 to open and close the opening 114. A light-shielding cloth (light-shielding means) 118 is mounted on an outer surface of the circumferential wall of the casing 110 over the opening 114. The light-shielding cloth 118 has an upper end fixed to the casing 110 and opposite sides and a lower end fastened to the casing 110 by MAGIC TAPE (registered trademark, manufactured by Kuraray Co., Ltd. If some trouble occurs or a necessary number of films have been manufactured when the film roll 14 has not yet been used up, then the opening 114 is closed by the shutter 116 and the light-shielding cloth 118 is placed over the opening 114, so that the light-shielded magazine 70 can be removed from the housing 38 in a light-shielded fashion.

A rotatable shaft 124 is disposed centrally on the casing 110 of the light-shielded magazine 70. The film roll 14 is fixedly mounted on the rotatable shaft 124 by a retainer 126.

A movable plate 125 is horizontally movably supported on a partition wall 130 of the supply unit 32 in alignment with the opening 114 in the light-shielded magazine 70. The movable plate 125 is movable to a position over the opening 114 to prevent the operator from opening the shutter 116 in error when either one of the doors 52a through 52d of the film manufacturing apparatus 10 is open. When all the doors 52a through 52d are detected as being closed, then the movable plate 125 is retracted away from the opening 114 toward the partition wall 130 by a cylinder 127 which is mounted on the partition wall 130.

A vertical support member 122 is mounted on a rear surface of the casing 110 of the light-shielded magazine 70. The vertical support member 122 has a grip hole 123 defined in an upper end thereof for carrying the light-shielded magazine 70. The vertical support member 122 has a lower end fixed to a support plate 120 and a rear central surface to which there is exposed an engaging cavity 128 defined in the rotatable shaft 124. The rotatable shaft 124 has a gear 129 integrally formed therewith around the engaging cavity 128 for preventing the rotatable shaft 124 from rotating while the light-shielded magazine 70 is carried. The gear 129 is engaged by an end of a substantially L-shaped lock member 131 whose bent portion is pivotally supported on the light-shielded magazine 70. The engaging end of the lock member 131 is normally urged into engagement with the gear 129 by a spring 135 (see FIG. 4).

A cylinder 137 has an end pivotally supported on the partition wall 130 of the supply unit 32. A rod 141 extends from the other end of the cylinder 137 and is coupled to an end of a plate 143 that is pivotally supported at its center on the partition wall 130. The other end of the plate 143 is positioned to displace the other end of the lock member 131 when the cylinder 137 is actuated at the time the light-shielded magazine 70 is installed on the feed-out mechanism 74.

The support mechanism 72 which supports the light-shielded magazine 70 thereon has an array of rollers 133 which extends in the direction along which the light-shielded magazine 70 is inserted. The support mechanism 72 also includes a support base 134 held on the partition wall 130 by a bracket 132 and supporting the rollers 133, and a displacing unit 138 having a cylinder 136 for displacing the support base 134 toward the partition wall 130. The support base 134 has guide plates 139a, 139b supported on an end thereof near the door 52d and a positioning plate 140 supported on the other end thereof near the winding unit 34. Securing pins 144 are disposed above the support base 134 near the door 52d. The securing pins 144 are vertically displaceable by a cylinder 142 mounted on the support base 134. The securing pins 144 secure the light-shielded magazine 70 in position when they are pressed by the support plate 120.

The feed-out mechanism 74 comprises a feed-out motor 148 fixed to the partition wall 130 by a bracket 146, a pulley 154 operatively coupled to a pulley 150 connected to the feed-out motor 148 by a timing belt 152, and a chuck 160 connected coaxially to a rotatable shaft 156 of the pulley 154 by a cylinder 158. A tension pulley 162 for adjusting the tension of the timing belt 152 is located between the pulley 150 and the pulley 154. The rotatable shaft 156 is rotatably supported on the partition wall 130 by bearings 164a, 164b.

The chuck 160 has three chuck fingers 166a through 166c for engaging in the engaging cavity 128 defined in the rear surface of the light-shielded magazine 70. The chuck fingers 166a through 166c can be radially movable by the cylinder 158. A rotary encoder 168 for detecting the angular displacement of the rotatable shaft 156 is operatively coupled to the rotatable shaft 156 by pulleys 170a, 170b.

Figure 7:
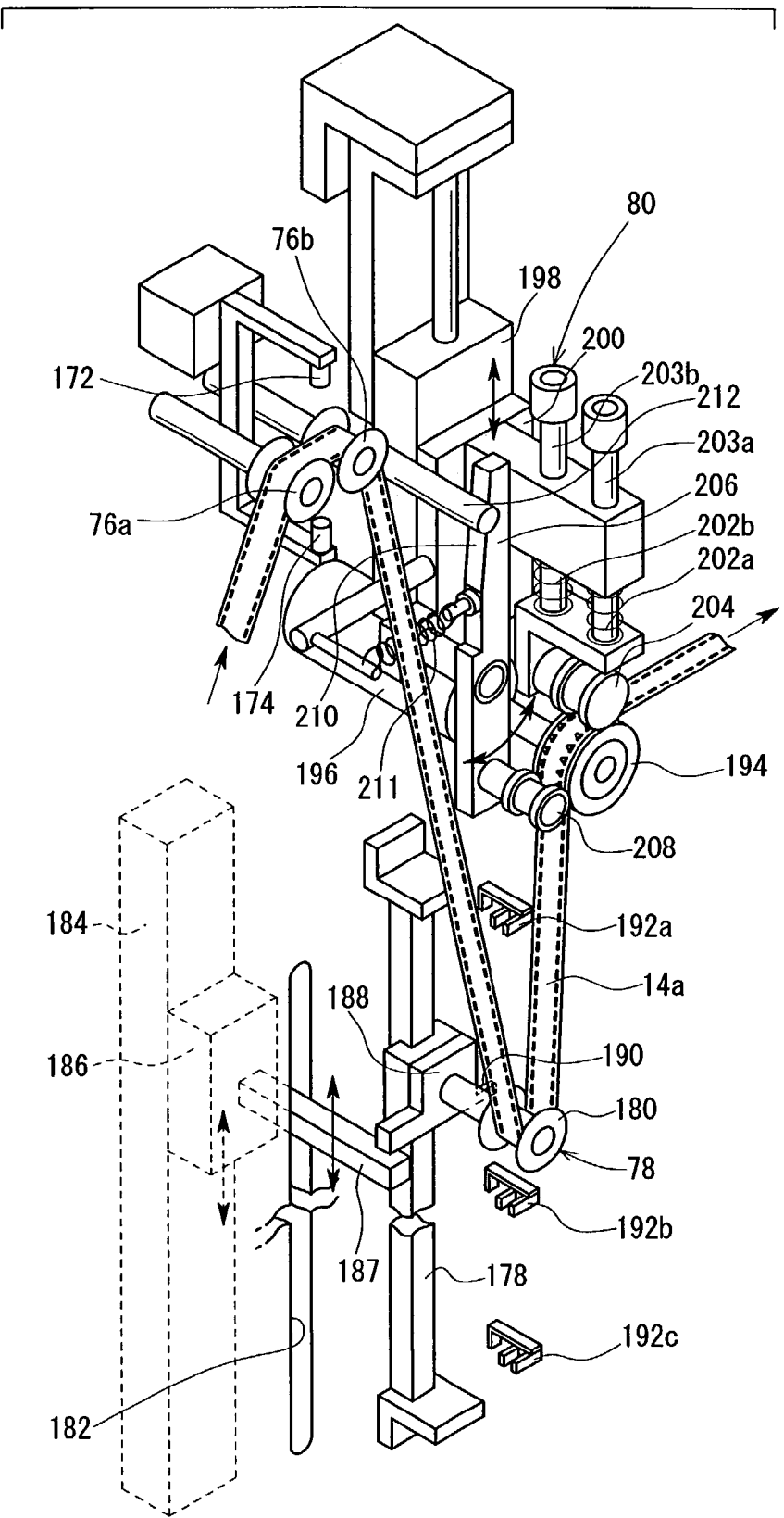
FIG. 7 is a perspective view of a feed mechanism according to the first embodiment.
Figure 8:
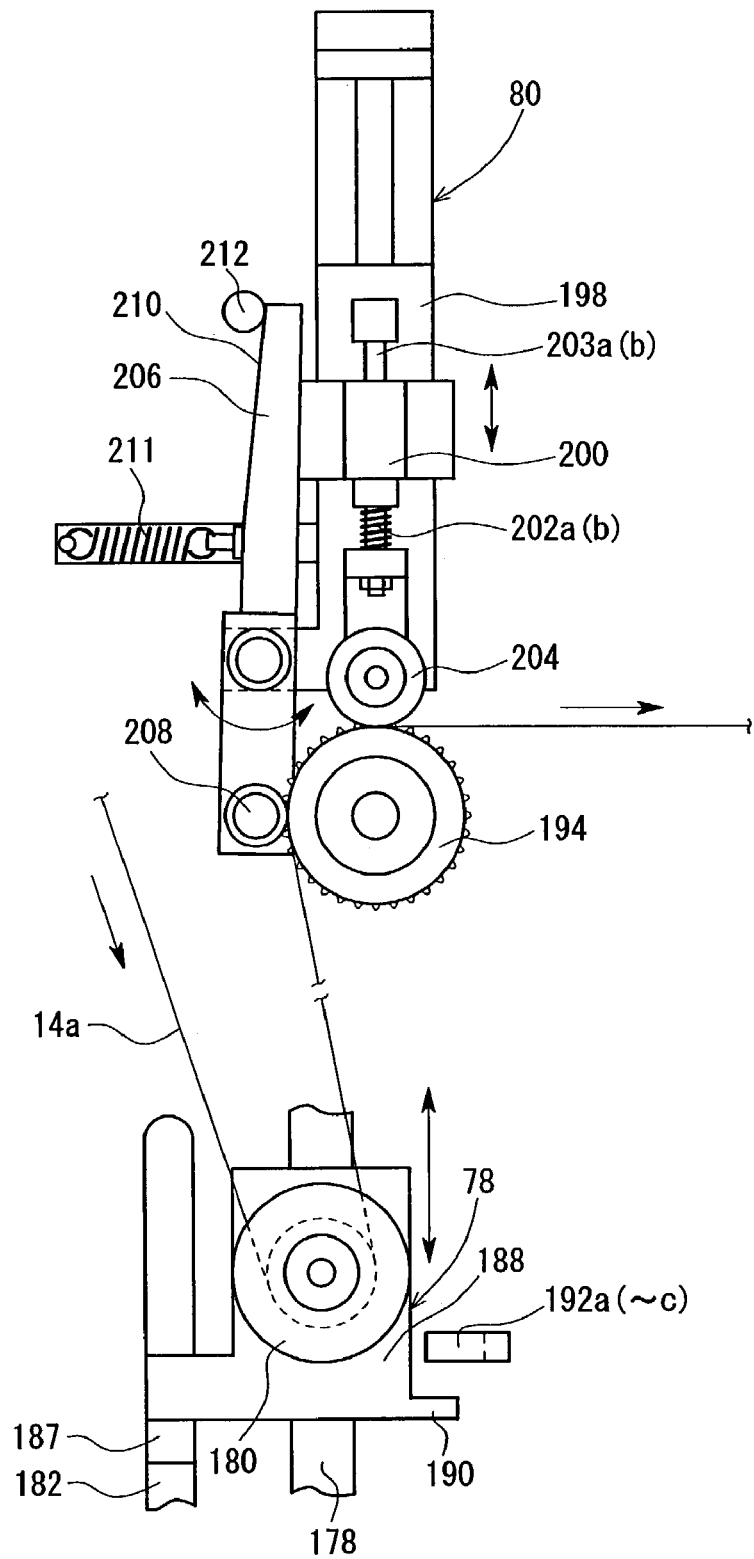
FIG. 8 is a side elevational view of the feed mechanism according to the first embodiment.

FIGS. 7 and 8 show the rollers 76a, 76b disposed between the supply unit 32 and the winding unit 34, and the buffer mechanism 78 and the feed mechanism 80 in the winding unit 34.

The rollers 76a, 76b are juxtaposed in an upper region between the supply unit 32 and the winding unit 34. A light-emitting unit 172 and a light-detecting unit 174 which are vertically spaced from each other are disposed between the rollers 76a, 76b for detecting perforations 16 in one of the opposite sides of the film strip 14a.

The buffer mechanism 78 has a dancer roller 180 vertically movable along a vertical guide rail 178 mounted on the partition wall 130 of the winding unit 34. The partition wall 130 has a slot 182 defined therein parallel to the guide rail 178 and supports a cylinder 184 disposed on a rear surface thereof. The cylinder 184 has a movable body 186 connected to a rod 187 which projects through the slot 182 and supports on its upper surface a base 188 on which the dancer roller 180 is rotatably supported. A dog 190 is joined to a side of the base 188. When the dog 190 passes through photointerrupters 192a through 192c which are disposed respectively in upper, middle, and lower positions on the partition wall 130, the dancer roller 180 is positionally detected as having reaching three positions which correspond to the respective photointerrupters 192a through 192c.

The feed mechanism 80 has a sprocket 194 positioned above the dancer roller 180. The sprocket 194 engages in the perforations 16 in the film strip 14a and is driven by a feed motor 196 mounted on the rear surface of the partition wall 130. Above the sprocket 194, there is disposed a roller 204 coupled to a movable body 200 of a cylinder 198 by rods 203a, 203b with respective springs 202a, 202b disposed therearound. A lever 206 has an intermediate portion pivotally supported on the movable body 200. The lever 206 has a lower end supporting a rotatable roller 208 held against a side of the sprocket 194 with the film strip 14a interposed therebetween. The lever 206 has a tapered surface 210 on its upper side which is normally pulled by a spring 211 to keep the tapered surface 210 in sliding contact with a pin 212 mounted on the partition wall 130. As the movable body 200 is moved vertically by the cylinder 198, the lever 206 is angularly moved about its pivoted portion to move the roller 208 toward and away from the sprocket 194.

Figure 9:
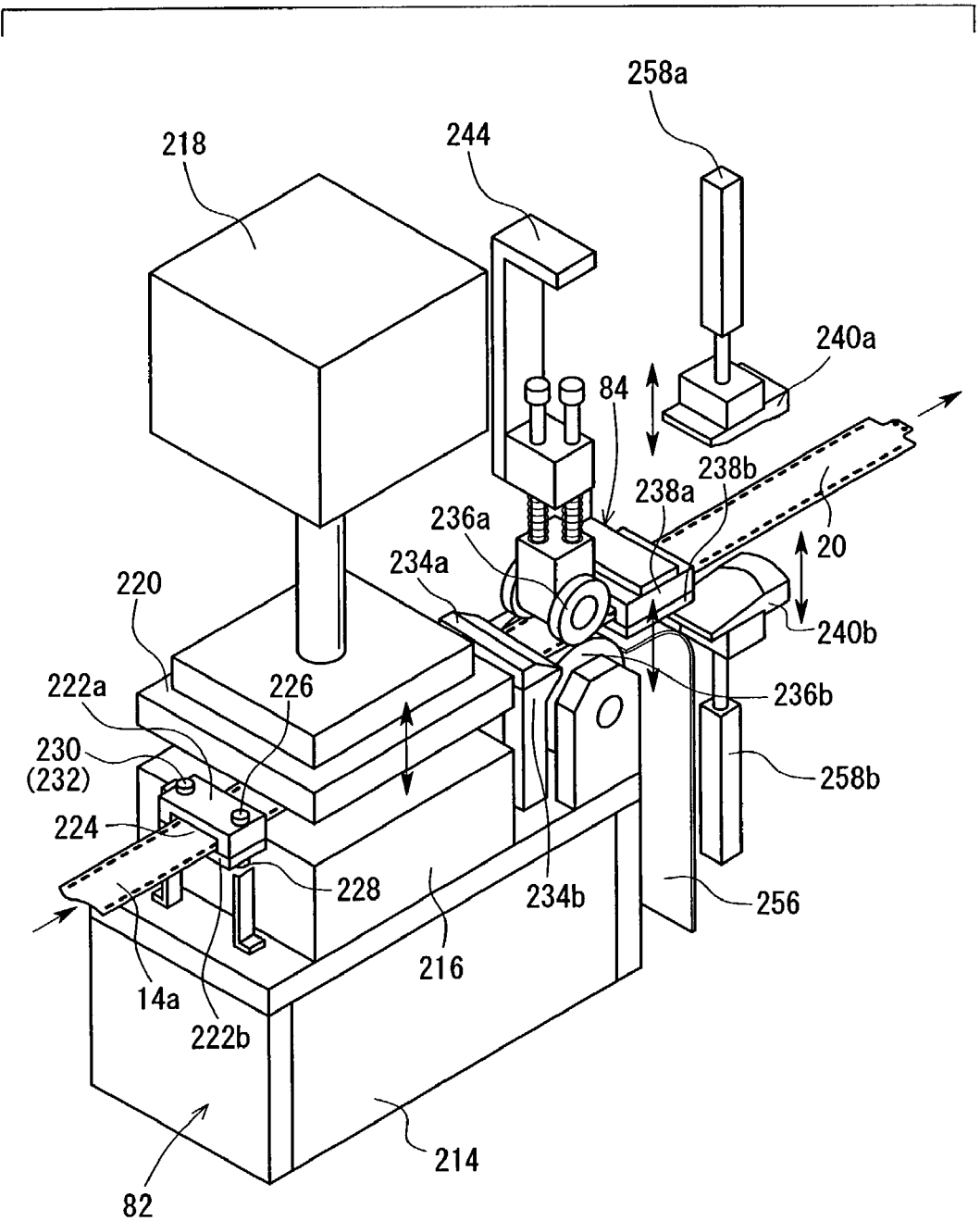
FIG. 9 is a perspective view of a cutting mechanism and an inserting mechanism according to the first embodiment.
Figure 10:
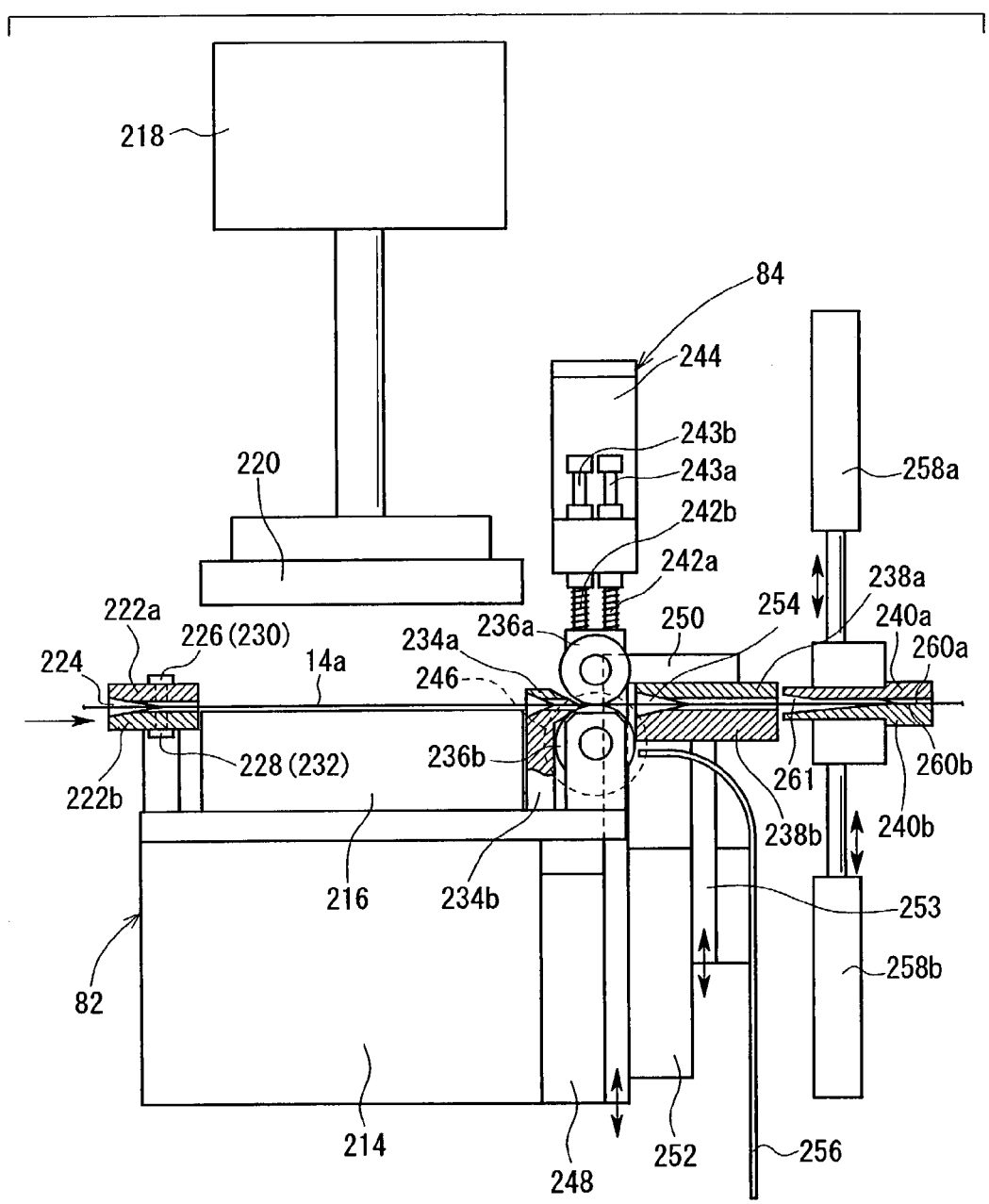
FIG. 10 is a front elevational view, partly in cross section, of the cutting mechanism and the inserting mechanism according to the first embodiment.

FIGS. 9 and 10 show the cutting mechanism 82 and the inserting mechanism 84 in the winding unit 34.

Figure 42:
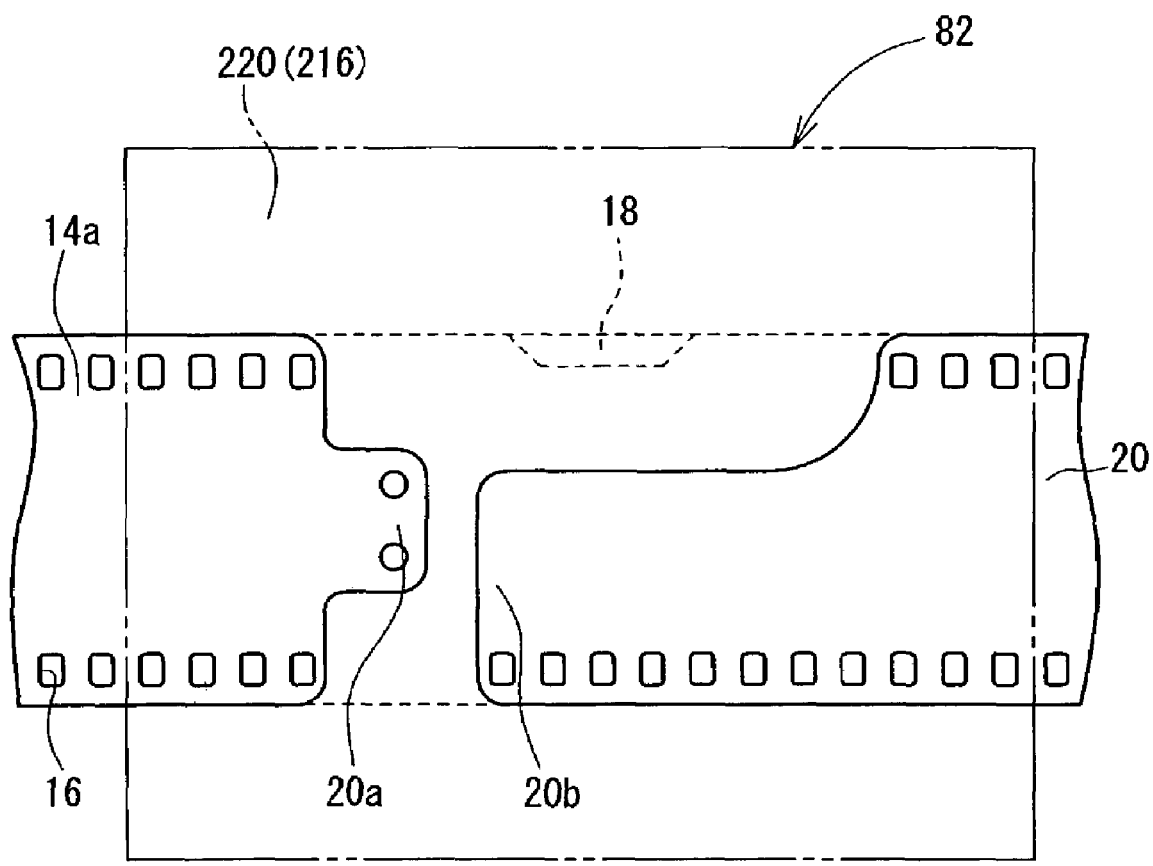
FIG. 42 is a plan view of a film cut off a film strip by the cutting mechanism according to the first embodiment.

The cutting mechanism 82 comprises a lower blade 216 supported on a base 214 and an upper blade 220 disposed above the lower blade 216 and vertically movable toward and away from the lower blade 216 by a cylinder 218. When the upper blade 220 is lowered against the lower blade 216, they cut the film strip 14a, forming a leading end 20a of a fixed-length film 20 and a trailing end 20b of a preceding fixed-length film 20 which are spaced from each other across a notch 18 (see FIGS. 2 and 42).

A pair of upper and lower guides 222a, 222b is disposed upstream of the cutting mechanism 82 to which the film strip 14a is supplied. The upper and lower guides 222a, 222b define therebetween a slit 224 having a spreading upstream portion for the insertion of the film strip 14a therein. A light-emitting unit 226 and a light-detecting unit 228 which are vertically spaced from each other are disposed on one side of the guides 222a, 222b for detecting perforations 16 in the film strip 14a. A light-emitting unit 230 and a light-detecting unit 232 which are vertically spaced from each other are disposed on the other side of the guides 222a, 222b for detecting notches 18 in the film strip 14a.

Downstream of the cutting mechanism 82, there is disposed a pair of upper and lower guides 234a, 234b for the insertion therein of the film strip 14a or the fixed-length film 20, followed by the inserting mechanism 84. The inserting mechanism 84 has upper and lower insertion rollers 236a, 236b for gripping and feeding the film strip 14a or the fixed-length film 20, first guides 238a, 238b, and second guides 240a, 240b.

The upper insertion roller 236a is vertically movably supported on a base 244 by rods 243a, 243b with respective springs 242a, 242b disposed therearound. The lower insertion roller 236b is supported on the base 214 and rotatable by a feed motor 246.

The first guides 238a, 283b are supported by a cylinder 248 fixed to the base 214 of the cutting mechanism 82. To the cylinder 248, there is coupled a movable bracket 250 fixed to the upper first guide 238a. The lower first guide 238b is coupled by a movable bracket 253 to a cylinder 252 which is fixed to the movable bracket 250. The first guides 238a, 238b are movable toward and away from each other by the cylinder 252. When the first guides 238a, 238b are moved toward each other, they define therebetween a slit 254 having a spreading upstream portion for the insertion of the fixed-length film 20 therein.

A guide plate 256 having an upper portion curved toward the insertion rollers 236a, 236b is fixed to the movable bracket 253 below the first guide 238b. The guide plate 256 serves to discharge downwardly a portion of a film strip 14a to be discarded when the guide plate 256 is lifted a given distance by the cylinder 248 through the movable bracket 250.

The second guides 240a, 240b are movable toward and away from each other by respective cylinders 258a, 258b. The upper second guide 240a has a recess 260a defined in a lower surface thereof, and the lower second guide 240b has a land 260b disposed on an upper surface thereof in alignment with the recess 260a. The recess 260a and the land 260b define a slit 261 between the second guides 240a, 240b for bending the leading end of the film strip 14a inserted therein to make it rigid when the second guides 240a, 240b are moved toward each other.

Figure 11:
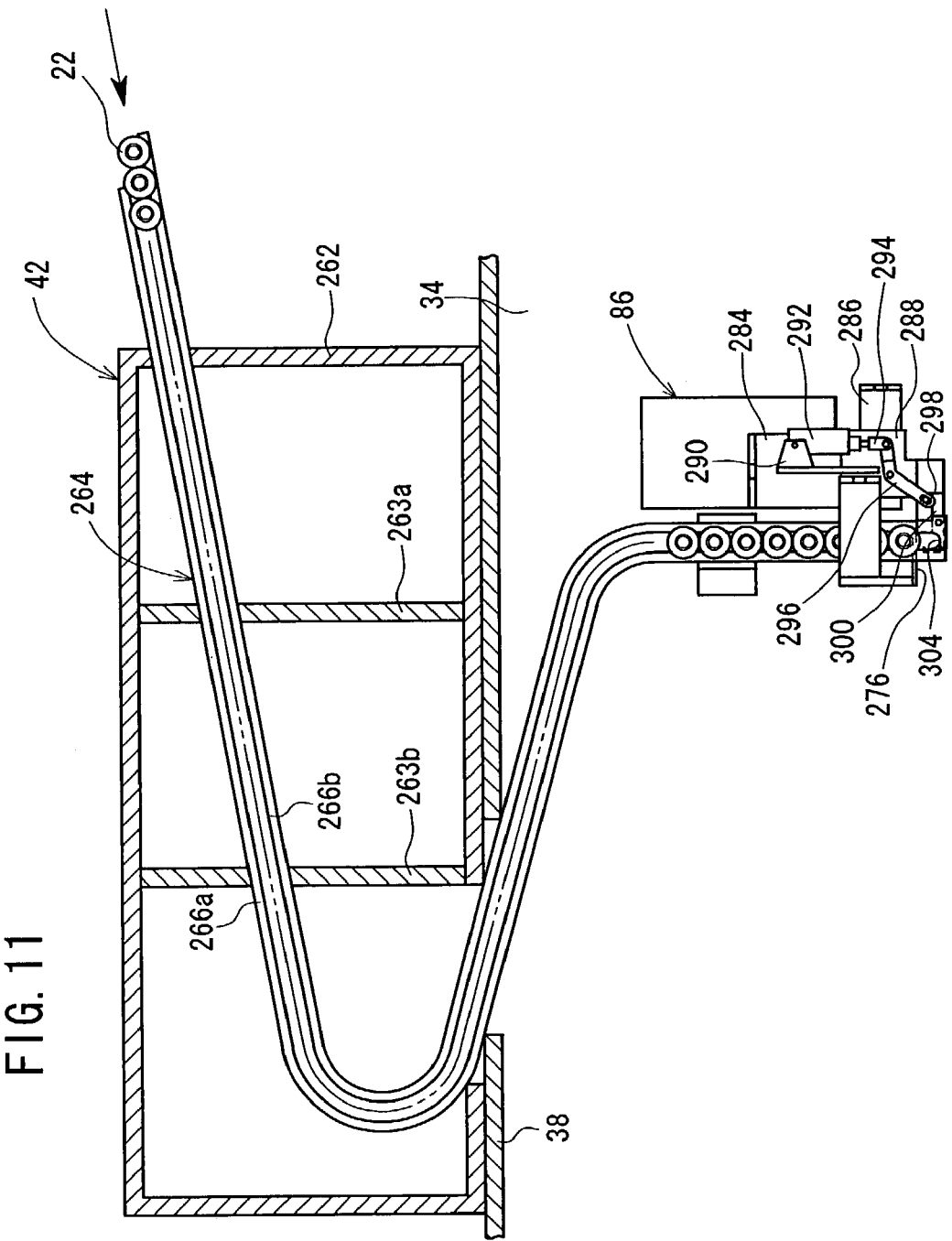
FIG. 11 is a side elevational view, partly in cross section, of a spool delivery device and a spool supply mechanism according to the first embodiment.

FIG. 11 shows the spool delivery device 42 disposed above the winding unit 34 and the spool supply mechanism 86 for supplying the spool 22 to the winding mechanism 88.

The spool delivery device 42 has a light-shielding case 262 housing therein a chute 264 connected to the spool feeder 44. The chute 264 serves to deliver spools 22 with flanges 22a, 22b thereof engaging a pair of guide plates 266a, 266b. The guide plates 266a, 266b has a curved shape extending from the spool delivery device 42 to the winding unit 34. Therefore, no external light travels from the spool feeder 44 into the winding unit 34. Two partition plates 263a, 263b are disposed in the light-shielding case 262 and divides the interior of the light-shielding case 262 for a better light-shielding capability.

Figure 12:
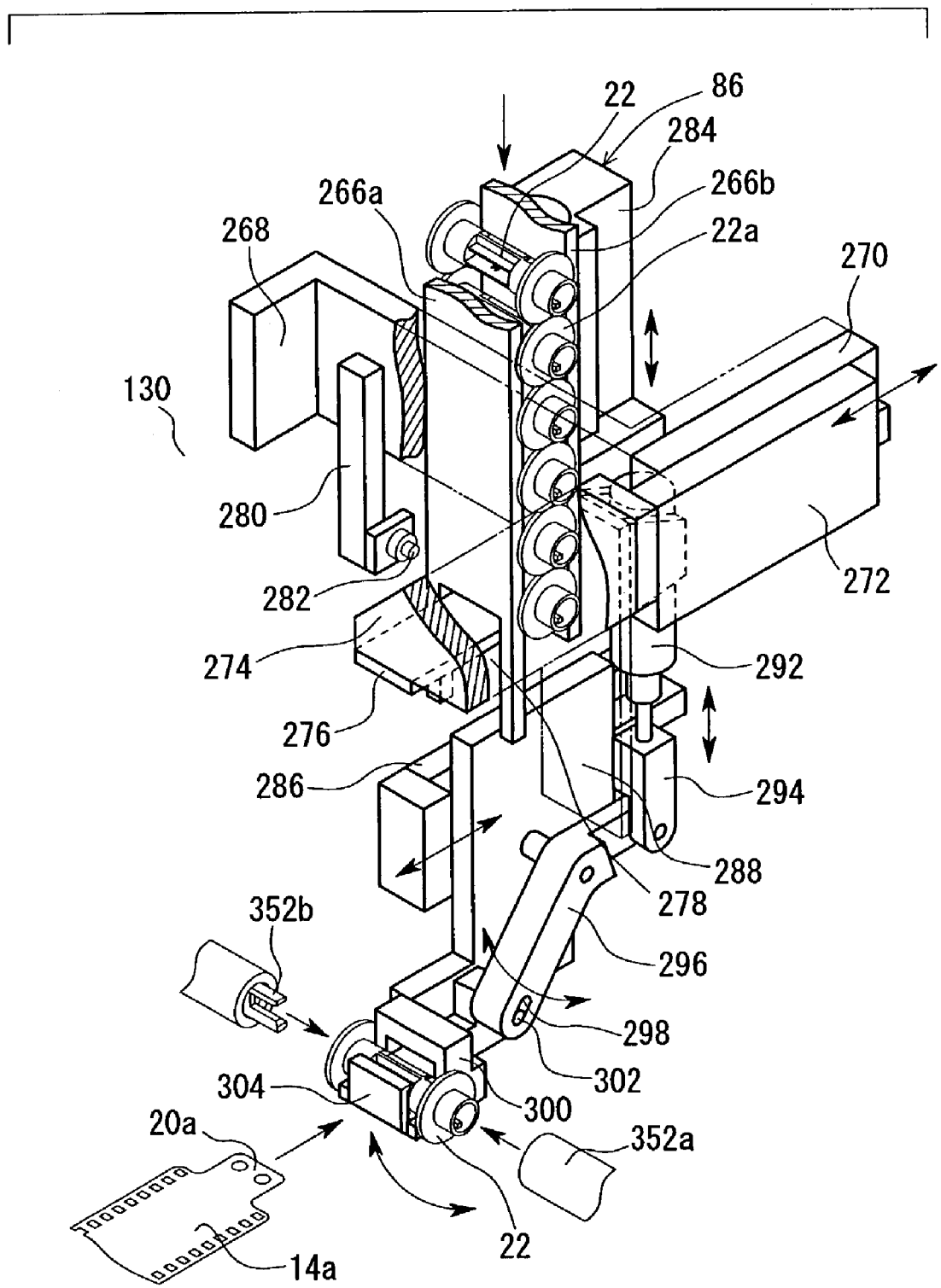
FIG. 12 is a perspective view, partly cut away, of the spool supply mechanism according to the first embodiment.
Figure 13:
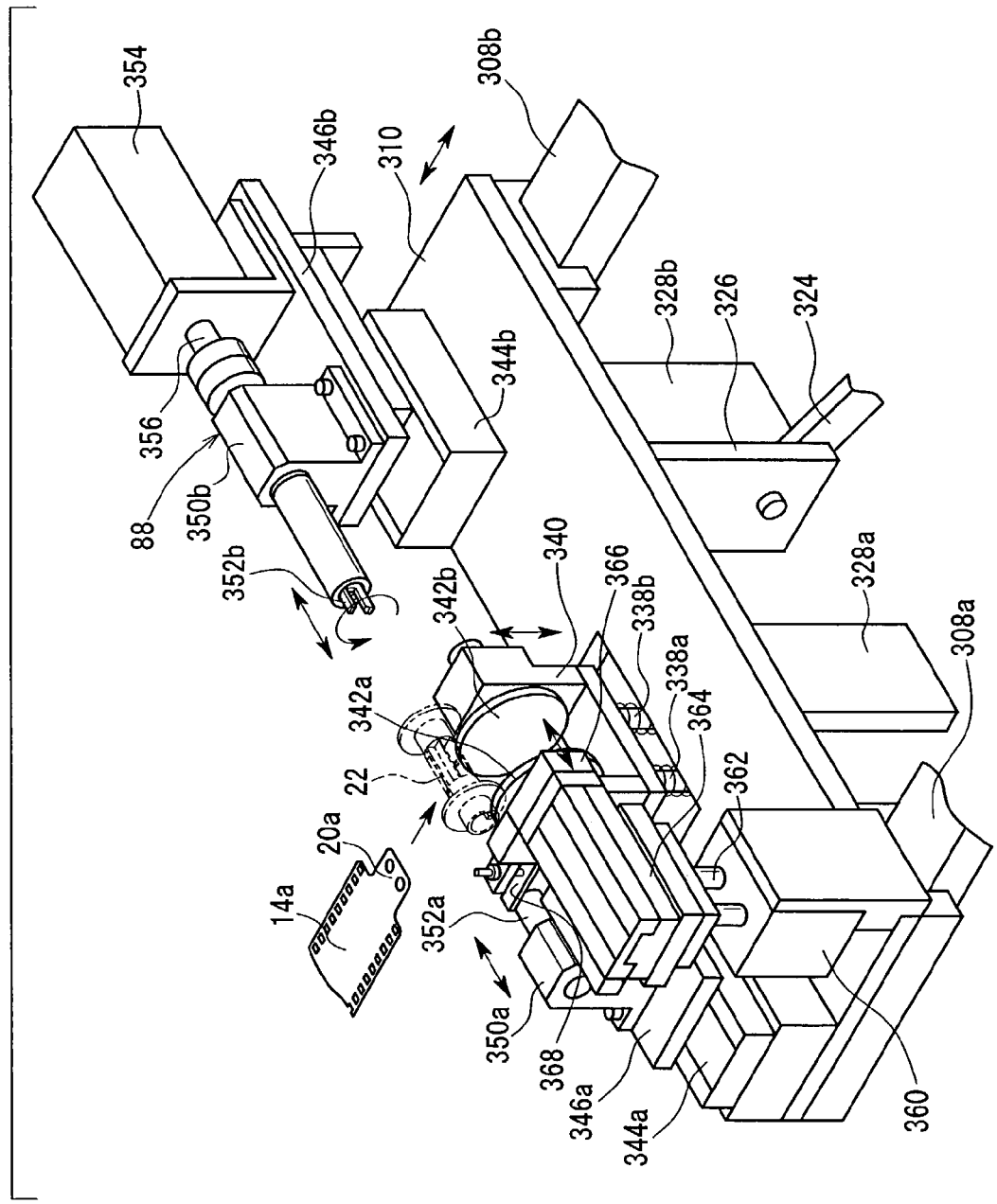
FIG. 13 is a perspective view of a winding mechanism according to the first embodiment.

The chute 264 has a lower end disposed in the winding unit 34 and connected to the spool supply mechanism 86. As shown in FIG. 12, the spool supply mechanism 86 has a cylinder 270 fixedly mounted on the partition wall 130 by a bracket 268. The cylinder 270 has a movable plate 272 to which a spool extracting plate 276 is connected by a bracket 274. The spool extracting plate 276 is movable toward and away from the guide plate 266b through a groove 278 that is defined in the lower end of the guide plate 266a. A sensor 282 supported by a bracket 280 is disposed on one side of the spool extracting plate 276. The sensor 282 serves to detect whether there is a spool 22 at the lower end of the chute 264 or not.

Figure 44:
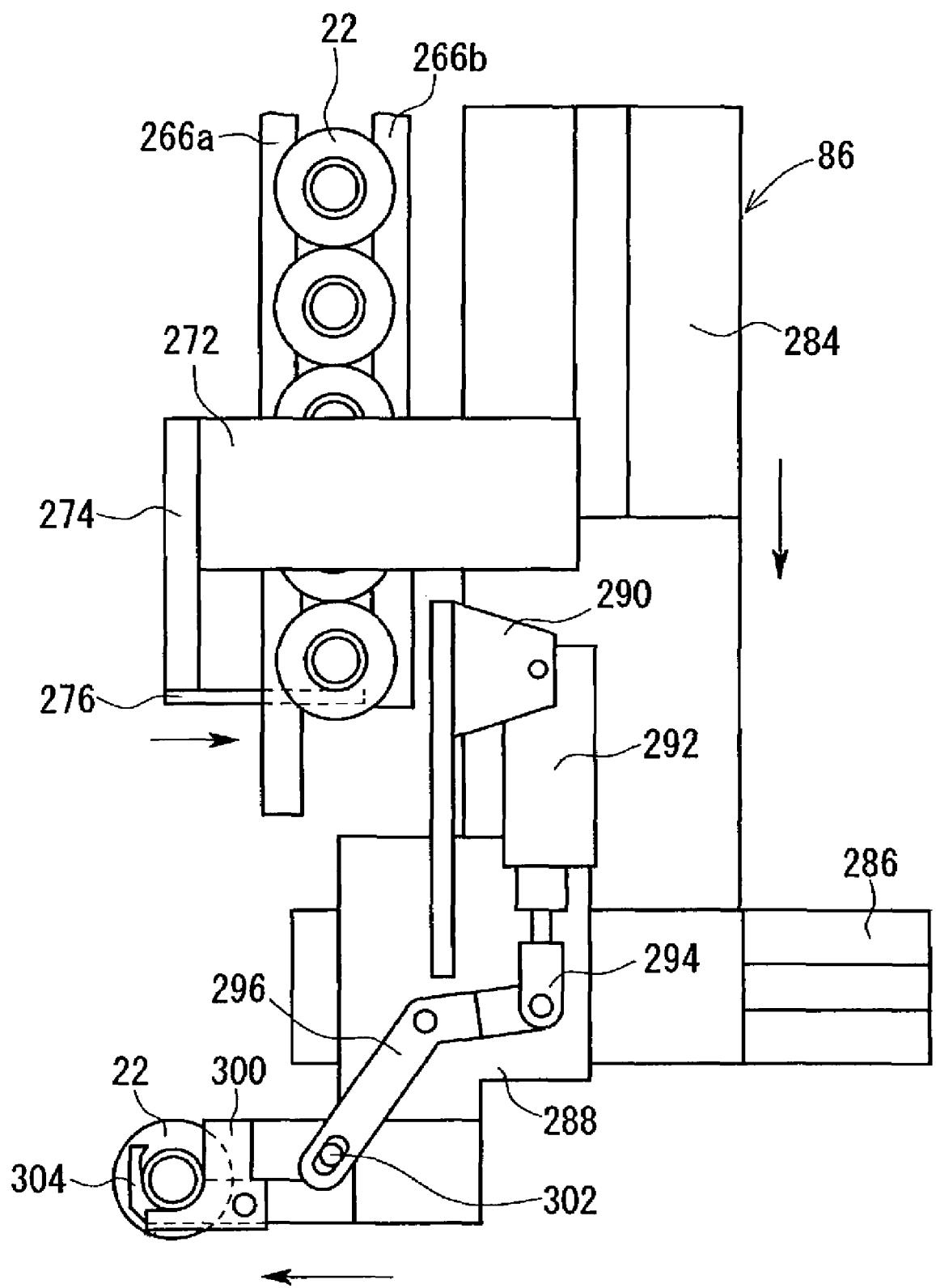
FIG. 44 is an elevational view illustrative of the manner in which the spool supply mechanism according to the first embodiment operates.
Figure 45:
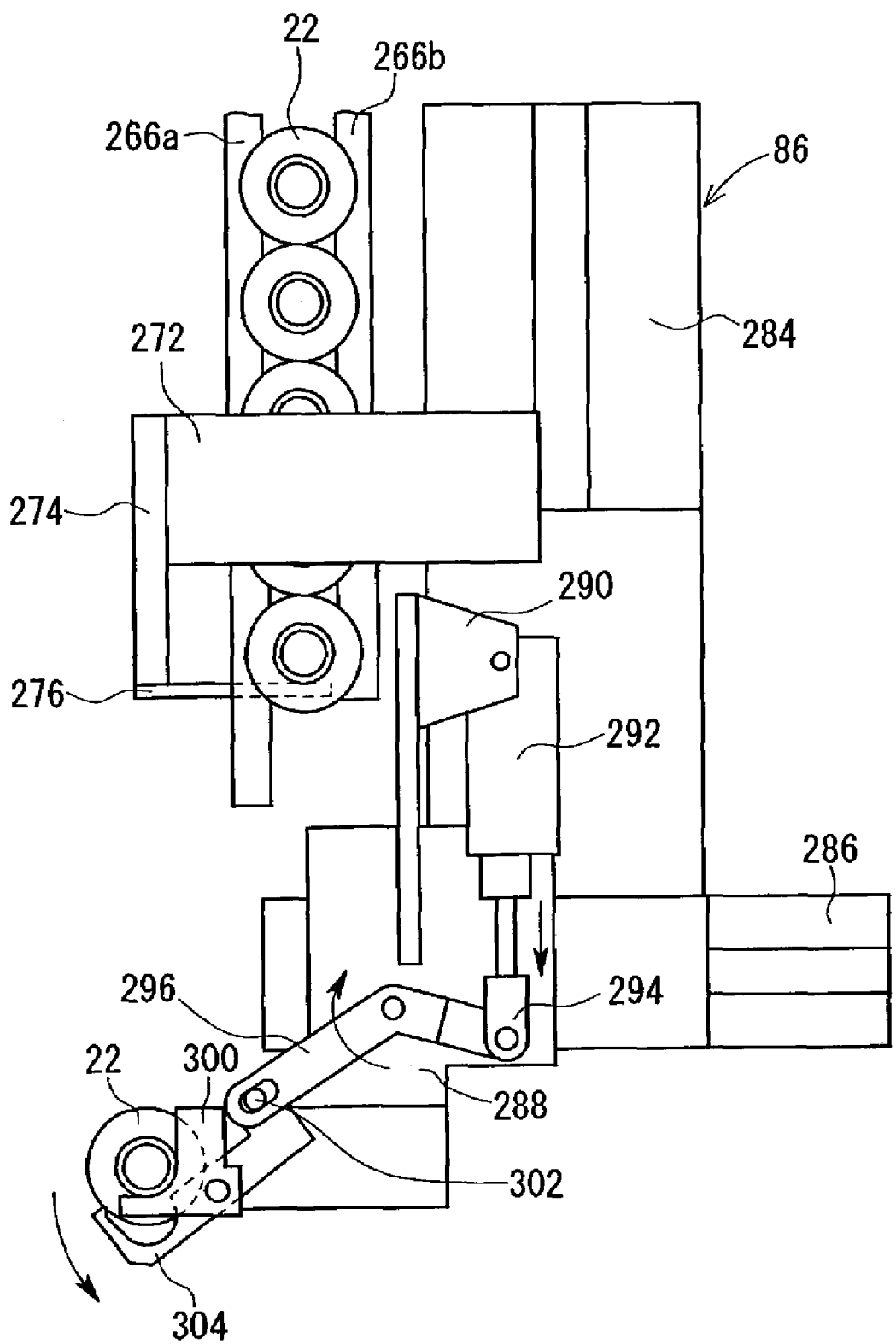
FIG. 45 is an elevational view illustrative of the manner in which the spool supply mechanism according to the first embodiment operates.

The spool supply mechanism 86 also has a first cylinder 284, a second cylinder 286 vertically movable by the first cylinder 284, a movable plate 288 horizontally movable by the second cylinder 286, and a third cylinder 292 pivotally supported on the movable plate 288 by a bracket 290. The third cylinder 292 has a rod 294 on which an end of a link 296 is pivotally supported. The link 296 has a central portion pivotally supported on the movable plate 288 and an oblong hole 298 defined in the other end thereof. A spool rest 304, which is centrally pivotally supported on a spool receiver 300, has a semi-arcuate surface at one end and is connected at an opposite end thereof to a pin 302 which engages in the oblong hole 298 (see FIGS. 43 through 45). The spool rest 304 is disposed at the lower end of the movable plate 288.

FIGS. 13 through 16 show the winding mechanism 88 disposed underneath the spool supply mechanism 86.

The winding mechanism 88 has two spaced support plates 306a, 306b fixed to the partition wall 130, guide rails 308a, 308b mounted on and extending between the support plates 306a, 306b, and a base 310 movable along the guide rails 308a, 308b between the inserting mechanism 84 and the loading mechanism 96.

A cylinder 314 (moving mechanism) having an end pivotally supported on a bearing member 312 that is fixed to the partition wall 130 is disposed beneath the base 310. The cylinder 314 has a rod 316 projecting from the other end thereof, and a link 318 has an end pivotally supported on the distal end of the rod 316. The other end of the link 318 is fixed to a support shaft 322 rotatably supported on brackets 320 fixedly mounted on the support plate 306b. A link 324 has an end fixed to the support shaft 322 and an opposite end pivotally supported on a bracket 326 which is fixedly mounted on a lower surface of the base 310. Therefore, the base 310 can be moved along the guide rails 308a, 308b when the cylinder 314 is actuated.

Figure 16:
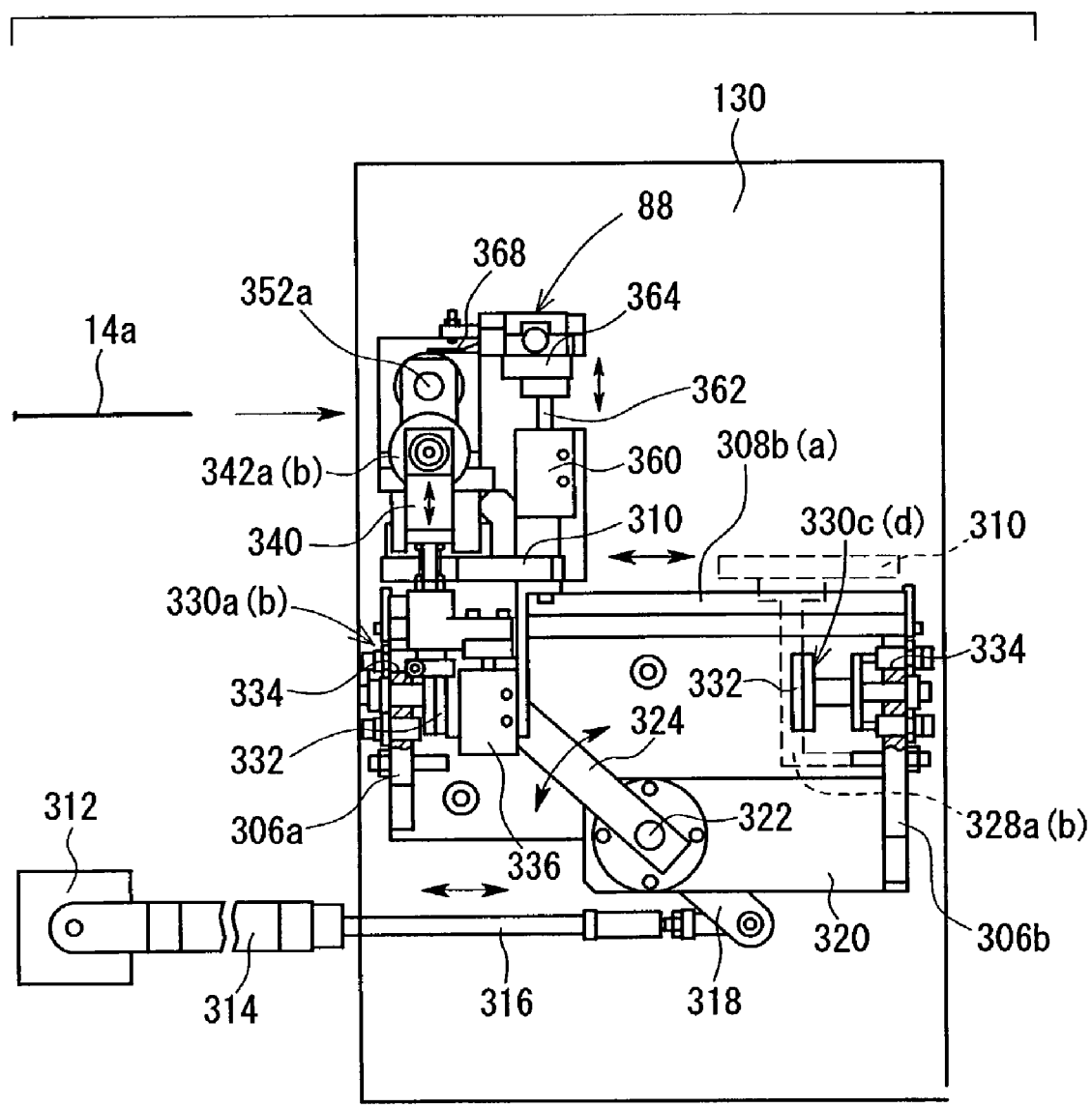
FIG. 16 is a side elevational view, partly in cross section, of the winding mechanism according to the first embodiment.

Two spaced positioning plates 328a, 328b are mounted on the lower surface of the base 310. Shock absorbing mechanisms 330a through 330d are mounted on the support plates 306a, 306b respectively in alignment with the positioning plates 328a, 328b. As shown in FIG. 16, the shock absorbing mechanisms 330a through 330d have respective shock absorbing plates 332 engageable by the positioning plates 328a, 328b and respective shock absorbers 334 which support the shock absorbing plates 332 while allowing them to be displaced toward the support plates 306a, 306b. The shock absorbing plates 332 serve to absorb shocks produced when they are hit by the positioning plates 328a, 328b, and are made of vibroisolating rubber such as "HANENITE" (registered trademark, Naigai Rubber Industry Co., Ltd.).

A cylinder 336 is secured between the positioning plate 328a and the bracket 326, and has two rods 338a, 338b projecting upwardly therefrom and supporting a bracket 340 disposed above the base 310 with respective springs 339a, 339b acting thereon. Two support disks 342a, 342b are rotatably supported on the bracket 340 for supporting the opposite perforated edges of the film strip 14a wound around the spool 22. The support disks 342a, 342b are vertically movable under the resiliency of the springs 339a, 339b, so that they can be progressively lowered as the diameter of the coil of the film strip 14a wound around the spool 22 increases.

Cylinders 344a, 344b are mounted on the base 310 on opposite sides of the bracket 340. The cylinders 344a, 344b have respective movable tables 346a, 346b with respective bearing members 350a, 350b fixed thereto. Engaging arms 352a, 352b for engaging the opposite ends of the spool 22 are rotatably supported respectively by the bearing members 350a, 350b. A winding motor 354 for winding the film strip 14a around the spool 22 is fixedly mounted on the movable table 346b and has a drive shaft 356 coaxially coupled to the engaging arm 352b. Reflective sensors 358a, 358b for inspecting the respective flanges 22a, 22b of the spool 22 are disposed on respective sides of the bearing members 350a, 350b.

A first cylinder 360 is mounted on the base 310 and has two upwardly extending rods 362 supporting on their upper ends a second cylinder 364 fixed thereto adjacent to the engaging arm 352a. The second cylinder 364 has a movable block 366 supporting a phase adjusting plate 368 thereon. The phase adjusting plate 368 engages a step 22c (see FIG. 2) of the spool 22 to adjust the phase, i.e., angular position, of a groove 22d of the spool 22 with respect to the leading end 20a of the film strip 14a.

Structural details of the cartridge delivery device 46 disposed above the assembling unit 36, the cartridge supply mechanism 90 for supplying one-open-sided cartridge cases 28 to the delivery mechanism 94, and the delivery mechanism 94 will be described below.

Figure 17:
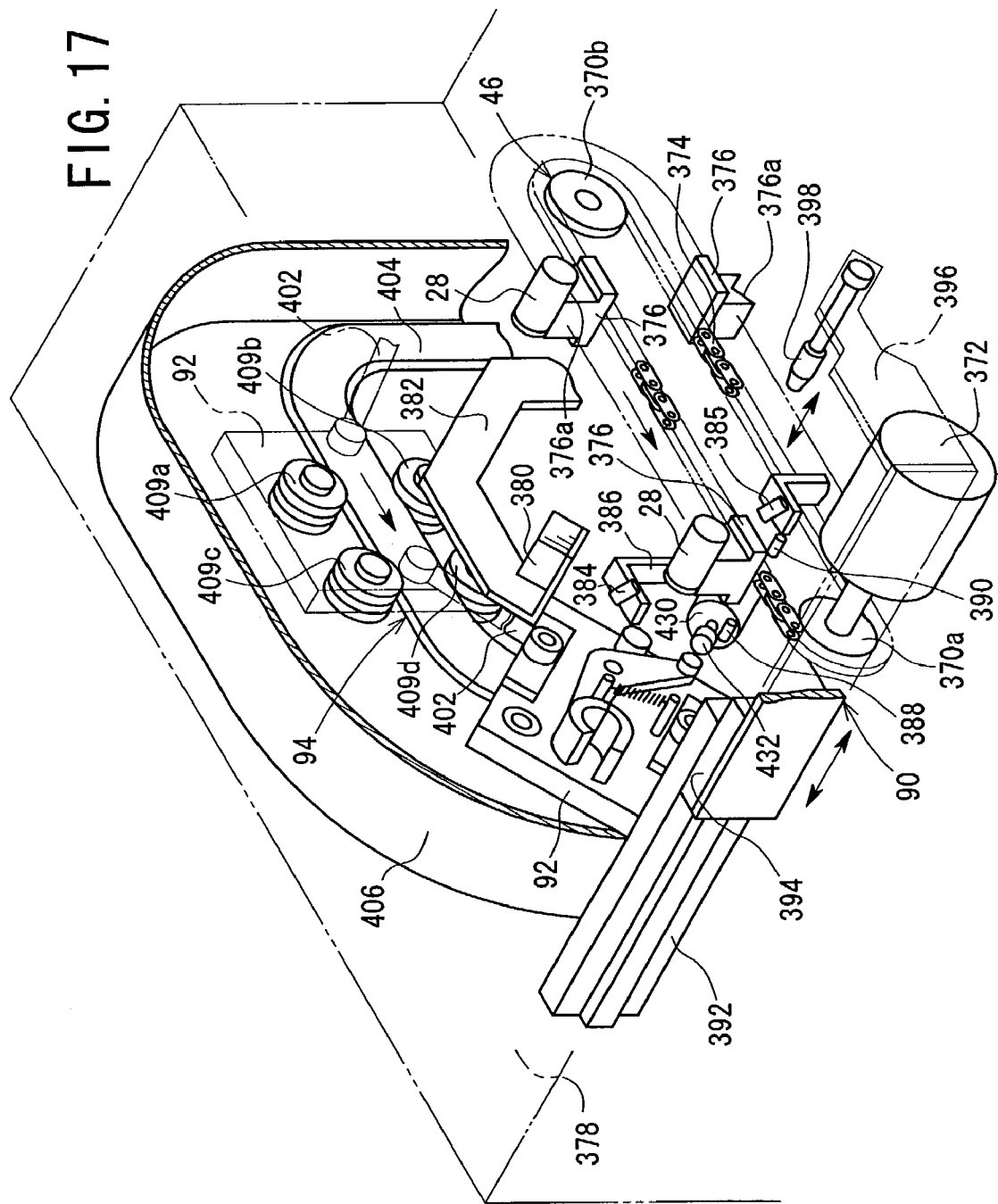
FIG. 17 is a perspective view of a cartridge feeder and a cartridge supply mechanism according to the first embodiment.

FIG. 17 shows the cartridge delivery device 46 and the cartridge supply mechanism 90 in detail.

As shown in FIG. 17, the cartridge delivery device 46 has a delivery motor 372 for rotating a sprocket 370a, a chain belt 374 trained around the sprocket 370a and a sprocket 370b, and a plurality of pallets 376 fixed to the chain belt 374 at given spaced intervals. Each of the pallets 376 has a V-shaped seat 376a for holding a one-open-sided cartridge 28 thereon. A magnet is embedded in the surface of the V-shaped seat 376a for attracting a straight fin 28a (see FIG. 2), which provides a film outlet, of the one-open-sided cartridge 28. As shown in FIG. 2, the one-open-sided cartridge 28 also has a flange 28b facing, but spaced from, the straight fin 28a, and a light-shielding ribbon 28c mounted one each of the straight fin 28a and the flange 28b.

The cartridge supply mechanism 90 has a light-shielding case 378 which houses therein near its inlet a bar-code reader 380 supported by a bracket 382 for reading a bar code 28d indicative of a film type, etc. which is recorded on an outer circumferential surface of the one-open-sided cartridge 28. A light-emitting unit 384 and a light-detecting unit 385 for detecting whether there is a one-open-sided cartridge 28 or not are supported on a bracket 386 on a side of the chain belt 374 which is disposed in the cartridge supply mechanism 90. A light-emitting unit 388 and a light-detecting unit 390 for detecting a pallet 376 and positioning a one-open-sided cartridge 28 with respect to the cartridge supply mechanism 90 are disposed on both sides of the chain belt 374.

The cartridge supply mechanism 90 comprises a cylinder 392 having a movable plate 394, and a substantially cylindrical insert 398 coupled to the movable plate 394 by an arm 396. When the cylinder 392 is actuated, the insert 398 is inserted into the opening of the one-open-sided cartridge 28 carried by a pallet 376, and supplies the one-open-sided cartridge 28 to the delivery mechanism 94.

The delivery mechanism 94 has a plurality of pallets 92 interconnected by links 402. The pallets 92 are circulated along a substantially elliptical guide rail 404 which is disposed in the light-shielding case 378 and the assembling unit 36. The light-shielding case 378 disposed above the assembling unit 36 has a light-shielding passage 406 surrounding the guide rail 404 for an increased light-shielding capability.

Figure 18:
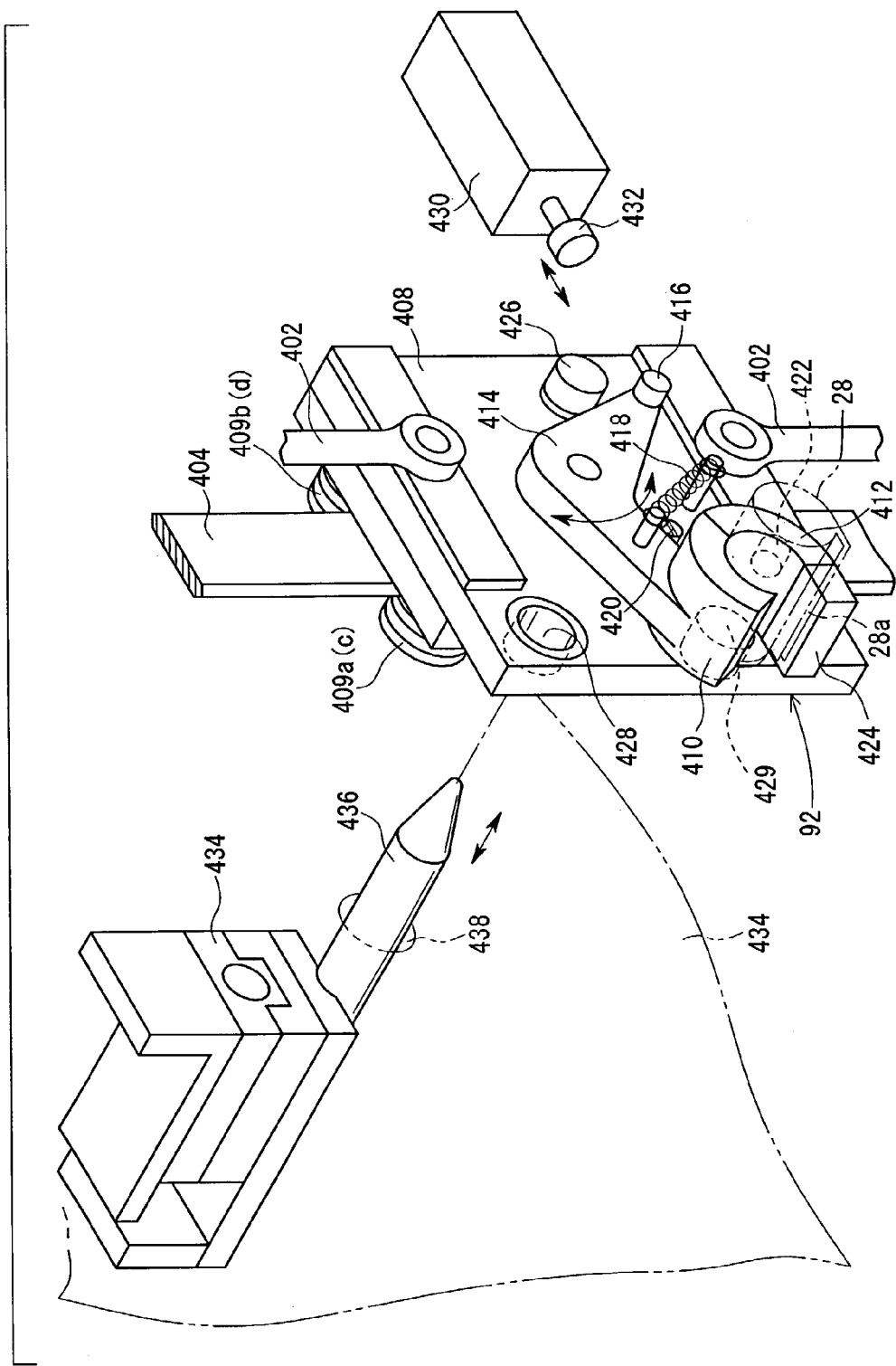
FIG. 18 is a perspective view of a pallet and a positioning mechanism therefor in a delivery mechanism according to the first embodiment.

FIG. 18 shows each of the pallets 92 in detail. As shown in FIG. 18, the pallet 92 has a base 408 supporting on a rear surface thereof a plurality of rotatable rollers 409a through 409d for moving the pallet 92 along the guide rail 404. The base 408 also supports on its front surface a movable holder 410 and a fixed holder 412 for holding a one-open-sided cartridge 28 or a wound-film-loaded cartridge 12. The movable holder 410 is integrally formed with one end of an arm 414 which is bent at its central region. The arm 414 has its bent central region pivotally supported on the base 408 and supports on its other end a cam follower 416 for angularly moving the movable holder 410. The length of the arm 414 which lies between the movable holder 410 and the pivoted central region is connected to the base 408 by a spring 418 which normally biases the movable holder 410 toward the fixed holder 412.

An eccentric shaft 420 is threaded into the base 408 near the bent region of the arm 414 for adjusting the relative positional relationship of the movable holder 410 with respect to the fixed holder 412. A magnet 422 for attracting the one-open-sided cartridge 28 is embedded in the fixed holder 412. The fixed holder 412 has on its distal end an integral rest 424 for receiving thereon the straight fin 28a of the one-open-sided cartridge 28.

A cam follower 426 for positioning the pallet 92 is mounted on the base 408 in the vicinity of the other end of the arm 414. The base 408 has a positioning hole 428 defined therein near the movable holder 410 and extending therethrough to the rear surface thereof. The base 408 also has a hole 429 defined therein which is positioned centrally in a holder that is jointly made up of the movable holder 410 and the fixed holder 412. The hole 429 serves to receive therein a spool positioning pin of the loading mechanism 96 to be described later on.

Cylinders 430 for opening the movable holder 410 on the pallet 92 to a certain angular extent away from the fixed holder 412 are disposed in respective areas corresponding to the cartridge supply mechanism 90, the loading mechanism 96 in the assembling unit 36, the inspecting mechanism 106, and the discharge mechanism 105. Each of the cylinders 430 has a rod 432 whose distal end pushes the cam follower 416 to turn the arm 414 for opening the movable holder 410, i.e., angularly moving the movable holder 410 away from the fixed holder 412. Positioning pins 436 displaceable by cylinders 434 are disposed in respective areas corresponding to the cartridge supply mechanism 90, the loading mechanism 96 in the assembling unit 36, the cap supply mechanism 100, the crimping mechanism 104, the inspecting mechanism 106, and the discharge mechanism 105. When each of the positioning pins 436 is inserted through a hole 438 defined in the partition wall 130 into a hole 428 defined in the base 408, it positions the pallet 92 in place.

Figure 19:
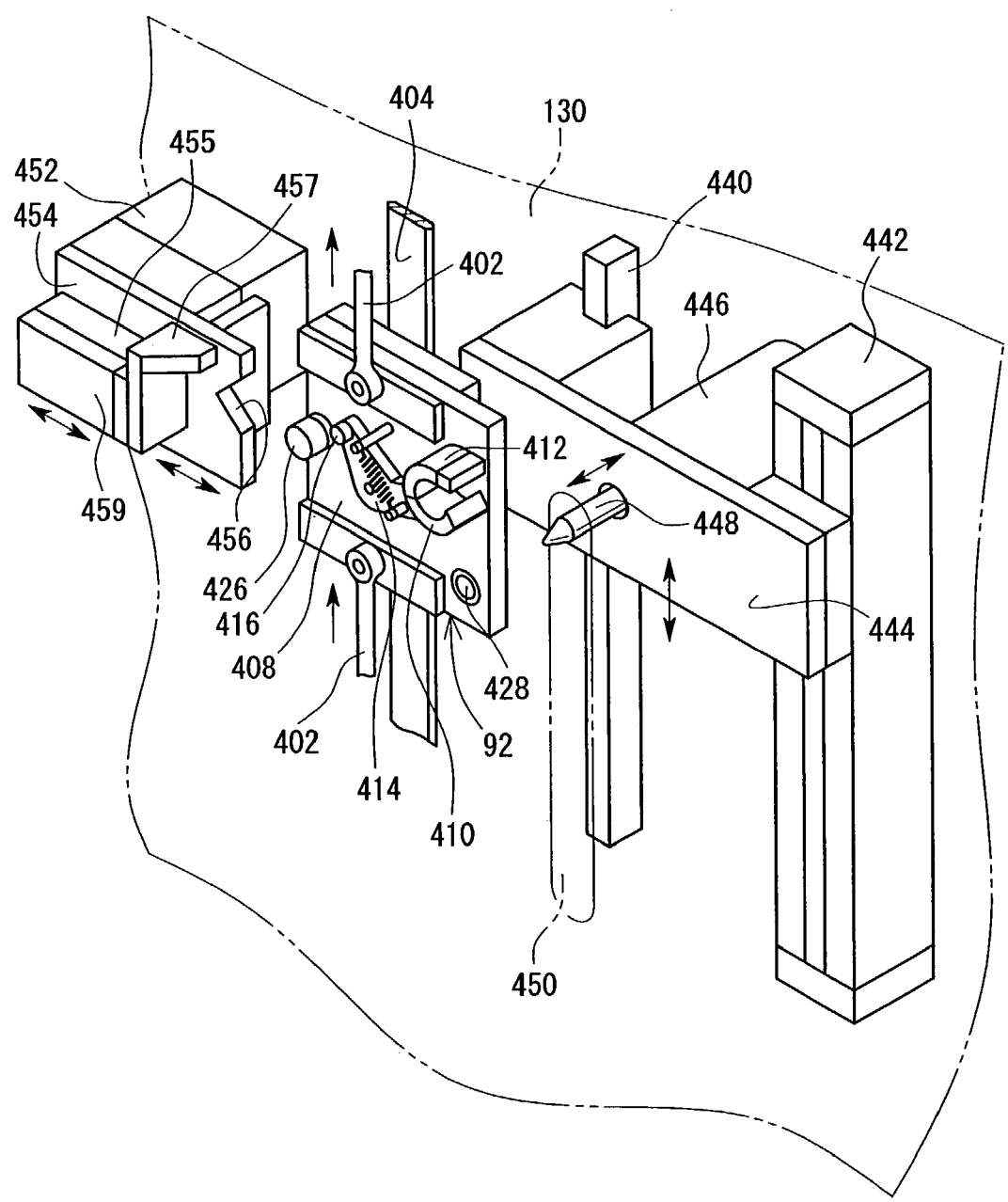
FIG. 19 is a perspective view of a pallet and a drive mechanism therefor in the delivery mechanism according to the first embodiment.

A drive mechanism and a positioning mechanism for the pallet 92, as shown in FIG. 19, are disposed in a region corresponding to the removing mechanism 108 in the assembling unit 36. As shown in FIG. 19, the drive mechanism comprises a movable plate 444 which is movable by a cylinder 442 while being guided by a guide rail 440, and an engaging pin 448 axially movable by a cylinder 446 mounted on the movable plate 444. The engaging pin 448 is movable into and out of a slot 450 defined in the partition wall 130 and is also vertically movable along the slot 450. The engaging pin 448, when moved into the slot 450, engages in the positioning hole 428 in the pallet 92. All the pallets 92 interconnected by the links 402 are intermittently delivered by the drive mechanism shown in FIG. 19.

The positioning mechanism has a movable plate 454 movable by a cylinder 452 disposed on one side of the pallet 92. The movable plate 454 has a V-shaped notch 456 defined in an edge thereof for engaging the cam follower 426 mounted on the base 408 of the pallet 92 thereby to position the pallet 92. A cylinder 455 is fixedly mounted on the movable plate 454 and has a movable plate 459 with a pusher 457 mounted thereon. The pusher 457 pushes the cam follower 416 on the end of the arm 414 to turn the movable holder 410 to release a wound-film-loaded cartridge 12 from the movable holder 410 and the fixed holder 412.

Structural details of the transfer mechanism 95 and the loading mechanism 96 in the assembling unit 36 will be described below.

Figure 20:
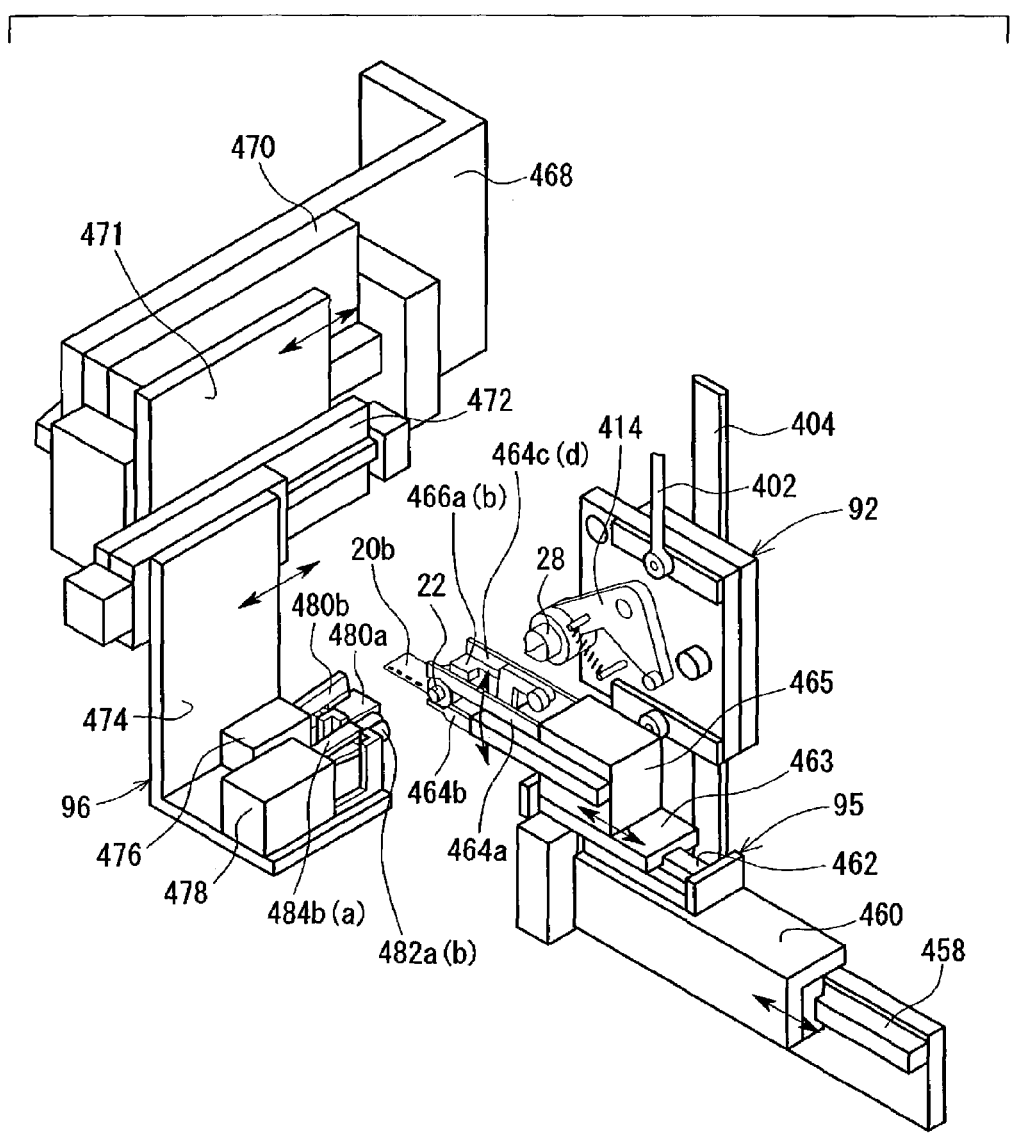
FIG. 20 is a perspective view of a transfer mechanism and an assembling mechanism according to the first embodiment.
Figure 21:
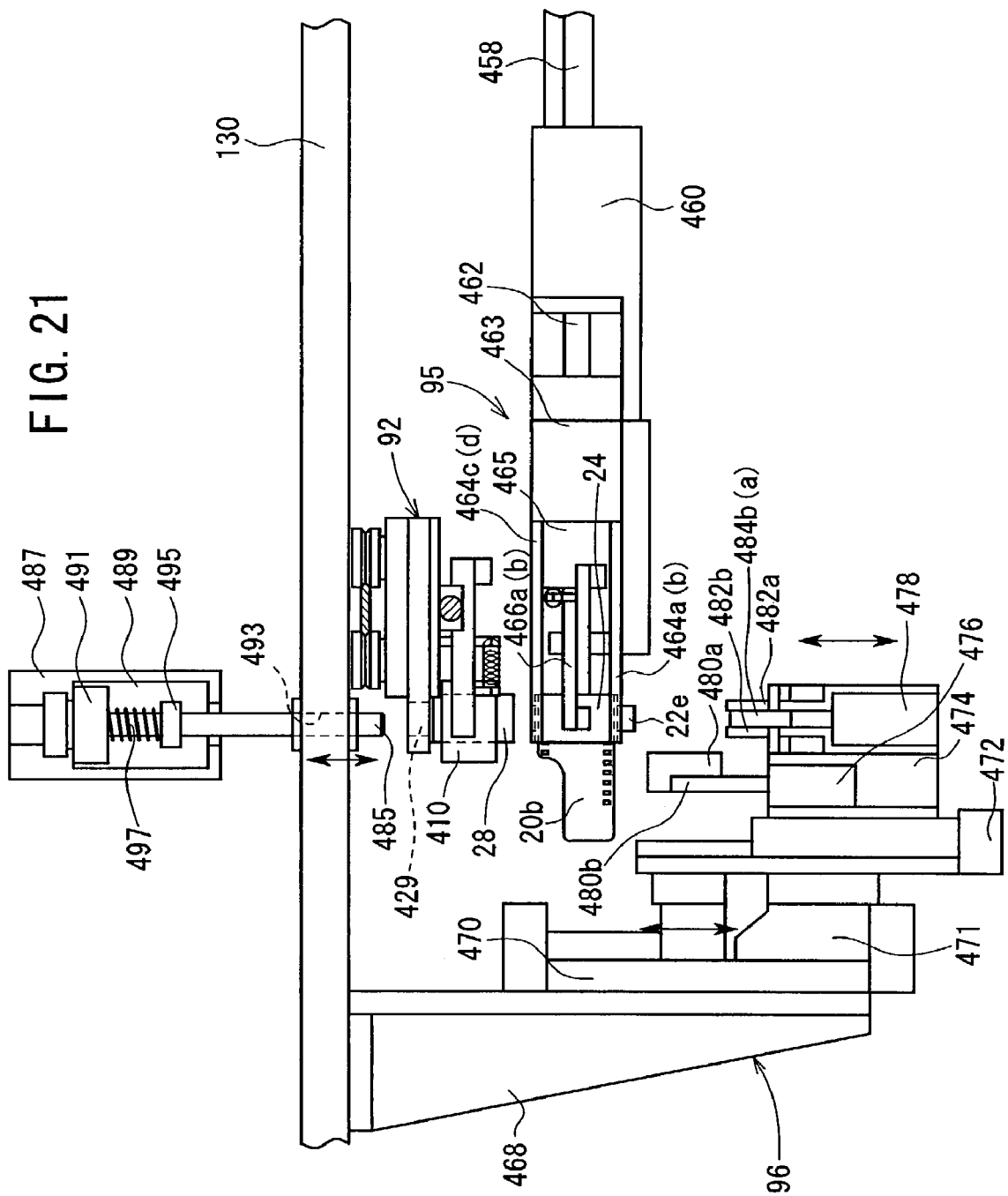
FIG. 21 is a plan view of the transfer mechanism and the assembling mechanism according to the first embodiment.

In FIGS. 20 and 21, the transfer mechanism 95 receives a wound-film assembly 24 including a fixed-length film 20 from the winding mechanism 88, and transfers the wound-film assembly 24 to the assembling unit 36. The loading mechanism 96 loads the transferred wound-film assembly 24 from the transfer mechanism 95 onto a pallet 92 positioned in a given location.

The transfer mechanism 95 includes an elongate first cylinder 458 having a movable plate 460 which supports a second cylinder 462 disposed thereon. The second cylinder 462 has a movable plate 463 to which there is fixed a cylinder 465 for opening and closing two pairs of clamps 464a through 464d for gripping flanges 22a, 22b of a spool 22. A pair of clamps 466a, 466b for holding the outer circumferential surface of the spool 22 to prevent the fixed-length film 20 wound thereon from being unwound is coupled to the clamps 464a through 464d. The clamps 464a through 464d and the clamps 466a, 466b are simultaneously opened and closed by the cylinder 465.

The loading mechanism 96 comprises a first cylinder 470 supported on a bracket 468 fixed to the partition wall 130 of the assembling unit 36, a second cylinder 472 displaceable toward a pallet 92 by a movable plate 471 of the first cylinder 470, an L-shaped movable bracket 474 displaceable toward the pallet 92 by the second cylinder 472, and a third cylinder 476 and a fourth cylinder 478 which are disposed on the L-shaped movable bracket 474.

Lower and upper restrictive plates 480a, 480b which are openable and closable vertically are connected to the third cylinder 476. The lower and upper restrictive plates 480a, 480b serve to grip and support the trailing end 20b of the fixed-length film 20 which projects (protrudes) from the wound-film assembly 24. The lower restrictive plate 480a is wider than the upper restrictive plate 480b. Partly cylindrical holders 482a, 482b which are horizontally spaced from each other are fixed to the fourth cylinder 478. Clamps 484a, 484b which are openable and closable by the fourth cylinder 478 are disposed between the holders 482a, 482b. The holders 482a, 482b and the clamps 484a, 484b jointly make up a cylinder which can engage a protruding end 22e of the spool 22 near the flange 22a.

A spool positioning pin 485 for engaging the spool 22 near the flange 22b is disposed on the portion of the partition wall 130 which faces and is aligned with the holders 482a, 482b and the clamps 484a, 484b. The spool positioning pin 485 has an end supported by a bracket 491 mounted on a movable plate 489 of a cylinder 487, and an opposite end insertable through a hole 493 defined in the partition wall 130 into the hole 429 in the pallet 92. A spring 497 is disposed around the spool positioning pin 485 between the bracket 491 and a ring 495 mounted on an intermediate portion of the spool positioning pin 485, the spring 497 being movable toward and away from the bracket 491.

Figure 22:
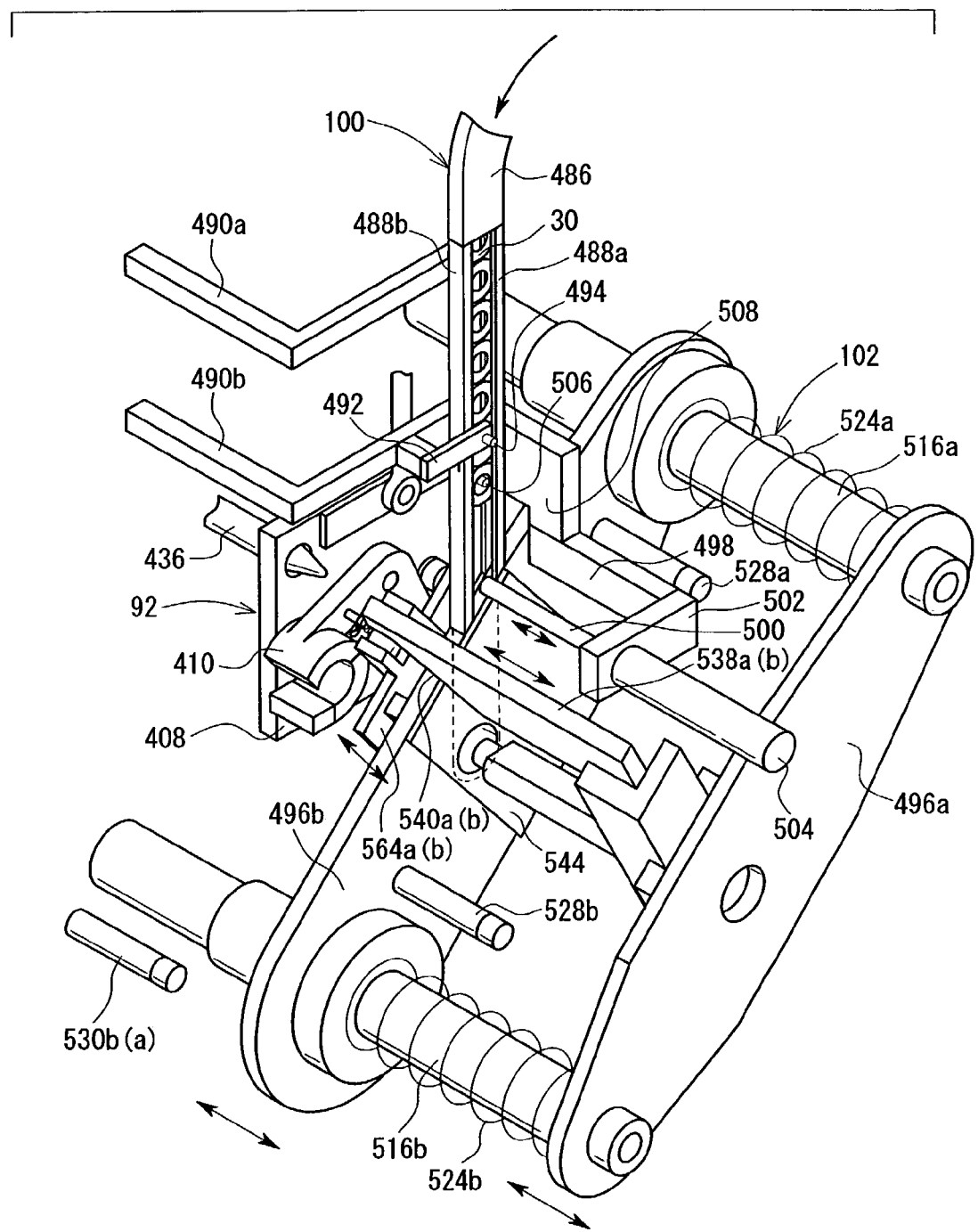
FIG. 22 is a perspective view of a cap supply mechanism and a mounting mechanism according to the first embodiment.

FIG. 22 shows structural details of the cap supply mechanism 100 and the mounting mechanism 102.

The cap supply mechanism 100 has guide plates 488a, 488b for receiving caps 30 delivered from the cap feeder 98 (see FIG. 4) along the chute 486, and supplies caps 30 to the mounting mechanism 102. As shown in FIG. 22, each of the guide plates 488a, 488b has a substantially U-shaped cross section for guiding caps 30. The guide plates 488a, 488b are spaced from each other and fixed to the partition wall 130 by brackets 490a, 490b. A sensor 494 is mounted by a bracket 492 on a distal end of the bracket 490b which is positioned lower than the bracket 490a. The sensor 494 is positioned in alignment with the gap between the guide plates 488a, 488b, and serves to detect whether there is a cap 30 between the guide plates 488a, 488b or not.

Figure 23:
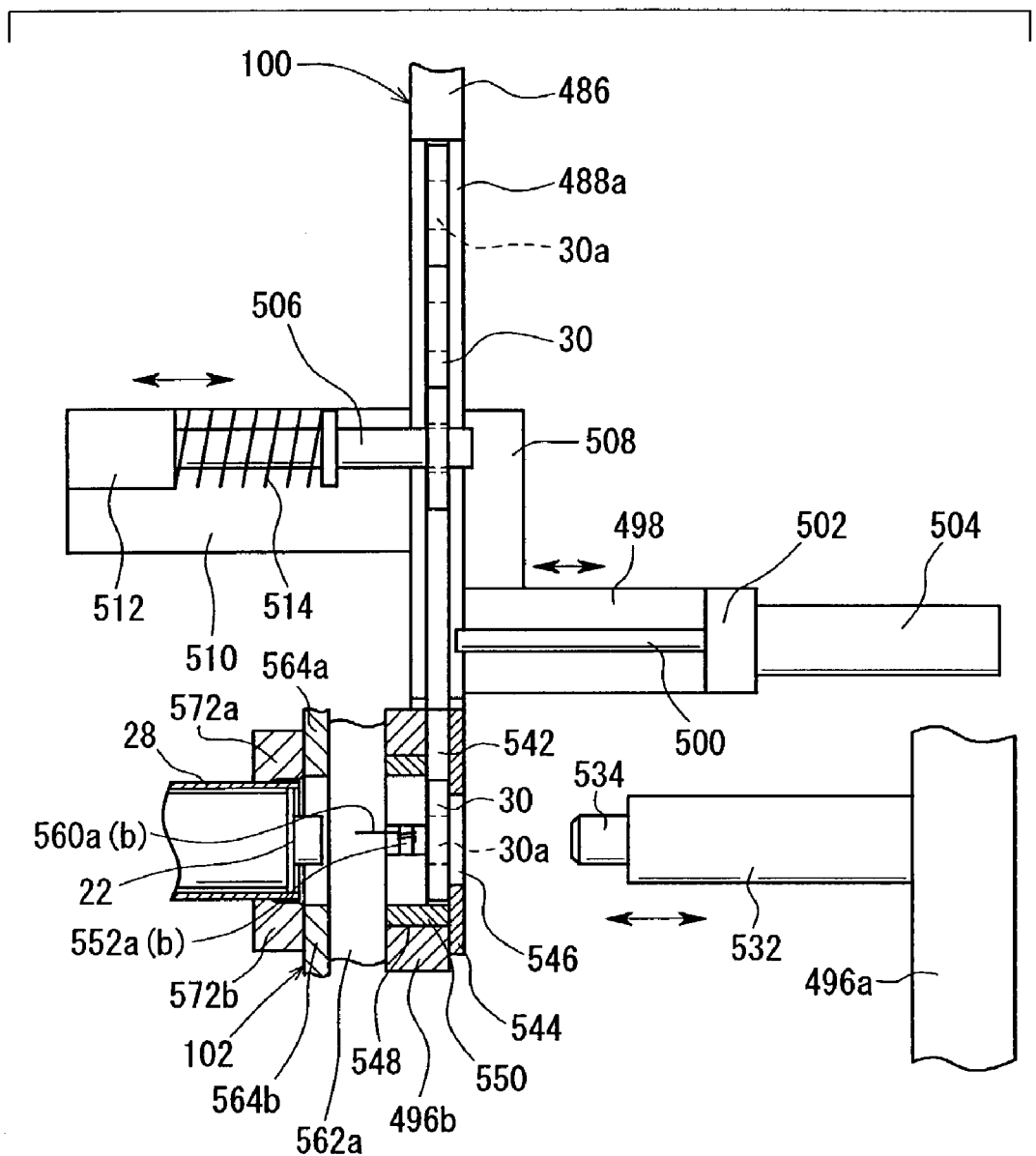
FIG. 23 is a fragmentary elevational view, partly in cross section, of the cap supply mechanism and the mounting mechanism according to the first embodiment.

The mounting mechanism 102 has two spaced support plates 496a, 496b. One of the support plates 496b which is closer to the partition wall 130 is disposed on the lower ends of the guide plates 488a, 488b. A bracket 498 is affixed to the support plate 496b, and a pin 500 is connected to the bracket 498 by a plate 502 in alignment with the gap between the guide plates 488a, 488b. The pin 500 is axially movable under the elastic force of a spring (not shown) disposed in a casing 504 which is disposed at the rear end of the pin 500. As shown in FIG. 23, the pin 500 can move in between the guide plates 488a, 488b away from the support plate 496a. A pin 506 is connected to the bracket 498 by plates 508, 510 in alignment with the gap between the guide plates 488a, 488b. The pin 506 is movable with respect to a casing 512 disposed at the rear end thereof under the elastic force of a spring 514. The pins 500, 506 are displaced when the support plate 496b moves. As shown in FIG. 23, when the pin 506, which is positioned higher than the pin 500, is inserted in a hole 30a in a cap 30, the lower pin 500 is retracted away from the guide plates 488a, 488b. When the upper pin 506 is retracted away from the guide plates 488a, 488b, the lower pin 500 is inserted between the guide plates 488a, 488b, supporting a cap 30 upwardly.

Figure 24:
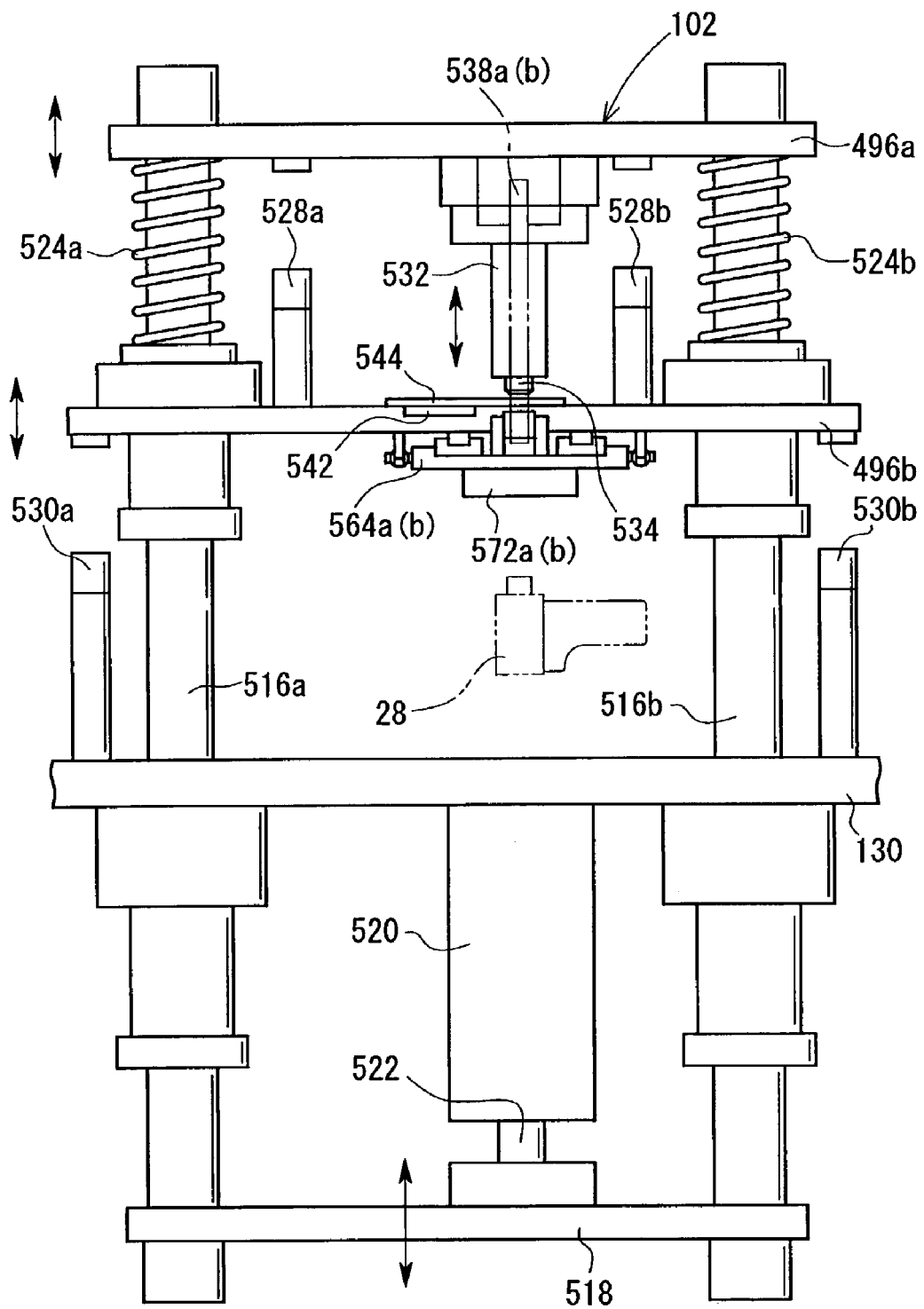
FIG. 24 is a plan view of the mounting mechanism according to the first embodiment.

As shown in FIG. 22, the support plates 496a, 496b of the mounting mechanism 102 lie parallel to each other and are inclined to the vertical direction. Rods 516a, 516b have ends fixed to the respective opposite ends of the support plate 496a. As shown in FIG. 24, the rods 516a, 516b extend through the respective opposite ends of the other support plate 496b and the partition wall 130, and have their other ends interconnected by a joint plate 518. A cylinder 520 mounted on the partition wall 130 has a rod 522 fixed to the joint plate 518. Springs 524a, 524b are disposed around the respective portions of the rods 516a, 516b which extend between the support plates 496a, 496b. The support plate 496b has stops 528a, 528b supported thereon for limiting the displacement of the support plate 496a with respect to the support plate 496b. The partition wall 130 has stops 530a, 530b supported thereon for limiting the displacement of the support plate 496b with respect to the partition wall 130.

A presser 532 having a distal end for pressing a cap 30 is disposed centrally on the support plate 496a. A pin 534 is mounted centrally on the distal end of the presser 532 for insertion into the hole 30a in the cap 30. The pin 534 is movable under the elastic force of a spring (not shown) disposed in the presser 532. Cams 538a, 538b are disposed respectively above and below the presser 532. The cams 538a, 538b have rear ends fixed to the support plate 496a and front ends disposed respectively above and below the support plate 496b. The front ends of the cams 538a, 538b have respective tapered surfaces 540a, 540b for abutment against cam followers to be described later on.

As shown in FIG. 23, a plate 544 is mounted on the support plate 496b. A slot 542 which serves as a passage for caps 30 is defined between the support plate 496b and the plate 544 in alignment with the lower ends of the guide plates 488a, 488b of the cap supply mechanism 100. The plate 544 has a hole 546 defined therein for the passage therethrough the presser 532 and the pin 534. The support plate 496b also has a hole 548 defined therein in concentric relation to the hole 546. A cap holder 550 is mounted in the hole 548.

Figure 25:
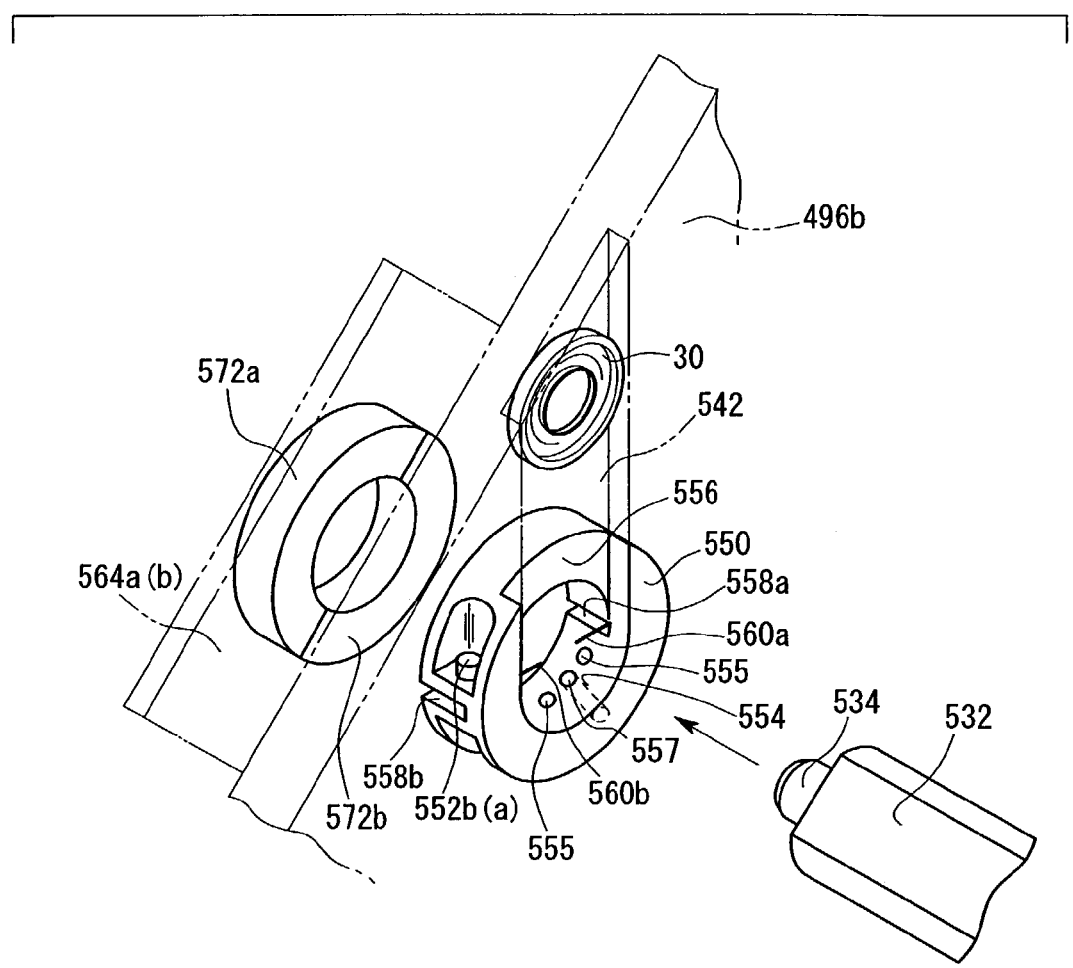
FIG. 25 is a fragmentary perspective view of the mounting mechanism according to the first embodiment.

As shown in FIG. 25, the cap holder 550 is doughnut-shaped and has a hole 554 defined centrally therein for passage of a cap 30 therethrough. The cap holder 550 has a slot 556 defined therein which is held in communication with the slot 542 defined in the support plate 496b. A cap 30 is introduced from the slot 542 through the slot 556 into the hole 554 in the cap holder 550. A plurality of magnets 555 for attracting a cap 30 are embedded in an inner circumferential surface of the cap holder 550 which defines the hole 554 in diametrically opposite relation to the slot 556. A cap sensor 557 for detecting whether there is a cap 30 in the hole 554 or not is disposed in the inner circumferential surface of the cap holder 550.

The cap holder 550 has a pair of recesses 558a, 558b defined therein which extend from the support plate 496b. Pins 552a, 552b are mounted on the cap holder 550 and extend across the respective recesses 558a, 558b. Springs 560a, 560b are attached to the portions of the pins 552a, 552b which lie in the respective recesses 558a, 558b. The springs 560a, 560b have respective ends projecting in the hole 554. The springs 560a, 560b cooperate with the plate 544 and the magnets 555 in holding the cap 30 that is introduced into the hole 554.

Figure 26:
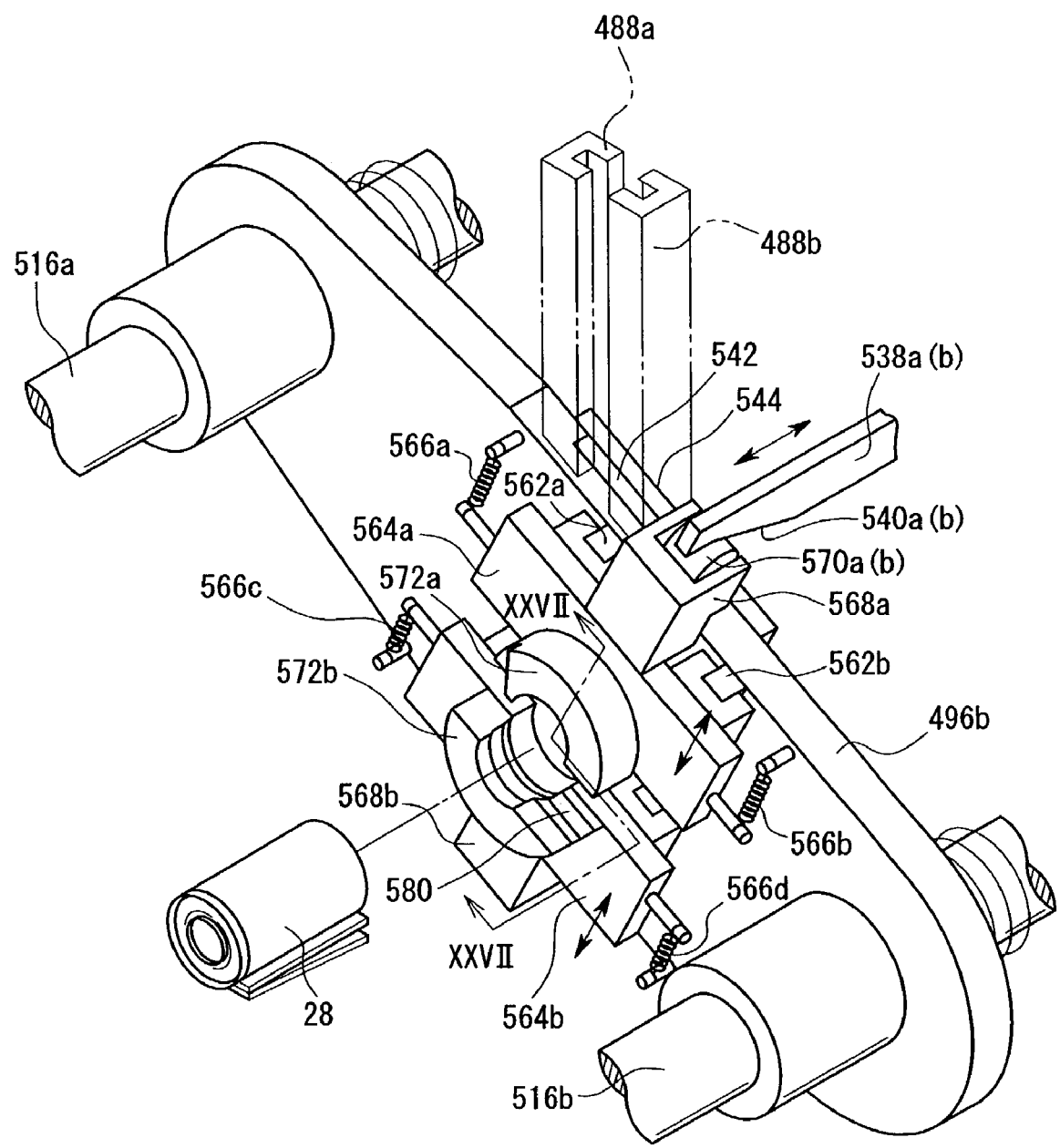
FIG. 26 is a fragmentary perspective view of the mounting mechanism according to the first embodiment.

As shown in FIG. 26, two slide tables 564a, 564b displaceable substantially vertically along guide rails 562a, 562b are disposed on the surface of the support plate 496b which faces the partition wall 130. The slide table 564a is biased to move upwardly by springs 566a, 566b acting between the support plate 496b and the slide table 564a, and the slide table 564b is normally biased to move downwardly by springs 566c, 566d acting between the support plate 496b and the slide table 564b. The slide table 564a has an arm 568a projecting upwardly, and a cam follower 570a held in abutment against the tapered surface 540a of the cam 538a is rotatably supported on the arm 568a. The slide table 564b has an arm 568b projecting downwardly, and a cam follower 570b held in abutment against the tapered surface 540b of the cam 538b is rotatably supported on the arm 568b.

Figure 27:
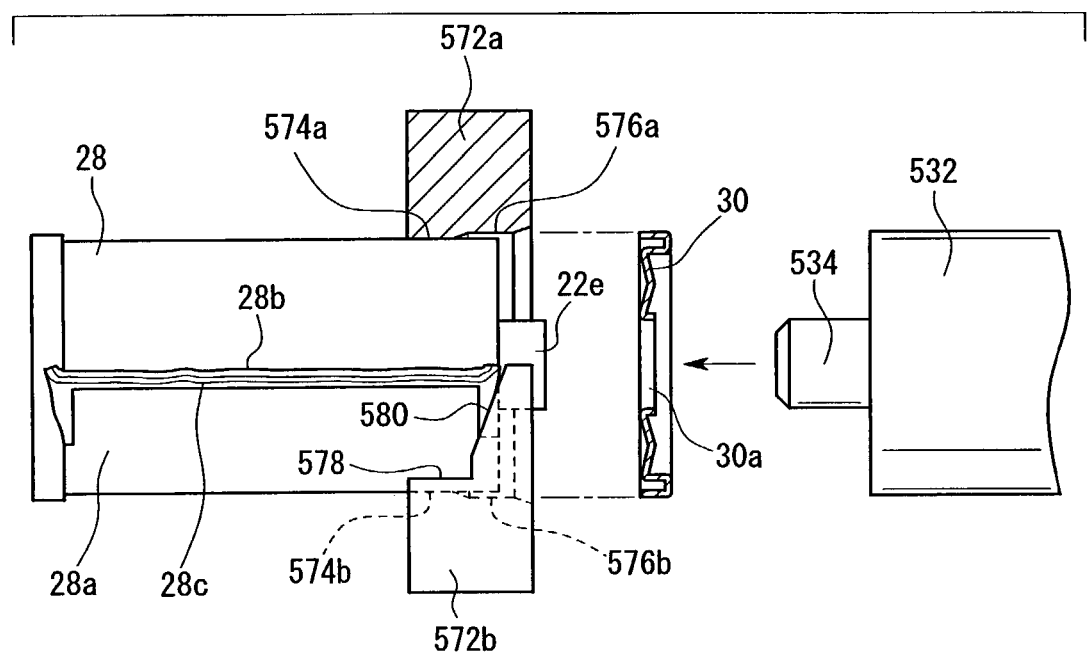
FIG. 27 is a cross-sectional view taken along line XXVII-XXVII of FIG. 26.

Semicircular guide blocks 572a, 572b are fixed respectively to the slide tables 564a, 564b. As shown in FIG. 27, which is a cross-sectional view taken along line XXVII-XXVII of FIG. 26, the guide blocks 572a, 572b have respective cartridge guides 574a, 574b which jointly make up an inner circumferential surface whose diameter is substantially the same as the outside diameter of a one-open-sided cartridge 28, and respective cap guides 576a, 576b which jointly make up an inner circumferential surface whose diameter is substantially the same as the outside diameter of a cap 30. The guide block 572b has a recess in its end for mating with the guide block 572a, providing a guide surface 578 for guiding the straight fin 28a of a one-open-sided cartridge 28, and a bending surface 580 for bending the ribbon 28c mounted one each of the straight fin 28a and the flange 28b toward the spool 22 inserted in the one-open-sided cartridge 28.

Figure 28:
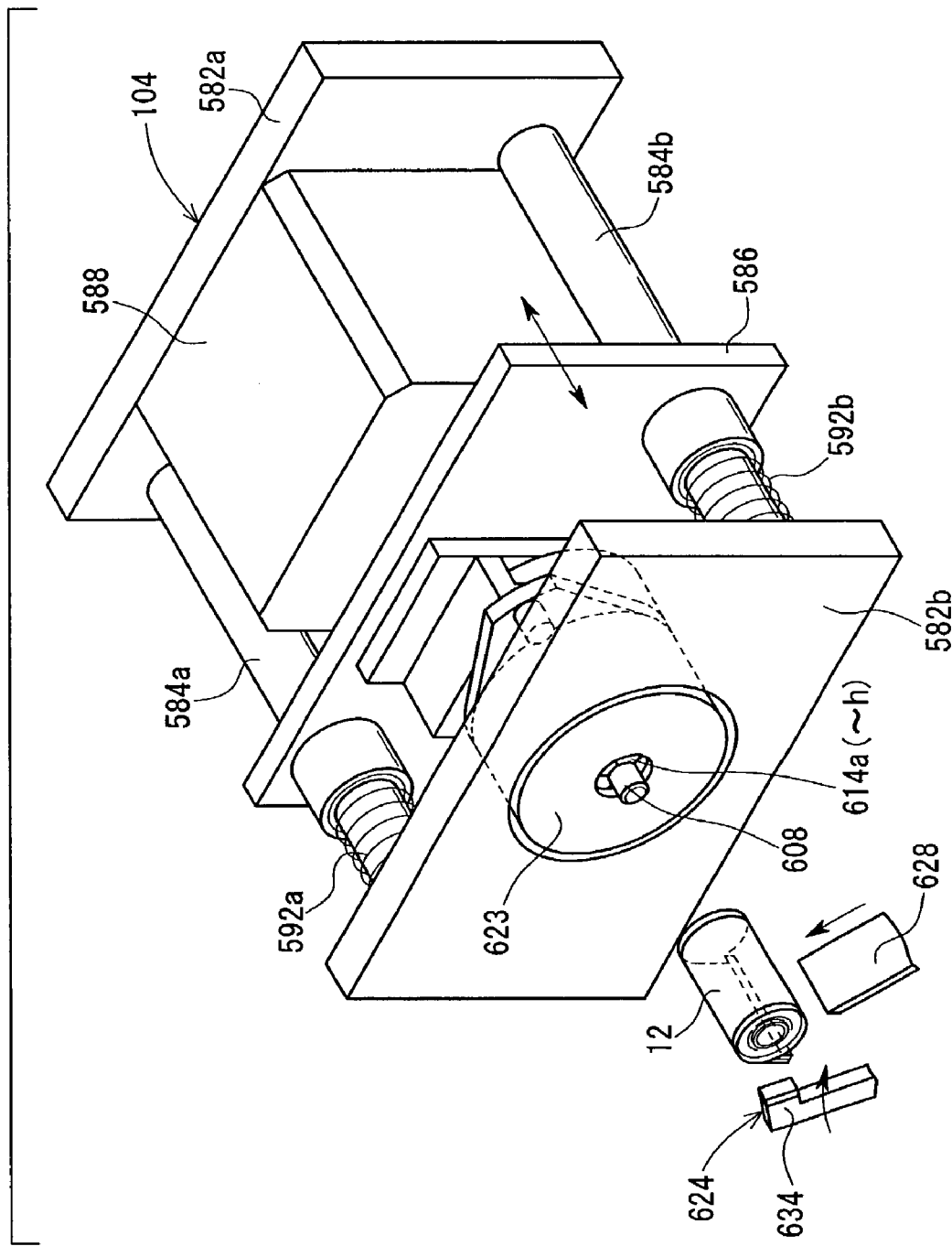
FIG. 28 is a perspective view of a crimping mechanism according to the first embodiment.

FIG. 28 shows structural details of the crimping mechanism 104. As shown in FIG. 28, the crimping mechanism 104 has a pair of spaced support bases 582a, 582b and a slide plate 586 slidably supported on a pair of guide rods 584a, 584b extending between and fixed to the support bases 582a, 582b. A cylinder 588 is fixedly mounted on the support base 582a and has a rod 590 (see FIG. 29) coupled to the slide plate 586. Springs 592a, 592b are disposed around the respective guide rods 584a, 584b and act between the support base 582b and the slide plate 586.

Figure 29:
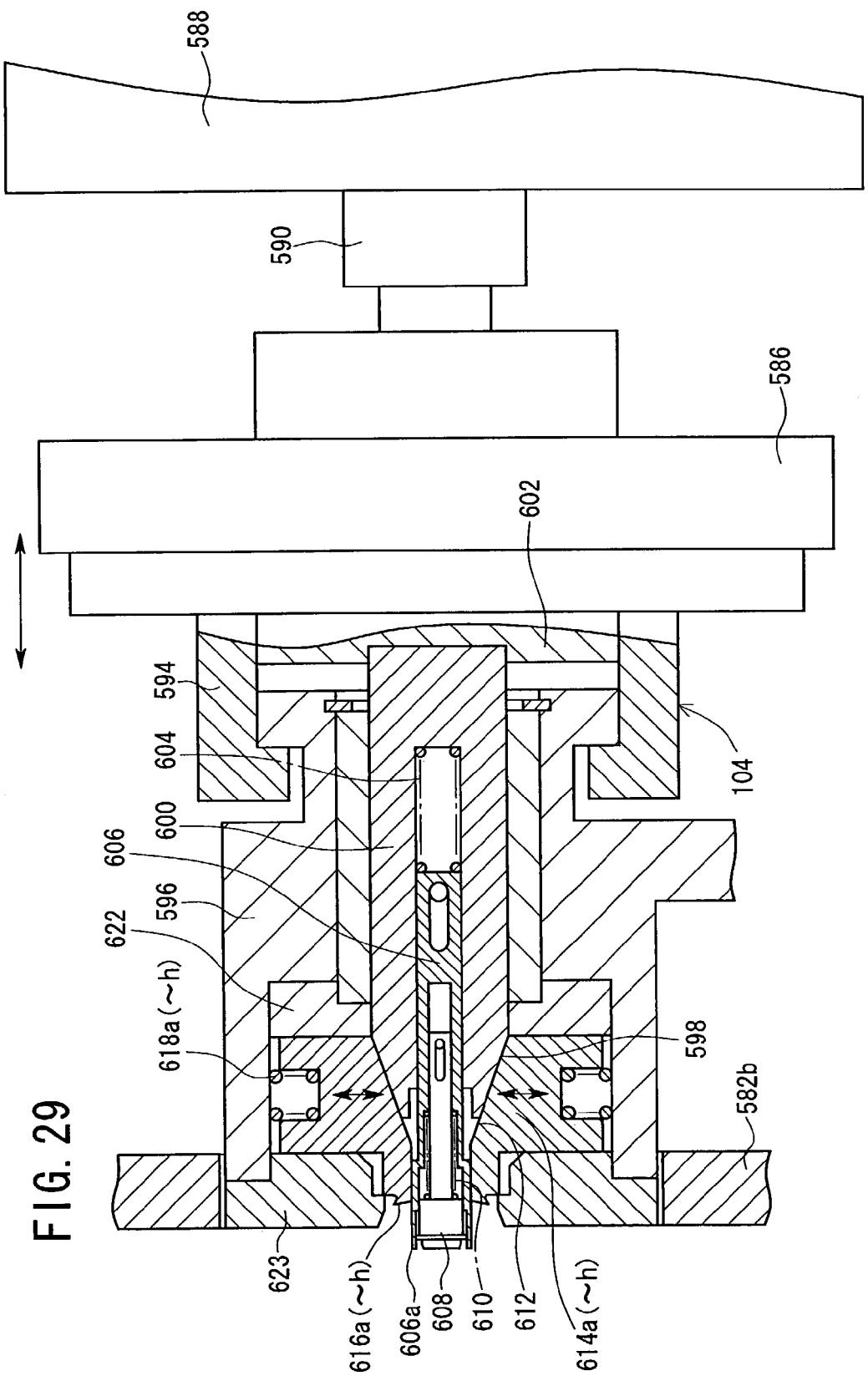
FIG. 29 is a cross-sectional view of the crimping mechanism according to the first embodiment.

As shown in FIG. 29, a connector 594 is fixed to the slide plate 586, and another connector 596 is connected to the connector 594. The connectors 594, 596 are held in operative engagement with each other for movement toward and away from each other. A pusher 600 having a tapered surface 598 on its distal end is mounted by an attachment plate 602 centrally in the connector 594 fixed to the slide plate 586. A slide bar 606 which is loaded by a spring 604 is inserted centrally in the pusher 600. A spool support 608 loaded by a spring 610 for engaging the protruding end 22e of a spool 22 is mounted in the distal end of the slide bar 606. The slide bar 606 has a tip end 606a for engaging an outer circumferential edge of the hole 30a in a cap 30 to prevent the cap 30 from being deformed.

Eight crimping dies 614a through 614h, which jointly provide a tapered surface 612 slidingly engaging the tapered surface 598 of the pusher 600, are disposed on and around the distal end of the pusher 600. The crimping dies 614a through 614h have respective wedges 616a through 616h on their tip ends for being pressed against the inner circumferential surface of the outer circumferential edge of a cap 30. The crimping dies 614a through 614h are pressed against the connector 596 with springs 618a through 618h interposed therebetween. The crimping dies 614a through 614h are retained between retainers 622, 623 which are fixed to the connector 596.

Figure 30:
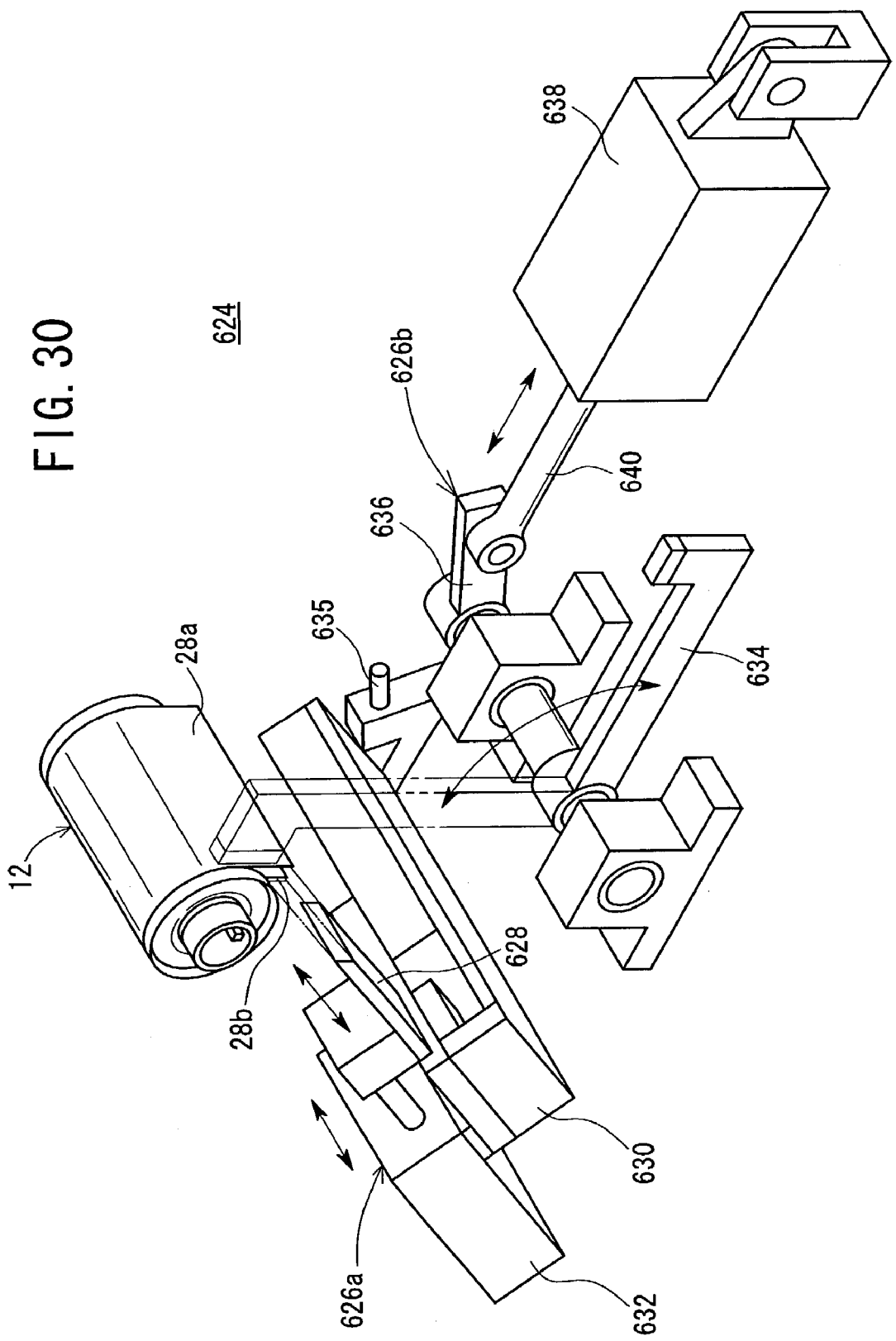
FIG. 30 is a perspective view of a positioning mechanism in the crimping mechanism according to the first embodiment.
Figure 31:
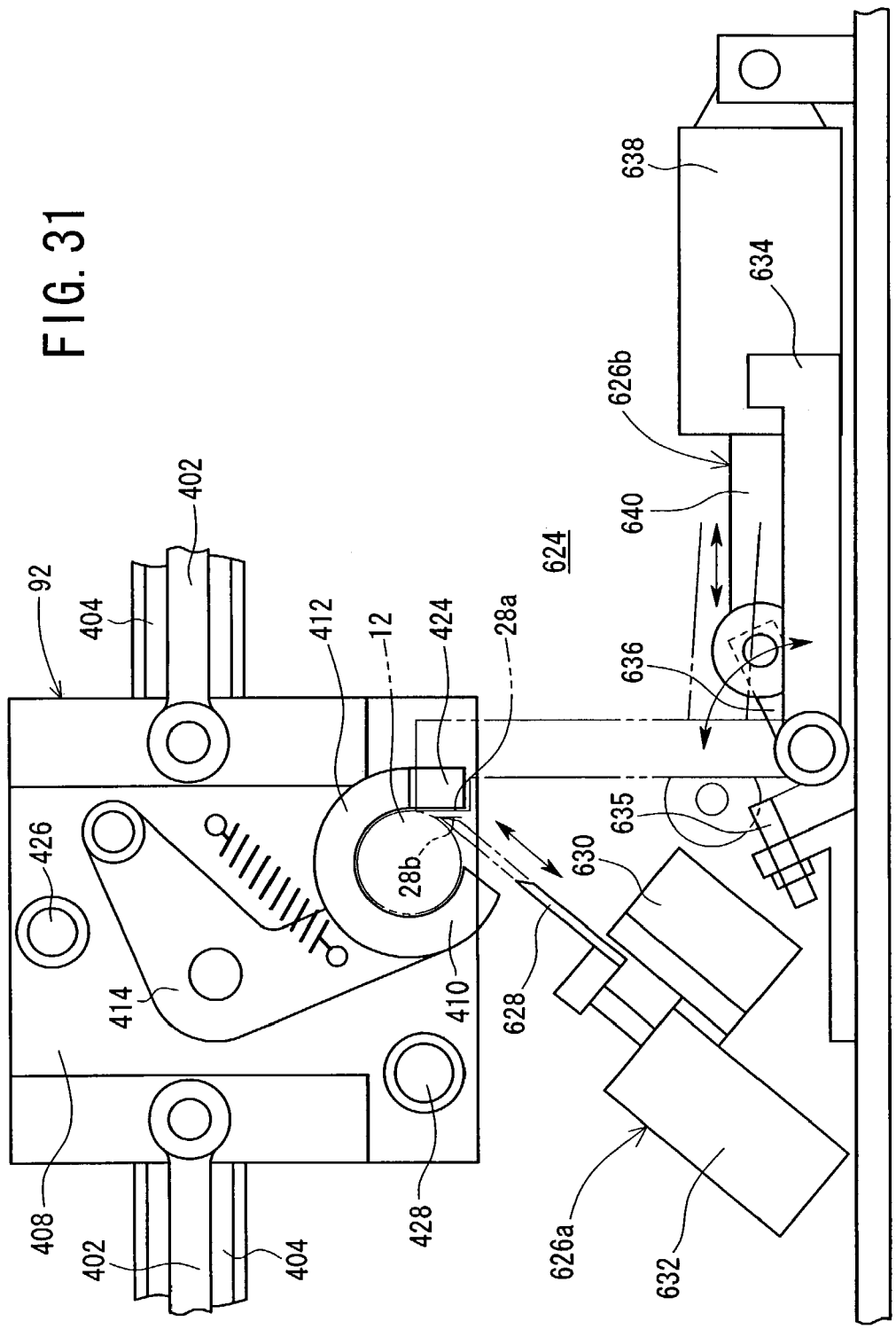
FIG. 31 is a side elevational view of the positioning mechanism in the crimping mechanism according to the first embodiment.

A positioning mechanism 624 shown in FIGS. 30 and 31 is disposed between the crimping mechanism 104 and a pallet 92 which is positioned in front of the crimping mechanism 104. The positioning mechanism 624 includes a first positioner 626a for positioning the flange 28b of a one-open-sided cartridge 28 and a second positioner 626b for positioning the straight fin 28a of the one-open-sided cartridge 28. The first positioner 626a has a positioning plate 628 having a tip end insertable into a bent region of the flange 28b. The positioning plate 628 is displaceable along the axis of the one-open-sided cartridge 28 by a cylinder 630, and displaceable toward the bent region of the flange 28b by a cylinder 632. The second positioner 626b has a presser 634 having an end for being pressed against the straight fin 28a. The presser 634 has the other end supported on a pivot shaft which is coupled by a link 636 to a rod 640 of a cylinder 638. An angular range in which the link 636 is angularly movable about the pivot shaft is limited by a stop 635 which is disposed near the pivot shaft.

Figure 32:
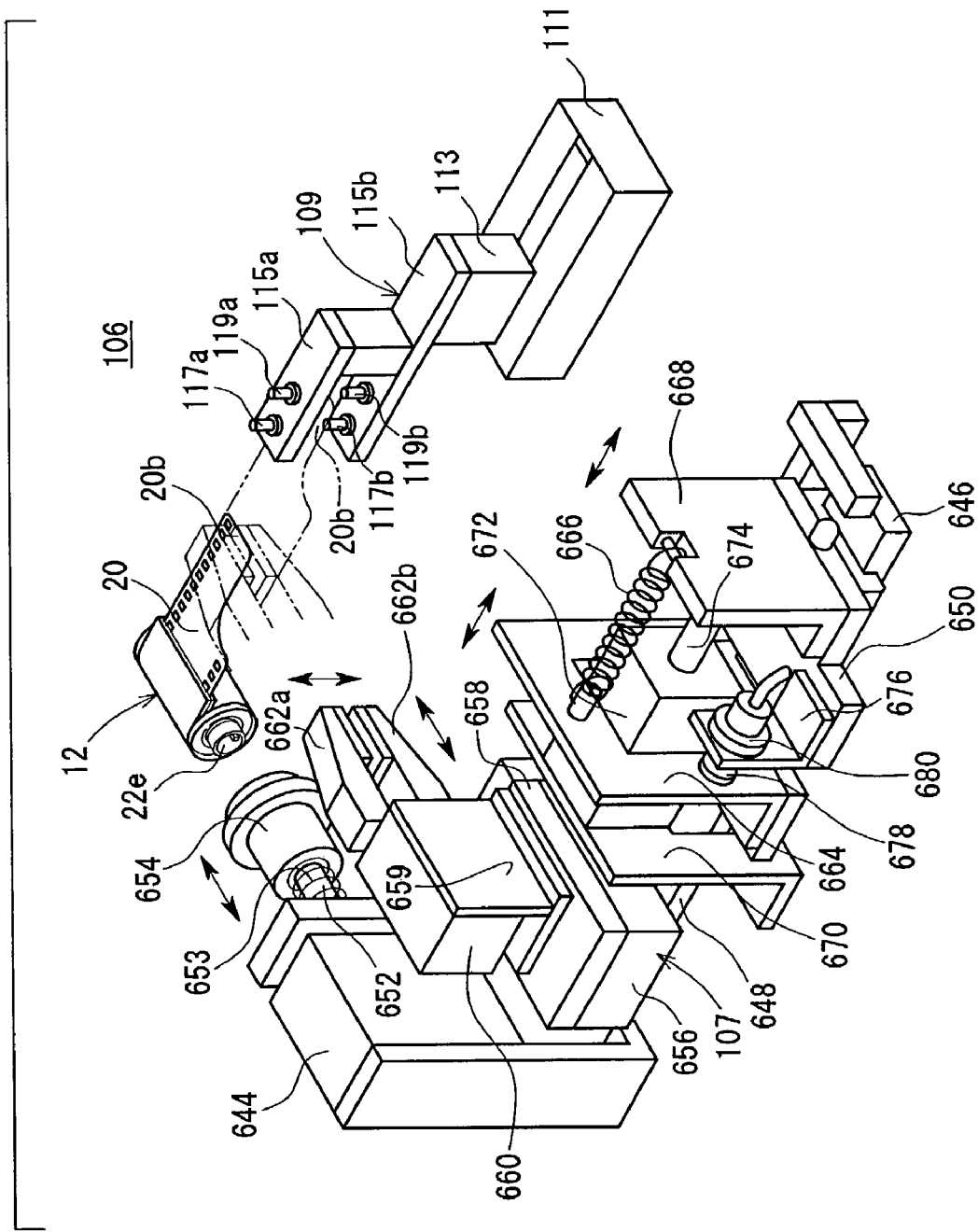
FIG. 32 is a perspective view of an inspecting mechanism according to the first embodiment.
Figure 33:
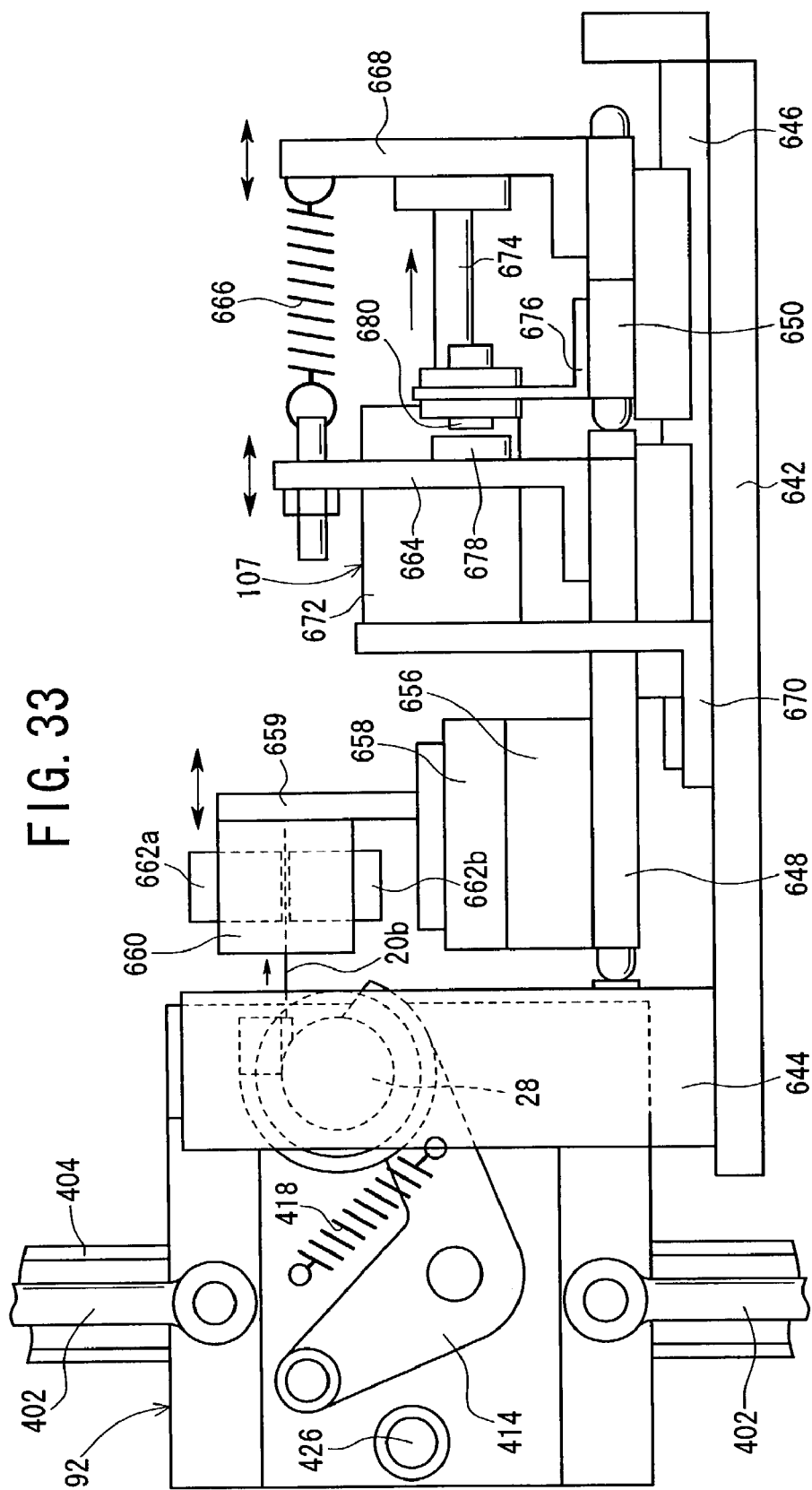
FIG. 33 is a side elevational view of a pullout resistance inspecting unit in the inspecting mechanism according to the first embodiment.

FIGS. 32 and 33 show structural details of the inspecting mechanism 106. The inspecting mechanism 106 comprises a pullout resistance inspecting unit 107 for inspecting the resistance to an action to pull the fixed-length film 20 from a wound-film-loaded cartridge 12, and a length inspecting unit 109 for inspecting the length of the fixed-length film 20 which is exposed out of the wound-film-loaded cartridge 12.

The pullout resistance inspecting unit 107 has a cylinder 644 fixedly mounted on a base 642, and a first slide table 648 and a second slide table 650 which are displaceable along a guide rail 646 mounted on the base 642.

The cylinder 644 has a rod 652 supporting thereon an engaging nose 654 for engaging the cap 30 mounted on the wound-film-loaded cartridge 12. The engaging nose 654 is kept in engagement with the cap 30 under the elastic force of a spring 653 disposed around the rod 652. The first slide table 648 supports, on its portion near the cylinder 644, a cylinder 656 fixedly disposed thereon which has a movable plate 658 to which a cylinder 660 is fixed by a bracket 659. The cylinder 660 has a pair of clamps 662a, 662b for gripping the trailing end 20b of the fixed-length film 20 which is exposed out of the wound-film-loaded cartridge 12.

The first slide table 648 supports, on its portion near the second slide table 650, a bracket 664 fixedly disposed thereon which is connected to an end of a spring 666 whose other end is connected to a bracket 668 fixedly mounted on the second slide table 650. A motor 672 is fixedly mounted on the base 642 by a bracket 670. The motor 672 comprises a linear-motion motor for linearly displacing a drive shaft 674 thereof which has a distal end secured to the bracket 668.

A bracket 676 is fixedly mounted on the second slide table 650 in confronting relation to the bracket 664 on the first slide table 648. The brackets 664, 676 support respectively thereon a dog 678 and a detector 680 which jointly make up a proximity sensor.

The length inspecting unit 109 is disposed alongside of the pullout resistance inspecting unit 107 and on an extension of the trailing end 20b of the fixed-length film 20. The length inspecting unit 109 includes a cylinder 111 having a movable block 113 supporting thereon two confronting plates 115a, 115b which are vertically spaced from each other by a given distance. The plates 115a, 115b support thereon two pairs of light-emitting units 117a, 119a and light-detecting units 117b, 119b. When the trailing end 20b of the fixed-length film 20 is positioned between the light-detecting units 117b, 119b, the length of the fixed-length film 20 which is exposed out of the wound-film-loaded cartridge 12 is judged as being appropriate.

FIGS. 34 through 37 show structural details of the removing mechanism 108 and the wound-film-loaded cartridge unloader 50. The removing mechanism 108 comprises a remover 682 for removing a wound-film-loaded cartridge 12 delivered by a pallet 92 and turning the wound-film-loaded cartridge 12 into an upright position, a first transfer unit 684 for transferring the wound-film-loaded cartridge 12 removed by the remover 682, and a second transfer unit 686 for transferring the wound-film-loaded cartridge 12 transferred by the first transfer unit 684 and inspecting the height of the wound-film-loaded cartridge 12. The height of the wound-film-loaded cartridge 12 refers to a dimension thereof up to the cap 30.

The remover 682 has a movable block 692 movable by a cylinder 690 mounted on a bracket 688 fixed to the partition wall 130, and a clamp unit 696 mounted on a bracket 694 coupled to the movable block 692. The clamp unit 696 is angularly movable about the bracket 694, and comprises a pair of clamps 698a, 698b for gripping the wound-film-loaded cartridge 12 and a cylinder 700 for opening and closing the clamps 698a, 698b. The bracket 694 supports thereon a rotary actuator 704 having a drive shaft connected to a gear 706 held in mesh with a gear 708 which is mounted on the clamp unit 696.

The first transfer unit 684 is disposed below an end of the stroke of the remover 682. The first transfer unit 684 comprises a cylinder 710 having a movable block 714 movable along a guide rail 712 and a receiver 716 mounted on the movable block 714. The receiver 716 holds the wound-film-loaded cartridge 12 supplied from the remover 682, and moves the wound-film-loaded cartridge 12 to the second transfer unit 686.

The second transfer unit 686 comprises a cylinder 718 extending along the cylinder 690 of the remover 682 (see FIG. 34), a pair of cylinders 722, 724 fixed to a movable block 720 of the cylinder 718 by a bracket 721, a presser 728 mounted on a movable plate 726 of the cylinder 722, and a pair of clamps 732a, 732b openable and closable by a cylinder 730 mounted on a movable plate 729 of the cylinder 724. The presser 728 is vertically movably supported on the movable plate 726 and loaded by a spring 731. The presser 728 has a movable member whose displacement is detected as representing height information of the wound-film-loaded cartridge 12. The clamps 732a, 732b grip the wound-film-loaded cartridge 12 transferred by the first transfer unit 684, and supplies the wound-film-loaded cartridge 12 to the wound-film-loaded cartridge unloader 50.

The wound-film-loaded cartridge unloader 50 has a feeder conveyor 734 extending from within and out of the assembling unit 36. The feeder conveyor 734 is surrounded by a light-shielding cover 736 (see FIG. 4). A cylinder 738 is disposed on one side of the feeder conveyor 734 and has a pusher 742 as a moving element for rejecting a wound-film-loaded cartridge 12, which is detected as a defective product, from the feeder conveyor 734.

Figure 57:
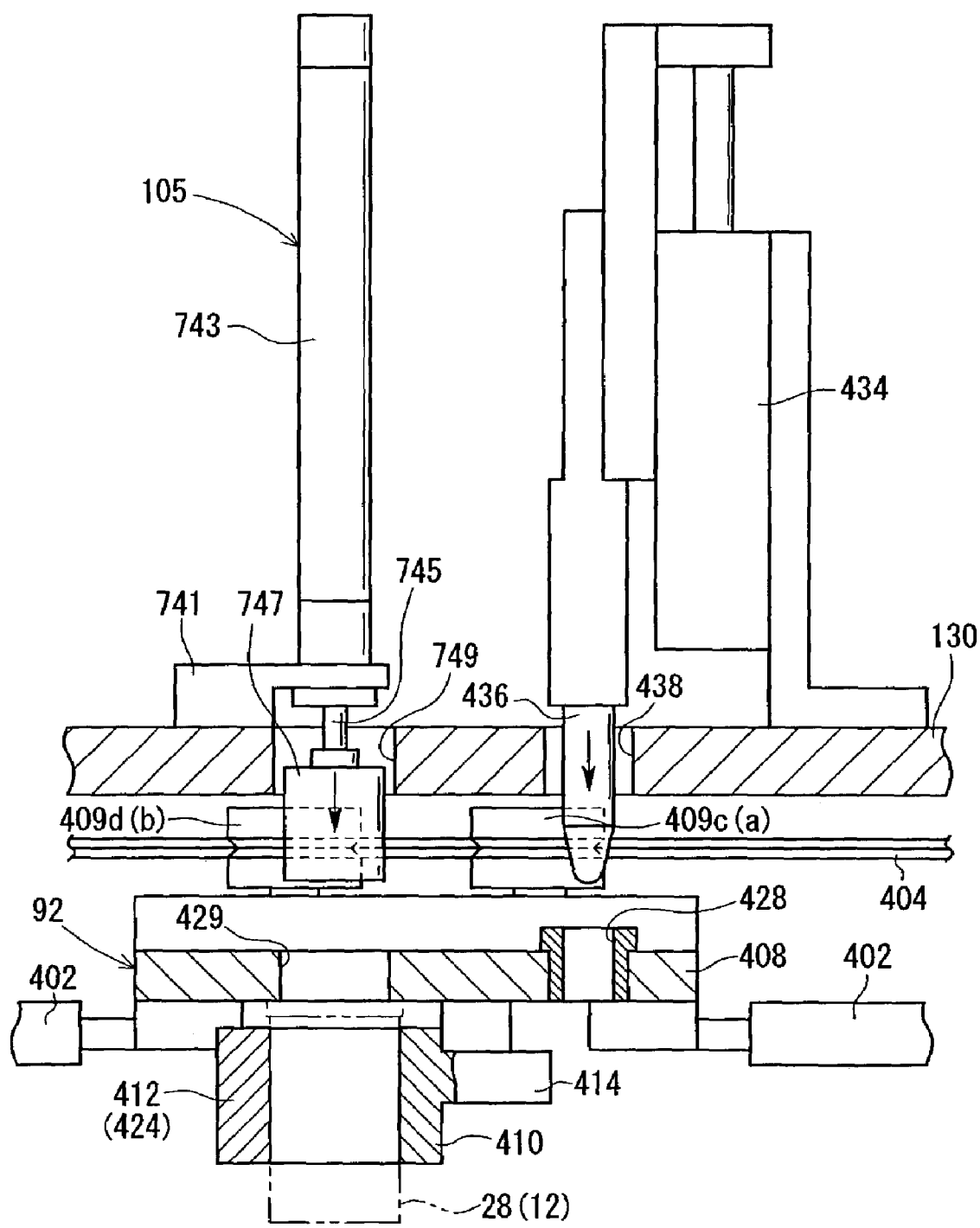
FIG. 57 is a plan view, partly in cross section, of a discharge mechanism according to the first embodiment.
Figure 58:
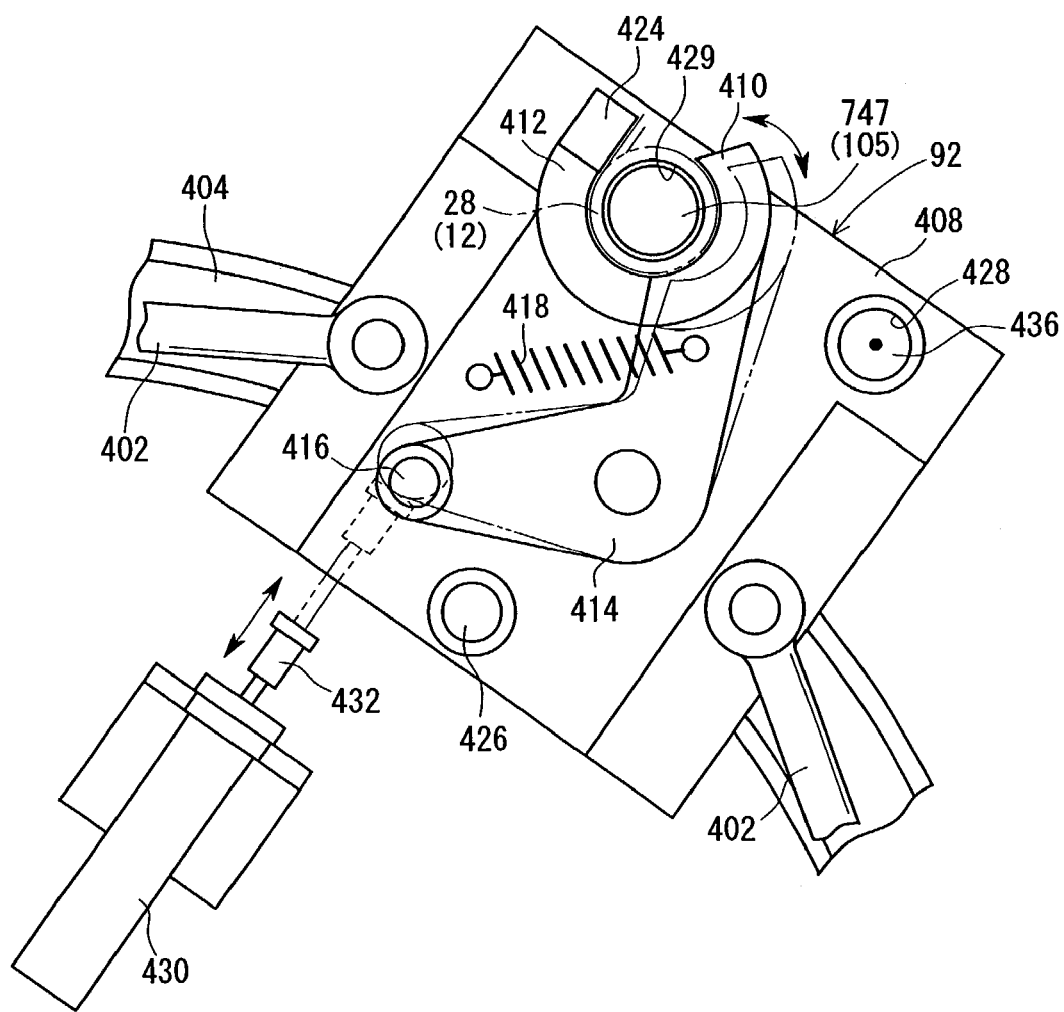
FIG. 58 is a front elevational view of the discharge mechanism according to the first embodiment.

FIGS. 57 and 58 show structural details of the discharge mechanism 105. The discharge mechanism 105 has a cylinder 743 supported on a bracket 741 fixed to the partition wall 130, and a pusher 747 coupled to the distal end of a rod 745 of the cylinder 743. The rod 745 and the pusher 747 are disposed in and extend through a hole 749 defined in the partition wall 130. The discharge mechanism 105 discharges a wound-film-loaded cartridge 12, which has not been removed from a pallet 92 by the upstream removing mechanism 108, or a one-open-sided cartridge 28 or a cap 30, which remains on a pallet 92, from the pallet 92 when the cylinder 743 is actuated.

Figure 38:
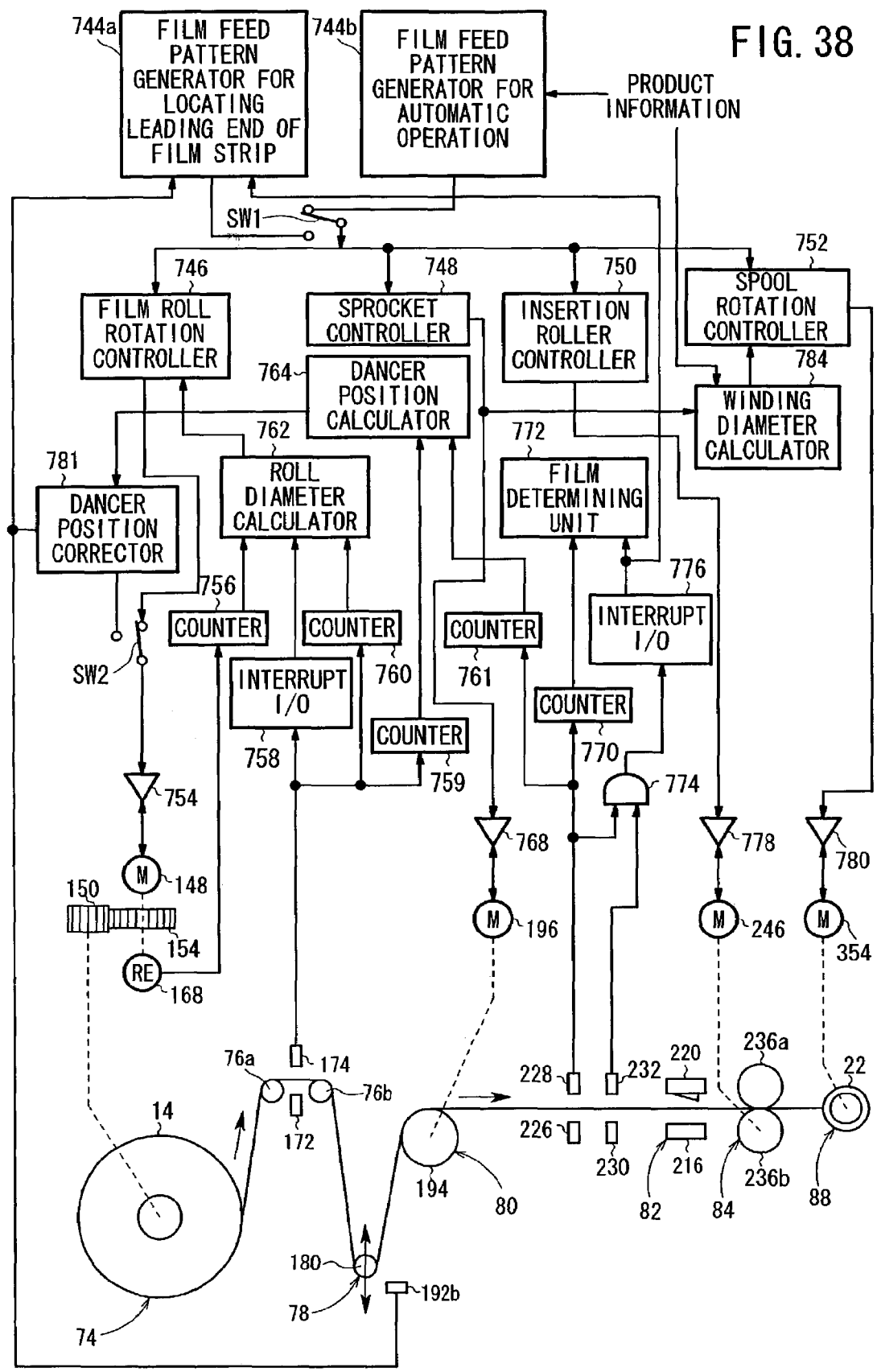
FIG. 38 is a block diagram of a control circuit of a film feed system according to the first embodiment.

FIG. 38 shows in block form a control circuit of a film feed system in the film manufacturing apparatus 10. The control circuit performs a control process from controlling the feed-out mechanism 74 to feed out the film strip 14a unwound from the film roll 14 to controlling the winding mechanism 88 to wind the fixed-length film 20 around the spool 22. The control circuit comprises film feed pattern generators 744a, 744b for generating film feed patterns in the mechanisms based on a predetermined reference pattern, a film roll rotation controller 746 for controlling the feed-out of the film strip 14a with the feed-out mechanism 74 according to a generated film feed pattern, a sprocket controller 748 for controlling the rotation of the sprocket 194 of the feed mechanism 80, an insertion roller controller 750 for controlling the rotation of the insertion roller 236b of the inserting mechanism 84, a spool rotation controller 752 for controlling the rotation of the spool 22 of the winding mechanism 88, and a dancer position corrector 781 for positionally correcting the dancer roller 180 using a detected signal from the photointerrupter 192b of the buffer mechanism 78.

The film feed pattern generator 744a generates a film feed pattern for positioning the leading end of the film strip 14a. The film feed pattern generator 744b generates a film feed pattern for producing, in an automatic operation mode, a wound-film-loaded cartridge 12 from the film strip 14a, whose leading end has been positioned, based on film size information which is either supplied from a host computer or entered by the operator. A selector switch SW1 for switching between the film feed pattern generators 744a, 744b is connected between the film feed pattern generators 744a, 744b and the film roll rotation controller 746, the sprocket controller 748, the insertion roller controller 750, and the spool rotation controller 752.

The film roll rotation controller 746 controls the feed-out motor 148 for the film roll 14 through a selector switch SW2 and a servoamplifier 754. The selector switch SW2 selectively connects the film roll rotation controller 746 and the dancer position corrector 781 to the servoamplifier 754.

To the rotary encoder 168 coupled to the feed-out motor 148, there is connected a counter 756 for counting signal pulses supplied from the rotary encoder 168. The-light-detecting unit 174 which is disposed between the rollers 76a, 76b between the feed-out mechanism 74 and the buffer mechanism 78 generates a pulse signal based on perforations 16 in the film strip 14a, and supplies the generated pulse signal to an interrupt I/O 758 and counters 759, 760. Signals from the interrupt I/O 758 and the counters 756, 760 are supplied to a roll diameter calculator 762 for calculating the diameter of the film roll 14. The roll diameter calculator 762 calculates the diameter of the film roll 14 and supplies the calculated diameter to the film roll rotation controller 746. A signal from the counter 759 is supplied to a dancer position calculator 764 for calculating the position of the dancer roller 180.

The sprocket controller 748 controls the feed motor 196 for the sprocket 194 through a servoamplifier 768, and supplies fed-length information of the film strip 14a which is fed by the sprocket 194 to a winding diameter calculator 784. The winding diameter calculator 784 calculates a winding diameter of the film strip 14a to be wound around the spool 22 based on film thickness information which is either supplied from a host computer or entered by the operator.

The light-detecting unit 228 for detecting perforations 16 and a light-detecting unit 232 for detecting notches 18 are disposed between the feed mechanism 80 and the cutting mechanism 82. A signal from the light-detecting unit 228 is supplied through a counter 761 to the dancer position calculator 764. Based on the signals from the counters 759, 761, the dancer position calculator 764 calculates the position of the dancer roller 180, and supplies a signal representing the calculated position to dancer position corrector 781.

The signal from the light-detecting unit 228 is supplied through a counter 770 to a film determining unit 772 and also supplied to an input terminal of an AND gate 774. The other input terminal of the AND gate 774 is supplied with a signal from the light-detecting unit 232. An output signal from the AND gate 774 is supplied through an interrupt I/O 776 to the film determining unit 772. The signal from the interrupt I/O 776 is also supplied to the film feed pattern generator 744a as a signal for determining a cutting position for the film strip 14a.

The film determining unit 772 confirms the length of the film strip 14a which is actually transported from the number of perforations 16 counted by the counter 770 while the film strip 14a is being fed a length corresponding to a preset film size, and determines whether the confirmed length is acceptable or not. The film determining unit 772 also determines whether the number of counted perforations 16 after a notch 18 has passed is of a prescribed value or not in order to ensure the cutting position where the film strip 14a is to be cut off.

The insertion roller controller 750 controls the feed motor 246 for the insertion roller 236b through a servoamplifier 778.

The spool rotation controller 752 controls the winding motor 354 for the engaging arm 352b for rotating the spool 22 through a servoamplifier 780. The spool rotation controller 752 is supplied with information about the winding diameter from the winding diameter calculator 784. The spool rotation controller 752 controls the winding motor 354 based on the supplied information about the winding diameter.

The film manufacturing apparatus 10 according to the first embodiment of the present invention is basically constructed as described above. Operation of the film manufacturing apparatus 10 will be described below.

After the film manufacturing apparatus 10 is moved on the casters 64a through 64d to a given location, the film manufacturing apparatus 10 is fixed to that location by extending the jack bolts 66a through 66d into contact with the floor, lifting the casters 64a through 64d off the floor. Since the film manufacturing apparatus 10 can be moved on the casters 64a through 64d to change its position freely, the film manufacturing apparatus 10 may be taken to any desired position, e.g., may be brought into a maintenance room for maintenance.

The film manufacturing apparatus 10 is air-conditioned by air supplied and discharged through the ducts 68a, 68b. As a room accommodating the film manufacturing apparatus 10 therein does not need to be air-conditioned in its entirety, the cost of an air-conditioning facility and a process of air-conditioning the film manufacturing apparatus 10 is much lower than if the room were to be air-conditioned entirety.

The film manufacturing apparatus 10 manufactures wound-film-loaded cartridges 12 shown in FIG. 2. In preparation for the production of wound-film-loaded cartridges 12, the film manufacturing apparatus 10 carries out a process of supplying spools 22 to the spool feeder 44, a process of supplying caps 30 to the cap feeder 98 in the assembling unit 36 from the hopper 48 through the cap supply passage 47, a process of supplying one-open-sided cartridge cases 28 to the cartridge delivery device 46, and a process of supplying a film roll 14 to the supply unit 32.

The film roll 14 is supplied to the supply unit 32 as follows: The operator opens the door 52d on a side of the film manufacturing apparatus 10, and loads the light-shielded magazine 70 (see FIG. 5) which accommodates the film roll 14 into the supply unit 32. As shown in FIGS. 4 and 6, the lock member 131 biased by the spring 135 has its end engaging the gear 129 to prevent the rotatable shaft 124 from rotating. Therefore, while the light-shielded magazine 70 is being carried, the film roll 14 therein is prevented from being unwound. The light-shielded magazine 70 keeps the film roll 14 in a light-shielded state by the lid 112 mounted on the casing 110.

The light-shielded magazine 70 is loaded by introducing the support plate 120 between the guide plates 139a, 139b and moving the support plate 120 on the rollers 133 of the support mechanism 72 until the leading end of the support plate 120 abuts against the positioning plate 140. Thereafter, the door 52d is closed to shield the interior of the film manufacturing apparatus 10 against entry of light.

In FIG. 6, the cylinder 142 is actuated to bring the securing pins 144 into abutment against the upper surface of the support plate 120, thus fixing the light-shielded magazine 70 in position. After the light-shielded magazine 70 is fixed in position, the cylinder 136 is actuated to displace the support mechanism 72 toward the partition wall 130 until the chuck 160 engages in the engaging cavity 128 that is defined in the rotatable shaft 124 on the rear surface of the light-shielded magazine 70. After the chuck 160 engages in the engaging cavity 128, the chuck fingers 166a through 166c are displaced radially outwardly by the cylinder 158 into engagement with the rotatable shaft 124.

After the light-shielded magazine 70 is loaded in the feed-out mechanism 74, the cylinder 137 mounted on the partition wall 130 is actuated to turn the plate 143 whose one end is coupled to the rod 141. The other end of the plate 143 displaces the other end of the lock member 131 out of engagement with the gear 129, thereby freeing the film roll 14 for rotation about its own axis.

After the film roll 14 is thus loaded in the supply unit 32, the light-shielding cloth 118 is removed from the light-shielded magazine 70 and the shutter 116 is opened, and then the leading end of the film roll 14 is pulled and threaded to the cutting mechanism 82 of the winding unit 34 (such a process will hereinafter be referred to as a "threading process"). At this time, the monitoring cameras 67a, 67b (see FIG. 4) capture images of the interior of the winding unit 34 and the assembling unit 36 based on illuminating light having a wavelength to which the film roll 14 is not sensitive, and the captured images are displayed on the display monitor 40 on top of the housing 38.

If either one of the doors 52a through 52d of the film manufacturing apparatus 10 is open, then the movable plate 125 disposed in the vicinity of the shutter 116 projects along the outer circumferential surface of the light-shielded magazine 70, preventing the operator from removing the light-shielding cloth 118 and opening the shutter 116 (see FIG. 4). Therefore, the operator do not remove the light-shielding cloth 118 and open the shutter 116 in error, and hence do not expose the film roll 14 to undesirable light. When all the doors 52a through 52d are closed, providing a light-shielded state in the film manufacturing apparatus 10, the movable plate 125 is retracted toward the partition wall 130, allowing the shutter 116 to be opened.

Prior to the threading process, the dancer roller 180 of the buffer mechanism 78 is lifted by the rod 187 actuated by the cylinder 184 to an uppermost position in which the dog 190 is detected by the photointerrupter 192a.

Figure 39:
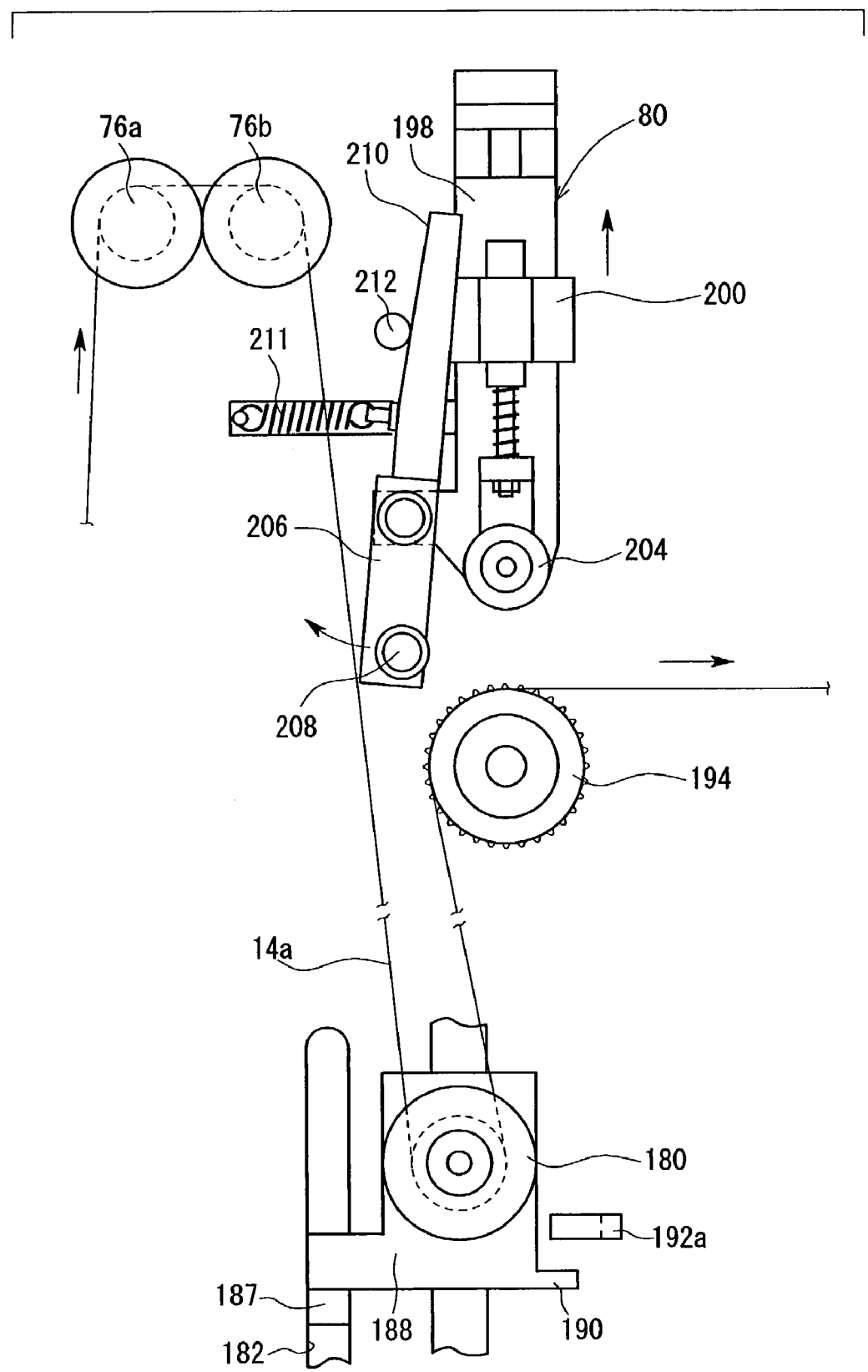
FIG. 39 is an elevational view illustrative of the manner in which the feed mechanism according to the first embodiment operates.

The cylinder 198 of the feed mechanism 80 is actuated to elevate the feed mechanism 80, spacing the roller 204 from the sprocket 194. The tapered surface 210 held in sliding contact with the pin 212 turns the lever 206, moving the roller 208 away from the sprocket 194 (see FIG. 39). In the cutting mechanism 82, the upper blade 220 is displaced away from the lower blade 216.

The operator then inserts the hands into the film manufacturing apparatus 10 through the light-shielding bag means 54a through 54h. Since each of the light-shielding bag means 54a through 54h has the inner and outer bags 60a, 60b outside and inside of the doors 52a through 52c, as shown in FIG. 3, no external light leaks into the film manufacturing apparatus 10 from where the hands are inserted into the film manufacturing apparatus 10.

While viewing images displayed on the display monitor 40, the operator removes the light-shielding cloth 118 from the light-shielded magazine 70, opens the shutter 116, takes out the film strip 14a following the leading end of the film roll 14, trains the film strip 14a around the rollers 76a, 76b and the dancer roller 180, and places perforations 16 of the film strip 14a on the sprocket 194. Then, the operator inserts the end of the film strip 14a through the slit 224 defined between the upper and lower guides 222a, 222b, and threads the film strip 14a to the cutting mechanism 82.

When the threading process is finished, the cylinder 198 of the feed mechanism 80 is actuated to bring the rollers 204, 208 into abutment against the sprocket 194 with the film strip 14a interposed therebetween. The film strip 4a is now sandwiched between the rollers 204, 208 and the sprocket 194 (see FIG. 8).

Thereafter, the cylinder 184 is lowered to a lowermost position, allowing the dancer roller 180 supported on the rod 187 to drop by gravity thereby to take up the sag in the film strip 14a which has been threaded. The dancer roller 180 is now suspended by the film strip 14a (see FIG. 7).

Then, in order to move the dancer roller 180 to the position where it is detected by the uppermost photointerrupter 192a, the feed-out motor 148 of the feed-out mechanism 74 is energized to rotate at a low speed in a direction to wind back the film roll 14. When the dog 190 connected to the base 188 of the dancer roller 180 is detected by the photointerrupter 192a, the feed-out motor 148 is de-energized. As a result, the film strip 14a is kept shortest in the buffer mechanism 78. The position of the dancer roller 180 at the photointerrupter 192a will hereinafter be referred to as a "threading origin".

After the dancer roller 180 is set to the threading origin, in order to accurately recognize the vertical position of the dancer roller 180 at any time, the counter 759 connected to the photo-detecting unit 174 which is disposed upstream of the buffer mechanism 78 for counting perforations 16 and the counter 761 connected to the photo-detecting unit 228 which is disposed downstream of the buffer mechanism 78 for counting perforations 16 are reset to "0". The dancer position calculator 764 can accurately calculate any position of the dancer roller 180 relative to the threading origin depending on the difference between the number of perforations 16 counted by the counter 159 and the number of perforations 16 counted by the counter 161, based on the interval information of the perforations 16 which are spaced at constant intervals.

After the film strip 14a is thus threaded, the leading end of the film strip 14a to be processed into a product is positioned. For positioning the leading end of the film strip 14a, in FIG. 38, the selector switch SW1 is connected to the film feed pattern generator 744a, and the selector switch SW2 is connected to the film roll rotation controller 746.

The diameter of the film roll 14 is calculated in order to synchronize the rotation of the film roll 14 and the rotation of the sprocket 194 for feeding out the film strip 14a.

After the count of the counter 760 which counts perforations 16 based on the signal from the light-detecting unit 174 disposed upstream of the buffer mechanism 78 is set to "0", only the feed-out motor 148 is energized to feed out the film strip 14a by a small distance. The distance that the film strip 14a is fed out is selected such that the count of the counter 760 which increases as the film strip 14a is fed out reaches a preset value, i.e., such that the dancer roller 180 is vertically positioned in a range between the photointerrupters 192a, 192b.

The roll diameter calculator 762 determines the diameter of the film roll 14 based on the counts of the counters 756, 760. Specifically, the diameter D of the film roll 14 is calculated according to the following equation (1):

$$((\pi \cdot D) \cdot (\Delta P/k) = n \cdot N \tag{1}$$

where n represents the pitch (mm) of the perforations 16, $\Delta P$ an increase in output pulses from the rotary encoder 168 as counted by the counter 756 while the film strip 14a is being fed out the small distance, N the number of perforations 16 counted by the counter 760, and k the number of output pulses from the rotary encoder 168 which are generated while the film roll 14 makes one revolution.

Figure 40:
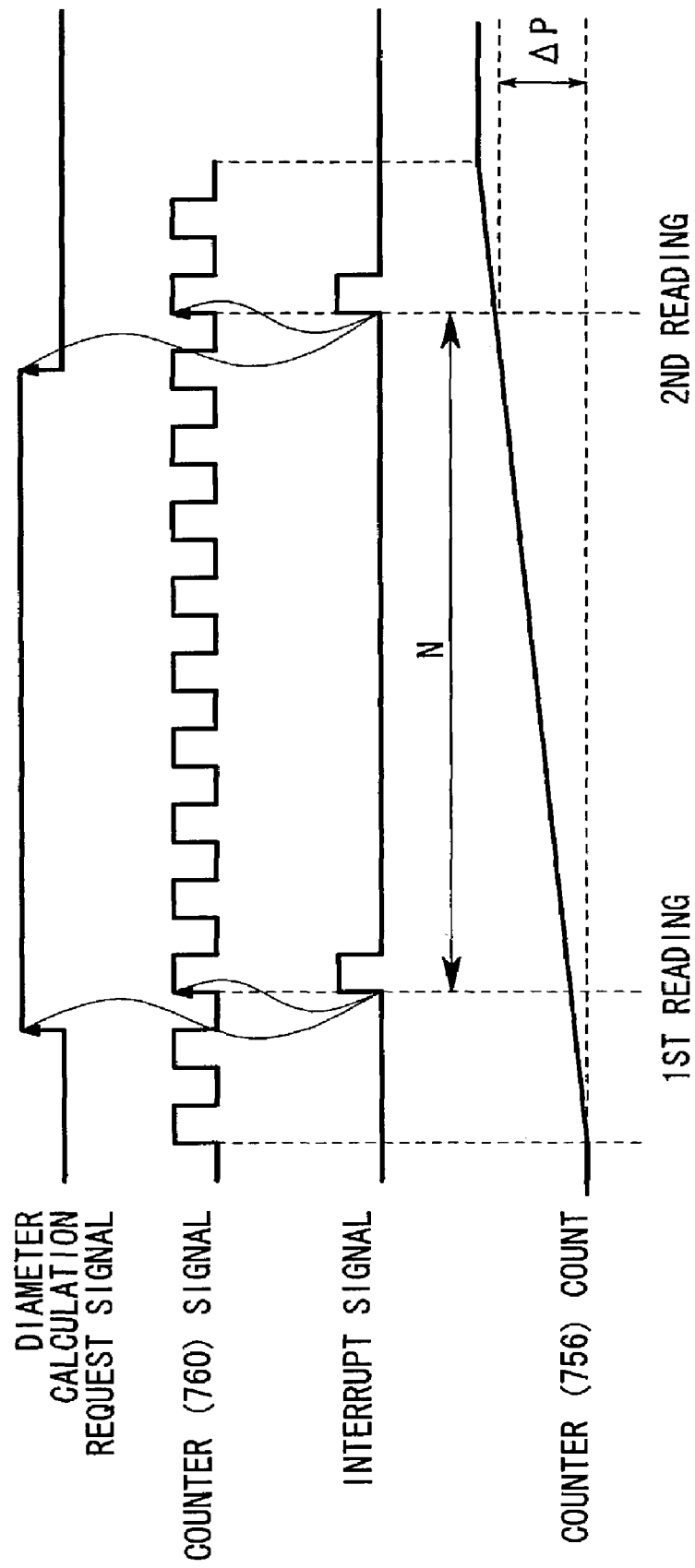
FIG. 40 is a timing chart of a process of calculating the diameter of a film roll according to the first embodiment.

As shown in FIG. 40, the roll diameter calculator 762 recognizes a positive-going edge of a detected signal representing a perforation 16 immediately after a diameter calculation request signal is started, as an interrupt signal through the interrupt I/O 758, and reads present values of the counters 756, 760 the instant the positive-going edge is recognized. Thereafter, the roll diameter calculator 762 recognizes a positive-going edge of a detected signal representing a perforation 16 immediately after the diameter calculation request signal is ended, as an interrupt signal through the interrupt I/O 758, and reads present values of the counters 756, 760 the instant the positive-going edge is recognized. The difference between the first and second read values of the counter 756 corresponds to the increase $\Delta P$ in output pulses from the rotary encoder 168 in the equation (1), and the difference between the first and second read values of the counter 760 corresponds to the number N of perforations 16 counted by the counter 760 in the equation (1). Using the increase $\Delta P$ and the counted number N of perforations 16, the roll diameter calculator 762 calculates the diameter D of the film roll 14 according to the equation (1).

Based on the fact that the film roll 14 has accurately spaced perforations 16, the diameter D of the film roll 14 can be calculated with a relatively less costly arrangement without having to directly measure the diameter D of the film roll 14. Since the above process of calculating the diameter D of the film roll 14 is carried out as an interrupt process based on positive-going edges of detected signals representing perforations 16, the cycle time of the sequencer is affected minimally, and the diameter D of the film roll 14 can be calculated highly accurately.

Then, a process of shaping the leading end of the film strip 14a into the leading end 20a shown in FIG. 2 based on the position of a notch 18 defined in the film strip 14a is carried out.

First, the inserting mechanism 84 is actuated to make itself ready for discarding a certain length from the leading end of the film strip 14a. Specifically, the cylinder 248 is actuated to cause the movable brackets 250, 253 to lift the first and second guides 238a, 283b while they are held close to each other. At this time, the guide plate 256 fixed to the movable bracket 253 is also lifted to the position shown in FIG. 41.

Thereafter, the film roll rotation controller 746 energizes the feed-out motor 148 of the feed-out mechanism 74 to rotate the pulleys 150, 154, the rotatable shaft 156, the chuck 160, and the rotatable shaft 124 of the light-shielded magazine 70 to feed the film strip 14a from the film roll 14. At the same time, the sprocket controller 748 energizes the feed motor 196 of the feed mechanism 80 to rotate the sprocket 194 for thereby supplying the film strip 14a through the cutting mechanism 82 to the position between the insertion rollers 236a, 236b of the inserting mechanism 84. The insertion roller controller 750 energizes the feed motor 246 for the insertion roller 236b in synchronism with the feed motor 196 to deliver the leading end portion of the film strip 14a downwardly in the winding unit 34 along the curved lower surface of the guide plate 256. The feed-out motor 148 and the feed motors 196, 246 are controlled to rotate the film roll 14, the sprocket 194, and the insertion roller 236b to rotate at coordinated peripheral speeds.

The leading end portion of the film strip 14a is delivered downwardly in the winding unit 34 and discarded because the leading end portion is touched by the operator in the threading process and may possibly be damaged as it is positioned on the outer circumferential surface of the film roll 14. The film strip 14a may also be discarded if necessary while wound-film-loaded cartridges 12 are being manufactured.

The position of the notches 18 defined in the film strip 14a may possibly contain an error due to dimensional discrepancies between lots of film rolls 14. From the standpoint of desired product quality, it is necessary to cut off the film strip 14a at a constant position with respect to a perforation 16. To meet such a requirement, a detected signal indicative of a notch 18 and a detected signal indicative of a perforation 16 are generated by the AND gate 774, and an edge of the output signal from the AND gate 774 is used as a reference signal for the position to cut the film strip 14a into a fixed-length film 20. In this manner, the film strip 14a can be cut off at a constant position with respect to a perforation 16 regardless of a notch position error due to dimensional discrepancies between lots of film rolls 14. The output signal from the AND gate 774 is processed by the interrupt I/O 776 to minimize any adverse effect on the cycle time of the sequencer, for thereby determining the film strip cutting position highly accurately.

After having received the reference position to cut the film strip 14a based on a detected notch 18, the film feed pattern generator 744a continuously delivers the film strip 14a until the notch 18 reaches a given cutting position in the cutting mechanism 82. At this time, in order to attain a position to stop the notch 18 more accurately, the film feed speed of the film feed pattern generated by the film feed pattern generator 744a is changed to a value for feeding the film strip 14a at a sufficiently low speed. According to the changed film feed pattern, the film roll 14, the sprocket 194, and the insertion roller 236b are rotated at low speeds. The length of the film strip 14a which is fed by the film roll 14, the sprocket 194, and the insertion roller 236b is determined according to a design value of the film manufacturing apparatus 10.

The feeding of the film strip 14a is stopped when the film strip 14a is fed a desired length and the notch 18 reaches given cutting position in the cutting mechanism 82. Thereafter, the cylinder 218 of the cutting mechanism 82 is actuated to lower the upper blade 220 to cut off the film strip 14a, producing a leading end 20a of a fixed-length film 20 and a trailing end 20b (see FIG. 42).

After the film strip 14a is cut off by the cutting mechanism 82 and the upper blade 220 is lifted away from the lower blade 216 by the cylinder 218, the insertion roller 236b is rotated by the feed motor 246 to discard an unwanted cut-off portion of the film strip 14a which remains in the cutting mechanism 82 along the guide plate 256 downwardly in the winding unit 34. At the same time, the debris including the notch 18 which is also severed by the cutting mechanism 82 is also discarded from the cutting mechanism 82 downwardly in the winding unit 34.

After the unwanted cut-off portion and the debris are thus discarded, the various mechanisms of the film manufacturing apparatus 10 are initialized prior to an automatic mode of operation of the film manufacturing apparatus 10 to manufacture wound-film-loaded cartridges 12.

Figure 41:
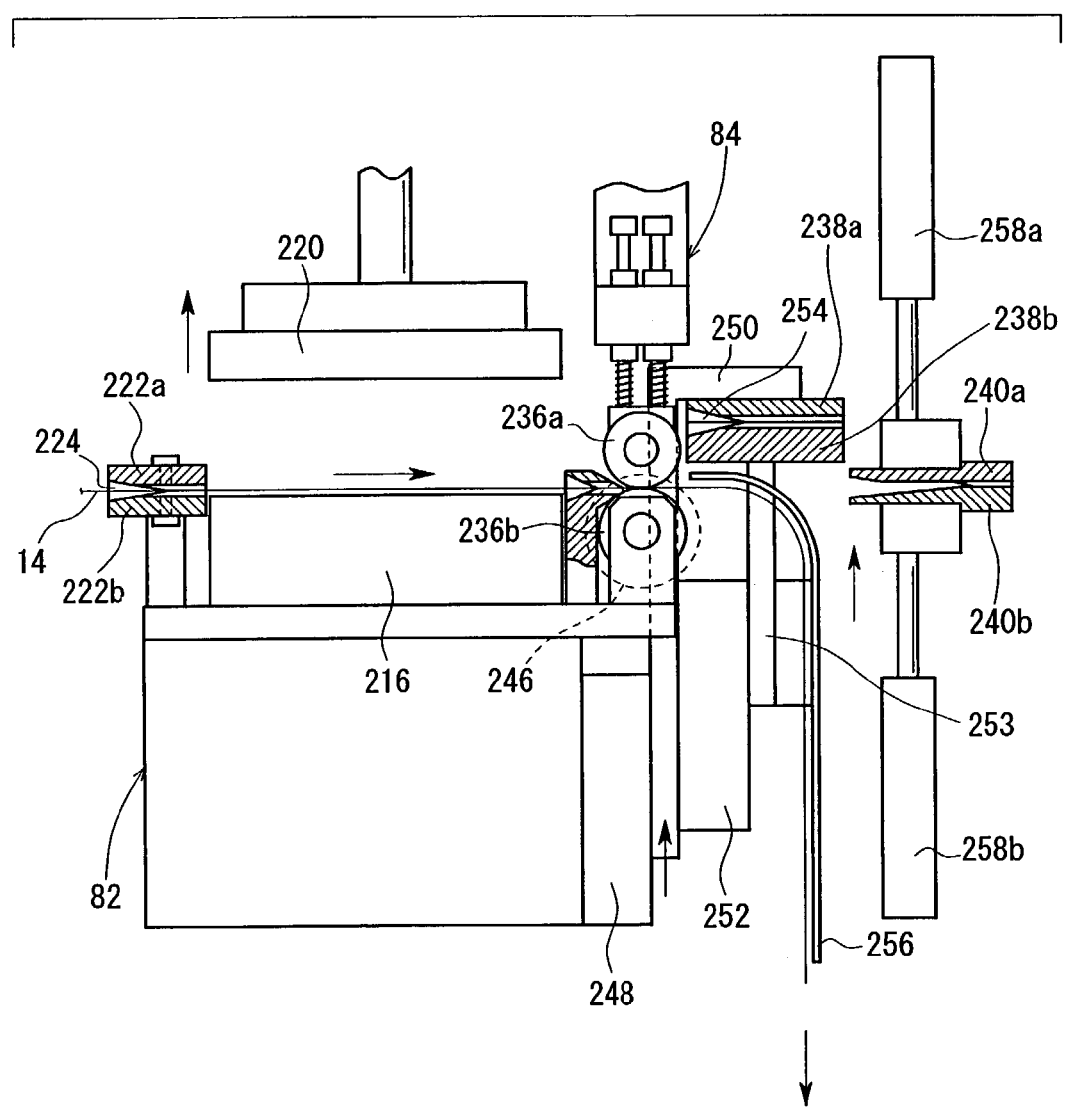
FIG. 41 is an elevational view illustrative of the manner in which the inserting mechanism according to the first embodiment operates.

The cylinder 248 of the inserting mechanism 84 is actuated to lower the movable bracket 250 from the position shown in FIG. 41, thus lowering the first and second guides 238a, 238b. As a result, a passage defined by the slit 254 between the first and second guides 238a, 238b for the insertion of the leading end of the film strip 14a is provided downstream of the insertion rollers 236a, 236b (see FIG. 10).

Then, the selector switch SW2 is connected to the dancer position corrector 781. The dancer position corrector 781 energizes the feed-out motor 148 of the feed-out mechanism 74 based on the positional information of the dancer roller 180 from the dancer position calculator 764 for thereby feeding out the film strip 14a from the film roll 14. The dancer roller 180 which has been vertically positioned between the photointerrupters 192a, 192b now starts being lowered. When the dancer roller 180 reaches the photointerrupter 192b, the dancer position corrector 781 de-energizes the feed-out motor 148. The position of the dancer roller 180 at the photointerrupter 192b will hereinafter be referred to as a "dancer origin".

Concurrent with the above preparatory process, size information of a fixed-length film 20 is either supplied from the host computer to or manually entered into the film feed pattern generator 744b, and thickness information of a fixed-length film 20 is also either supplied from the host computer to or manually entered into the film roll rotation controller 746.

The film manufacturing apparatus 10 now starts to operate in an automatic mode for manufacturing wound-film-loaded cartridges 12. At this time, the selector switch SW1 is connected to the film feed pattern generator 744b, and the selector switch SW2 is connected to the film roll rotation controller 746.

In the automatic mode of operation, spools 22 are successively supplied from the spool feeder 44 through the spool supply mechanism 86 to the winding mechanism 88.

Specifically, as shown in FIG. 11, spools 22 supplied from the spool feeder 44 drop while their flanges 22a, 22b are engaging the guide plates 266a, 266b of the chute 264, and are supplied to the spool supply mechanism 86. As shown in FIG. 11, the spool extracting plate 276 is disposed in the groove 278 at the lower ends of the guide plates 266a, 266b in the spool supply mechanism 86, and holds thereon the lowermost one of the succession of spools 22 along the chute 264. The spool receiver 300 for transferring the spool 22 to the winding mechanism 88 is waiting for a spool 22 below the spool extracting plate 276.

The cylinder 270 is actuated to enable the movable plate 272 and the bracket 274 to remove the spool extracting plate 276 from the groove 278, causing the lowermost spool 22 to drop onto the spool receiver 300. After the spool 22 is transferred to the spool receiver 300, the cylinder 270 is actuated again to move the spool extracting plate 276 back into the groove 278 to prevent the next spool 22 from dropping onto the spool receiver 300.

Figure 43:
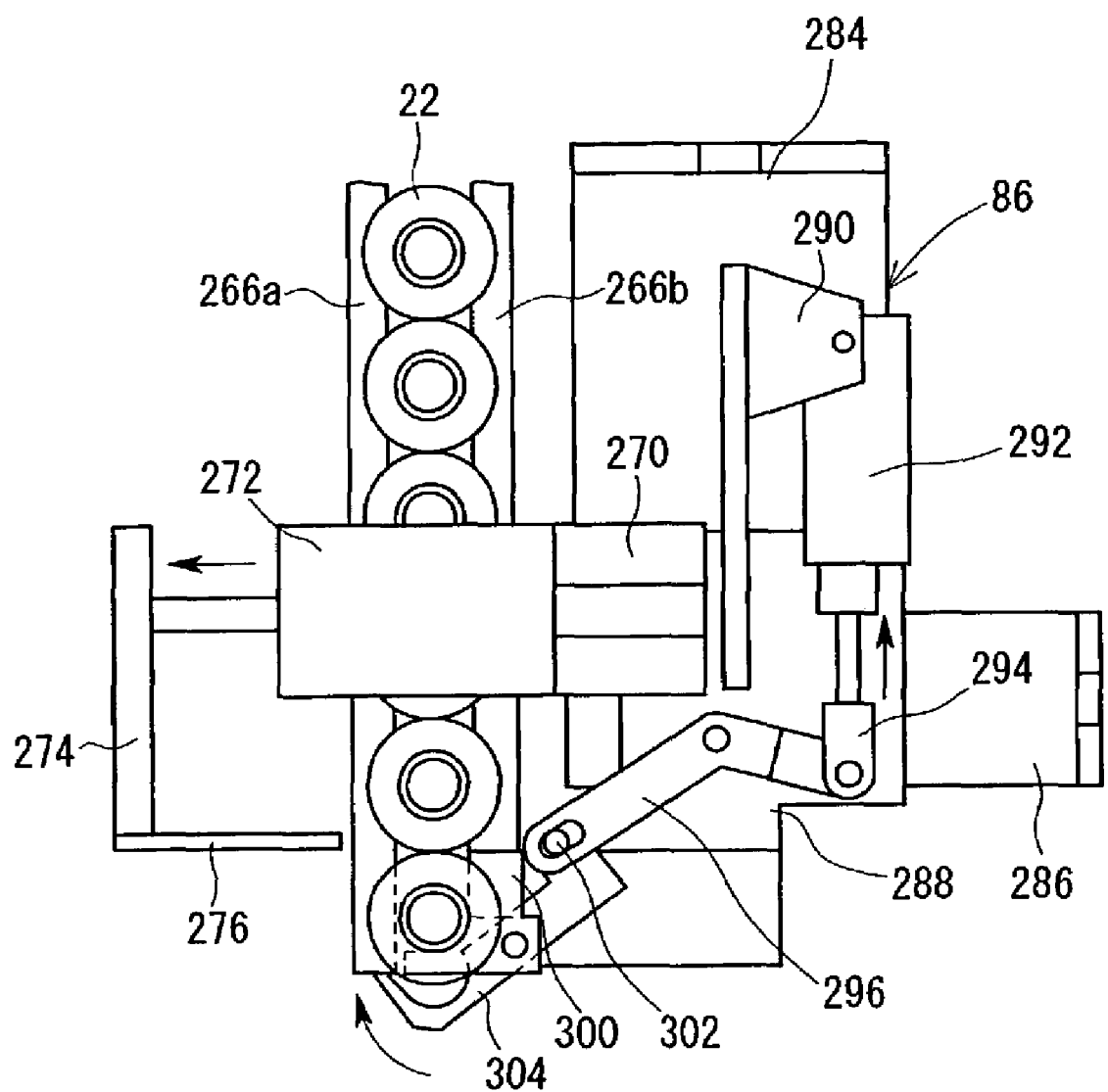
FIG. 43 is an elevational view illustrative of the manner in which the spool supply mechanism according to the first embodiment operates.

The third cylinder 292 is actuated to turn the spool rest 304 supported on the spool receiver 300 clockwise in FIG. 43 to hold the spool 22. Thereafter, the first cylinder 284 is actuated to lower the spool receiver 300 to a vertical position aligned with the engaging arms 352a, 352b. Then, the second cylinder 286 is actuated to move the spool receiver 300 and the spool rest 304 toward the inserting mechanism 84 (see FIG. 44), placing them between the engaging arms 352a, 352b. The cylinders 344a, 344b of the winding mechanism 88 are then actuated to cause the bearing members 350a, 350b supported on the movable tables 346a, 346b to displace the engaging arms 352a, 352b toward the spool 22 and bring the engaging arms 352a, 352b into engagement with the respective ends of the spool 22 (see FIGS. 13 and 15).

After the spool 22 is transferred to the winding mechanism 88, the third cylinder 292 of the spool supply mechanism 86 is actuated to displace the rod 294 downwardly. The link 296 is turned about the pin 302 inserted in the oblong hole 298 to angularly move the spool rest 304 coupled to the distal end of the link 296 away from the spool 22 (see FIG. 45). Then, the spool rest 304 and the speed receiver 300 operate in a process which is a reversal of the process shown in FIGS. 43 and 44, returning to the position at the lower ends of the guide plates 266a, 266b where they wait for a next spool 22.

Figure 46:
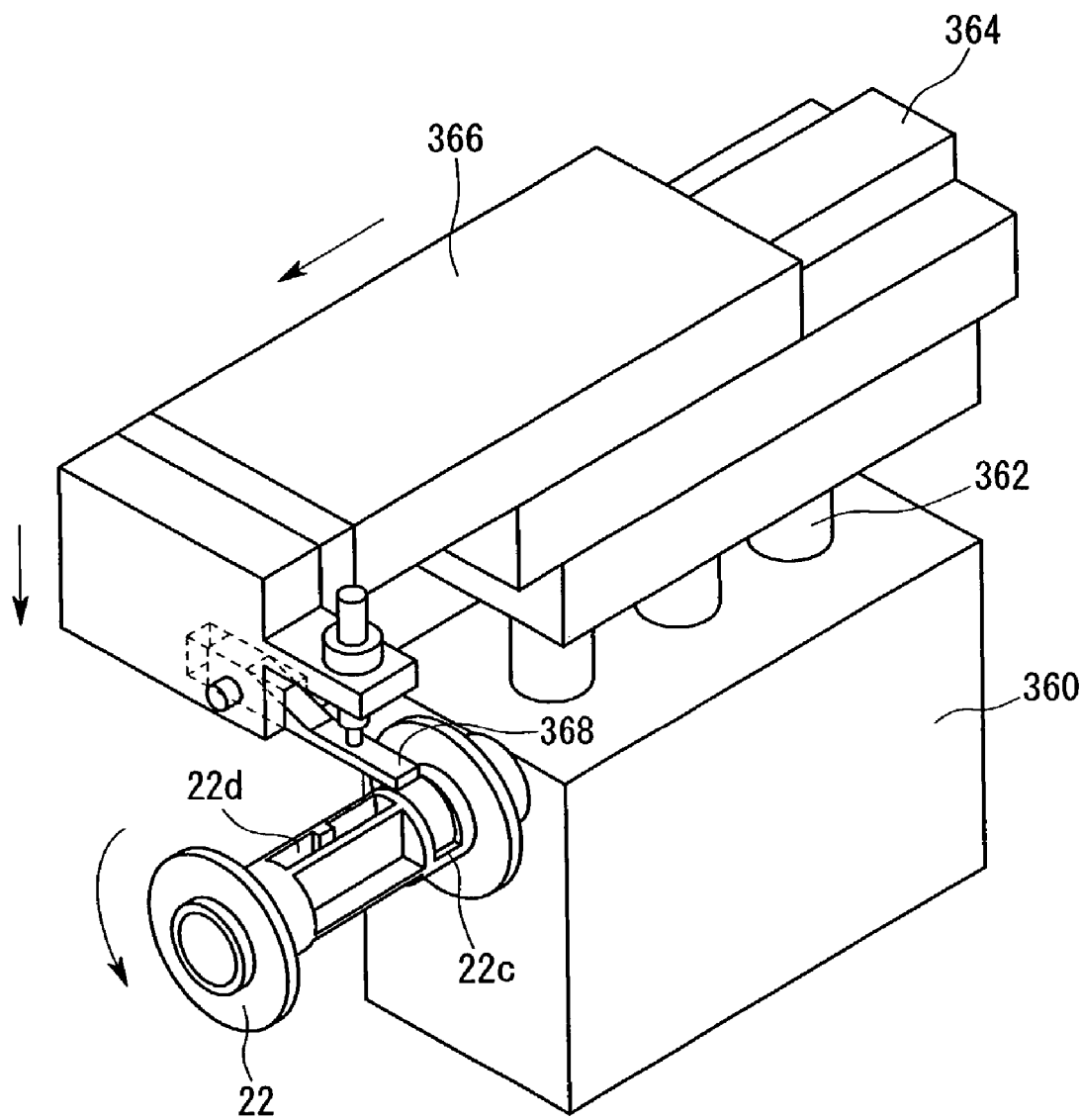
FIG. 46 is a perspective view illustrative of the manner in which a spool is adjusted in phase in the winding mechanism according to the first embodiment.

In the winding mechanism 88 which has received the spool 22 from the spool supply mechanism 86, the second cylinder 364 is actuated to cause the movable block 366 to move the phase adjusting plate 368 to a position above the step 22c of the spool 22. Thereafter, the first cylinder 306 is actuated to cause the rod 362 to lower the second cylinder 364 until the tip end of the phase adjusting plate 368 abuts against the spool 22 (see FIG. 46). Then, the spool rotation controller 752 energizes the winding motor 354 (see FIG. 47) to cause the engaging arm 352b to rotate the spool 22 about its own axis. When the tip end of the phase adjusting plate 368 abuts against the step 22c of the spool 22, the winding motor 354 generates a torque greater than a certain level. The torque thus generated by the winding motor 354 is detected by the servoamplifier 780, which de-energizes the winding motor 354 thereby to adjust the groove 22d of the spool 22 in phase, i.e., to a certain angular position.

Figure 15:
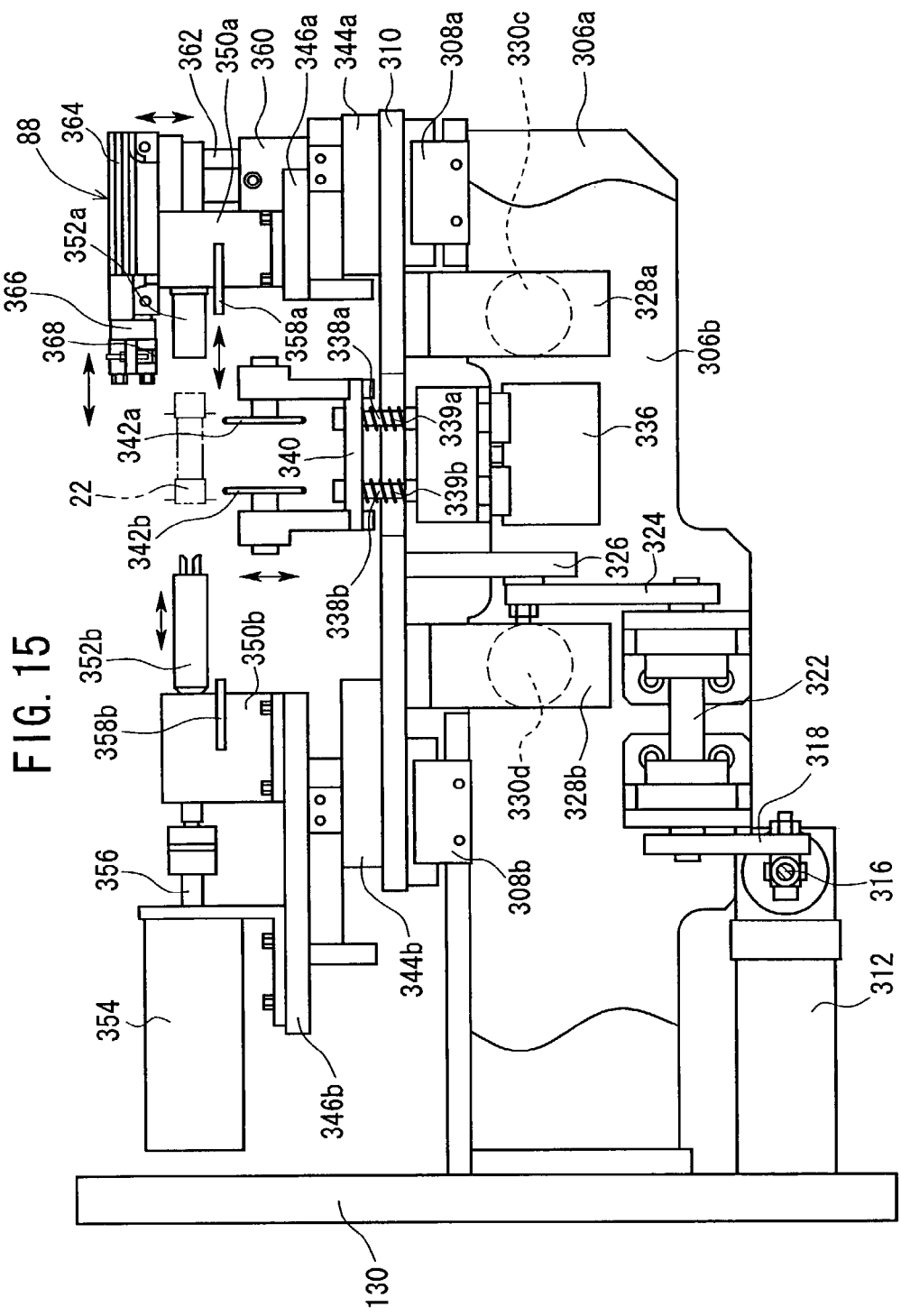
FIG. 15 is a front elevational view of the winding mechanism according to the first embodiment.

After the spool 22 is adjusted in phase, the phase adjusting plate 368 is returned to its original position shown in FIG. 15. Then, a process of inserting the leading end 20a of the film strip 14a into the groove 22d of the spool 22 is carried out.

Figure 47:
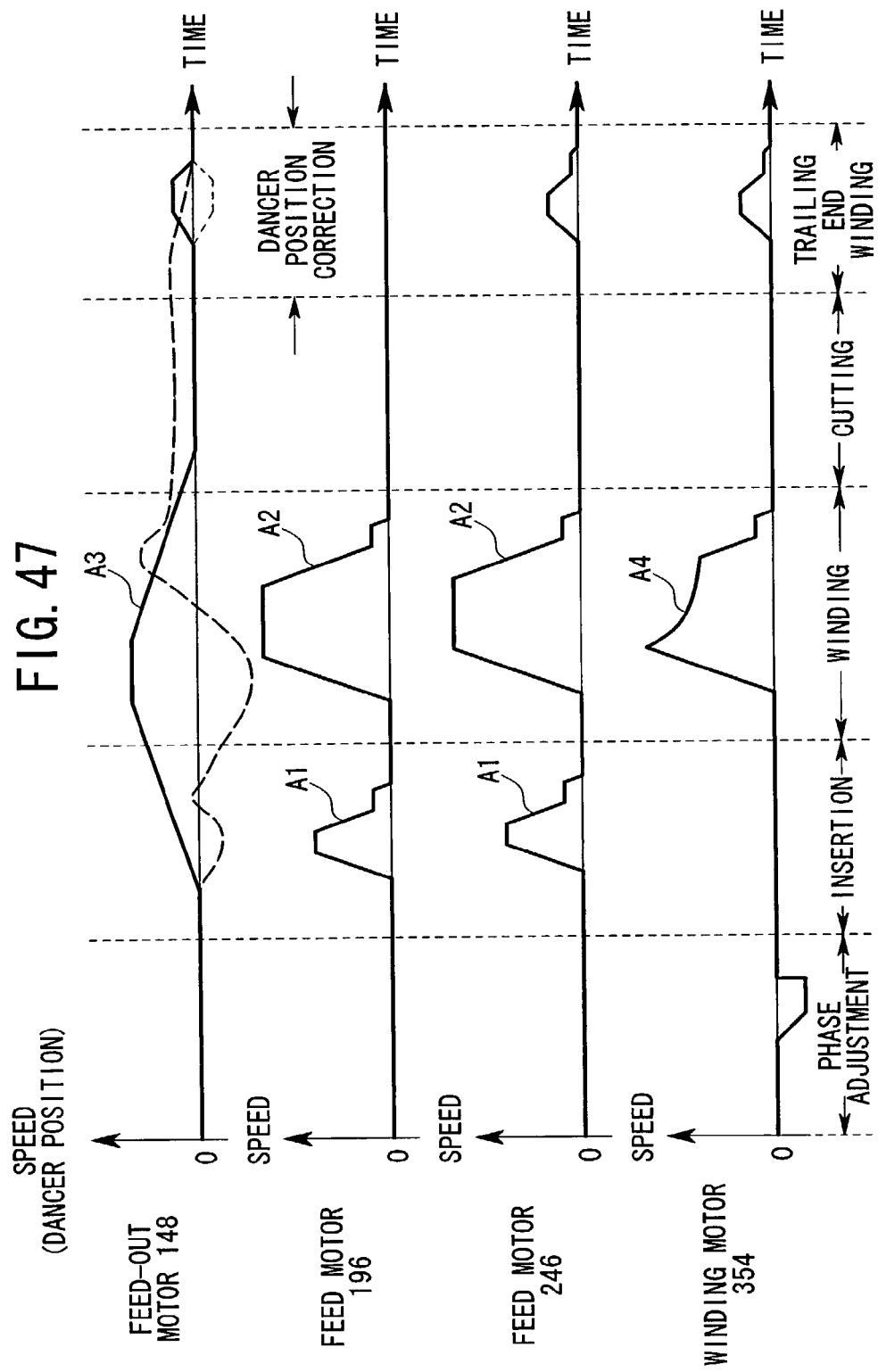
FIG. 47 is a diagram showing a film feed pattern in the film feed system according to the first embodiment.

The film roll rotation controller 746, the sprocket controller 748, and the insertion roller controller 750 energize the feed-out motor 148 and the feed motors 196, 246 according to film feed patterns A1, A3 shown in FIG. 47 for thereby feeding the film strip 14a a given length toward the spool 22. The leading end 20a of the film strip 14a is guided by the first guides 238a, 238b of the inserting mechanism 84, and thereafter is made rigid by being curved by the recess 260a and the land 260b of the second guides 240a, 240b, so that the leading end 20a of the film strip 14a can smoothly be inserted into the groove 22d (see FIGS. 10 and 13).

Figure 48:
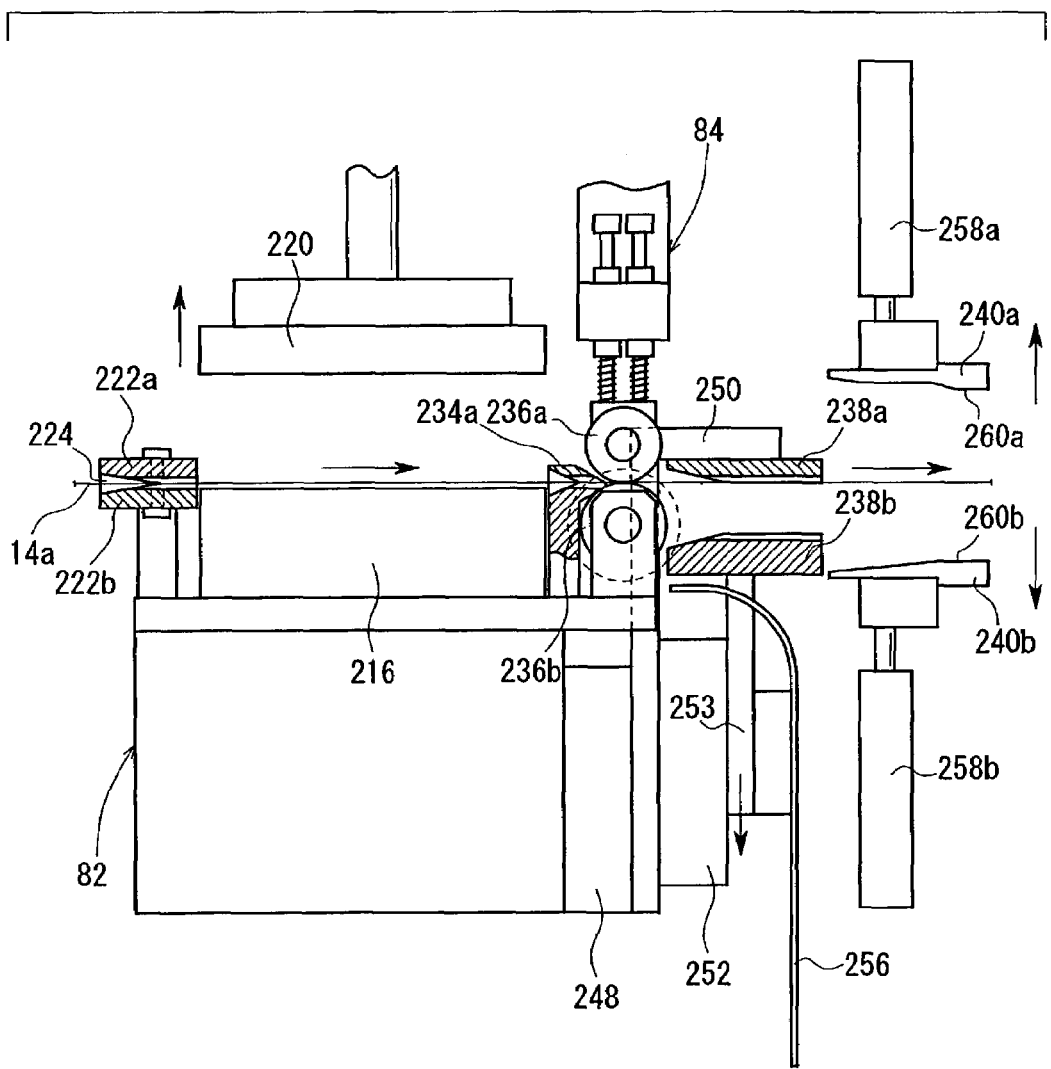
FIG. 48 is an elevational view illustrative of the manner in which the inserting mechanism according to the first embodiment operates.

After the leading end 20a is inserted into the groove 22d of the spool 22, the film strip 14a starts being wound around the spool 22. The first guides 238a, 238b and the second guides 240a, 240b of the inserting mechanism 84 are spaced from the film strip 14a, as shown in FIG. 48, in order to prevent the film strip 14a as it is wound around the spool 22 from being damaged by sliding contact with the first guides 238a, 238b and the second guides 240a, 240b. Specifically, the cylinder 252 is actuated to cause the movable bracket 253 to lower the first guide 238b away from the first guide 238a. The cylinders 258a, 258b are also actuated to move the second guides 240a, 240b vertically away from each other.

Then, the film roll rotation controller 746, the sprocket controller 748, and the insertion roller controller 750 energize the feed-out motor 148, the feed motors 196, 246, and the winding motor 354 according to film feed patterns A2 through A4 shown in FIG. 47. The winding motor 354 rotates the engaging arm 352b in a direction opposite to the direction in which it is rotated to adjust the spool 22 in phase. The film strip 14a is now wound around the spool 22.

When the film strip 14a is now wound around the spool 22, the coil of the film strip 14a on the spool 22 progressively increases in diameter. In order to prevent the peripheral speed at which to wind the film strip 14a from increasing due to the increasing diameter of the coil of the film strip 14a on the spool 22 and also to prevent the tension of the film strip 14a as it is wound around the spool 22 from increasing due to the increasing peripheral speed, the spool rotation controller 752 calculates the film feed pattern A4 on a real-time basis to equalize the peripheral speed at which to wind the film strip 14a to the peripheral speed of the sprocket 194, using the winding diameter information from the winding diameter calculator 784 based on the film feed pattern A2, and then controls the rotational speed of the winding motor 354 according to the calculated film feed pattern A4.

Specifically, the winding diameter calculator 784 calculates a winding diameter Drw of the film strip 14a wound around the spool 22 according to the following equation (2):

$$\pi \cdot (Drw/2)^2 - \pi \cdot (DO/2)^2 = L \cdot t \quad (2)$$

where t represents the thickness of the film strip 14a which is given film information, L the length by which the film strip 14a is fed at present, as obtained from the sprocket controller 748, and DO the core diameter of the spool 22. The calculated winding diameter Drw is supplied to the spool rotation controller 752, which controls the rotational speed of the winding motor 354 according to the calculated film feed pattern A4 shown in FIG. 47.

While the film strip 14a is being wound around the spool 22, the torque generated by the winding motor 354 is detected by the servoamplifier 780, which controls the winding motor 354 not to produce a torque higher than a predetermined level, for thereby avoiding the application of an excessive tension to the film strip 14a which is being wound around the spool 22 to prevent the quality of the wound film strip 14a from being adversely affected. The information about the winding diameter calculated by the winding diameter calculator 784 is reflected as data for limiting the torque of the servoamplifier 780 for thereby carrying out a constant-tension winding process for winding the film strip 14a under constant tension or a tapered-tension winding process for winding the film strip 14a under progressively changing tension.

While the leading end 20a of the film strip 14a is being inserted into the groove 22d of the spool 22 and the film strip 14a is being wound around the spool 22, the film strip 14a is fed from the film roll 14 according to the film feed pattern A3 shown in FIG. 47 which is different from those of the sprocket 194 and the insertion roller 236b. The speed at which the film strip 14a is fed from the film roll 14 may be increased or reduced more slowly than the speeds of the sprocket 194 and the insertion roller 236b for preventing the film roll 14 from being wound in displaced layers, which would otherwise be caused due to quick accelerations and decelerations, thereby to keep the wound film strip 14a in good quality. The slower acceleration and deceleration of the film roll 14 also allows the feed-out motor 148 to be smaller in size.

The film strip 14a is supplied through the buffer mechanism 78 to the winding mechanism 88. The dancer roller 180 of the buffer mechanism 78 forms a loop as a buffer of the film strip 14a in order to adjust the difference between the speed at which the film strip 14a is fed out by the feed-out mechanism 74 and the speed at which the film strip 14a is wound by the winding mechanism 88. Since the loop of the film strip 14a is forcibly formed vertically by the dancer roller 180, the horizontal distance between the supply unit 32 and the winding unit 34 for accommodating the loop therebetween may be smaller than if the film strip 14a were looped in its free state without using the dancer roller 180. Accordingly, the film manufacturing apparatus 10 may be smaller in size.

By optimizing the relationship between the film feed pattern A3 for the feed-out motor 148 and the film feed patterns A1, A2 for the feed motor 196, it is possible to minimize the range of vertical displacements of the dancer roller 180 for thereby minimizing the vertical size of the film manufacturing apparatus 10. The film feed patterns A1 through A3 can easily be determined by calculating the difference between the rate at which the film strip 14a is introduced into the buffer mechanism 78 and the rate at which the film strip 14a is taken out of the buffer mechanism 78, using the time to start feeding out the film strip 14a, the speed at which to feed out the film strip 14a, and the times in which to accelerate and decelerate the film strip 14a.

The film roll rotation controller 746 controls the feed-out motor 148 based on the roll diameter calculated by the roll diameter calculator 762 in each feed cycle in order to equalize the speed at which the film strip 14a is fed from the film roll 14 to the film feed pattern A3. The dotted-line pattern shown in FIG. 47 over the film feed pattern A3 represents variations of the speed of the dancer roller 180 with respect to the position of the photointerrupter 192b when the feed-out motor 148 is thus controlled.

When the process of winding of the given length of film strip 14a as it is fed as described above around the spool 22 is completed, the dancer roller 180 can be stopped in the vicinity of the photointerrupter 192b, which serves as the dancer origin, with a simple control arrangement without the need for strict positional control for the dancer roller 180. If the photointerrupter 192a positioned above the photointerrupter 192b or the photointerrupter 192c positioned below the photointerrupter 192b detects the dancer roller 180, then the dancer roller 180 may be judged as malfunctioning.

The reflective sensors 358a, 358b for inspecting the respective flanges 22a, 22b of the spool 22 are disposed on respective sides of the bearing members 350a, 350b. These sensors 358a, 358b inspect the state of the flanges 22a, 22b when the spool 22 is adjusted in phase or the film strip 14a is wound around the spool 22.

Figure 49:
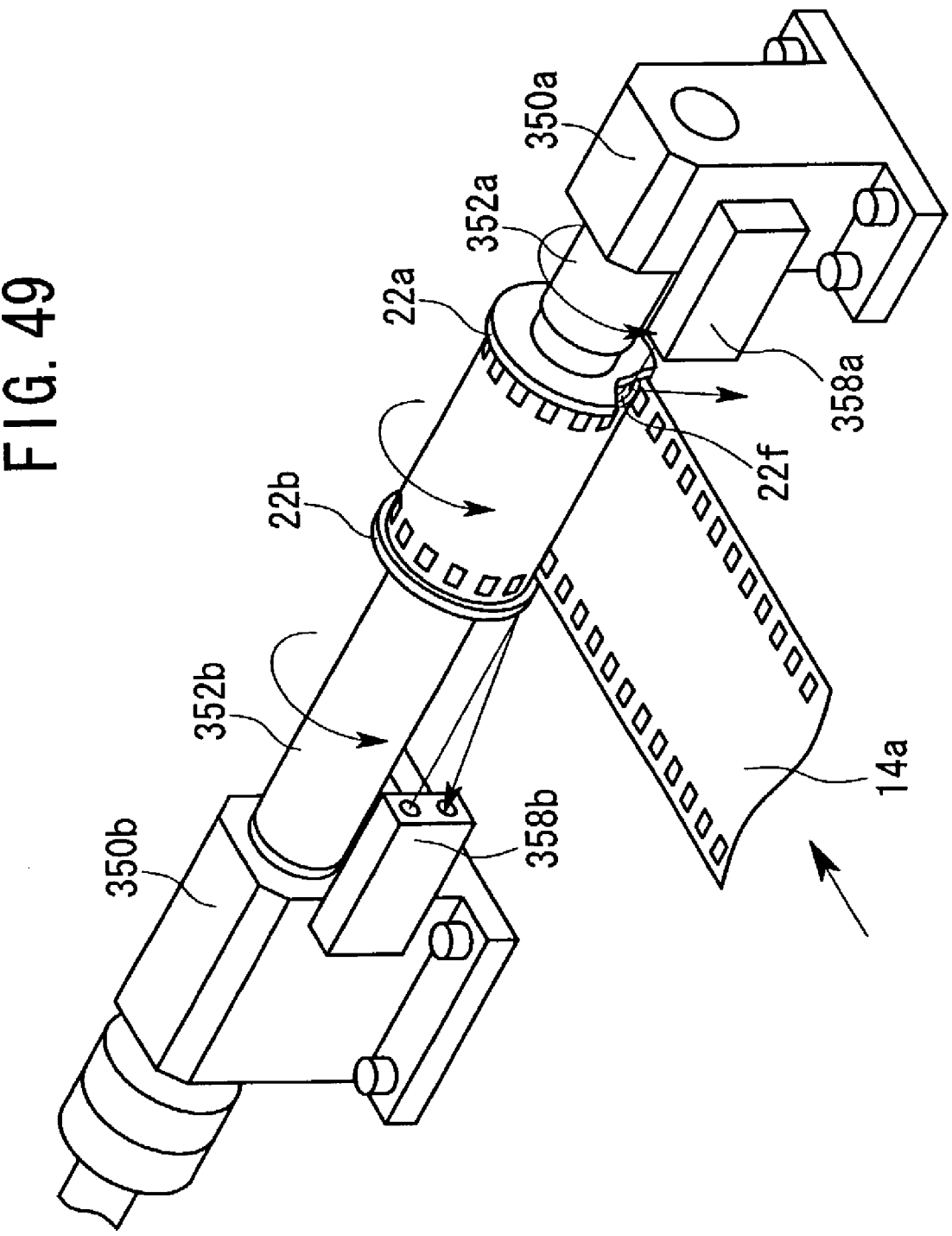
FIG. 49 is a perspective view showing how the status of a flange of a spool is inspected in the winding mechanism according to the first embodiment.

Specifically, while the spool 22 is being rotated about its own axis by the engaging arms 352a, 352b, the reflective sensors 358a, 358b apply light beams such as infrared radiation beams or the like to the respective flanges 22a, 22b to inspect the state thereof. The sensors 358a, 358b have their optical axes adjusted such that they can detect reflected light beams from the flanges 22a, 22b if they are normal. If the flange 22a has a defect 22f as shown in FIG. 49, then when the defect 22f is positioned on the optical axis of the light beam emitted from the sensor 358a, the light beam emitted from the sensor 358a is not reflected by the flange 22a, and hence the sensor 358a detects the defect 22f. The flange 22b is inspected by the sensor 358b in the same manner.

Inasmuch as the process of inspecting the flanges 22a, 22b of the spool 22 is carried out concurrently with the process of adjusting the phase of the spool 22 or the process of winding the film strip 14a around the spool 22, the time required by the inspecting process is not added to the time required to manufacture a film, making the film manufacturing process efficient. Any wound-film-loaded cartridges 12 with the film strip 14a wound around the spool 22 having the defect 22f in the flanges 22a, 22b can be discarded as defective products from the feeder conveyor 734 by the pusher 742 which is displaced by the cylinder 738 in the wound-film-loaded cartridge unloader 50 (see FIG. 35).

The flanges 22a, 22b of the spool 22 can be inspected before the film strip 14a is wound around the spool 22.

Specifically, the winding mechanism 88 inspects the flanges 22a, 22b by rotating the spool 22 with the winding motor 354 before the spool 22 is adjusted in phase by the phase adjusting plate 368. If it is confirmed that the flanges 22a, 22b have a defect 22f, then the process of adjusting the phase of the spool 22 with the phase adjusting plate 368 and the process of winding the film strip 14a around the spool 22 are not carried out, but the empty spool 22 is transferred to a next process.

Thus, the wound-film-loaded cartridge 12 with no film strip 14a wound around the spool 22 can be discarded as a defective product from the wound-film-loaded cartridge unloader 50. Therefore, the film strip 14a is not wasted, and the film manufacturing process is made economical.

After the given length of film strip 14a is wound around the spool 22, the cylinder 218 of the cutting mechanism 82 is actuated to lower the upper blade 220 toward the lower blade 216, cutting off the film strip 14a at the notch 18 into the fixed-length film 20. The debris including the notch 18 which is severed is discarded downwardly in the winding unit 34.

After the film strip 14a is cut off, the dancer roller 180 is positionally corrected as an initial setting process for supplying a next film strip 14a. Specifically, when the feed-out of the film strip 14a is completed, the position where the dancer roller 18 is stopped may be slightly displaced off the dancer origin due to a calculation error caused by the roll diameter calculator 762, and such a displacement of the dancer roller 18 off the dancer origin may be accumulated as an error in feeding out a next film strip 14a.

The dancer roller 180 is positionally corrected as follows: The dancer position calculator 764 calculates the position of the dancer roller 180 from the counts of the counters 759, 761, and determines from the calculated position whether the dancer roller 180 is located above or below the photo-interrupter 192b which serves as the dancer origin. After the selector switch SW2 is shifted to the dancer position corrector 781, the dancer position corrector 781 determines the direction in which to rotate the feed-out motor 148 based on the determined dancer roller position, and rotates the feed-out motor 148 in one direction or the other. When the dancer roller 180 reaches the dancer origin detected by the photo-interrupter 192b, the feed-out motor 148 is stopped by the dancer position corrector 781 (see FIG. 47). Then, after the dancer roller 180 reaches the dancer origin, the counts of the counters 759, 761 are initialized to appropriate values to achieve a detected dancer roller position that matches a known loop length of the film strip 14a in the buffer mechanism 78. The selector switch SW2 is shifted to the film roll rotation controller 746.

Since the position of the dancer roller 180 is not detected directly from its displacement, but calculated indirectly from the lengths of the film strip 14a which enter and leave the buffer mechanism 78, the cost of the facility required to detect the position of the dancer roller 180 is reduced, and the dancer roller 180 can be positionally controlled with sufficient accuracy. The above process of positioning the dancer roller 180 is carried out concurrently with the process, to be described later on, of winding the trailing end 20b of the severed fixed-length film 20, thus shortening the cycle time of the film manufacturing apparatus 10.

After the film strip 14a is severed and the fixed-length film 20 is wound around the spool 22, the trailing end 20b of the fixed-length film 20 is wound on the spool 22. The length of the trailing end 20b which needs to be wound on the spool 22 is determined by machine dimensions, and the trailing end 20b of the fixed-length film 20 is wound on the spool 22 by coordinating the feed motor 246 and the winding motor 354 (see FIG. 47).

When the trailing end 20b of the fixed-length film 20 passes through the point of contact between the insertion rollers 236a, 236b in the process of winding the trailing end 20b on the spool 22, the winding mechanism 88 starts being displaced toward the transfer mechanism 95 of the assembling unit 36. The cycle time of the film manufacturing apparatus 10 can thus be made shorter than if the winding mechanism 88 Were displaced toward the transfer mechanism 95 after the completion of the process of winding the trailing end 20b on the spool 22.

Specifically, as shown in FIG. 15, the cylinder 336 is actuated to lift the bracket 340 with the rods 338a, 338b, causing the support disks 342a, 342b supported on the bracket 340 to abut against the fixed-length film 20 wound around the spool 22. The fixed-length film 20 is now prevented from being unwound. Because the support disks 342a, 342b are vertically movably supported by the springs 339a, 339b, the support disks 342a, 342b can appropriately support the fixed-length film 20 regardless of the diameter of the coil of the fixed-length film 20 on the spool 22.

Figure 14:
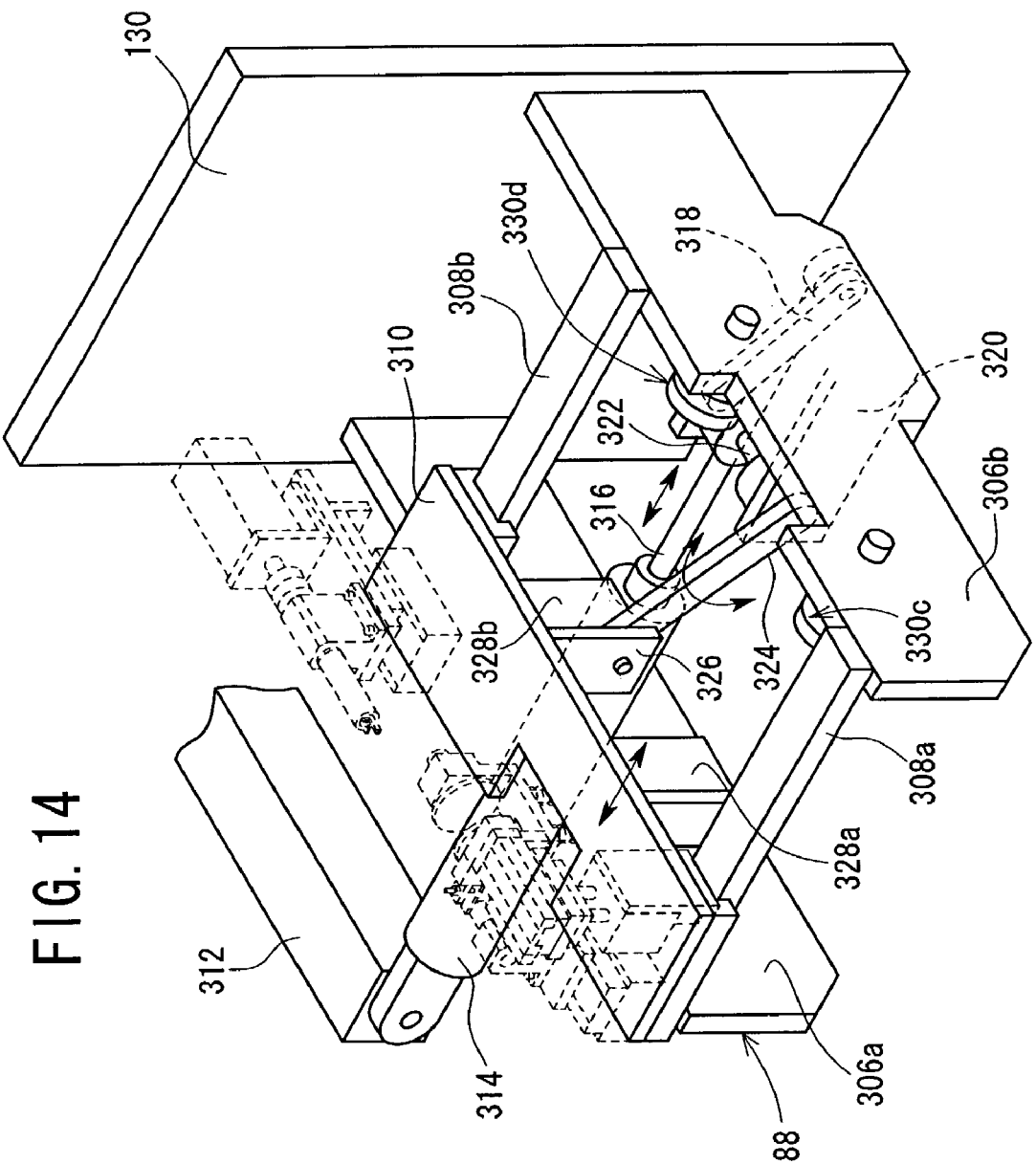
FIG. 14 is a perspective view of a moving means in the winding mechanism according to the first embodiment.

In FIGS. 14 and 16, the cylinder 314 is actuated to turn the links 318, 324 pivotally supported on the distal end of the rod 316, displacing the base 310 coupled to the end of the link 324 along the guide rails 308a, 308b toward the transfer mechanism 95. The spool 22 held on the base 310 is also displaced in unison with the base 310 toward the transfer mechanism 95.

When the base 310 moves along the guide rails 308a, 308b, the positioning plates 328a, 328b mounted on the lower surface of the base 310 abut against the shock absorbing mechanisms 330c, 330d mounted on the support plate 306b, thus positioning the spool 22 with respect to the transfer mechanism 95. As each of the shock absorbing mechanisms 330c, 330d has the shock absorber 334 and the shock absorbing plate 332 engageable by the positioning plate, no vibrations are applied to the spool 22. Therefore, the fixed-length film 20 stays wound neatly around the spool 22, and the service life of the film manufacturing apparatus 10 is prolonged. As vibrations are sufficiently absorbed by the shock absorbing mechanisms, the winding mechanism 88 can be displace at a high speed. Accordingly, the wound-film assembly 24 with the fixed-length film 20 wound around the spool 22 can be transferred at a high speed to the transfer mechanism 95.

Figure 50:
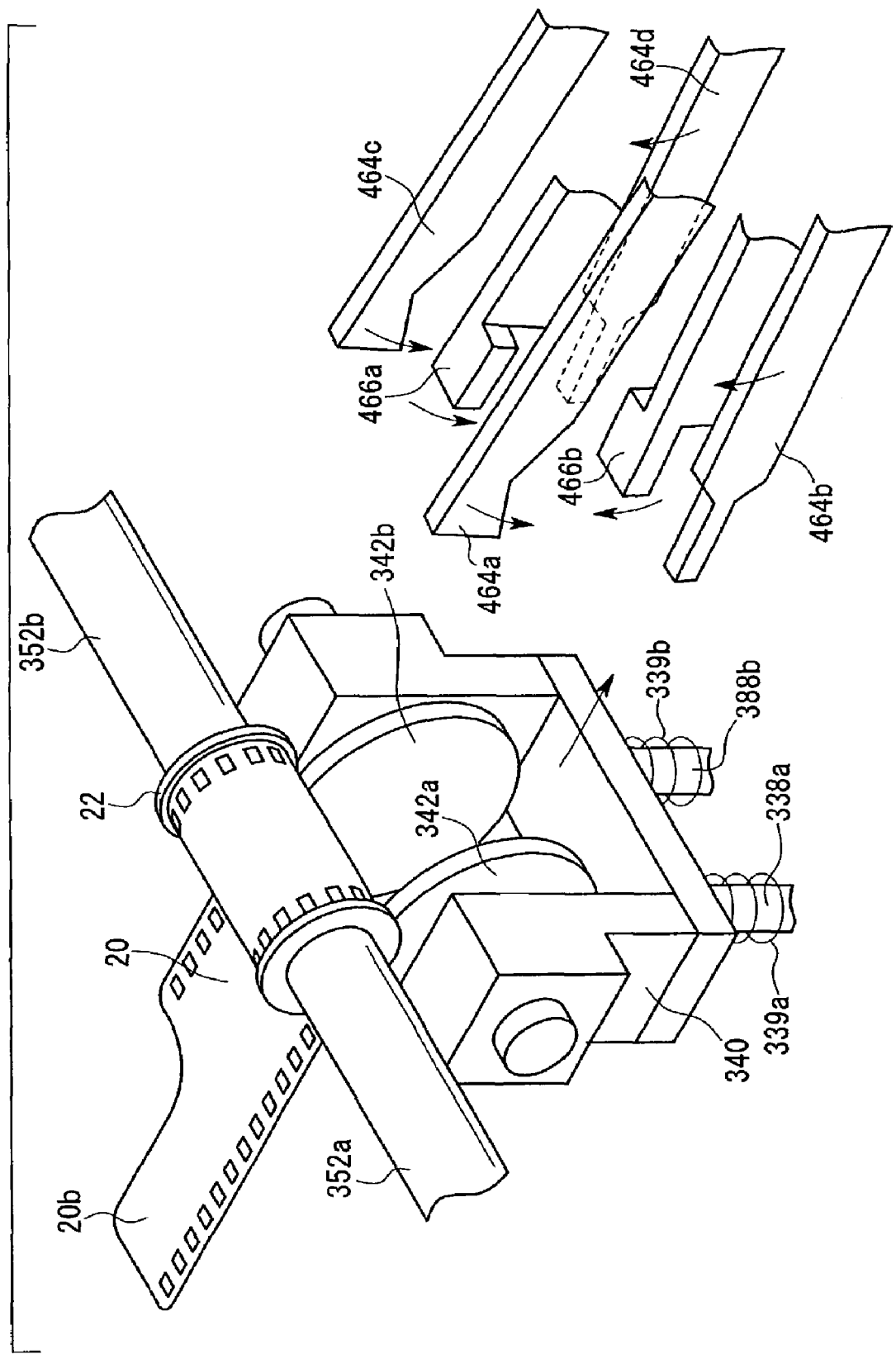
FIG. 50 is a perspective view showing how a wound-film assembly is transferred between the winding mechanism and the transfer mechanism according to the first embodiment.

The clamps 464a through 464d, 466a, 466b of the transfer mechanism 95 are brought to and kept in a forward stroke end near the winding mechanism 88 (see FIG. 20) by the first cylinder 458 and the second cylinder 462. The clamps 464a through 464d, 466a, 466b are held open by the cylinder 465 as shown in FIG. 50.

When the wound-film assembly 24 enters between the clamps 464a through 464d and between the clamps 466a, 466b, the cylinder 465 is actuated to clamp the wound-film assembly 24. The clamps 464a through 464d clamp the flanges 22a, 22b of the spool 22, and the clamps 466a, 466b clamp the fixed-length film 20. At this time, the fixed-length film 20 is prevented from being unwound by the clamps 466a, 466b.

In the winding mechanism 88, the cylinders 344a, 344b are actuated to release the engaging arms 352a, 352b from the spool 22, and, at the same time, the cylinder 336 is actuated to release the support disks 342a, 342b from the spool 22. Thereafter, the winding mechanism 88 is returned to the inserting mechanism 84. The winding mechanism 88 is positioned with respect to the inserting mechanism 84 while vibrations are sufficiently absorbed when the positioning plates 328a, 328b mounted on the lower surface of the base 310 of the winding mechanism 88 abut against the shock absorbing mechanisms 330a, 330b mounted on the support plate 306a.

The transfer mechanism 95 is moved by the first cylinder 458 to a region where the loading mechanism 96 is located (see FIG. 20). Then, the loading mechanism 96 inserts a wound-film assembly 24 held by the transfer mechanism 95 into a one-open-sided cartridge 28 supplied by the delivery mechanism 94. Prior to describing a process of inserting a wound-film assembly 24, a process of supplying a one-open-sided cartridge 28 with the delivery mechanism 94 will be described below.

In FIG. 17, a one-open-sided cartridge 28 is placed on the V-shaped seat 376a of a pallet 376 of the cartridge delivery device 46. At this time, the one-open-sided cartridge 28 is oriented such that its end free of the cap 30 faces the viewer of FIG. 17 and the straight fin 28a of the one-open-sided cartridge 28 is directed downstream with respect to the direction in which the pallet 376 is delivered. The magnet which is embedded in the surface of the V-shaped seat 376a attracts the one-open-sided cartridge 28 in position. The delivery motor 372 is energized to drive the chain belt 374 to move the pallet 376 which is holding the one-open-sided cartridge 28 in the direction indicated by the arrow, thus delivering the one-open-sided cartridge 28 to the cartridge supply mechanism 90. The bar-code reader 380 for reading the bar code 28d applied to the one-open-sided cartridge 28 is disposed in the path of the one-open-sided cartridge 28. Based on the information represented by the bar code 28d read by the bar-code reader 380, it is possible to inspect whether a one-open-sided cartridge 28 of a different type is supplied or not.

The one-open-sided cartridge 28 which is delivered to the cartridge supply mechanism 90 is confirmed for its presence by the light-emitting unit 384 and the light-detecting unit 385. After the pallet 376 is positioned based on a signal detected by the light-emitting unit 388 and the light-detecting unit 390, the one-open-sided cartridge 28 is transferred to the delivery mechanism 94.

The pallets 92 of the delivery mechanism 94 are interconnected by the links 402, and circulated along the guide rail 404 by the drive mechanism (see FIG. 19) disposed in the vicinity of the removing mechanism 108 in the assembling unit 36. Each of the pallets 92 has the positioning hole 428 defined in a corner thereof. The engaging pin 448 of the drive mechanism is moved by the cylinder 446 to project from the slot 450 defined in the partition wall 130 and engage in the positioning hole 428. When the cylinder 442 is actuated, the movable plate 444 thereof displaces the engaging pin 448 to deliver the pallet 92 intermittently.

When the pallet 92 reaches a region where the one-open-sided cartridge 28 is inserted by the cartridge supply mechanism 90, the cylinder 434 disposed in that region is actuated to insert the positioning pin 436 into the hole 428 of the pallet 92, thus positioning the pallet 92. The cylinder 430 also disposed in that region is actuated to cause the rod 432 to press the cam follower 416 of the arm 414 (see FIG. 18). The arm 414 is turned to space the movable holder 410 on its distal end away from the fixed holder 412.

When the cylinder 392 of the cartridge supply mechanism 90 is actuated, the arm 396 connected to the movable plate 394 displaces the insert 398 into the one-open-sided cartridge 28. The insert 398 is further displaced to insert the one-open-sided cartridge 28 between the movable holder 410 and the fixed holder 412 of the pallet 92 that is positioned in the way in which the insert 398 is displaced. After the one-open-sided cartridge 28 is inserted, the cylinder 430 is actuated to retract the rod 432, whereupon the movable holder 410 is displaced toward the fixed holder 412 under the tension of the spring 418 thereby to hold the one-open-sided cartridge 28. The straight fin 28a of the one-open-sided cartridge 28 is positioned and supported by the rest 424 integral with the fixed holder 412.

The pallet 92 which holds the one-open-sided cartridge 28 is delivered along the guide rail 404 to a position in front of the loading mechanism 96 (see FIG. 20). When the pallet 92 is delivered to the loading mechanism 96, the cylinder 434 disposed in that position is actuated to insert the positioning pin 436 into the hole 428 of the pallet 92, thus positioning the pallet 92. Then, the cylinder 487 disposed in that position is actuated to cause the movable plate 489 to displace the spool positioning pin 485 through the hole 429 defined in the base 408 between the movable holder 410 and the fixed holder 412 into the one-open-sided cartridge 28 (see FIG. 21). The tip end of the spool positioning pin 485 engages the end of the spool 22 near the flange 22b, which spool 22 is held by the transfer mechanism 95, thus positioning the spool 22.

Figure 51:
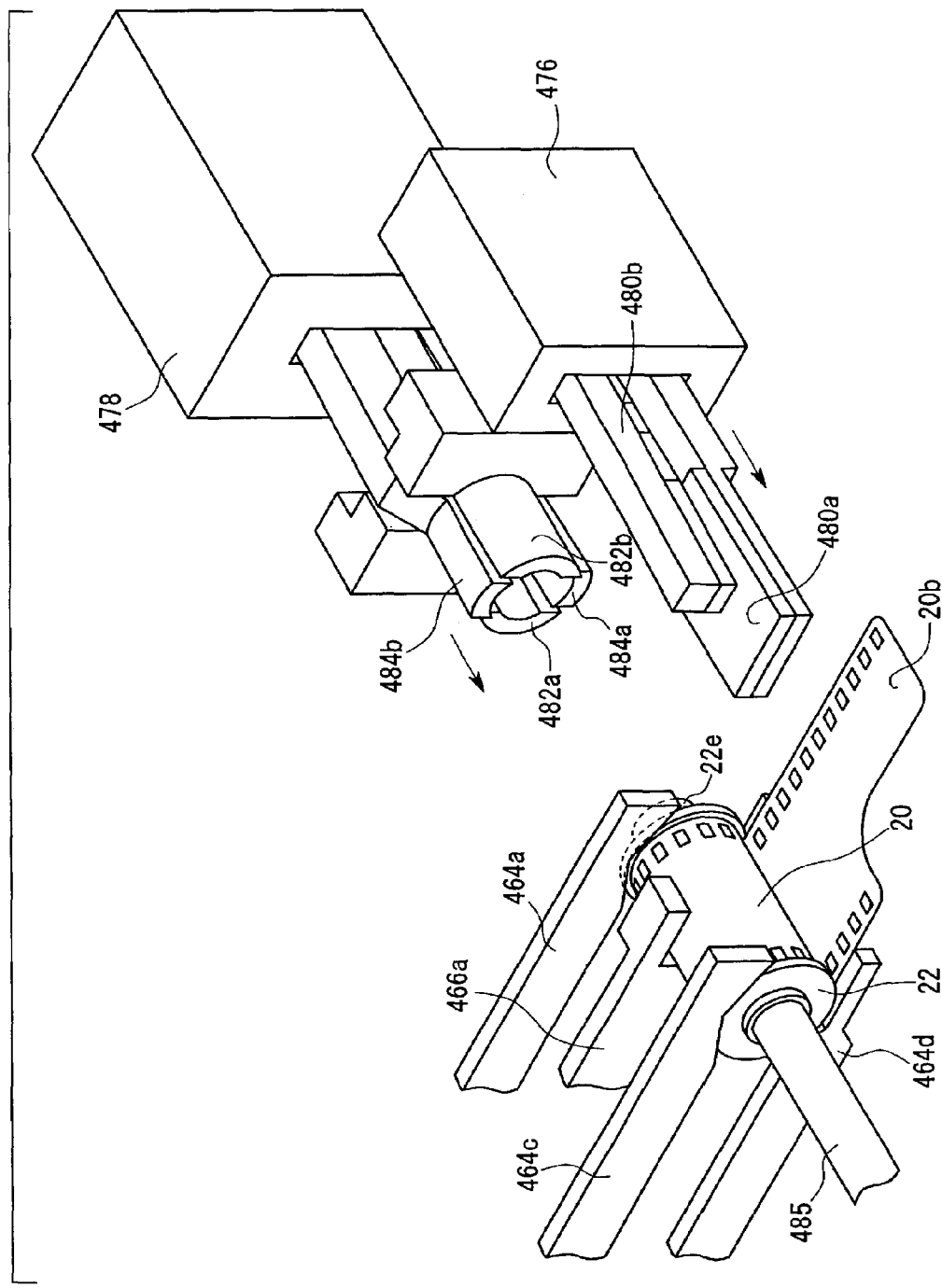
FIG. 51 is a perspective view showing the assembling mechanism according to the first embodiment before it holds the wound-film assembly.

At the same time, the second cylinder 472 is actuated to cause the movable bracket 474 to move the restrictive plates 480a, 480b, the holders 482a, 482b, and the clamps 484a, 484b toward the wound-film assembly 24 held by the transfer mechanism 95. As shown in FIG. 51, the holders 482a, 482b engage the protruding end 22e of the spool 22 and the clamps 484a, 484b are positioned above and below the protruding end 22e. The restrictive plate 480a, which is wider than the restrictive plate 480b, is located below the trailing end 20b of the fixed-length film 20, and the narrower restrictive plate 480b is located above the trailing end 20b of the fixed-length film 20.

Figure 52:
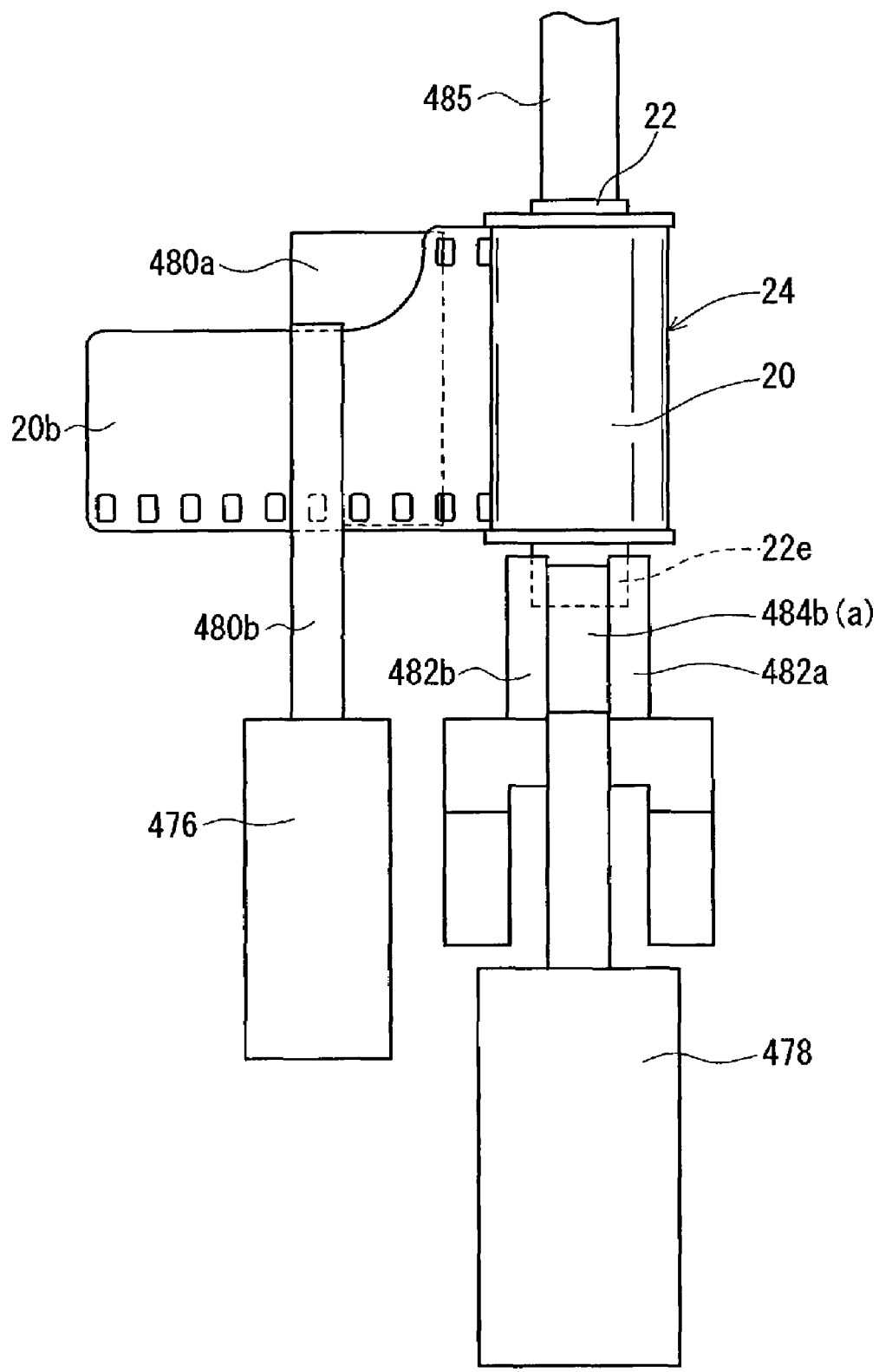
FIG. 52 is a plan view showing the assembling mechanism according to the first embodiment as it holds the wound-film assembly.

The fourth cylinder 478 is actuated to enable the clamps 484a, 484b to clamp the protruding end 22e of the spool 22. The third cylinder 476 is actuated to cause the restrictive plate 480a to position the lower surface of the trailing end 20b of the fixed-length film 20 and to cause the restrictive plate 480b to grip the trailing end 20b in coaction with the restrictive plate 480a (see FIG. 52).

After the spool 22 is held in position and the trailing end 20b of the fixed-length film 20 is gripped as described above, the cylinder 465 is actuated to move the clamps 464a through 464d, 466a, 466b away from the wound-film assembly 24, and then the second cylinder 462 is actuated to retract the clamps 464a through 464d, 466a, 466b in unison with the movable plate 463 away from the loading mechanism 96.

Then, the cylinder 430 is actuated to cause the rod 432 to press the cam follower 416 on the end of the arm 414. The arm 414 is turned to move the movable holder 410 away from the fixed holder 412. At this time, the straight fin 28a and the flange 28b of the one-open-sided cartridge 28 are spaced from each other, creating a gap therebetween. The one-open-sided cartridge 28 has been attracted by the magnet 422 embedded in the fixed holder 412.

Then, the wound-film assembly 24 held by the transfer mechanism 95 is inserted into the one-open-sided cartridge 28 by the loading mechanism 96.

Figure 53:
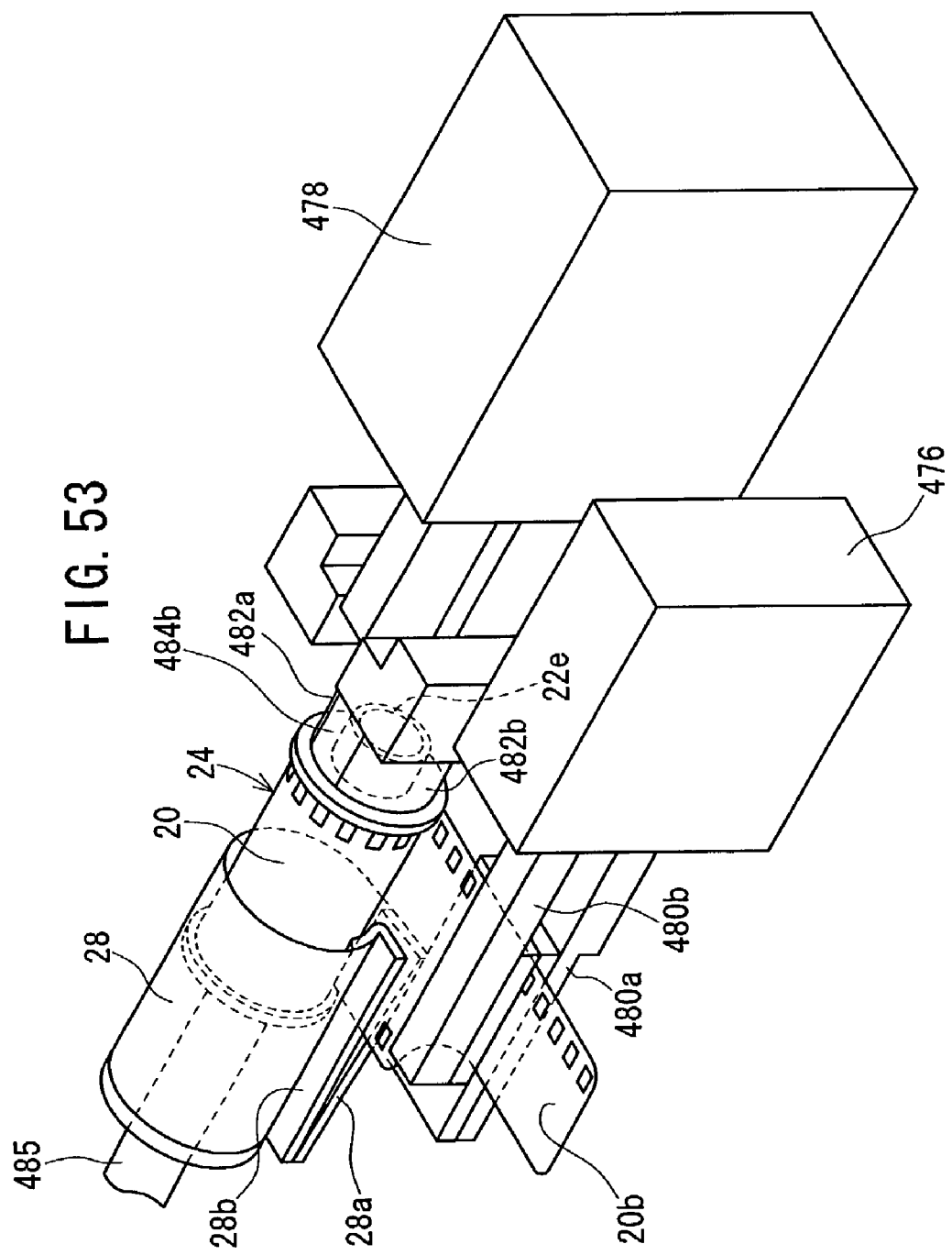
FIG. 53 is a perspective view showing the assembling mechanism according to the first embodiment as it inserts the wound-film assembly into a one-open-sided cartridge.

The first cylinder 470 is actuated to cause the movable plate 471 to move forward the third cylinder 476 and the fourth cylinder 478 while holding the wound-film assembly 24, and insert the wound-film assembly 24 into the one-open-sided cartridge 28 held by the pallet 92. The trailing end 20b of the fixed-length film 20 whose lower surface is positioned by the restrictive plate 480a is smoothly inserted into the film outlet between the straight fin 28a and the flange 28b of the one-open-sided cartridge 28 (see FIG. 53). Because the lower surface of the trailing end 20b is positioned by the restrictive plate 480a, even if the fixed-length film 20 has a different coil diameter, the trailing end 20b is held in a constant vertical position and can reliably be inserted into the one-open-sided cartridge 28.

After the wound-film assembly 24 is inserted in the one-open-sided cartridge 28, the rod 432 which has pressed the cam follower 416 of the pallet 92 is retracted, and the one-open-sided cartridge 28 is held by the movable holder 410 and the fixed holder 412. Then, the positioning pin 436 is retracted to release the pallet 92. Thereafter, the pallet 92 while holding the one-open-sided cartridge 28 with the wound-film assembly 24 inserted therein is delivered to the mounting mechanism 102, and then the positioning pin 436 is inserted again into the hole 428 of a pallet 92, thus positioning the pallet 92 (see FIG. 18).

The mounting mechanism 102 temporarily mounts a cap 30 supplied from the cap supply mechanism 100 on the one-open-sided cartridge 28. Specifically, the cap 30 is supplied from the hopper 48 through the cap supply passage 47 to the cap feeder 98 and then from the chute 486 through the guide plates 488a, 488b of the cap supply mechanism 100 to the mounting mechanism 102 (see FIG. 22).

When the cylinder 520 is actuated in FIG. 24, the joint plate 518 coupled to the rod 522 thereof displaces the rods 516a, 516b toward the partition wall 130. As the rods 516a, 516b are thus displaced, the support plates 496a, 496b of the mounting mechanism 102 are displaced toward the partition wall 130.

Upon the displacement of the support plate 496b toward the partition wall 130, the pin 500 is caused to enter between the guide plates 488a, 488b by the bracket 498 and the plate 502 which are fixed to the support plate 496b. At the same time, the displacement of the support plate 496b toward the partition wall 130 causes the plates 508, 510 coupled to the bracket 498 to remove the pin 506 from between the guide plates 488a, 488b. As a result, one cap 30 is released and dropped from the pin 506 and the pin 500 supports the cap 30. When the support plate 496b is displaced away from the partition wall 130, the upper pin 506 is inserted into the hole 30a in a cap 30 and holds the cap 30. At the same time, the lower pin 500 is removed from between the guide plates 488a, 488b, and the cap 30 supported on the pin 500 drops toward the mounting mechanism 102 (see FIG. 23). It is assumed in the description given below that one cap 30 is supplied to the mounting mechanism 102 by the above process.

The cap 30 supplied from the cap supply mechanism 100 is supplied through the slot 542 defined in the support plate 496b centrally into the cap holder 550. As shown in FIG. 25, the cap 30 is retained in the cap holder 550 by the magnets 555, the springs 560a, 560b mounted on the cap holder 550, and the plate 544 (see FIG. 23) mounted on the support plate 496b.

When the cylinder 520 of the mounting mechanism 102 is further actuated, the support plate 496b abuts against the stops 530a, 530b, and is prevented from being subsequently displaced. On the other hand, the support plate 496a is further displaced toward the support plate 496b while compressing the springs 524a, 524b. The pin 534 mounted on the support plate 496a is therefore inserted through the hole 546 defined in the plate 544 into the hole 30a in the cap 30. Then, the tip end of the presser 532 presses the outer circumferential edge of the hole 30a in the cap 30, displacing the cap 30 toward the guide blocks 572a, 572b against the springs 560a, 560b (see FIG. 25). At this time, the cap 30 is held by the pin 534 against dislodgment.

The slide tables 564a, 564b on which the guide blocks 572a, 572b are mounted are displaced toward each other by the cams 538a, 538b coupled to the support plate 496a. Specifically, as shown in FIGS. 22 and 26, when the support plate 496a is displaced toward the partition wall 130, the tapered surfaces 540a, 540b on the distal end portions of the cams 538a, 538b press the respective cam followers 570a, 570b mounted respectively on upper and lower surfaces of the slide tables 564a, 564b against the elastic force of the springs 566a, 566b. The slide tables 564a, 564b are thus displaced toward each other while being guided by the guide rails 562a, 562b. Consequently, the guide blocks 572a, 572b mounted on the slide tables 564a, 564b are also displaced toward each other.

The one-open-sided cartridge 28 accommodating the wound-film assembly 24 and delivered by the pallet 92 has been positioned between the partition wall 130 and the support plate 496b. Therefore, as shown in FIG. 27, the guide blocks 572a, 572b, each having a semiarcuate shape, grip the end of the one-open-sided cartridge 28 where the cap 30 is to be mounted. Specifically, the cartridge guides 574a, 574b in the guide blocks 572a, 572b grip the outer circumferential surface of the end of the one-open-sided cartridge 28, attaching the straight fin 28a and the flange 28b of the one-open-sided cartridge 28 closely through the ribbons 28c. The ribbons 28c projecting from the end of the one-open-sided cartridge 28 are bent toward the flange 28b by bending surface 580 in the guide block 572b. An annular gap for inserting the outer edge of the cap 30 therein is defined around the end of the one-open-sided cartridge 28 by the cap guides 576a, 576b in the respective guide blocks 572a, 572b.

The cap 30 held by the pin 534 is pressed by the presser 532 onto the end of the one-open-sided cartridge 28. At this time, since the ribbons 28c are bent by the bending surface 580 of the guide block 572b, the ribbons 28c are not caught by the cap 30, and the wound-film assembly 24 against light in the one-open-sided cartridge 28 is shielded from light effectively.

The wound-film-loaded cartridge 12 with the cap 30 temporarily mounted thereon as described above is then delivered to the crimping mechanism 104 by the pallet 92. The cap 30 does not accidentally drop down from the one-open-sided cartridge 28 because the cap 30 is retained on the one-open-sided cartridge 28 under the force of spring back to the end thereof while the pallet 92 is delivering the wound-film-loaded cartridge 12.

When the wound-film-loaded cartridge 12 is delivered to the crimping mechanism 104, the cylinder 434 located at the crimping mechanism 104 is actuated to insert the positioning pin 436 into the hole 428 in the pallet 92, thus positioning the pallet 92. Then, the positioning mechanism 624 shown in FIGS. 30 and 31 position and secure the straight fin 28a and the flange 28b of the wound-film-loaded cartridge 12. Specifically, the cylinder 632 of the first positioner 626a, which has the positioning plate 628, is displaced along the axis of the wound-film cartridge 12 by the cylinder 630. Then, the cylinder 632 is actuated to insert the positioning plate 628 into the bent region of the flange 28b. When the cylinder 638 of the second positioner 626b is actuated, the rod 640 causes the link 636 to turn the presser 634 until its tip end presses the straight fin 28a of the one-open-sided cartridge 28. As a result, the straight fin 28a and the flange 28b are gripped and positioned by the positioning plate 628 and the presser 634.

Figure 54:
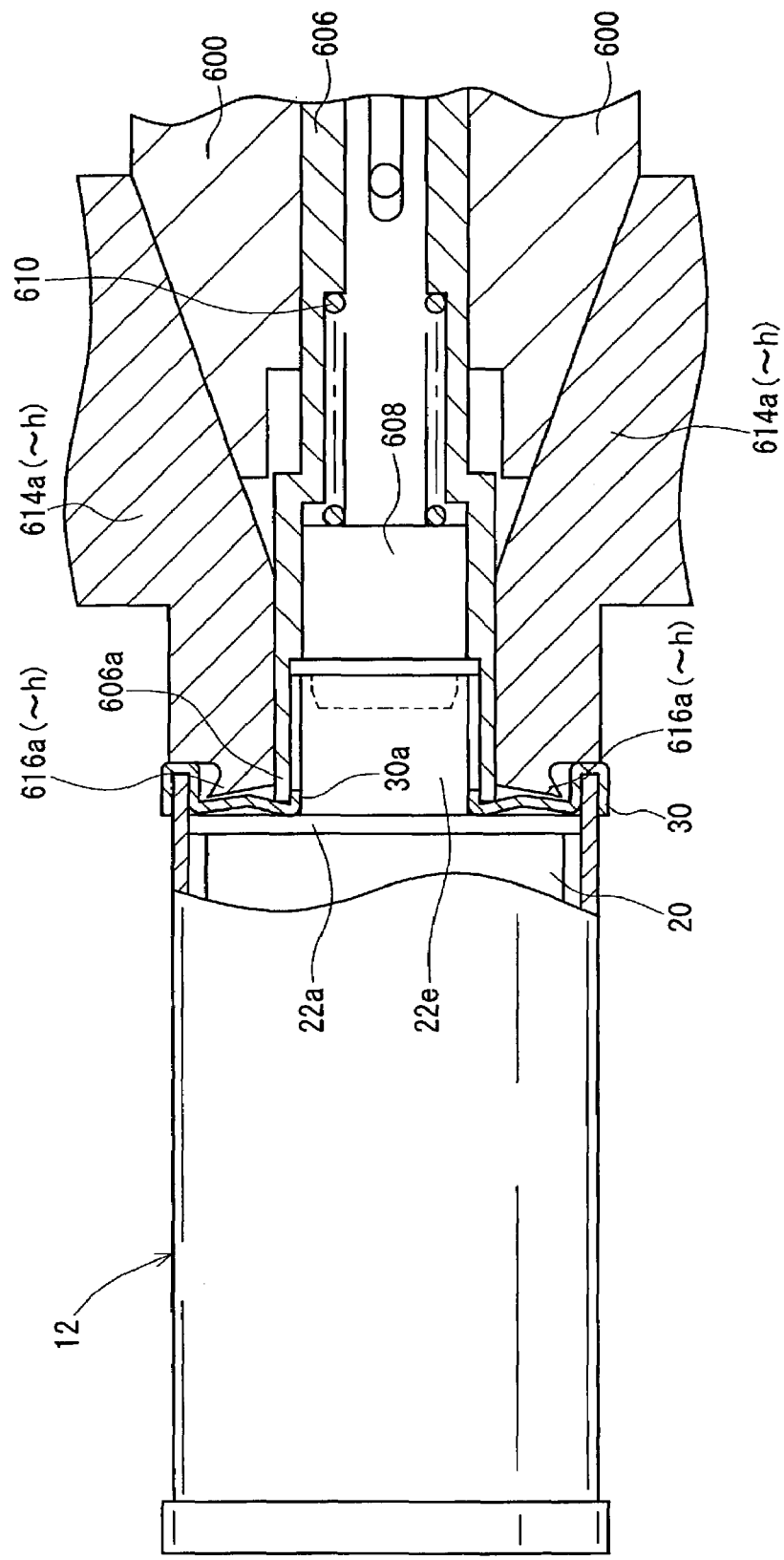
FIG. 54 is a cross-sectional view showing the manner in which the crimping mechanism according to the first embodiment crimps a cap.

Then, the crimping mechanism 104 is actuated. When the cylinder 588 is actuated in FIGS. 28 and 29, the rod 590 and the slide plate 586 displace the pusher 600 toward the wound-film-loaded cartridge 12. When the pusher 600 is displaced a certain distance, the slide bar 606 displaces the spool support 608 into engagement with the protruding end 22e of the spool 22, thus holding the spool 22 (see FIG. 54). The tip end 606a of the slide bar 606 grip the circumferential edge of the hole 30a in the cap 30 therebetween against undue deformation.

The crimping dies 614a through 614h, which jointly provide the tapered surface 612 slidingly engaging the tapered surface 598 of the pusher 600, are displaced in respective directions perpendicular to the direction in which the pusher 600 is displaced. The wedges 616a through 616h on the tip ends of the crimping dies 614a through 614h deform the outer circumferential edge of the cap 30 against the inner circumferential surface of the end of the wound-film-loaded cartridge 12. As a result, the cap 30 is crimped on the wound-film-loaded cartridge 12.

The wound-film-loaded cartridge 12 with the cap 30 crimped thereon is then delivered by the pallet 92 to the inspecting mechanism 106, which inspects a pullout resistance of the fixed-length film 20 in the wound-film-loaded cartridge 12 and also inspects a length of trailing end 20b in the fixed-length film 20 which is exposed out of the wound-film-loaded cartridge 12. When the pallet 92 is delivered to the inspecting mechanism 106, the positioning pin 436 is inserted into the hole 428 in the base 408, thus positioning and fixing the pallet 92. Thereafter, the rod 432 presses the cam follower 416, turning the arm 414 to release the movable holder 410 from gripping the wound-film-loaded cartridge 12 (see FIG. 18).

As shown in FIGS. 32 and 33, the cylinder 644 is actuated to bring the engaging nose 654 into engagement with the cap 30, securing the wound-film-loaded cartridge 12. The engaging nose 654 does not abut against the protruding end 22e of the spool 22, and holds the spool 22 rotatable. The cylinder 656 is actuated to position the clamps 662a, 662b respectively above and below the trailing end 20b of the fixed-length film 20. Thereafter, the cylinder 660 is actuated to enable the clamps 662a, 662b to grip the trailing end 20b.

When the clamps 662a, 662b grip the trailing end 20b, the motor 672 is energized to cause the drive shaft 674 thereof to displace the bracket 668 along the guide rail 646. The bracket 664 is coupled to the bracket 668 by the spring 666, and the clamps 662a, 662b for gripping the trailing end 20b of the fixed-length film 20 are coupled to the bracket 664 by the first slide table 648. Therefore, the displacement of the bracket 668 is transmitted through the guide rail 646 to the clamps 662a, 662b, pulling the trailing end 20b from the wound-film-loaded cartridge 12.

Figure 55:
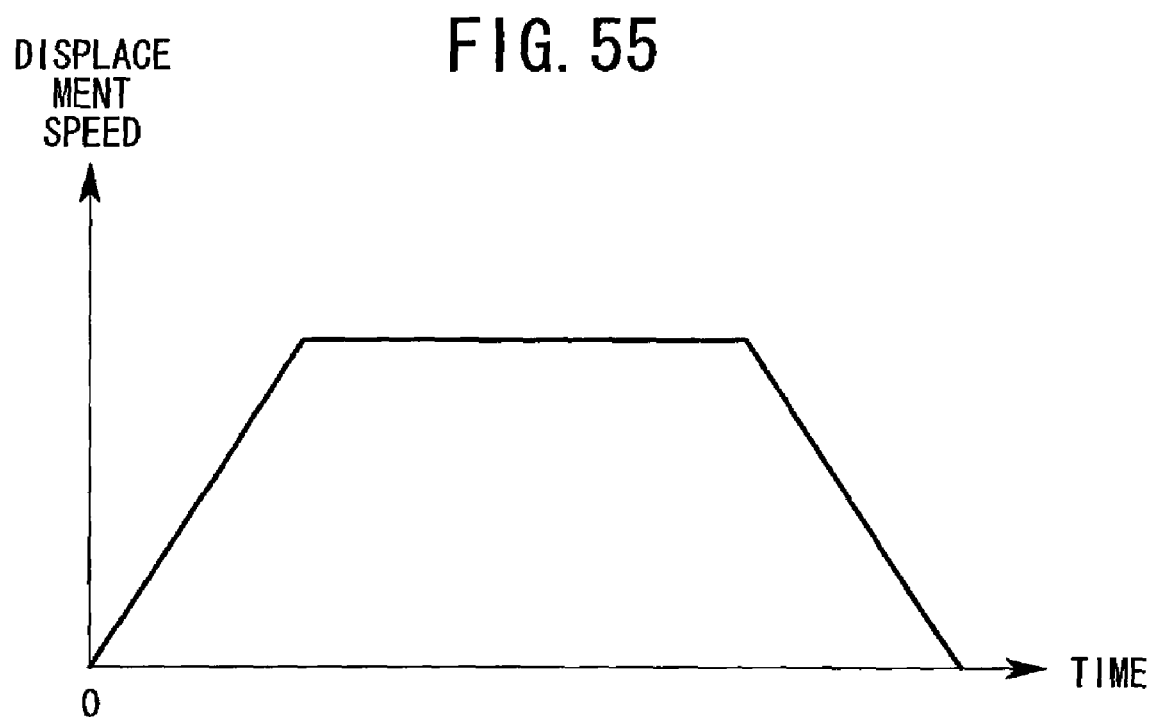
FIG. 55 is a diagram showing how a displacement speed changes with time in the inspecting mechanism according to the first embodiment.

For inspecting a pullout resistance of the fixed-length film 20, the motor 672 of the pullout resistance inspecting unit 107 shown in FIG. 33 displaces the bracket 668 in the direction indicated by the arrow at a displacement speed set as shown in FIG. 55. The motor 672 allows the displacement speed of the bracket 668 to be managed more stably than if a pneumatic cylinder were used to displace the bracket 668.

The elastic force of the spring 666 is selected such that the spring 666 extends to a predetermined length when a force which is larger than an allowable maximum pullout resistance in pulling the fixed-length film 20 from the wound-film-loaded cartridge 12 is applied to the spring 666. Therefore, if the fixed-length film 20 is wound in a proper state within the wound-film-loaded cartridge 12 without being caught by the cap 30 or the like, then since the fixed-length film 20 can easily be pulled out, the first slide table 648 is displaced as the second slide table 650 is displaced. The detector 680 fixedly mounted on the second slide table 650 and the dog 678 fixedly mounted on the first slide table 648 remain spaced from each other by a predetermined distance or less. As a consequence, it is determined that the pullout resistance of the fixed-length film 20 is sufficiently small and the fixed-length film 20 is wound in a proper state within the wound-film-loaded cartridge 12.

If the pullout resistance of the fixed-length film 20 is unduly large, then the first slide table 648 is displaced a small distance as the second slide table 650 is displaced, and the spring 666 extends beyond the predetermined length, moving the detector 680 away from the dog 678. Therefore, the detector 680 determines that the pullout resistance of the fixed-length film 20 pulled out of the wound-film-loaded cartridge 12 is too large, and finds the wound-film-loaded cartridge 12 defective.

Figure 56:
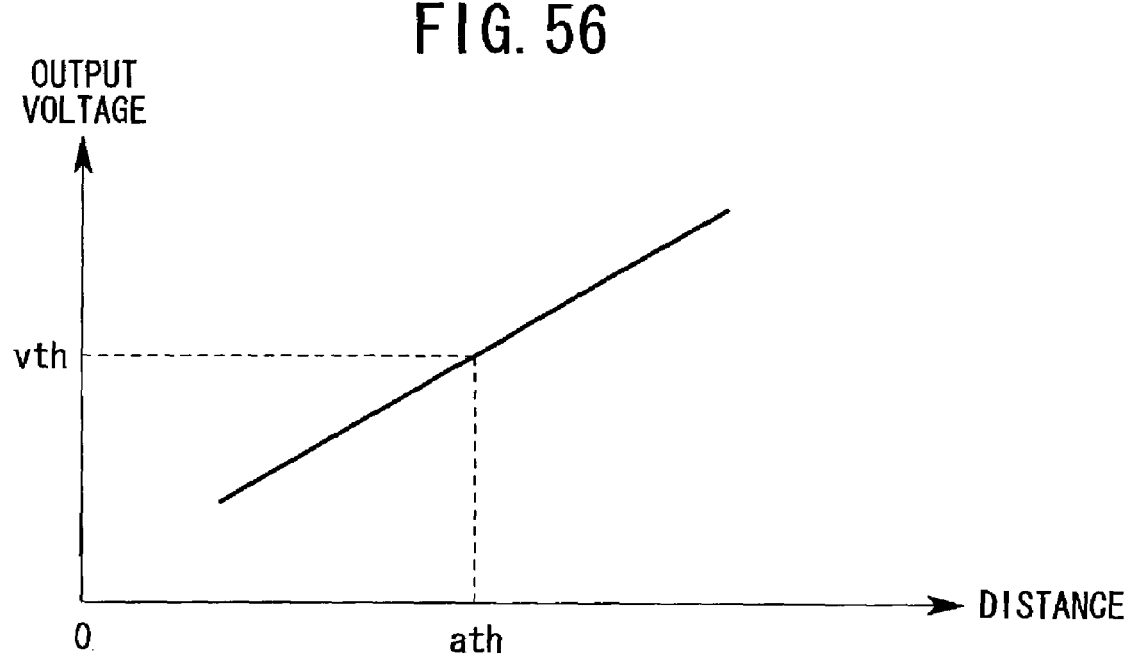
FIG. 56 is a diagram showing the output voltage of a sensor in the inspecting mechanism according to the first embodiment.

FIG. 56 shows the relationship between the distance of the detector 680 from the dog 678, and the output voltage of the detector 680 depending on the distance.

The detector 680 outputs a voltage which increases in proportion to an increase in the distance of the detector 680 from the dog 678. When the detector 680 is spaced from the dog 678 by a distance ath or greater and outputs a voltage vth or higher, it is determined that the pullout resistance of the fixed-length film 20 is in excess of the allowable maximum pullout resistance, and the wound-film-loaded cartridge 12 is defective.

Table 1 shows data of an experiment obtained for calibrating the detecting mechanism using a reference unit such as a weight or the like. In the experiment, the spring 666 had an initial tension of 250 gf (=2.45 N) and pulled various weight loads. The experiment data indicated that when a weight of 250 g which corresponds to the initial tension of the spring 666, i.e., the maximum allowable pullout resistance, was used as a load on the spring 666, the detecting mechanism reliably detected all results as defective. The spring 666 should be selected in view of not only the standard pullout resistance value of a product spring, but also the sliding resistance between the first slide table 648 and the guide rail 646, the resistance produced by air pipes connected to the cylinder 656 and the cylinder 660, and an increase in the tension of the spring 666 as it extends.

TABLE 1

| Weight load (g) | Count of defective results | Count of accepted results |
|---|---|---|
| 275 | 10 | 0 |
| 250 | 10 | 0 |

TABLE 1-continued

| Weight load (g) | Count of defective results | Count of accepted results |
|---|---|---|
| 225 | 5 | 5 |
| 200 | 0 | 10 |
| 0 through 175 | 0 | 10 |

The inspecting mechanism 106 has the length inspecting unit 109, combined with the pullout resistance inspecting unit 107, for inspecting the length of the fixed-length film 20 which is exposed out of the wound-film-loaded cartridge 12. As shown in FIG. 32, if the trailing end 20b of the fixed-length film 20 gripped and pulled out by the clamps 662a, 662b of the pullout resistance inspecting unit 107 is located between the light-detecting units 117b, 119b, then the length inspecting unit 109 judges that the length of the fixed-length film 20 which is exposed out of the wound-film-loaded cartridge 12 falls within a preset range. If the trailing end 20b is located otherwise, then the length inspecting unit 109 judges that the length of the fixed-length film 20 which is exposed out of the wound-film-loaded cartridge 12 falls outside of the preset range, and that the wound-film-loaded cartridge 12 is defective. Unless the exposed length of the fixed-length film 20 is inspected, the plates 115a, 115b of the length inspecting unit 109 are retracted by the cylinder 111 to prevent the exposed length of the fixed-length film 20 and the plates 115a, 115b from interfering with each other when the wound-film-loaded cartridge 12 is delivered by the pallet 92.

The wound-film-loaded cartridge 12 which has been inspected for the pullout resistance of the fixed-length film 20 and the length of the fixed-length film 20 which is exposed out of the wound-film-loaded cartridge 12 is then delivered to the removing mechanism 108.

In the removing mechanism 108, as shown in FIG. 19, the movable plate 454 disposed on one side of the pallet 92 is displaced by the cylinder 452 to have the notch 456 engaging the cam follower 426 mounted on the base 408, thus positioning the pallet 92 in the removing mechanism 108. After the pallet 92 is positioned by the notch 456, the cylinder 455 mounted on the movable plate 454 displaces the movable plate 459 toward the pallet 92. The pusher 457 coupled to the movable plate 459 pushes the cam follower 416 of the arm 414, turning the arm 414 to release the wound-film-loaded cartridge 12.

Figure 34:
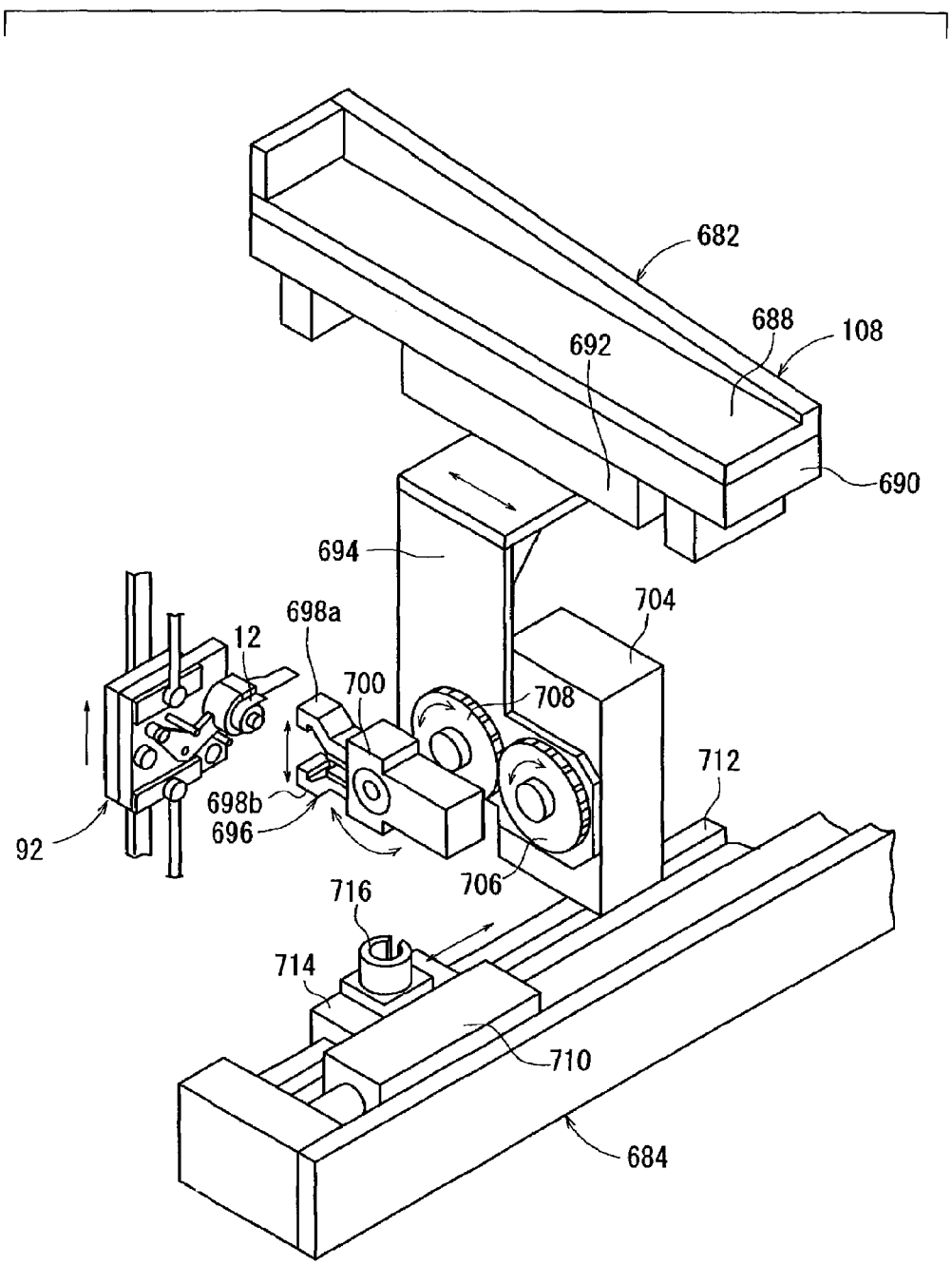
FIG. 34 is a perspective view of a remover and a first transfer device in a removing mechanism according to the first embodiment.
Figure 36:
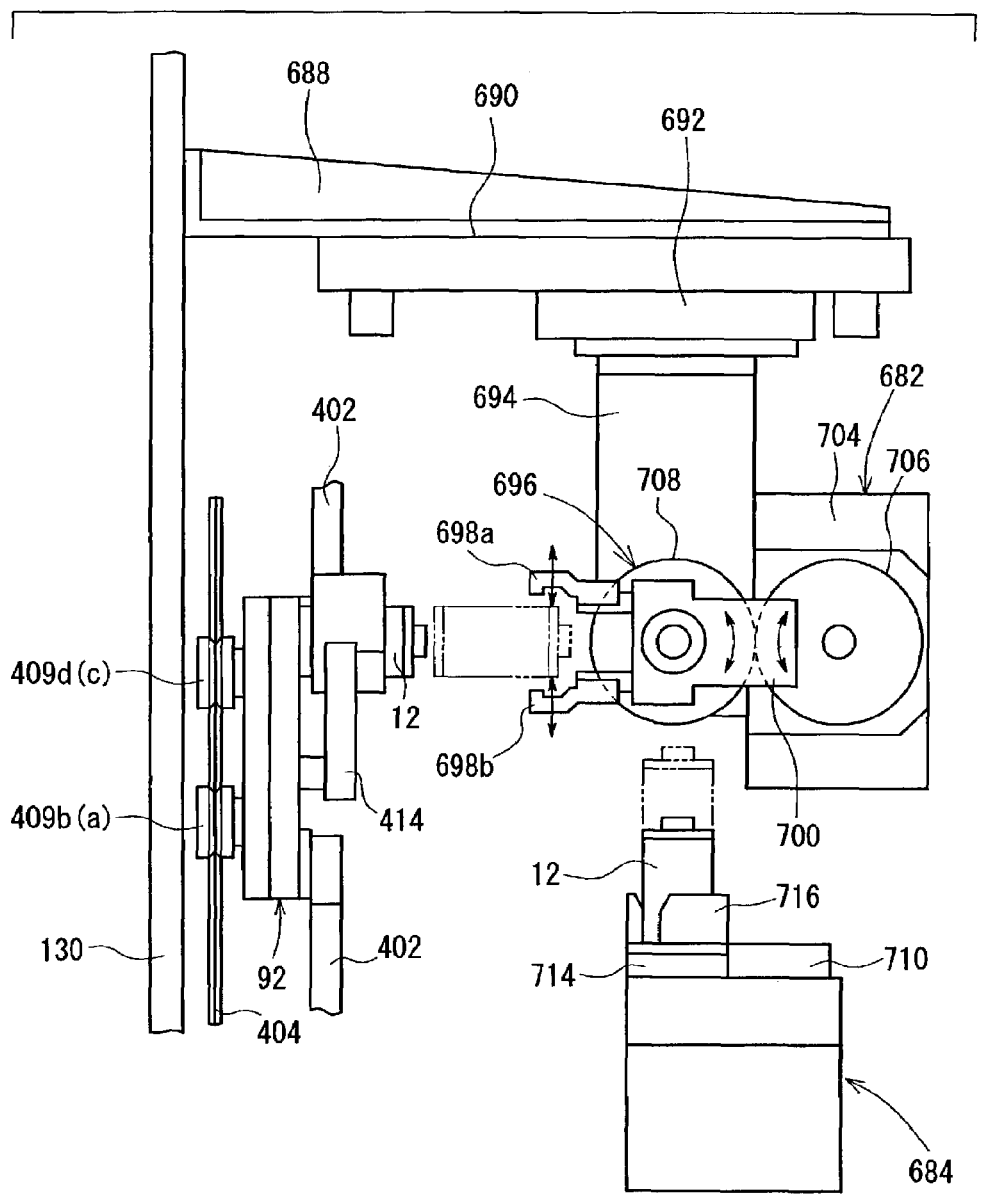
FIG. 36 is a front elevational view of the remover and the first transfer device in the removing mechanism according to the first embodiment.

In FIGS. 34 and 36, the cylinder 690 of the removing mechanism 108 is actuated to cause the movable block 692 and the bracket 694 to move the clamps 698a, 698b toward the wound-film-loaded cartridge 12. When the clamps 698a, 698b are positioned over the outer circumferential surface of the wound-film-loaded cartridge 12, the cylinder 700 is actuated to enable the clamps 698a, 698b to grip the wound-film-loaded cartridge 12. Then, the movable block 692 of the cylinder 690 is retracted to remove the wound-film-loaded cartridge 12 from the pallet 92.

After the wound-film-loaded cartridge 12 is removed from the pallet 92, the rotary actuator 704 is operated to cause the gears 706, 708 to turn the clamps 698a, 698b until the wound-film-loaded cartridge 12 is brought into an erected position. At this time, the receiver 716 of the first transfer unit 684 is waiting below the clamps 698a, 698b. The cylinder 700 is actuated to open the clamps 698a, 698b, letting the gripped wound-film-loaded cartridge 12 drop onto the receiver 716. The wound-film-loaded cartridge held by the receiver 716 is moved by the cylinder 710 along the guide rail 712 to a position below the second transfer-unit 686.

Figure 35:
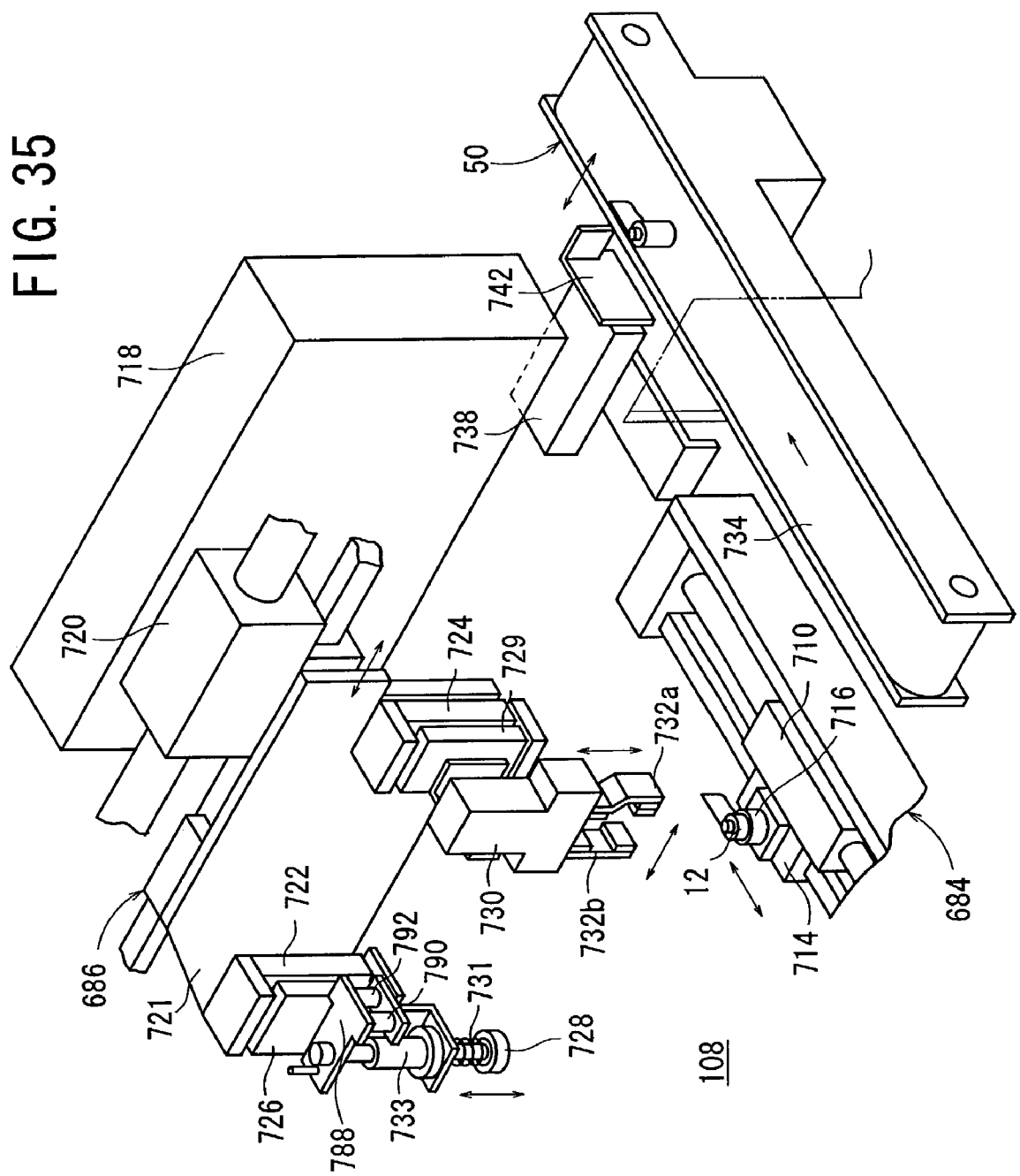
FIG. 35 is a perspective view of the first transfer device, a second transfer device, and a wound-film-loaded cartridge unloader in the removing mechanism according to the first embodiment.
Figure 37:
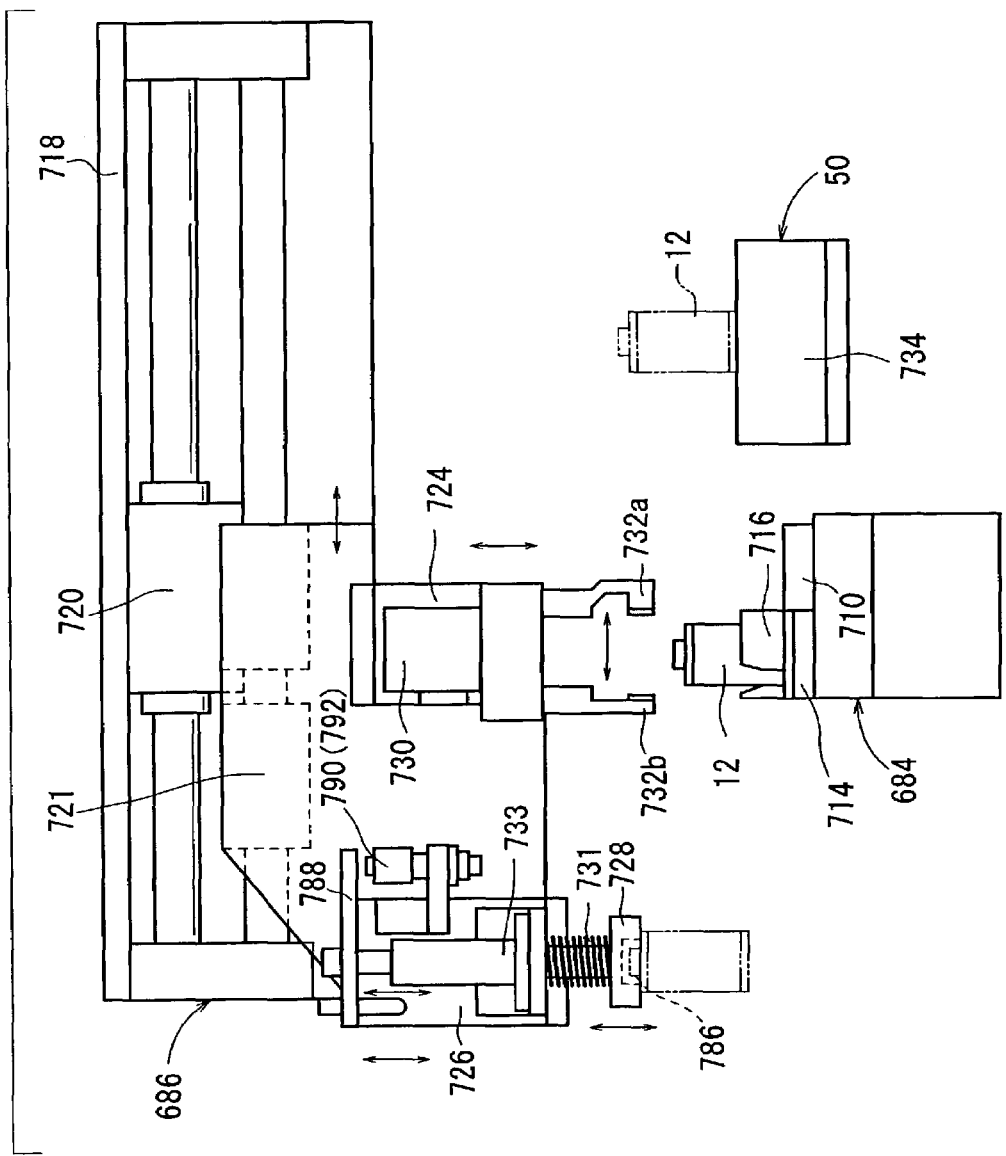
FIG. 37 is a-front elevational view of the first transfer device and the second transfer device in the removing mechanism according to the first embodiment.

In FIGS. 35 and 37, the clamps 732a, 732b of the second transfer unit 686 are waiting above the first transfer unit 684. When the wound-film-loaded cartridge 12 arrives, the cylinder 724 is actuated to cause the movable plate 729 to lower the clamps 732a, 732b, and then the cylinder 730 is actuated to cause the clamps 732a, 732b to grip the wound-film-loaded cartridge 12. The clamps 732a, 732b which have gripped the wound-film-loaded cartridge 12 are lifted by the cylinder 724, and then moved to a position above the feeder conveyor 734 of the wound-film-loaded cartridge unloader 50 by the movable block 720 which is moved by the cylinder 718. Then, the clamps 732a, 732b are opened to place the wound-film-loaded cartridge 12 onto the feeder conveyor 734, which unloads the wound-film-loaded cartridge 12 as a completed product out of the assembling unit 36.

When the clamps 732a, 732b are moved to the position above the feeder conveyor 734, the cylinder 722 lowers the presser 728 disposed on one side of the clamps 732a, 732b presses the presser 728 against a next wound-film-loaded cartridge 12 delivered by the first transfer unit 684. The presser 728 has a recess 786 defined centrally therein to avoid contact with the protruding end 22e of the spool 22 when the presser 728 engages the wound-film-loaded cartridge 12. The presser 728 abuts against the cap 30 of the wound-film-loaded cartridge 12, with the protruding end 20e received in the recess 786, whereupon a plate 788 connected to the presser 728 is elevated. Beneath a lower surface of the plate 788, there are disposed two proximity sensors 790, 792 fixed to the movable plate 726 which is lowered by the cylinder 722. The proximity sensors 790, 792 are spaced from the plate 788 such that they are turned on and off according to thresholds provided by upper and lower limits for the height of the wound-film-loaded cartridge 12. Therefore, it can be determined whether the height of the wound-film-loaded cartridge 12 falls within a predetermined range or not based on ON and OFF signals of the proximity sensors 790, 792.

Wound-film-loaded cartridges 12 which are judged as defective with the flanges 22a, 22b of the spool 22 by the sensors 358a, 358b of the winding mechanism 88, wound-film-loaded cartridges 12 which are judged as defective as a result of the inspection by the inspecting mechanism 106 or the presser 728 of the second transfer unit 686, or wound-film-loaded cartridges 12 which are picked up for sampling inspection are discharged onto the feeder conveyor 734 by the pusher 742 which is disposed on one side of the unloading path of the wound-film-loaded cartridge unloader 50.

When a pallet 92 is delivered by the delivery mechanism 94 and reaches the discharge mechanism 105, the cylinder 434 located at the discharge mechanism 105 is actuated to insert the positioning pin 436 from the position shown in FIG. 57 into the hole 428 in the pallet 92, thereby positioning the pallet 92. The cylinder 430 also located at the discharge mechanism 105 is actuated to cause the rod 432 to press the cam follower 416 of the arm 414 (see FIG. 58). Therefore, the arm 414 is turned to move the movable holder 410 on the tip end thereof away from the fixed holder 412 by a certain distance. Then, the cylinder 743 of the discharge mechanism 105 is actuated to insert the pusher 747 coupled to the rod 745 from the position shown in FIG. 57 into the hole 429 in the pallet 92.

If a wound-film-loaded cartridge 12 which has not been removed by the removing mechanism 108 is placed on the pallet 92, or a one-open-sided cartridge 28 or a cap 30 remains unremoved on the pallet 92, such a wound-film-loaded cartridge 12, a one-open-sided cartridge 28, or a cap 30 is discharged from the pallet 92. As a result, idle pallets 92 are reliably circulated to the region where a one-open-sided cartridge 28 is inserted by the cartridge supply mechanism 90.

A film manufacturing apparatus 810 according to a second embodiment of the present invention will be described below. The film manufacturing apparatus 810 is basically similar to the film manufacturing apparatus 10 according to the first embodiment as described above. Therefore, those parts of the film manufacturing apparatus 810 which are different from the film manufacturing apparatus 10 will mainly be described below, and those structural details of the film manufacturing apparatus 810 which are identical to those of the film manufacturing apparatus 10 are denoted by identical reference characters, and will not be described in detail below.

Figure 59:
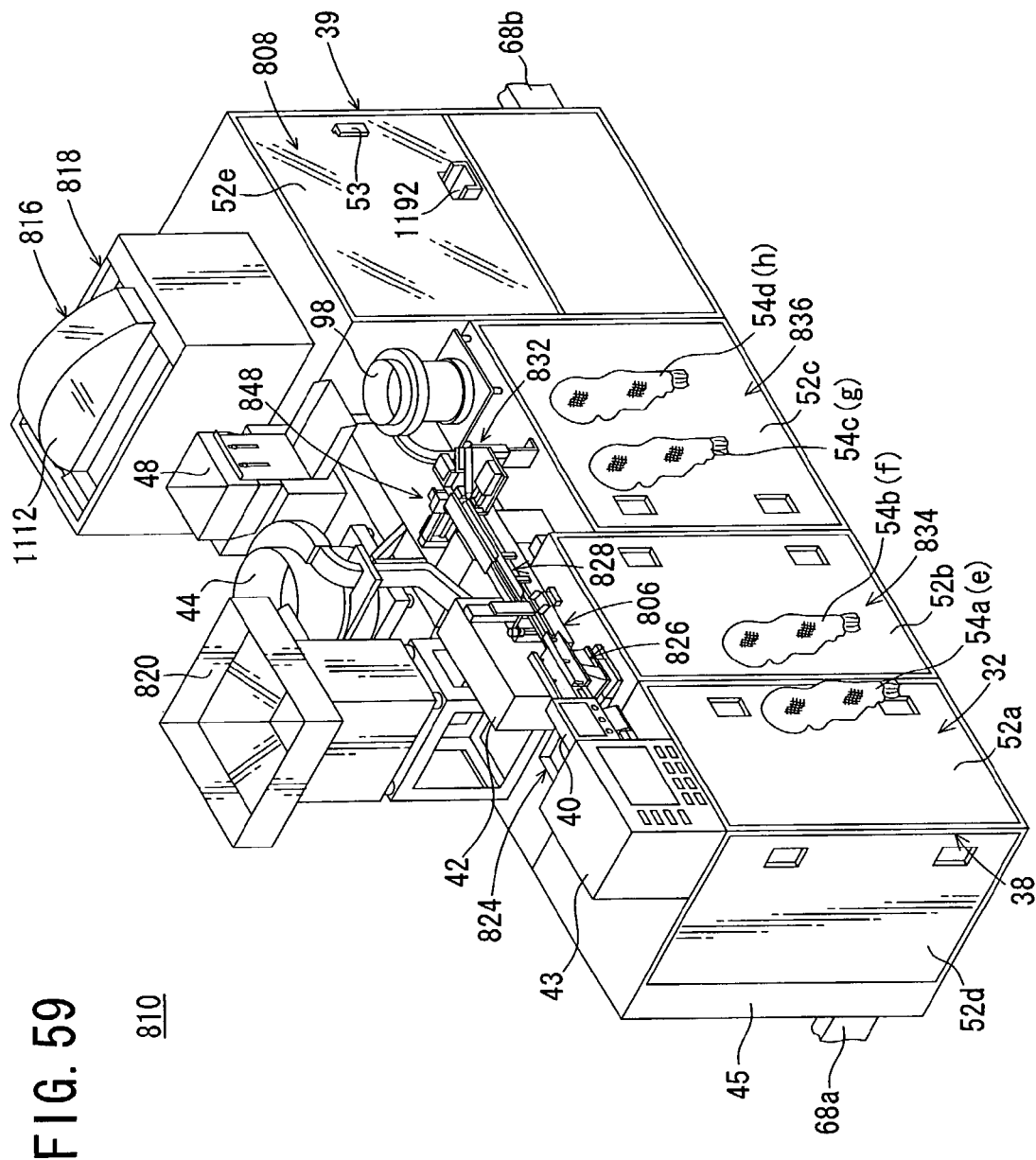
FIG. 59 is a perspective view of a film manufacturing apparatus according to a second embodiment of the present invention.
Figure 60:
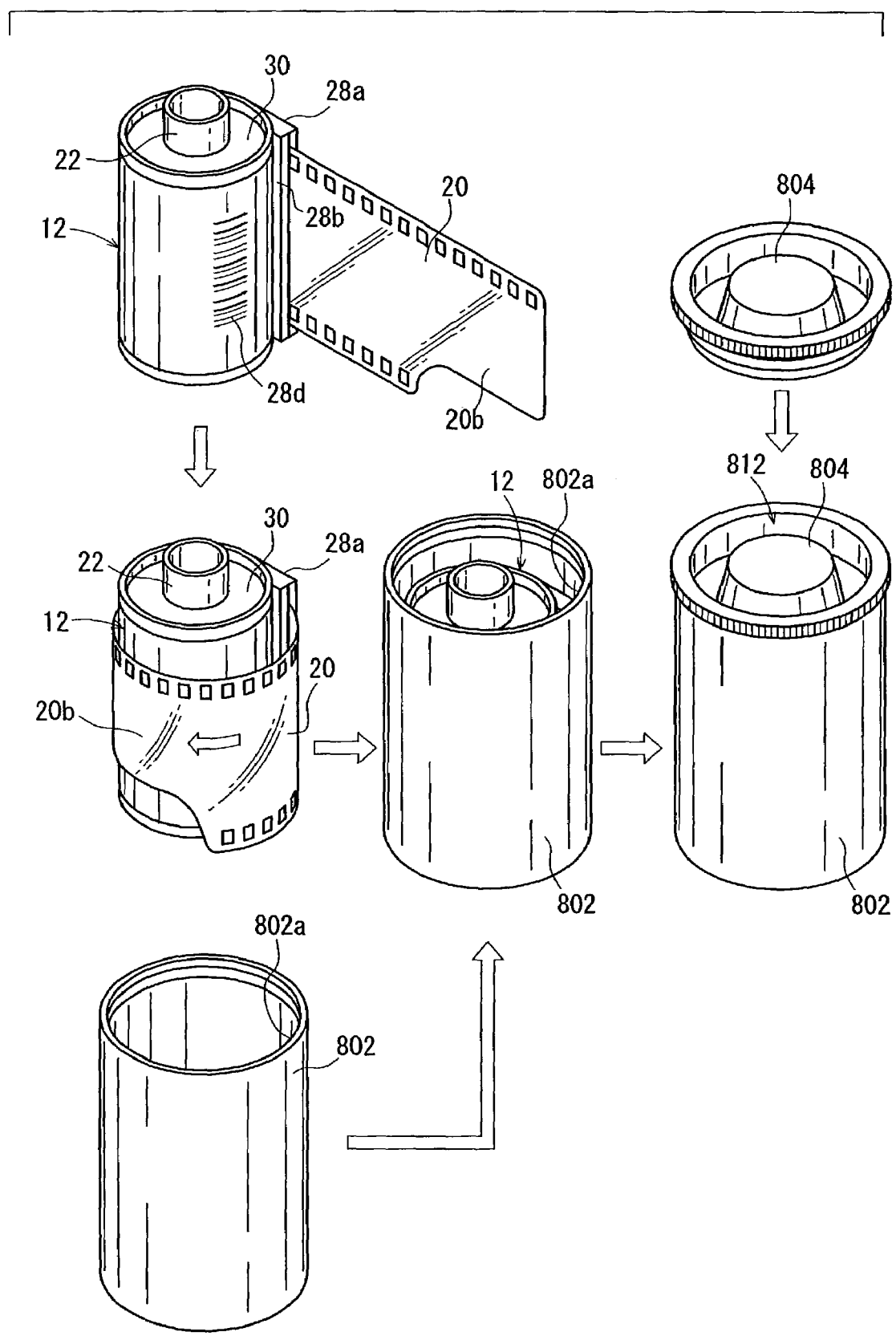
FIG. 60 is a perspective view illustrating successive production processes of producing a packaged product from a wound-film-loaded cartridge on the film manufacturing apparatus according to the second embodiment.

FIG. 59 shows the film manufacturing apparatus 810 in perspective. The film manufacturing apparatus 810 manufactures a packaged product 812 shown in FIG. 60. Specifically, after a wound-film-loaded cartridge 12 described above with reference to FIG. 2 is manufactured, the trailing end 20b of the fixed-length film 20 is wound around the wound-film-loaded cartridge 12, and then the wound-film-loaded cartridge 12 is loaded into a cartridge case 802 (referred to as a "case 802"). Thereafter, a case cap 804 is mounted on an opening 802a in the case 802, providing a packaged product 812.

Figure 61:
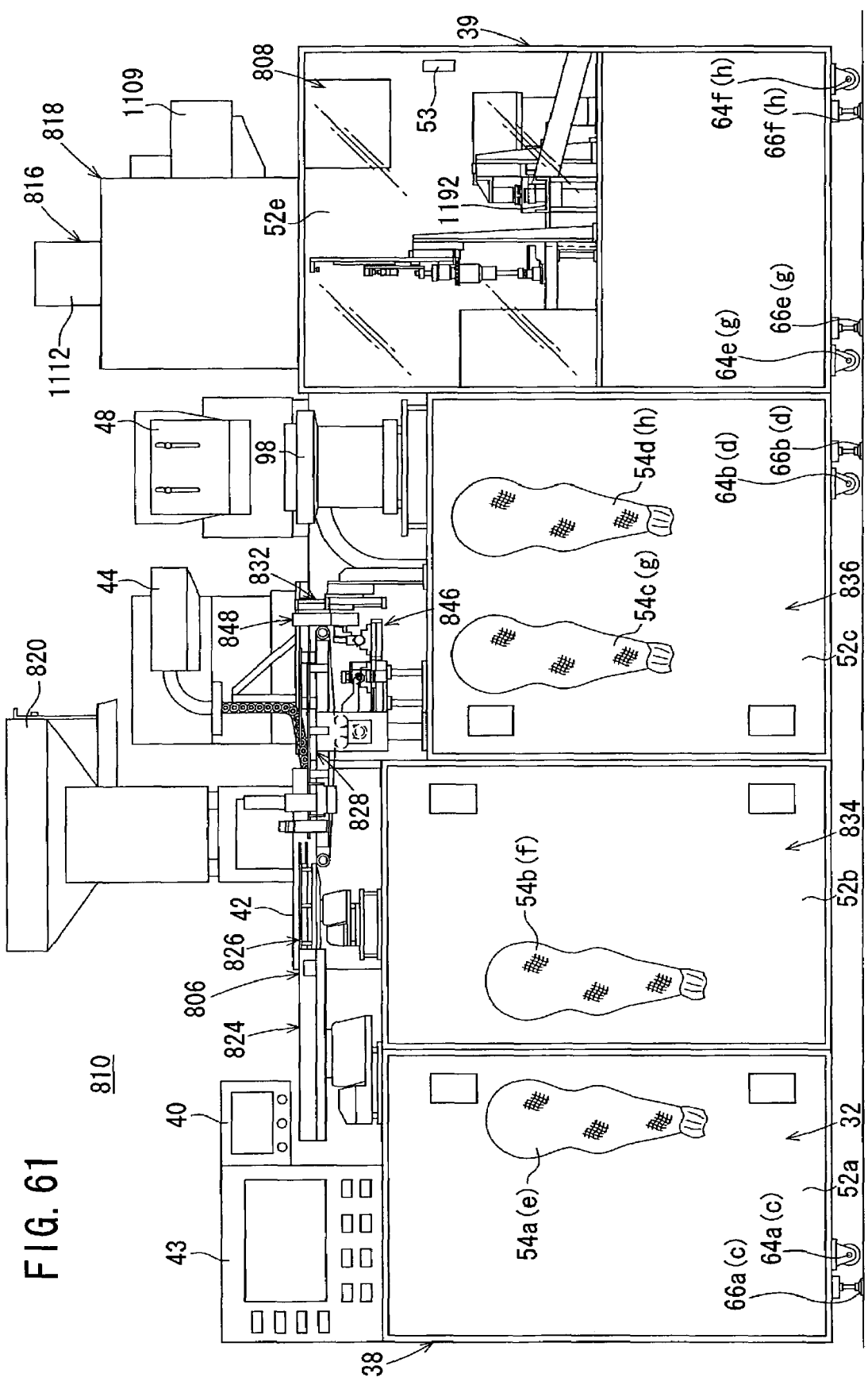
FIG. 61 is a side elevational view of the film manufacturing apparatus according to the second embodiment.
Figure 62:
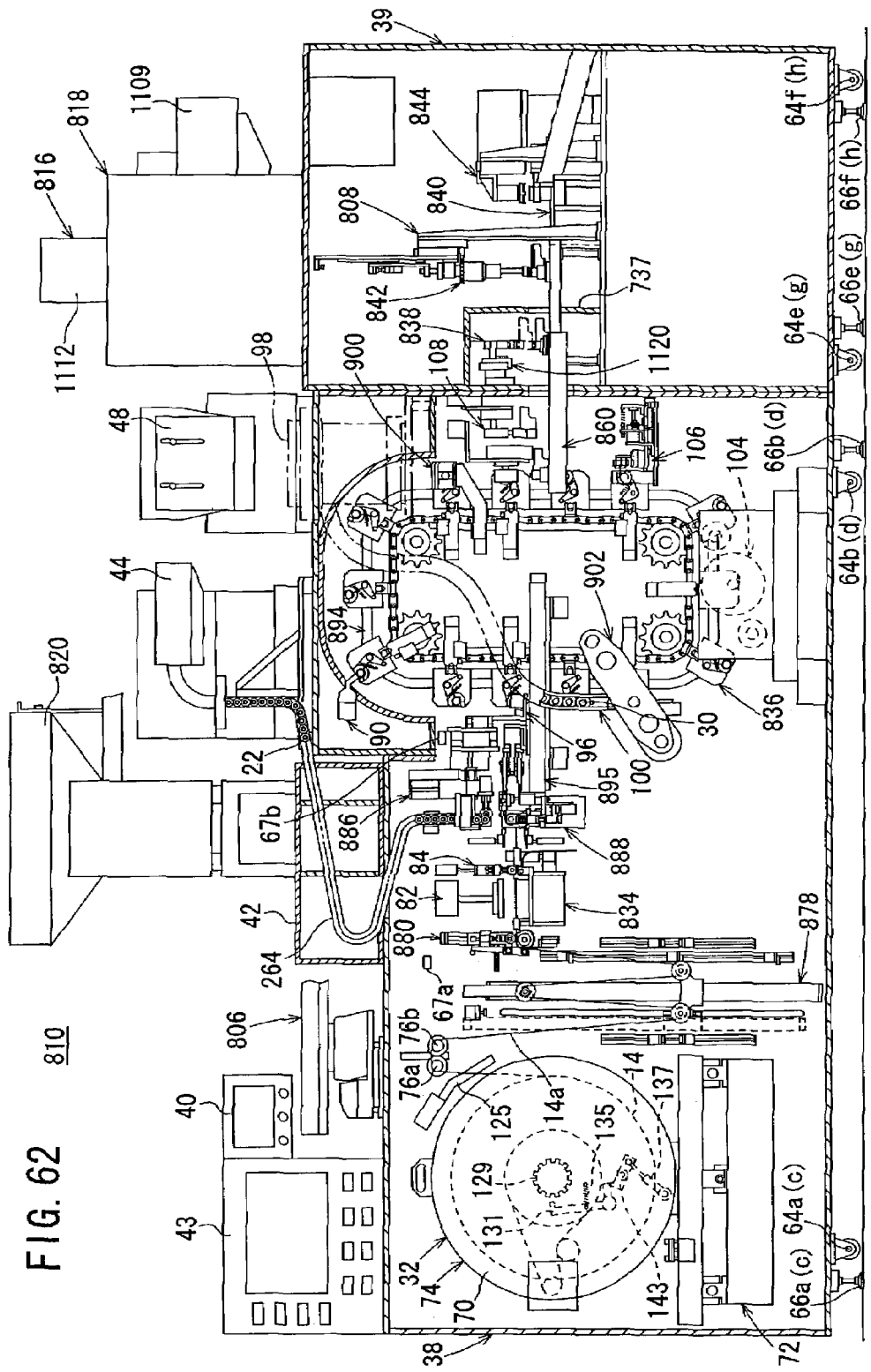
FIG. 62 is an elevational view showing internal structural details of the film manufacturing apparatus according to the second embodiment.
Figure 63:
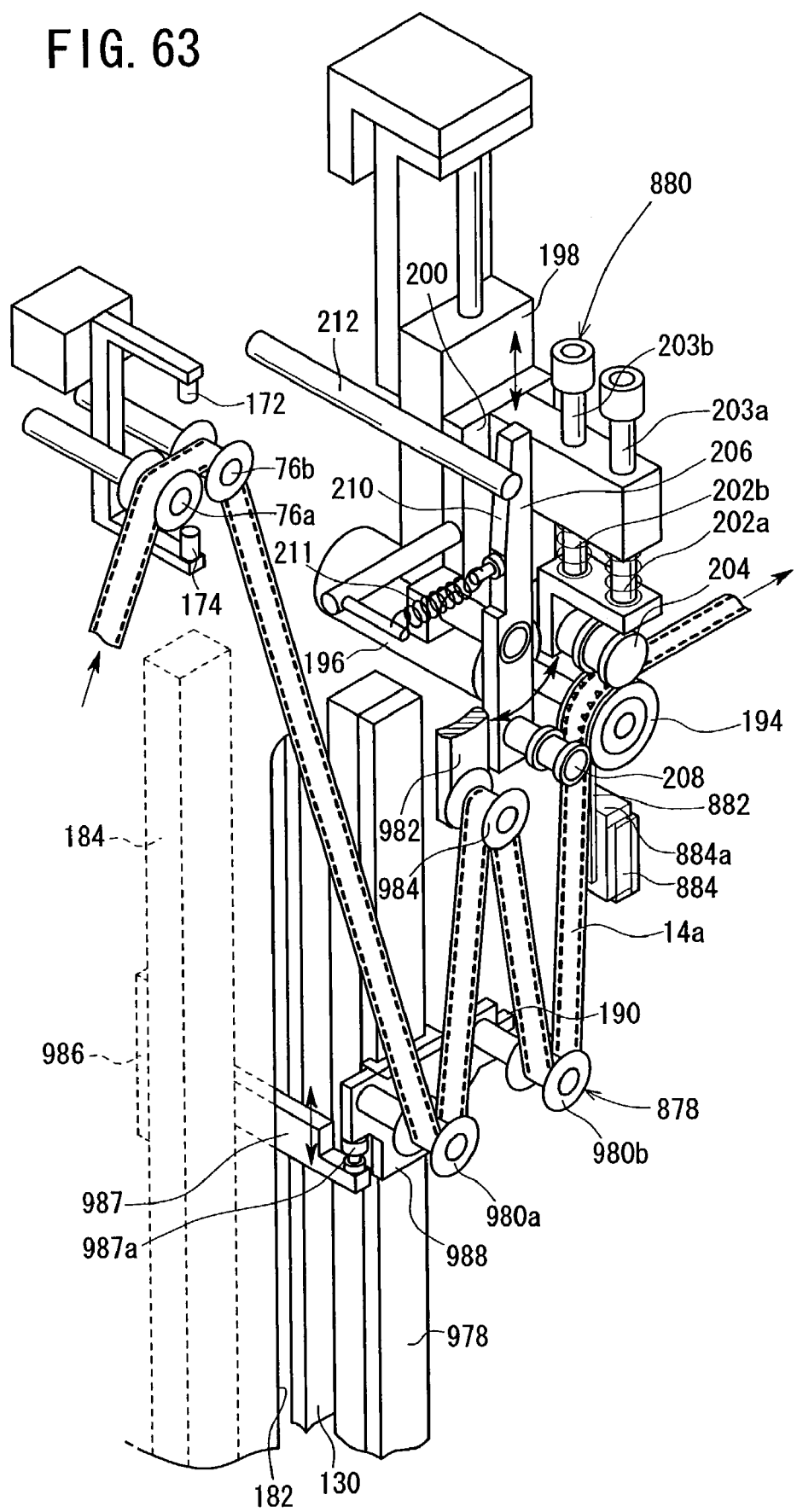
FIG. 63 is a perspective view of a buffer mechanism and a feed mechanism according to the second embodiment.

The film manufacturing apparatus 810 which manufactures the packaged product 812 is of a general structure shown in FIGS. 61 and 62. The film manufacturing apparatus 810 basically comprises a supply unit 32, which is identical to the supply unit 32 according to the first embodiment, for supplying a film roll 14, a winding unit 834 for winding a film strip 14a unwound from a film roll 14 around a spool 22 thereby to produce a wound-film assembly 24, a cartridge array supply unit 806 for supplying an array of one-open-sided cartridge cases 28 which are oriented in a given direction, a cartridge delivery unit 832 for transferring and delivering one-open-sided cartridge cases 28 from the cartridge array supply unit 806, an assembling unit 836 for inserting the wound-film assembly 24 into a one-open-sided cartridge case 28 and mounting a cap 30 on the cartridge case 28 thereby to assemble a wound-film-loaded cartridge 12, a case supply unit 816 for supplying an array of cases 802 which are oriented in a given direction, and a packaged product assembling unit 808 for loading the wound-film-loaded cartridge 12 into a case 802 and mounting a case cap 804 on the case 802. A shielding cover 737 is disposed in the housing 39 in order to shield a wound-film-loaded cartridge unloader 860 inserted in an opening between the assembly unit 836 and the packaged product assembling unit 808 from light.

A spool delivery device 42, which is identical to the spool delivery device 42 according to the first embodiment, for delivering spools 22 to the winding unit 834, and the cartridge array supply unit 806 are mounted on an upper panel of the winding unit 834. A spool hopper 820 for supplying spools 22 to a spool feeder 44 in timed relation to spools supplied from the spool feeder 44 is disposed above the spool feeder 44 in the spool delivery device 42. A control console 43 used by the operator to control the film manufacturing apparatus 810 and a display monitor 40 for monitoring internal mechanisms of the film manufacturing apparatus 810 are mounted on an upper panel of the film manufacturing apparatus 810.

A cartridge delivery unit 832 for delivering one-open-sided cartridges 28 from the cartridge array supply unit 806 to the assembling unit 836, and a cap feeder 98, and a cap feeder 98, which is identical to the cap feeder 98 according to the first embodiment, for supplying caps 30 into the assembling unit 836 are mounted on an upper panel of the assembling unit 836. A hopper 48, which is identical to the hopper 48 according to the first embodiment, for supplying caps 30 to the cap feeder 98 in timed relation to caps 30 supplied from the cap feeder 98 is mounted above the cap feeder 98. While the cap feeder 98 is located within the film manufacturing apparatus 10 (see FIG. 4) according to the first embodiment, the cap feeder 98 is located outside of the film manufacturing apparatus 810 according to the second embodiment.

The packaged product assembling unit 808 for loading a wound-film-loaded cartridge 12 unloaded from the wound-film-loaded cartridge unloader 860 into a case 802 and mounting a case cap 804 on the case 802, thus completing a packaged product 812 is disposed on a side of the assembling unit 836. The case supply unit 816 for supplying cases 802 to the packaged product assembling unit 808 is mounted on top of the packaged product assembling unit 808.

Casters 64a through 64h (moving means) for moving the film manufacturing apparatus 810 are mounted on a lower panel of a housing 38 which accommodates various mechanisms ranging from the supply unit 32 to the assembling unit 836 and a lower panel of a housing 39 which accommodates the packaged product assembling unit 808. Jack bolts 66a through 66h for fixing the film manufacturing apparatus 810 in a desired position are also disposed on the lower panels of the housings 38, 39. A door 52e having a knob 53 is mounted on a front side of the housing 39 for maintenance and servicing of internal mechanisms in the housing 39. The door 52e and a cover (not shown) around the housing 39 are formed by transparent plates made of synthetic resin or the like.

The winding unit 834 comprises a buffer mechanism 878 for regulating the rate at which the film strip 14a is supplied, a feed mechanism 880 for feeding the film strip 14a by a fixed length, a cutting mechanism 82 and an inserting mechanism 84 which are identical to the cutting mechanism 82 and the inserting mechanism 84 according to the first embodiment, a spool supply mechanism 886 for supplying a spool 22, and a winding mechanism 888 for winding the fixed-length film 20 around the spool 22.

The assembling unit 836 comprises a delivery mechanism 894 for delivering a one-open-sided cartridge 28 or a wound-film-loaded cartridge 12 in a circulatory path, a transfer mechanism (a wound-film assembly moving unit) 895 for transferring a wound-film assembly 24 supplied from the winding mechanism 888 of the winding unit 834 to the assembling unit 836, a loading mechanism 96 and a cap supply mechanism 100 which are identical to the loading mechanism 96 and the cap supply mechanism 100 according to the first embodiment, a mounting mechanism 902 for temporarily mounting the cap 30 on the one-open-sided cartridge 28, a crimping mechanism 104, an inspecting mechanism 106, and a removing mechanism 108 which are identical to the crimping mechanism 104, the inspecting mechanism 106, and the removing mechanism 108 according to the first embodiment, and a discharge mechanism 900 for discharging unnecessary components which remain in the assembling unit 836 and which are not removed from the assembing unit 836.

The cartridge array supply unit 806 has a single-row supply mechanism 824 for feeding out a single row of one-open-sided cartridges 28 in a vertical attitude, an attitude arranging mechanism 826 for arranging straight fins 28a of one-open-sided cartridges 28 into an attitude oriented in a desired direction, and an attitude holding delivery mechanism 828 for delivering one-open-sided cartridges 28 while holding them in a constant attitude and supplying the one-open-sided cartridges 28 held in the constant attitude to the cartridge delivery unit 832.

The cartridge delivery unit 832 has a cartridge transfer device 848 for transferring a one-open-sided cartridge 28 supplied from the attitude holding delivery mechanism 828 of the cartridge array supply unit 806 in a horizontal state with the straight fin 28a oriented in a desired direction, and a cartridge delivery device 846 for delivering the one-open-sided cartridge 28 transferred by the cartridge transfer device 848 to a cartridge supply mechanism 90 which is identical to the cartridge supply mechanism 90 according to the first embodiment.

The case supply unit 816 has a case feeder 818 for storing supplied cases 802 and for supplying the cases 802 with their openings 802a oriented in a given direction to the packaged product assembling unit 808.

The packaged product assembling unit 808 comprises a cartridge delivery mechanism 838 for transferring and delivering a would-film-loaded cartridge 12 supplied through the wound-film-loaded cartridge unloader 860, a case delivery mechanism 840 for supplying and delivering a case 802 to be loaded with a would-film-loaded cartridge 12, a cartridge loading mechanism 842 for inserting a would-film-loaded cartridge 12 into a case 802 while winding the trailing end 20b of the fixed-length film 20 projecting from the would-film-loaded cartridge 12 around the would-film-loaded cartridge 12, and a case cap mounting mechanism 844 for mounting a case cap 804 on an opening 802a in a case 802 loaded with a would-film-loaded cartridge 12 thereby to produce a packaged product 812.

The various mechanisms in the film manufacturing apparatus 810 and their operation will be described in detail below.

FIGS. 63 through 66 show structural details ranging from rollers 76a, 76b disposed between the supply unit 32 and the winding unit 834 to the buffer mechanism 878 and the feed mechanism 880 disposed in the winding unit 834.

The buffer mechanism 878 comprises a pair of dancer rollers 980a, 980b vertically movable along a guide rail 978 mounted vertically on a partition wall 130 of the winding unit 834, a fixed roller 984 supported on the partition wall 130 above the guide rail 978 by an L-shaped bracket 982, and a stop 985 including a damper 985a disposed at an upper end of the stroke of the dancer roller 980a. The dancer rollers 980a, 980b are rotatably supported on a base 988 supported upwardly by a rod 987, including a damper 987a, coupled to a movable plate 986 of a cylinder 184. The guide rail 978 and the bracket 982 which supports the fixed roller 984 jointly define a gap therebetween, and the base 988 on which the dancer rollers 980a, 980b are rotatably supported is movable through the gap to a position above the fixed roller 984.

With the buffer mechanism 878 thus constructed, the loop of the film strip 14a between the supply unit 32 and the winding unit 834 can be of an increased length. Specifically, the film strip 14a supplied from the supply unit 32 is trained around the rollers 76a, 76b and then the dancer roller 980a disposed therebelow, the upper fixed roller 984, and the dancer roller 980b disposed therebelow, and supplied over the sprocket 194 to the feed mechanism 880. The buffer mechanism 878 can thus produce a loop in the film strip 14a which is about twice the loop according to the first embodiment.

Figure 67:
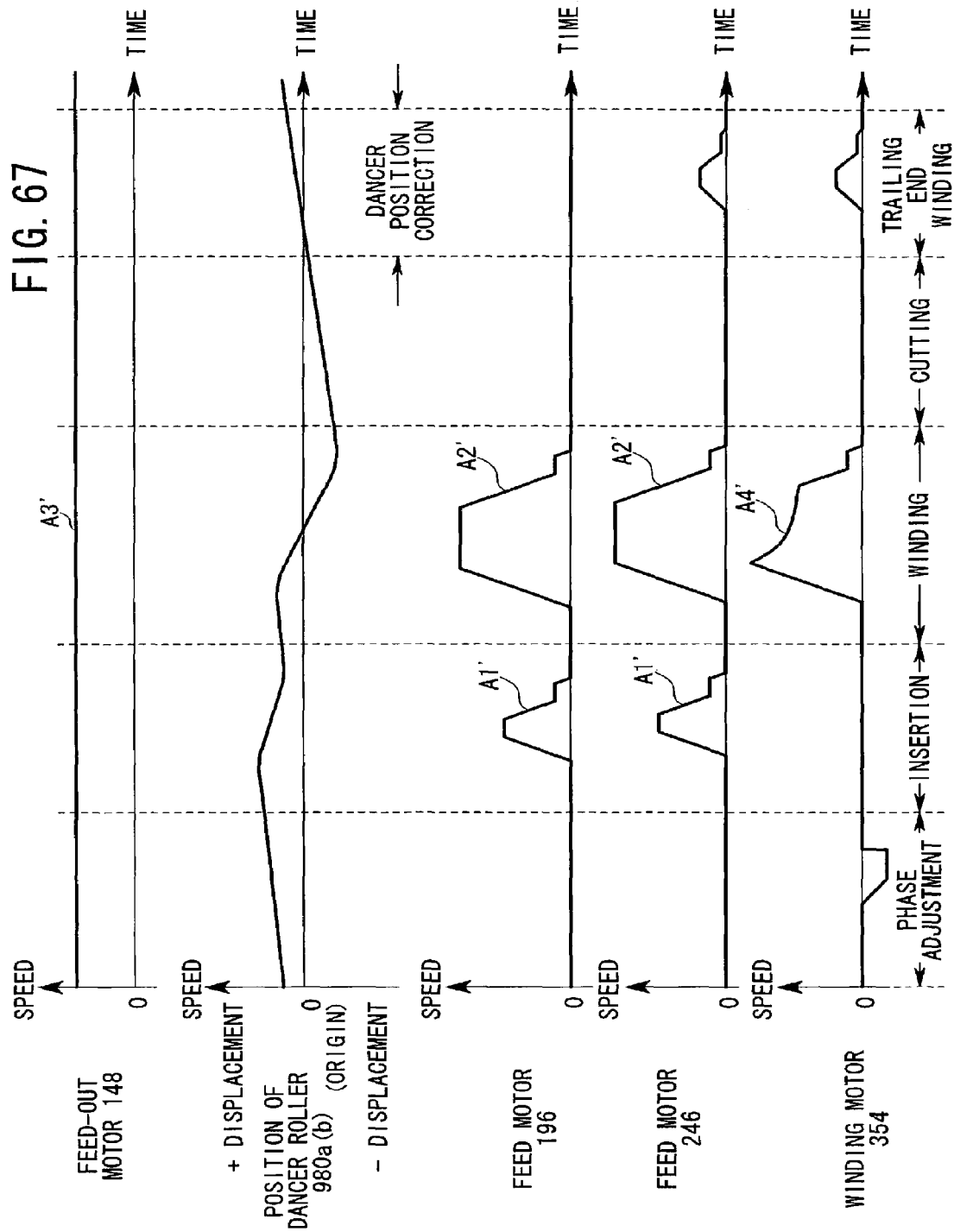
FIG. 67 is a diagram showing a film feed pattern in a film feed system according to the first embodiment.

As a result, as shown in FIG. 67, the feed-out motor 148 of the feed-out mechanism 74 is energized according to a film feed pattern A3' (at a constant rotational speed) to feed out the film strip 14a continuously from the film roll 14, and the feed motor 196 of the sprocket 194, the feed motor 246 of the insertion roller 236b, and the winding motor 354 of the winding mechanism 888 are energized according to respective film feed patterns A1', A2', A4' for feeding the film stripe 14a and winding it around the spool 22 at a higher speed than with the first embodiment. The productivity of the film manufacturing apparatus 810 is thus increased.

The feed mechanism 880 has a guide 882 for preventing the perforations 16 of the film strip 14a from engaging the sprocket 194 when the film strip 14a is threaded. The guide 882 is vertically movable by a cylinder 884 through a movable plate 884a thereof. The guide 882 has an arcuate upper end 882a. When the film manufacturing apparatus 810 operates to manufacture films, the guide 882 is placed in a position below the sprocket 194 out of contact with the sprocket 194.

For threading the film strip 14a, the roller 204 is spaced from the sprocket 194 by the cylinder 198, and the lever 206 is turned by the pin 212 to space the roller 208 away from the sprocket 194. At the same time, the cylinder 884 is actuated to move the upper end 882a of the guide 882 upwardly of the sprocket 194. The dancer rollers 980a, 980b of the buffer mechanism 878 are moved upwardly of the fixed roller 984 to place the base 988 in abutment against the stop 985 (see FIG. 66). Then, the film strip 14a is threaded from the rollers 76a, 76b through the sprocket 194 to the cutting mechanism 82. Thereafter, the dancer rollers 980a, 980b, the rollers 204, 208, and the guide 882 are returned to their positions (substantially as shown in FIG. 64) for manufacturing films.

Figure 66:
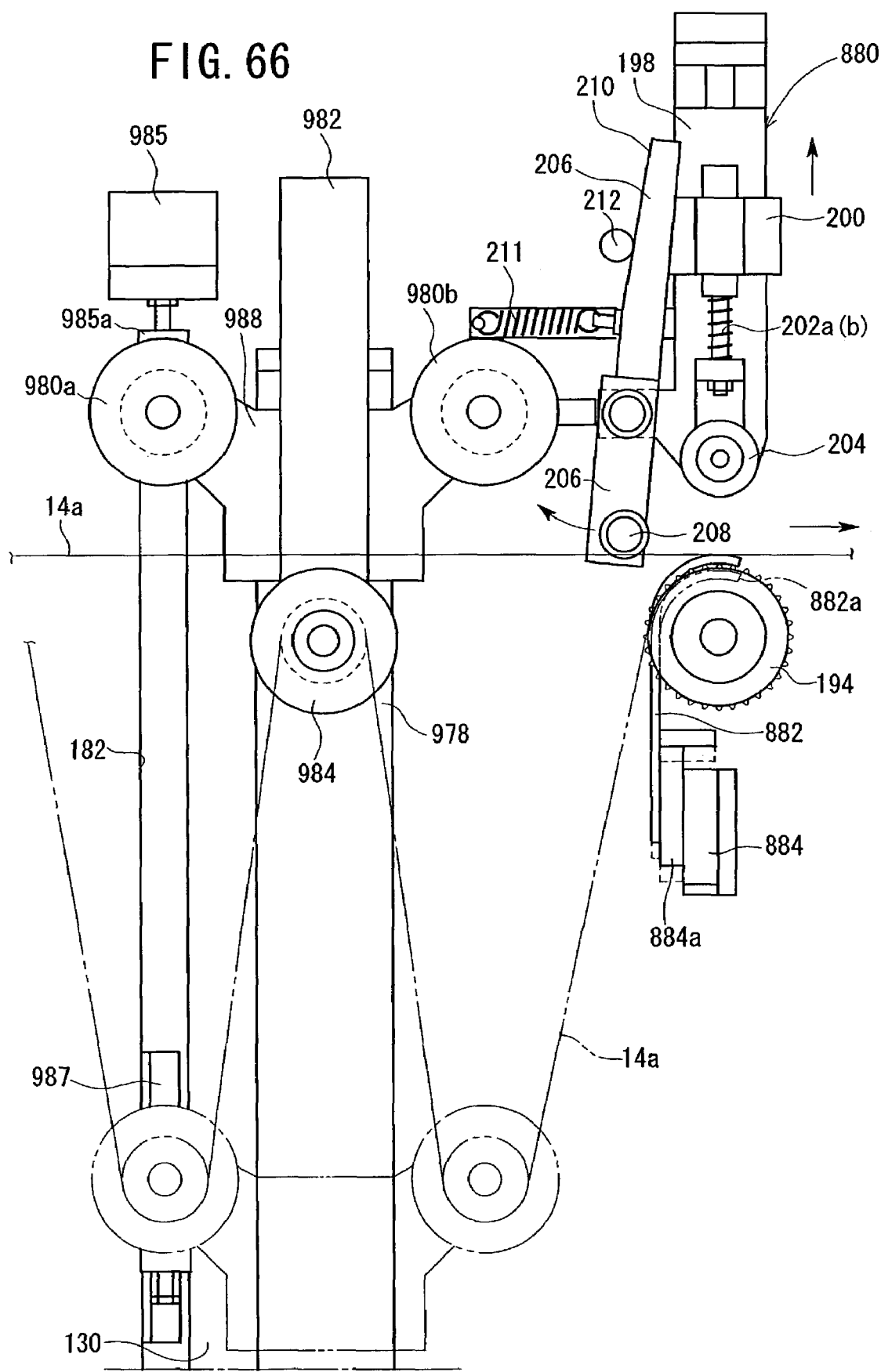
FIG. 66 is an elevational view illustrative of the manner in which the buffer mechanism and the feed mechanism according to the second embodiment operates.

When the film strip 14a is thus threaded, as shown in FIG. 66, the line along which the film-strip 14a is threaded from the rollers 76a, 76b through the sprocket 194 to the cutting mechanism 82 is substantially linear. When the film strip 14a is threaded, since the film strip 14a is spaced from the sprocket 194 by the guide 882, the perforations 16 of the film strip 14a do not engage the sprocket 194. Therefore, the film strip 14a can be threaded easily and quickly.

Figure 64:
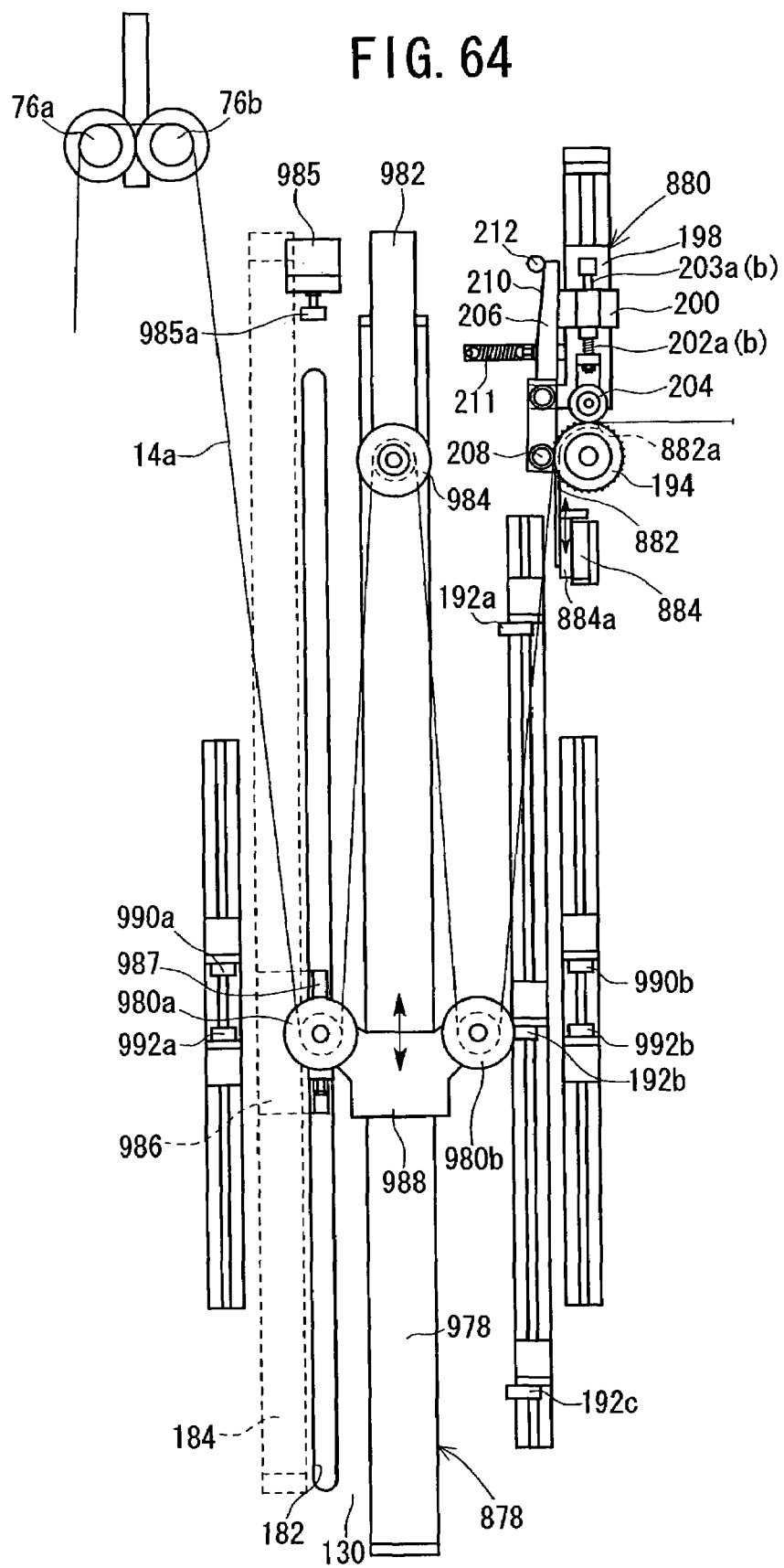
FIG. 64 is a side elevational view of the buffer mechanism and the feed mechanism according to the second embodiment.
Figure 65:
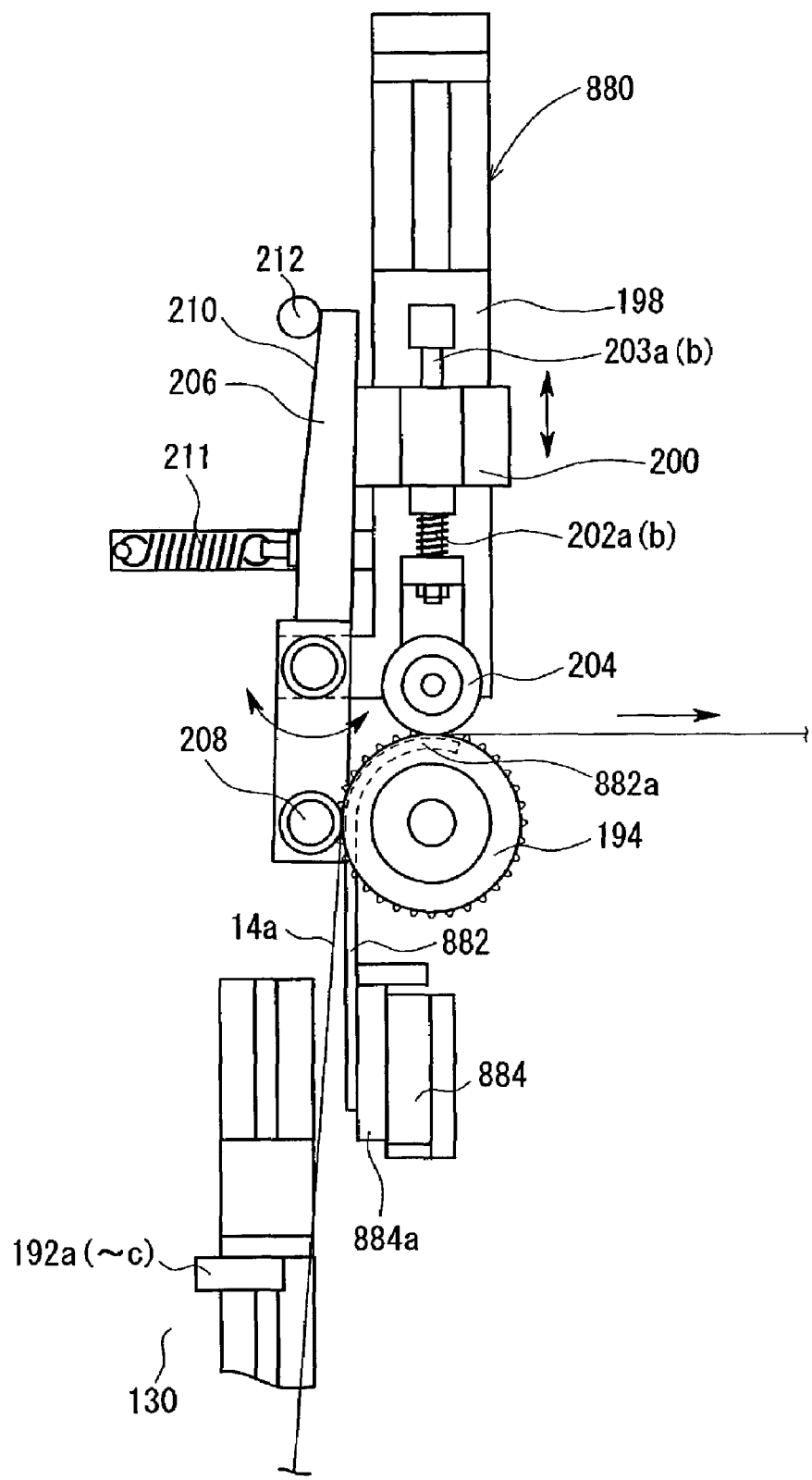
FIG. 65 is a side elevational view of the feed mechanism according to the second embodiment.

In FIG. 64, the distance of the film strip 14a which is fed out from the film roll 14 is controlled by two pairs of detectors 990a, 990b and detectors 992a, 992b such as photointerrupters.

Specifically, the base 988 is disposed in the vicinity of the photointerrupter 192b which serves as the dancer origine and the film manufacturing apparatus 810 starts to operate in an automatic mode for manufacturing the packaged product 812. Thereafter, if the detectors 990a, 990b detect the dancer rollers 980a, 980b, the rotating speed of the feed-out motor 148 increases and the distance of the film strip 14a which is fed out from the film roll 14 is increased. On the other hand, if the detectors 992a, 992b detect the dancer rollers 980a, 980b, the rotating speed of the feed-out motor 148 decreases and the distance of the film strip 14a which is fed out from the film roll 14 is decreased. Therefore, the distance of the film strip 14a which is fed out from the film roll 14 is adjusted by controlling the rotating speed of the feed-out motor 148.

Figure 68:
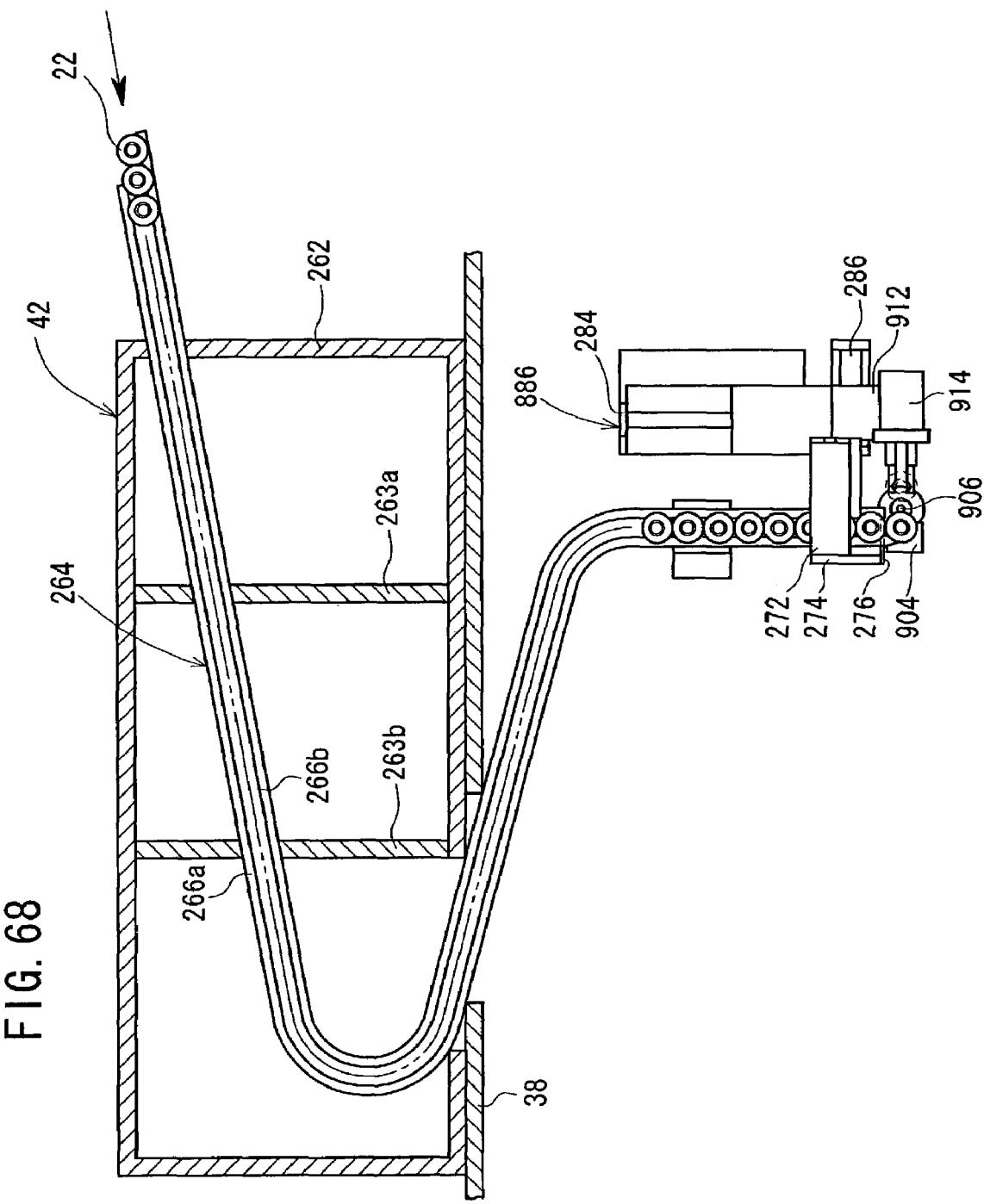
FIG. 68 is a side elevational view, partly in cross section, of a spool delivery device and a spool supply mechanism according to the second embodiment.

FIG. 68 shows a spool delivery device 42 that is identical to the spool delivery device 42 according to the first embodiment, and a spool supply mechanism 886 for supplying a spool 22 to winding mechanism 888, the spool supply mechanism 886 being disposed at the lower end of the chute 264 of the spool delivery device 42.

Figure 69:
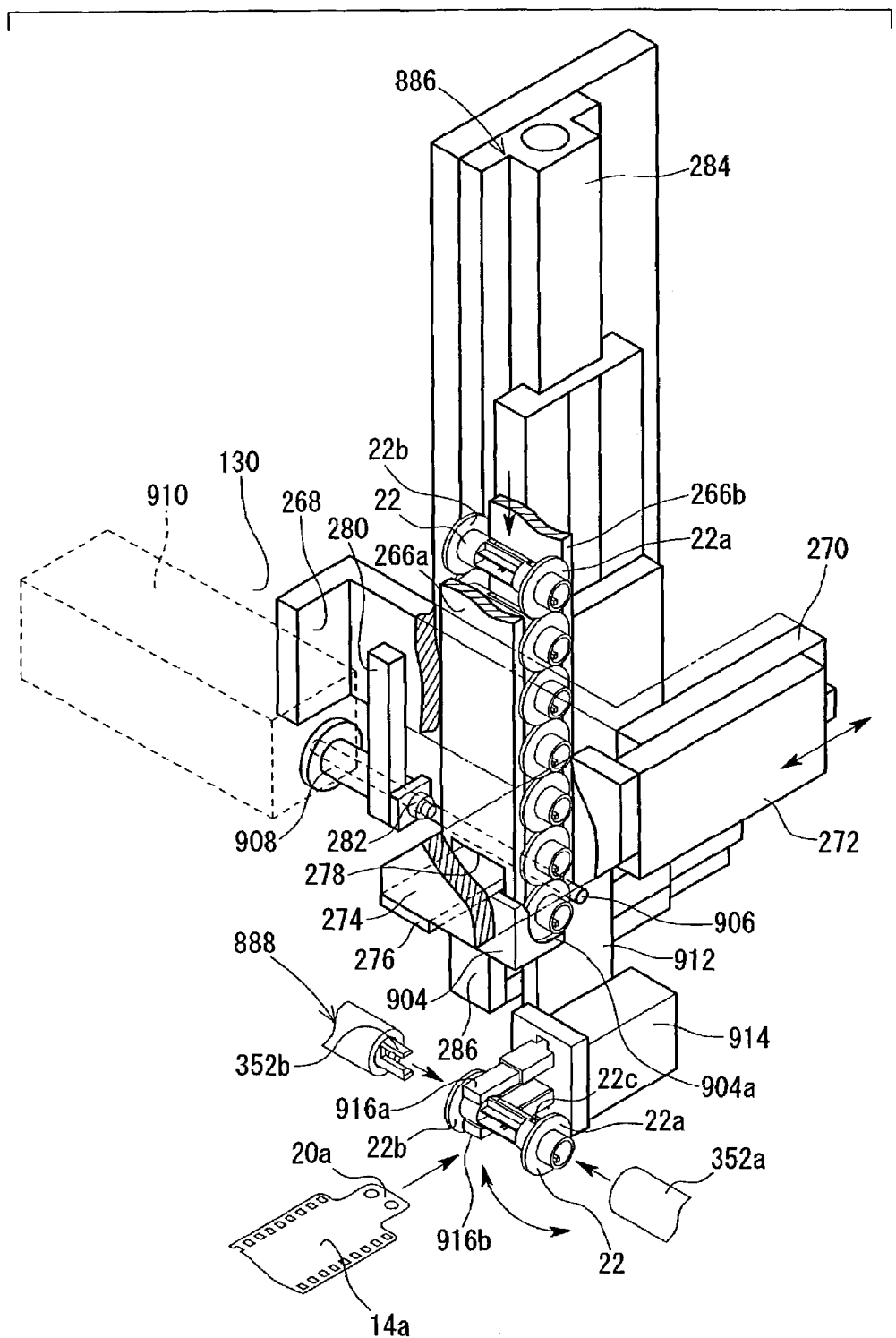
FIG. 69 is a perspective view, partly cut away, of the spool supply mechanism according to the second embodiment.

As shown in FIG. 69, the spool supply mechanism 886 has a spool rest 904 for receiving a spool 22 supplied along the guide plates 266a, 266b, and a shaft 906 for receiving the spool 22 in cooperation with the spool rest 904. The spool rest 904 has an arcuate rest surface 904a dimensioned to match the outside diameter of the flanges 22a, 22b of the spool 22. The shaft 906 is axially movably supported by a cylinder 910 fixed to the partition wall 130 and guided by a guide bushing 908.

The spool supply mechanism 886 has a movable plate 912 movable horizontally by the second cylinder 286, and a pair of clamps 916a, 916b openable and closable by a third cylinder 914 fixed to the movable plate 912. The sensor 282 is disposed on one side of the spool extracting plate 276 for detecting whether there is a spool 22 which is separated from the lowermost spool 22 and held by the spool extracting plate 276. The sensor 282 is supported by the bracket 280 fixed to the bracket 268.

Figure 70:
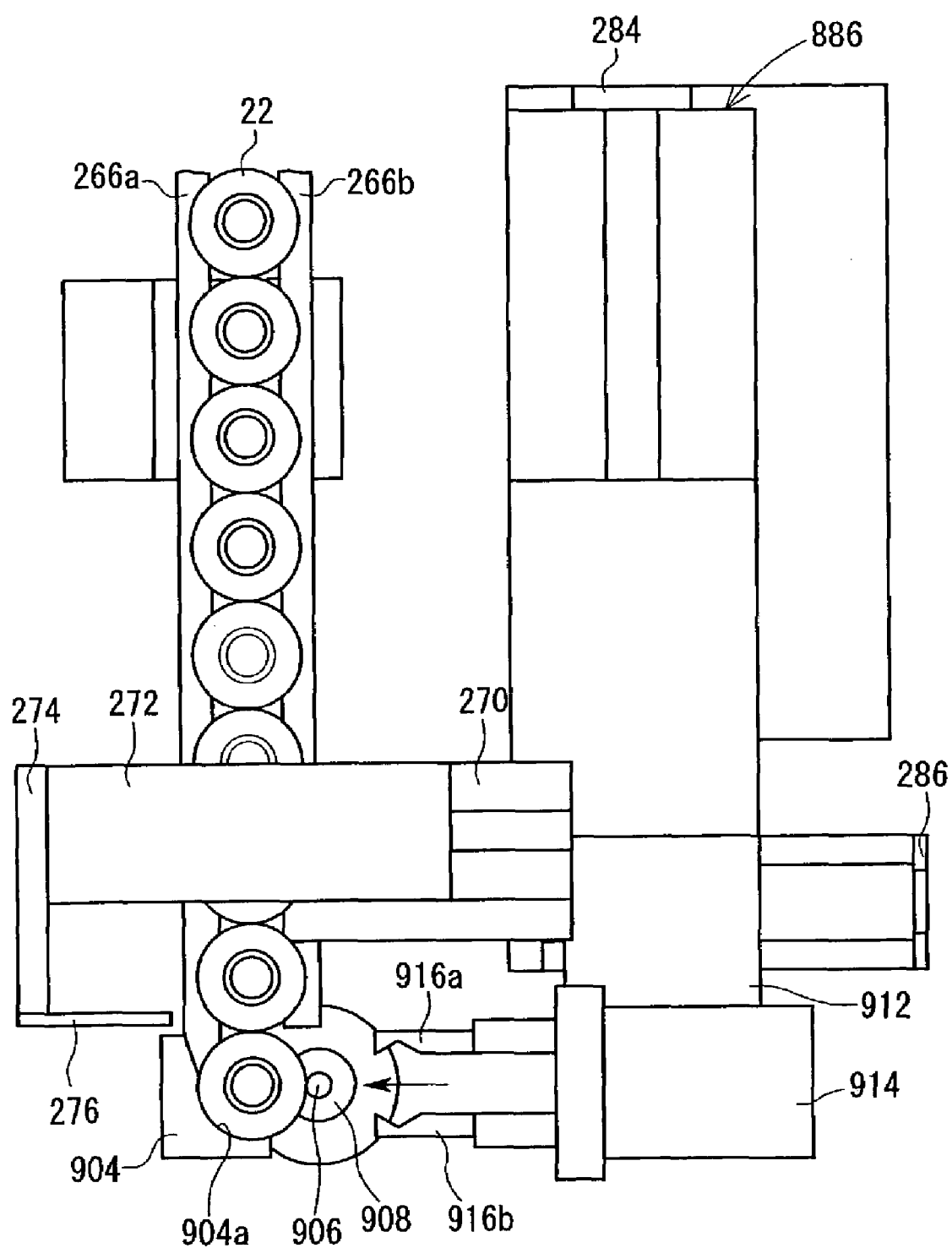
FIG. 70 is an elevational view illustrative of the manner in which the spool supply mechanism according to the second embodiment operates.
Figure 71:
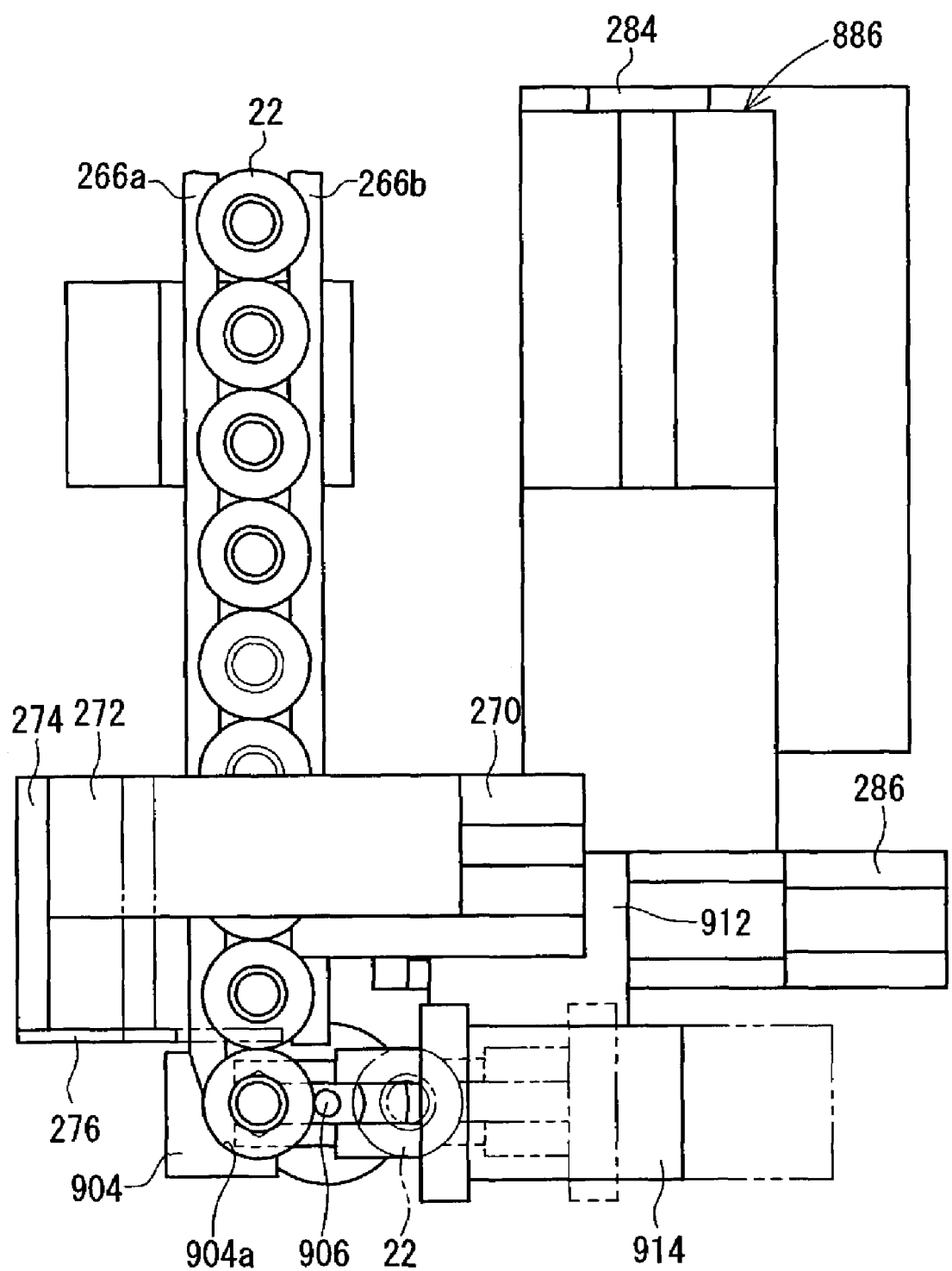
FIG. 71 is an elevational view illustrative of the manner in which the spool supply mechanism according to the second embodiment operates.

As shown in FIG. 70, a spool 22 supplied to the lower ends of the guide plates 266a, 266b is extracted by the spool extracting plate 276 and then received by the spool rest 904 and the shaft 906. Then, the second cylinder 286 is actuated to move the clamps 916a, 916b toward the spool rest 904, and the third cylinder 914 is actuated to close the clamps 916a, 916b to grip an inner portion of the spool 22 near the flange 22b (see FIG. 69). At the same time, the cylinder 270 is actuated to introduce the spool extracting plate 276 into the groove 278 to hold a spool 22 which is positioned immediately above the lowermost spool 22 which has been gripped (see FIG. 71). The cylinder 910 is actuated to retract the shaft 906 into the cylinder 910, after which the second cylinder 286 is actuated to move the clamps 916a, 916b which have gripped the spool 22 to the position shown in FIG. 70.

Figure 72:
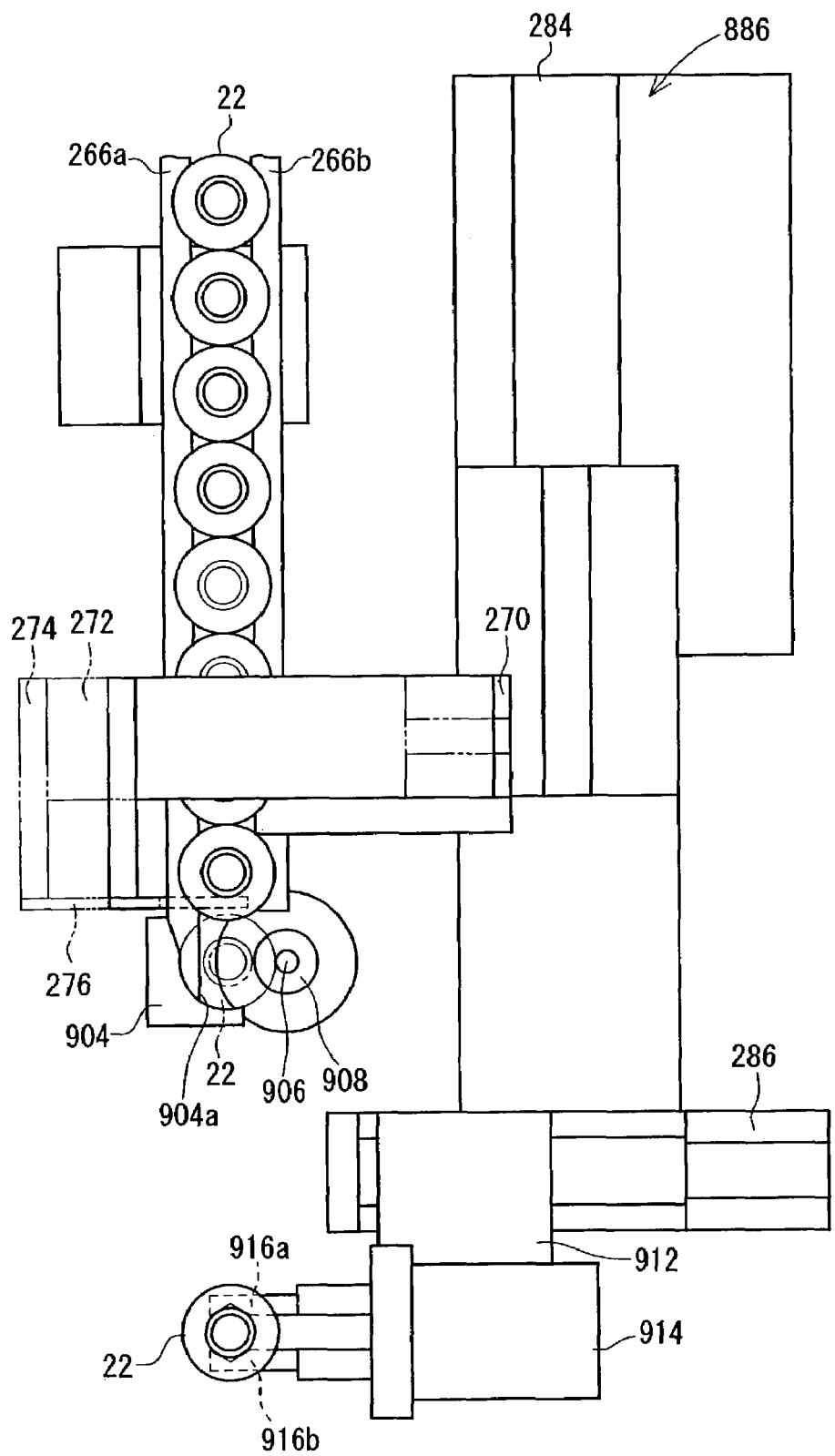
FIG. 72 is an elevational view illustrative of the manner in which the spool supply mechanism according to the second embodiment operates.

The clamps 916a, 916b which have gripped the spool 22 are lowered by the first cylinder 284 to the vertical position of the engaging arms 352a, 352b of the winding mechanism 888. Then, the second cylinder 286 is actuated to move the clamps 916a, 916b toward the engaging arms 352a, 352b (see FIG. 72) and place the clamps 916a, 916b between the engaging arms 352a, 352b. The spool 22 is now transferred to the winding mechanism 888 when the engaging arms 352a, 352b engage the opposite ends of the spool 22 (see FIG. 69).

In the spool supply mechanism 886, while the spool 22 gripped by the clamps 916a, 916b is being moved toward the engaging arms 352a, 352b of the winding mechanism 888, the shaft 906 is returned to the position facing the spool rest 904 to extract the spool 22 held by the spool extracting plate 276. Therefore, before the clamps 916a, 916b return to the position shown in FIG. 70, the spool rest 904 and the shaft 906 are readied for a next spool 22. As a result, the cycle time for supplying a spool with the spool supply mechanism 886 can be shortened.

After the spool 22 is transferred to the winding mechanism 88, the clamps 916a, 916b are opened by the third cylinder 914, releasing the spool 22. Thereafter, the clamps 916a, 916b return to the position shown in FIG. 70 by operating in a manner which is a reversal of the operation shown in FIG. 72, and starts to operate to transfer a next spool 22.

Figure 73:
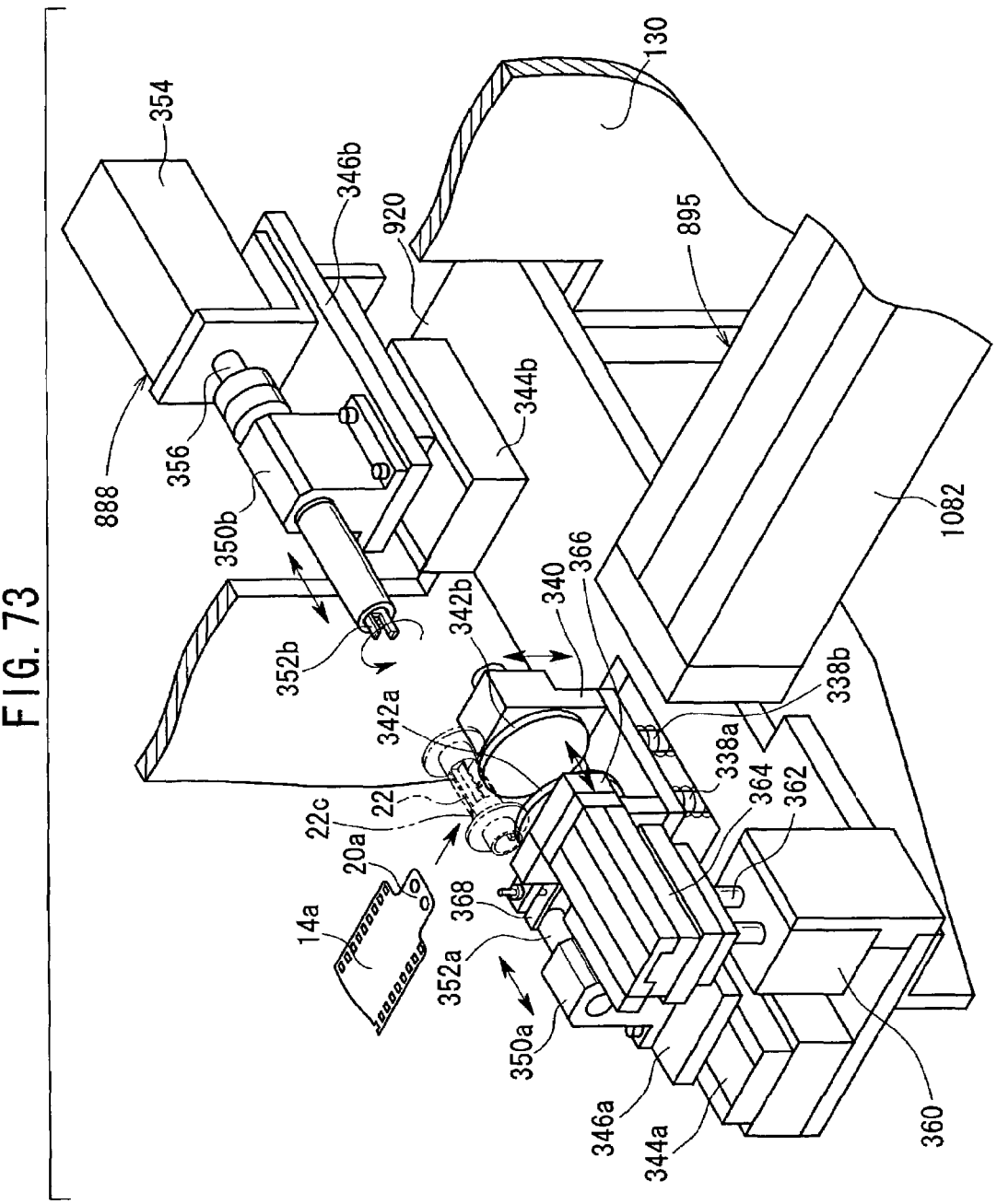
FIG. 73 is a perspective view of a winding mechanism according to the second embodiment.

As shown in FIG. 73, the winding mechanism 888 disposed below the spool supply mechanism 886 has a phase adjusting plate 368 disposed above the engaging arm 352a. The phase adjusting plate 368 abuts against an inner portion of the spool 22 near the flange 22a. When the spool 22 rotates, the phase adjusting plate 368 engages the step 22c of the spool 22 to adjust the phase, i.e., angular position, of the groove 22d of the spool 22 with respect to the leading end 20a of the film strip 14a.

The spool 22 is supplied to the winding mechanism 888 while it is gripped near the flange 22b by the clamps 916a, 916b of the spool supply mechanism 886 (see FIG. 69), and is adjusted in phase by the phase adjusting plate 368 which abuts against the spool 22 near the flange 22a. Since the clamps 916a, 916b do not contact with the phase adjusting plate 368, the phase adjusting plate 368 can start its operation to adjust the phase of the spool 22 without having to wait for the clamps 916a, 916b to be retracted from the winding mechanism 888. As a consequence, the winding mechanism 888 can quickly start winding the film strip 14a around the spool 22.

Figure 74:
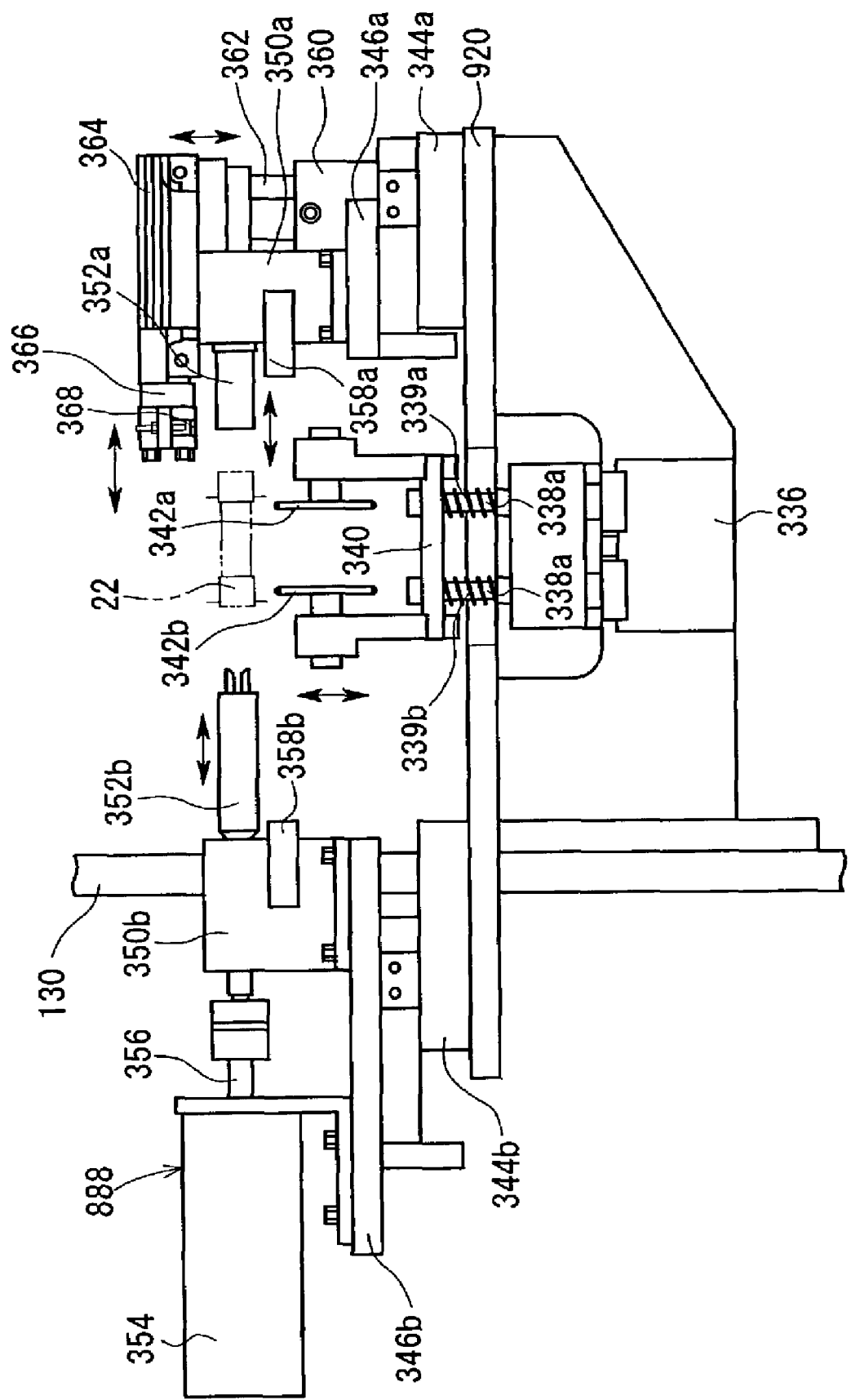
FIG. 74 is a front elevational view of the winding mechanism according to the second embodiment.

As shown in FIGS. 73 and 74, the winding mechanism 888 is fixed to the partition wall 130 by a bracket 920. The winding mechanism 888 according to the second embodiment does not have the base 310 of the winding mechanism 88 according to the first embodiment, the moving mechanism (e.g., the guide rails 308a, 308b, the cylinder 314, the links 318, 324, etc.) for reciprocally moving the base 310, and the shock absorbing mechanisms 330a through 330d. Instead, the transfer mechanism 895 of the assembling unit 836 has an actuator 1082 extending to the winding mechanism 888. Therefore, the wound-film assembly 24 with the fixed-length film 20 wound by the winding mechanism 888 is transferred to the transfer mechanism 895 by operation of the transfer mechanism 895. Since shocks which would be applied to the winding motor 354 by reciprocating movement of the transfer mechanism 95 in the first embodiment and stresses which would be applied to the sensors 358a, 358b and wires (not shown) can be reduced, the film manufacturing apparatus 810 can have a longer service life.

The cartridge array supply unit 806 disposed above the winding unit 834, and the cartridge transfer device 848, the cartridge delivery device 846, and the delivery mechanism 894 which are disposed above the assembling unit 836 will be described below.

Figure 75:
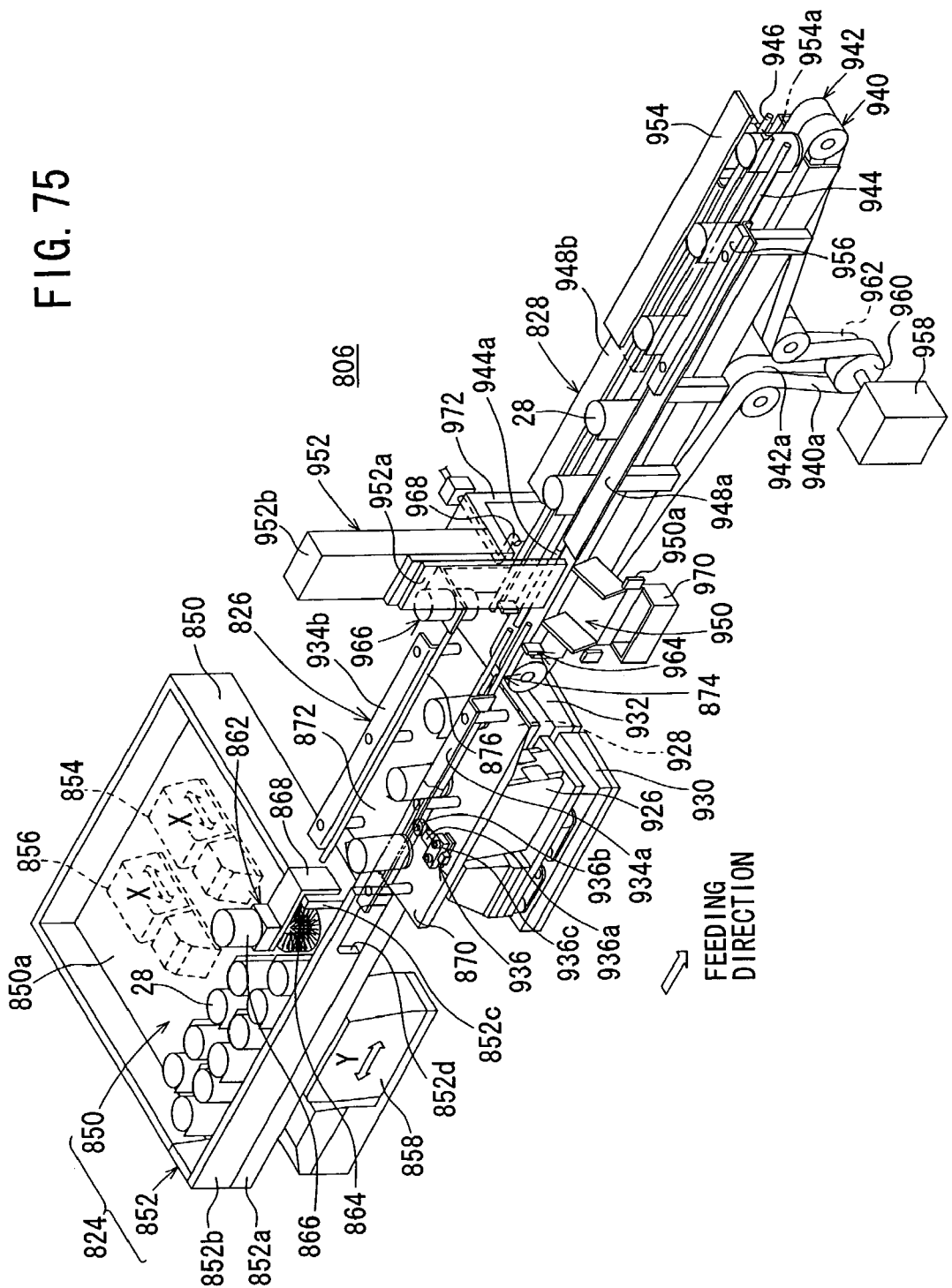
FIG. 75 is a perspective view of a cartridge array supply unit according to the second embodiment.

FIG. 75 shows structural details of the cartridge array supply unit 806. The cartridge array supply unit 806 has the single-row supply mechanism 824, the attitude arranging mechanism 826, and the attitude holding delivery mechanism 828 which are connected in series with each other.

The single-row supply mechanism 824 comprises a tray-shaped hopper 850 and a single-row feeder 852 connected to the tray-shaped hopper 850. The hopper 850 is supplied with a plurality of one-open-sided cartridges 28 from a transfer machine (not shown). The hopper 850 has a sensor (not shown) for detecting the rate at which one-open-sided cartridges 28 are supplied to the hopper 850. A monitoring controller (not shown) controls the rate at which one-open-sided cartridges 28 are supplied to the hopper 850 by the transfer machine based on a signal generated by the sensor.

Two vibration generators 854, 856 are mounted on a lower surface of a bottom panel 850a of the hopper 850. The vibration generators 854, 856 vibrate the bottom panel 850a of the hopper 850 in the direction indicated by the arrow X to gather one-open-sided cartridges 28 toward the single-row feeder 852.

The single-row feeder 852 comprises a single-row feeding plate 852*a*, a receiving plate 852*b*, a slot 852*c*, and a vibration generator 858. The one-open-sided cartridges 28 gathered from the hopper 850 are received by the receiving plate 852*b* and placed on the single-row feeding plate 852*a*. The vibration generator 858 vibrates the single-row feeding plate 852*a* in the direction indicated by the arrow Y in which to feed the one-open-sided cartridges 28. The one-open-sided cartridges 28 which are placed on the single-row feeding plate 852*a* are fed in a row from the slot 852*c* toward the attitude arranging mechanism 826 by the vibrating single-row feeding plate 852*a*.

A rotary propulsion unit 862 is disposed in the hopper 850 in front of the slot 852*c* for applying rotational forces to propel one-open-sided cartridges 28 into the slot 852*c*. The rotary propulsion unit 862 comprises a rotary brush 864 for contacting the circumferential surface of a one-open-sided cartridge 28 just in front of the slot 852*c*, a motor 866 having a rotatable shaft coupled to the rotary brush 864 for rotating the rotary brush 864, and a stay 868 supporting the motor 866 fixed thereto. The rotary brush 864 is made of nylon (polyamide resin), for example. The stay 868 is fixed to a side wall 850*b* of the hopper 850 near the slot 852*c*, and can be positionally adjusted by an adjusting mechanism (not shown).

The single-row supply mechanism 824 operates as follows: One-open-sided cartridges 28 gathered from the hopper 850 to the single-row feeder 852 are fed in a row toward the slot 852*c*, and then delivered one by one into the slot 852*c* by the rotary brush 864 of the rotary propulsion unit 862. Therefore, the slot 852*c* is prevented from being clogged with a plurality of one-open-sided cartridges 28. The one-open-sided cartridges 28 can thus be reliably fed in a row and a vertical attitude toward the attitude arranging mechanism 826. Any one-open-sided cartridges 28 which have fallen into a horizontal attitude in the hopper 850 or the single-row feeder 852 are discharged from the single-row feeder 852 through an opening 852*d* defined in the receiving plate 852*b*.

The attitude arranging mechanism 826 comprises two plates 870, 872, a pair of guides 874, 876, a pair of vibration generators 926, 928, and a pair of slant holders 930, 932.

The plates 870, 872, which are of an elongate rectangular shape, have their longitudinal axis aligned with the direction in which one-open-sided cartridges 28 are fed. The plates 870, 872 are disposed parallel to each other and slightly spaced from each other by a gap of 1 mm, for example, in a direction perpendicular to the feeding direction. The guides 874, 876 comprise rods extending in the feeding direction, and are attached above the respective plates 870, 872 by respective frames 934*a*, 934*b*.

The plates 870, 872 are supported to have their delivery surfaces slanted on the slant holders 930, 932 by the respective vibration generators 926, 928. The slant holders 930, 932 are slanted to cause one-open-sided cartridges 28 to slide toward the guide 874 (hereinafter also referred to as a "reference guide 874") and have their circumferential surfaces held against the guide 874. Preferably, the slant holders 930, 932 are slanted by about 9 degrees to the horizontal plane.

The reference guide 874 and the guide 876 are spaced from each other by a predetermined distance with respect to one-open-sided cartridges 28 erected in a vertical attitude, i.e., by a distance which allows one-open-sided cartridges 28 to turn 180° with the straight fins 28*a* kept out of contact with the guide 876. The one-open-sided cartridges 28 which are held against the reference guide 874 are delivered on and along the plates 870, 872 with their bottoms, i.e., the caps 26 thereof, being positioned across the gap between the plates 870, 872.

The vibration generators 926, 928 vibrate the plates 870, 872, respectively. The vibration generators 926, 928 produce a vibrational force which comprises a combination of a component directed in the feeding direction and a component directed perpendicularly to the plates 870, 872. The component directed in the feeding direction is greater than the component directed perpendicularly to the plates 870, 872 in order to propel one-open-sided cartridges 28 in the feeding direction.

The frequencies or amplitudes of vibrations generated by the vibration generators 926, 928 are different from each other to rotate one-open-sided cartridges 28 in one direction about their own axes. To produce vibrations of different frequencies, the vibration generator 926 vibrates the plate 870 in two strokes while the vibration generator 928 vibrates the plate 872 in one stroke. To produce vibrations of different amplitudes, the vibration generator 926 vibrates the plate 870 in a greater amplitude than the vibration generator 928 vibrates the plate 872. The frequencies or amplitudes of vibrations generated by the vibration generators 926, 928 may be made different from each other by incorporating springs having different levels of resiliency into the vibration generators 926, 928.

A projecting assembly 936 is mounted on the plate 870 and projects from a guide surface provided by the reference guide 874 into the path of one-open-sided cartridges 28. The projecting assembly 936 comprises a projecting plate 936*a*, a roller 936*b* rotatably supported on the projecting plate 936*a* by a bearing (not shown), and a clamp 936*c* clamping the projecting plate 936*a* and fastened to the plate 870 by bolts or the like. The projecting plate 936*a* has its projecting length, which extends from the reference guide 874 into the path of one-open-sided cartridges 28. The projecting plate is adjustable.

The attitude arranging mechanism 826 operates as follows: A one-open-sided cartridge 28 which is placed across the gap between the plates 870, 872 is fed in the feeding direction while rotating counterclockwise about its own axis in FIG. 75. When the straight fin 28*a* of the one-open-sided cartridge 28 abuts against the reference guide 874, the one-open-sided cartridge 28 stops its rotation, and the straight fin 28*a* is oriented in a given direction. Even if the straight fin 28*a* of a one-open-sided cartridge 28 is not oriented in the given direction, the one-open-sided cartridge 28 as it is fed is temporarily shifted off the reference guide 874 by the projecting assembly 936, and then rotated again counterclockwise until the straight fin 28*a* becomes oriented in the given direction. Accordingly, the one-open-sided cartridge 28 is fed reliably toward the attitude holding delivery mechanism 828 while the straight fin 28*a* is being oriented in the given direction.

In the second embodiment, the roller 936*b* is rotatably supported on the projecting plate 936*a* for temporarily shifting the one-open-sided cartridge 28 off the reference guide 874. However, any other elements may be used to temporarily shift one-open-sided cartridges 28 off the reference guide 874 insofar as they do not cause damage to the one-open-sided cartridges 28.

The attitude holding delivery mechanism 828 comprises two parallel conveyors 940, 942 which are slightly spaced from each other in a direction perpendicular to the feeding direction. The conveyors 940, 942 have respective feeding surfaces lying horizontally. The one-open-sided cartridges 28 are delivered by the conveyors 940, 942 with their bottoms, i.e., the caps 26 thereof, being positioned across the gap between the conveyors 940, 942.

The attitude holding delivery mechanism 828 also has a reference guide holder 944 and an auxiliary guide holder 946 attached above the respective conveyors 940, 942 by frames 948a, 948b. The reference guide holder 944 guides one-open-sided cartridges 28 along a surface aligned with the reference guide 874 referred to above. The one-open-sided cartridges 28 are fed along the reference guide holder 944 with their straight fins 28a held against the reference guide holder 944 to prevent the one-open-sided cartridges 28 from rotating about their axes.

The reference guide holder 944 includes a reference guide holder segment 944a extending in a range corresponding to a rejecter 950 to be described later on. The reference guide holder segment 944a is separate from the rest of the reference guide holder 944, and is vertically movable by a guide lifter 952.

The auxiliary guide holder 946 is horizontally spaced from and confronts the reference guide holder 944. The auxiliary guide holder 946 and the reference guide holder 944 sandwich one-open-sided cartridges 28 therebetween to prevent their straight fins 28a from being turned against the resistance from the reference guide holder 944.

The two conveyors 940, 942 have respective belts 940a, 942a. The belts 940a, 942a are trained respectively around a larger drive pulley 960 and a smaller drive pulley 962 which are fixed to the drive shaft of a motor 958, so that the belt 940a moves at a speed higher than the belt 942a. Therefore, one-open-sided cartridges 28 are fed by the conveyors 940, 942 while rotating counterclockwise about their own axes with the straight fins 28a being held against the reference guide holder 944.

The attitude holding delivery mechanism 828 includes a fall detector 964 and an inverted attitude detector 966 disposed in an upstream region for detecting, respectively, one-open-sided cartridges 28 which have fallen into a horizontal attitude and one-open-sided cartridges 28 which have been inverted in attitude with the caps 26 directed upwardly.

The fall detector 964 has a pair of transmissive photoelectric sensors disposed in facing relation to each other across the conveyors 940, 942, and detects whether a one-open-sided cartridge 28 has fallen or not based on the height thereof. The inverted attitude detector 966 comprises a proximity sensor disposed above the conveyors 940, 942 for detecting, in a contactless fashion, whether there is a cap 26 on a one-open-sided cartridge 28 or not.

The rejecter 950 comprises a guide lifter 952, an air nozzle 968, and a tray 970. The guide lifter 952 has a lifting plate 952a supporting the reference guide holder segment 944a for vertical movement, and an air cylinder 952b for vertically moving the lifting plate 952a. The air cylinder 952b is actuated by a solenoid-operated valve in response to a command from a controller (not shown). The guide lifter 952 is supported by a support frame 972.

The guide lifter 952 and the air-nozzle 968 are positioned downstream of the detectors 964, 966 with respect to the feeding direction. When the reference guide holder segment 944a is lifted by the guide lifter 952, the air nozzle 968 ejects a stream of air to reject a one-open-sided cartridge 28 which has fallen into a horizontal attitude or has been inverted upside down from the attitude holding delivery mechanism 828 into the tray 970. A pair of rejection sensors 950a is mounted on the tray 970 for detecting when a one-open-sided cartridge 28 is rejected.

The attitude holding delivery mechanism 828 also has a fall prevention plate 954 extending along the feeding direction for guiding one-open-sided cartridges 28 by holding upper surfaces thereof, and a bar magnet 956 extending along the feeding direction.

The fall prevention plate 954 has a tip end 954a extending along the feeding direction and bent downwardly. The bent tip end 954a enters between the straight fin 28a and the flange 28b of a one-open-sided cartridge 28 for preventing the one-open-sided cartridge 28 from rotating counterclockwise while it is moving in the feeding direction.

The bar magnet 956 extends along the reference guide holder 944 and is mounted on the frame 948a in spaced relation to the reference guide holder 944. The distance by which the bar magnet 956 is spaced from the reference guide holder 944 can be adjusted by an adjusting mechanism including bolts (not shown). The reference guide holder 944 and the frame 948a are made of a nonmagnetic material or a weakly magnetic material such as aluminum, stainless steel, or the like. Therefore, the feeding of one-open-sided cartridges 28 is not impaired by the magnetism of the bar magnet 956.

The attitude holding delivery mechanism 828 operates as follows: One-open-sided cartridges 28 are delivered while being held in an attitude oriented in a given direction because the conveyors 940, 942 run at different speeds. Since the fall prevention plate 954 holds the one-open-sided cartridges 28 downwardly, they are prevented from falling or being inclined when they are closely packed in a row in a downstream region with respect to the feeding direction. The bar magnet 956 magnetically attracts one-open-sided cartridges 28 being fed in an array to prevent the one-open-sided cartridge 28 positioned at the downstream end, in particular, of the array from falling or being inclined in a direction opposite to the feeding direction. Consequently, it is possible to deliver one-open-sided cartridges 28 reliably in a stable constant attitude toward the cartridge delivery unit 832.

Figure 76:
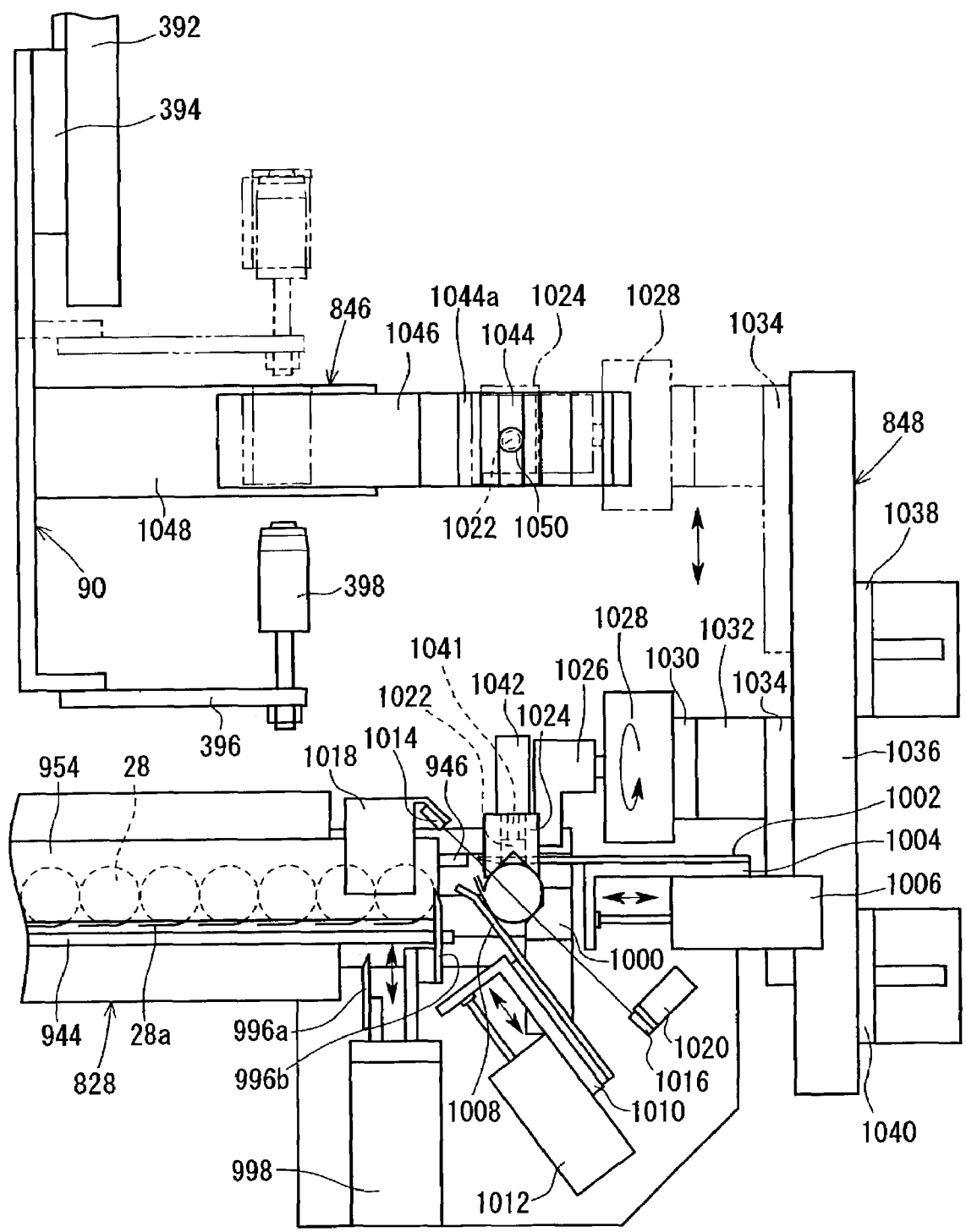
FIG. 76 is a plan view of a cartridge transfer device and a cartridge delivery device in a cartridge delivery unit according to the second embodiment.
Figure 77:
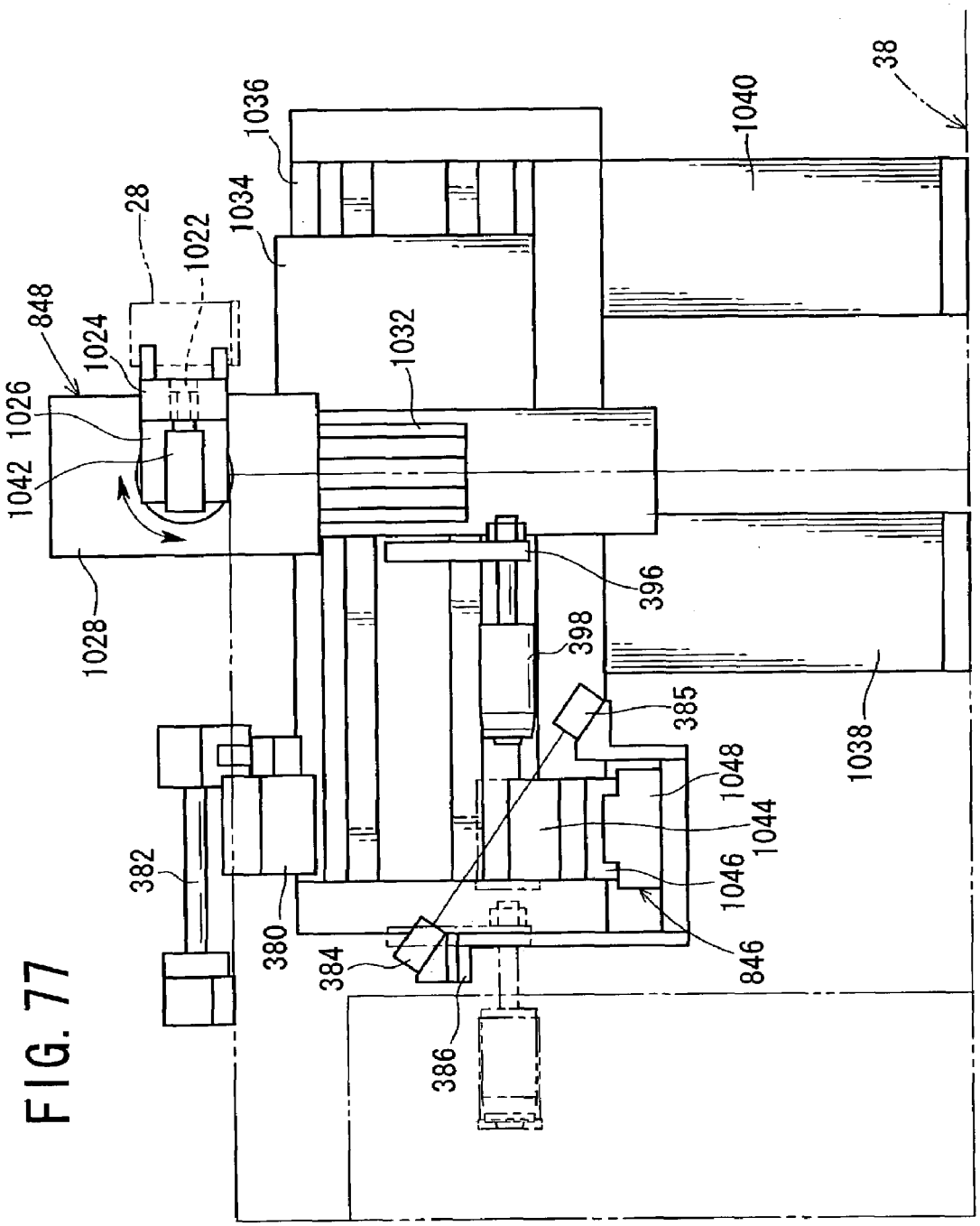
FIG. 77 is a front elevational view of the cartridge transfer device and the cartridge delivery device in the cartridge delivery unit according to the second embodiment.
Figure 78:
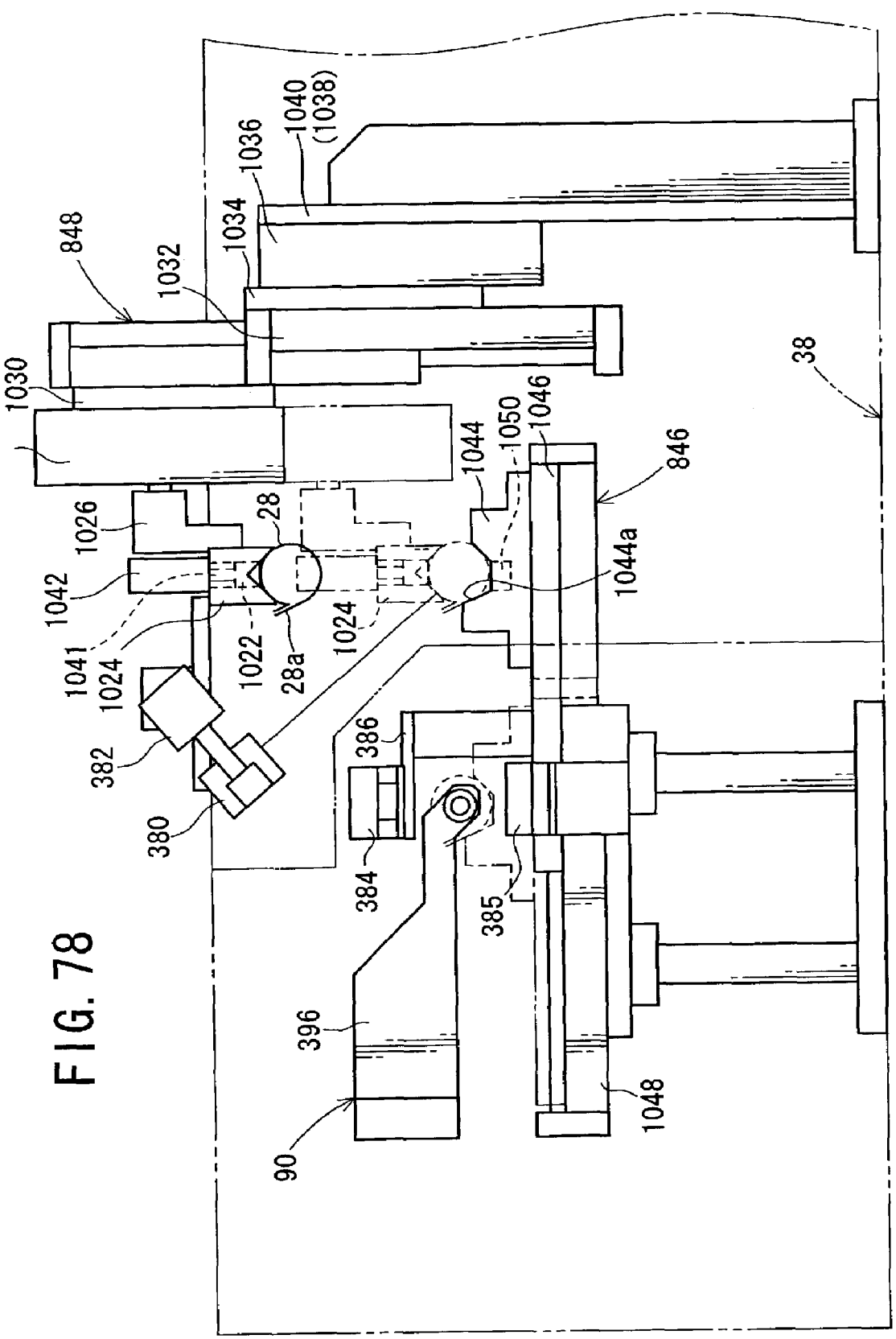
FIG. 78 is a side elevational view of the cartridge transfer device and the cartridge delivery device in the cartridge delivery unit according to the second embodiment.

FIGS. 76 through 78 show the cartridge transfer device 848 and the cartridge delivery device 846 of the cartridge delivery unit 832. The cartridge transfer device 848 comprises extracting plates 996a, 996b for extracting one-open-sided cartridges 28, one at a time, delivered from the attitude holding delivery mechanism 828, a cylinder 998 for moving the extracting plates 996a, 996b back and forth alternately, a stop 1000 for receiving and positioning a one-open-sided cartridge 28 extracted by the extracting plates 996a, 996b, a guide plate 1002 for guiding a received one-open-sided cartridge 28 laterally (downwardly in FIG. 76) in coaction with the stop 1000, a movable plate 1004 on which the guide plate 1002 is mounted, and a cylinder 1006 supporting the movable plate 1004 for back-and-forth movement. The extracting plates 996a, 996b have tapered distal ends for easily entering between adjacent one-open-sided cartridges 28 arranged in an array. The guide plate 1002 lies on an extension of the auxiliary guide holder 946 of the attitude holding delivery mechanism 828.

The cartridge transfer device 848 also has an adjusting member 1008 for adjusting the direction of the straight fin 28a of a one-open-sided cartridge 28, a movable plate 1010 on which the adjusting member 1008 is mounted, a cylinder 1012 supporting the movable plate 1010 for back-and-forth movement, and a light-emitting unit 1014 and a light-detecting unit 1016 for detecting whether there is a one-open-sided cartridge 28 in a position received by the stop

1000. The light-emitting unit 1014 and the light-detecting unit 1016 are mounted on respective brackets 1018, 1020.

The cartridge transfer device 848 further includes an attractive holder 1024 having a magnet 1022 for attracting a one-open-sided cartridge 28 in a position received by the stop 1000, a rotary block 1026 with the attractive holder 1024 mounted thereon, a rotary actuator 1028 which supports the rotary block 1026 for rotation, a movable plate 1030 on which the rotary actuator 1028 is mounted, a cylinder 1032 for vertically moving the movable plate 1030, a movable plate 1034 on which the cylinder 1032 is mounted, and a cylinder 1036 for reciprocally moving the movable plate 1034 between the attitude holding delivery mechanism 828 and the cartridge delivery device 846. The cylinder 1036 is fixedly mounted on an upper panel of the housing 38 through brackets 1038, 1040. The attractive holder 1024 has a cylinder 1042 which causes a rod 1041 to move the magnet 1022 toward and away from the one-open-sided cartridge 28.

The cartridge transfer device 848 operates as follows: A one-open-sided cartridge 28 delivered by the attitude holding delivery mechanism 828 and extracted by the extracting plates 996*a*, 996*b* which are moved by the cylinder 998 is received by the stop 1000. At the same time, the cylinder 1006 is actuated to displace the guide plate 1002 toward the auxiliary guide holder 946 of the attitude holding delivery mechanism 828 for thereby laterally guiding the one-open-sided cartridge 28. The cylinder 1012 is actuated to displace the adjusting member 1008 toward the straight fin 28*a* of the one-open-sided cartridge 28 for thereby adjusting the direction of the straight fin 28*a* to a predetermined oblique direction.

Then, the rotary actuator 1028 is operated to turn the attractive holder 1024 into an orientation matching the vertical attitude of the one-open-sided cartridge 28 held by the attitude holding delivery mechanism 828. The cylinders 1036, 1032 are actuated to move the attractive holder 1024 into the solid-line position shown in FIGS. 76 and 77. The attractive holder 1024 attracts the one-open-sided cartridge 28 under magnetic forces from the magnet 1022.

Having attracted the one-open-sided cartridge 28, the attractive holder 1024 is moved toward the cartridge delivery device 846 by the cylinder 1036, and is turned by the rotary actuator 1028 to place the one-open-sided cartridge 28 horizontally as indicated by the solid line in FIG. 78. Then, the cylinder 1032 is actuated to lower the attractive holder 1024 toward a seat 1044 of the cartridge delivery device 846. When the one-open-sided cartridge 28 abuts against the seat 1044, the cylinder 1042 is actuated to retract the magnet 1022 with the rod 1041 toward the cylinder 1042. As a result, the one-open-sided cartridge 28 is released from the magnet 1022. At the same time, the cylinder 1032 is actuated to move the attractive holder 1024 upwardly transfer the one-open-sided cartridge 28 to the seat 1044.

The cartridge delivery device 846 has a V-shaped seat 1044 for holding a one-open-sided cartridge 28 transferred from the attractive holder 1024 of the cartridge transfer device 848, a movable plate 1046 on which the seat 1044 is fixedly mounted, and a cylinder 1048 for reciprocally moving the movable plate 1046 between the cartridge transfer device 848 and the cartridge supply mechanism 90. The seat 1044 has a slanted surface 1044*a* for contacting the straight fin 28*a*, the slanted surface 1044*a* being wider than another slanted surface thereof. The seat 1044 has a magnet 1050 embedded centrally therein as with the seat 376*a* according to the first embodiment. The magnet 1050 has stronger magnetism than the magnet 1022 of the attractive holder 1024.

Figure 79:
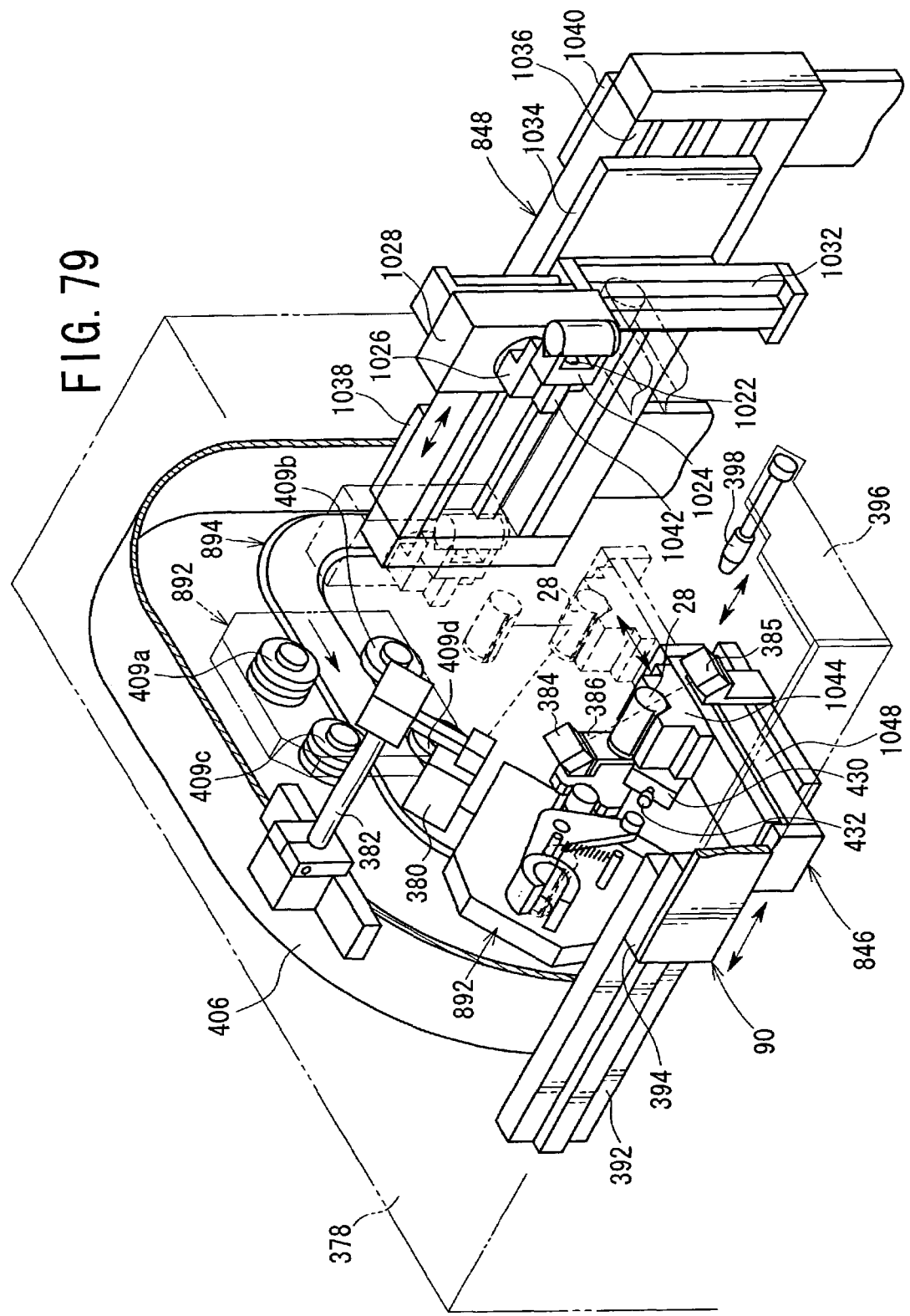
FIG. 79 is a perspective view of the cartridge delivery device and a cartridge supply mechanism according to the second embodiment.

The cartridge delivery device 846 operates as follows: A one-open-sided cartridge 28 transferred from the cartridge transfer device 848 to the seat 1044 by the attractive holder 1024 is delivered toward the cartridge supply mechanism 90 by the cylinder 1048 (see FIG. 79). Since the magnet 1050 embedded in the seat 1044 has stronger magnetism than the magnet 1022 of the attractive holder 1024, the seat 1044 can receive and hold the one-open-sided cartridge 28 more reliably. As the slanted surface 1044*a* of the seat 1044 for contacting the straight fin 28*a* of the one-open-sided cartridge 28 is wider than the other slanted surface of the seat 1044, the seat 1044 can hold the one-open-sided cartridge 28 reliably with the straight fin 28*a* oriented in a given direction. According to the second embodiment, furthermore, the cartridge supply mechanism 90 is supplied with one-open-sided cartridges 28 automatically by the cartridge array supply unit 806 and the cartridge delivery unit 832. Consequently, one-open-sided cartridges 28 can be supplied to the cartridge supply mechanism 90 quickly and reliably.

The one-open-sided cartridge 28 which is held by the seat 1044 of the cartridge delivery device 846 and supplied to the cartridge supply mechanism 90 is transferred to the delivery mechanism 894 of the assembling unit 896 by the cartridge supply mechanism 90 which is identical to the cartridge supply mechanism 90 according to the first embodiment.

Figure 80:
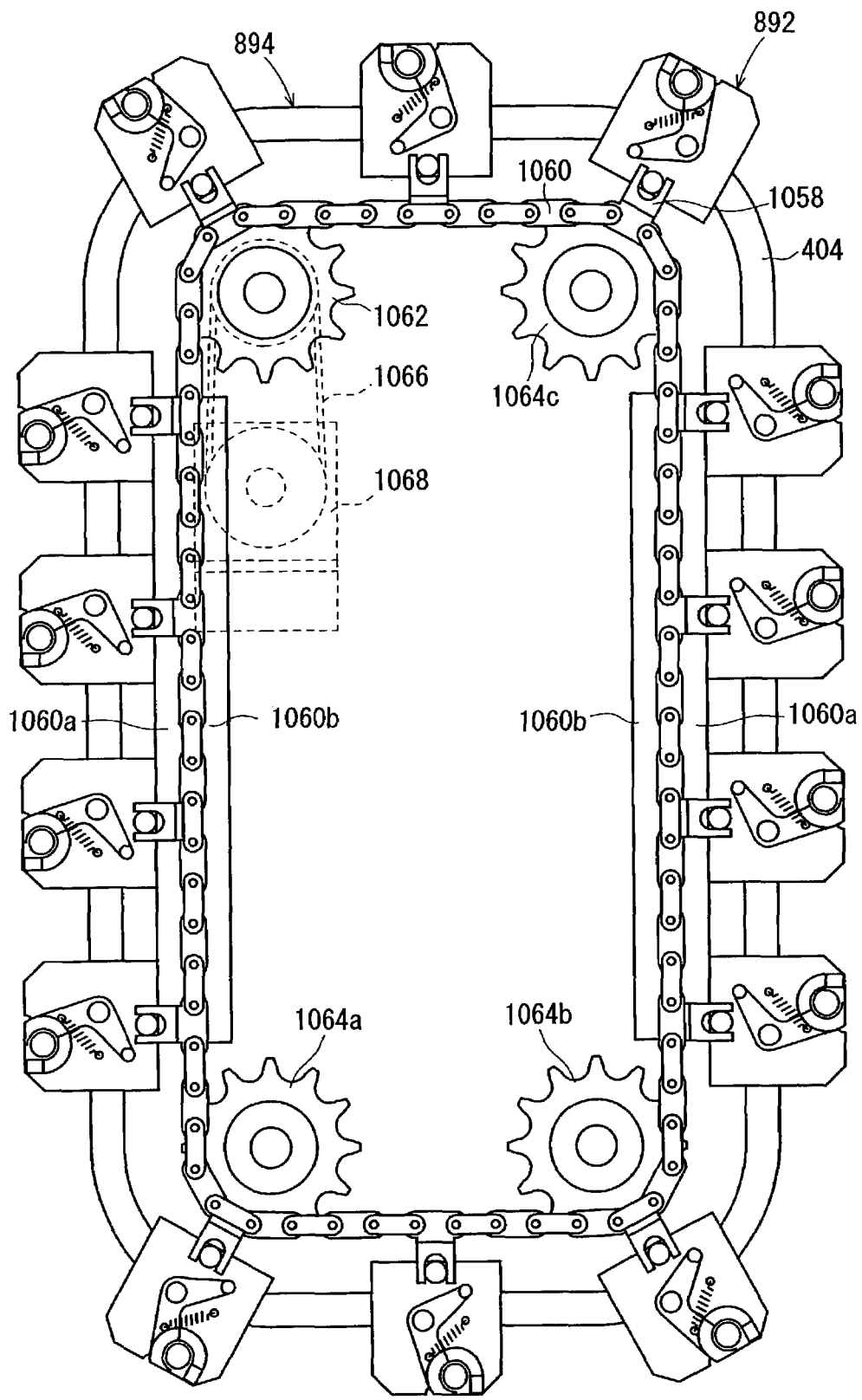
FIG. 80 is a side elevational view, partly omitted from illustration, of a delivery mechanism according to the second embodiment.
Figure 81:
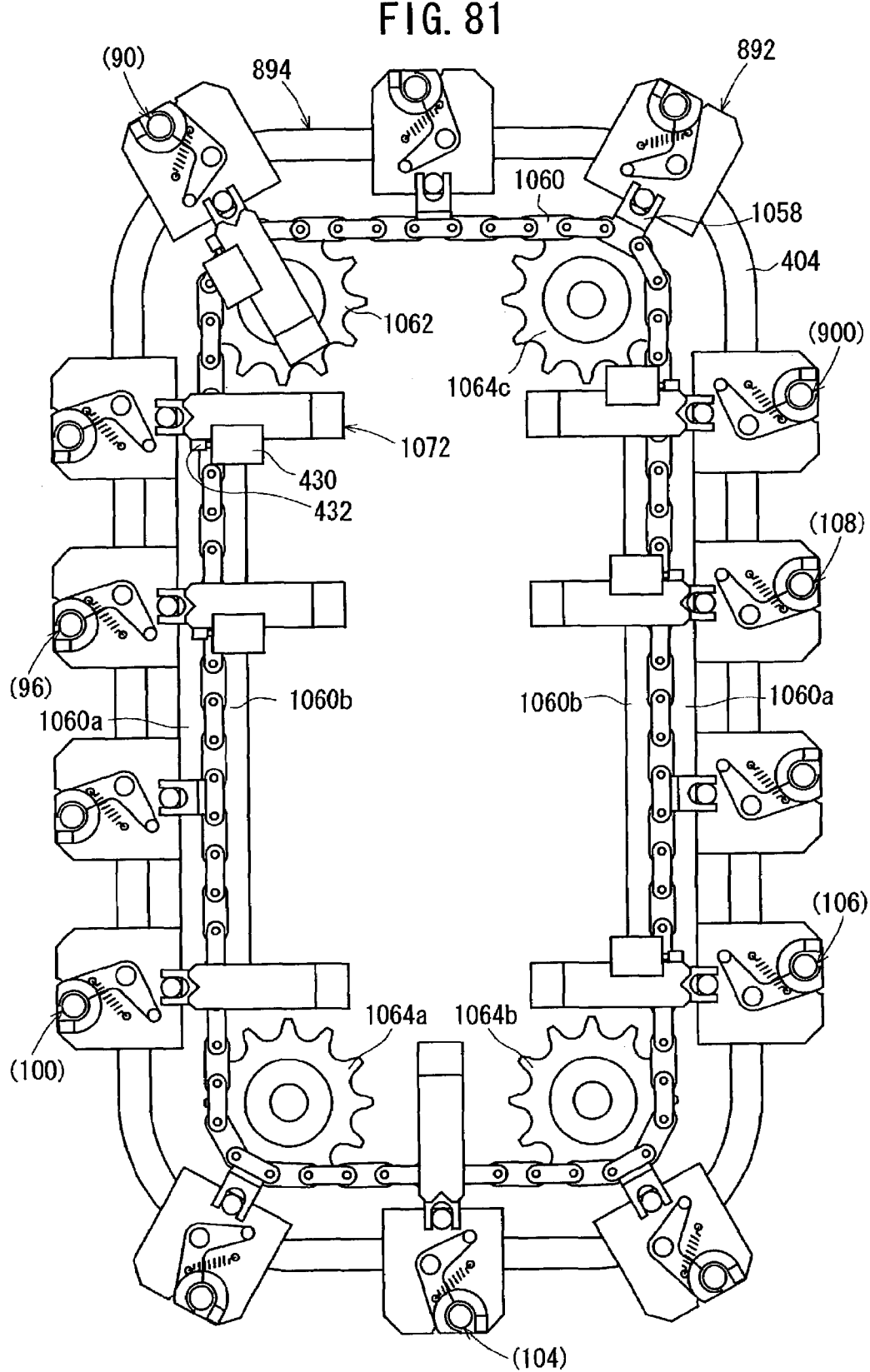
FIG. 81 is a side elevational view, partly omitted from illustration, of the delivery mechanism, including positioning mechanisms, according to the second embodiment.

As shown in FIGS. 80 and 81, the delivery mechanism 894 comprises a plurality of pallets 892, a chain belt 1060 having a plurality of links 1058 disposed at equal spaced intervals for delivering the pallets 892, a drive gear 1062 and a plurality of gear pulleys 1064*a*, 1064*b*, 1064*c* for circulating the chain belt 1060, a motor 1068 such as a servo-motor or the like for causing a timing belt 1066 to rotate the drive gear 1062, and a guide rail 404 disposed within the light-shielding case 378 and the assembling unit 836 for circulating the pallet 892 in the same manner as with the first embodiment. The chain belt 1060 is guided by a pair of confronting guide plates 1060*a*, 1060*b*.

Figure 82:
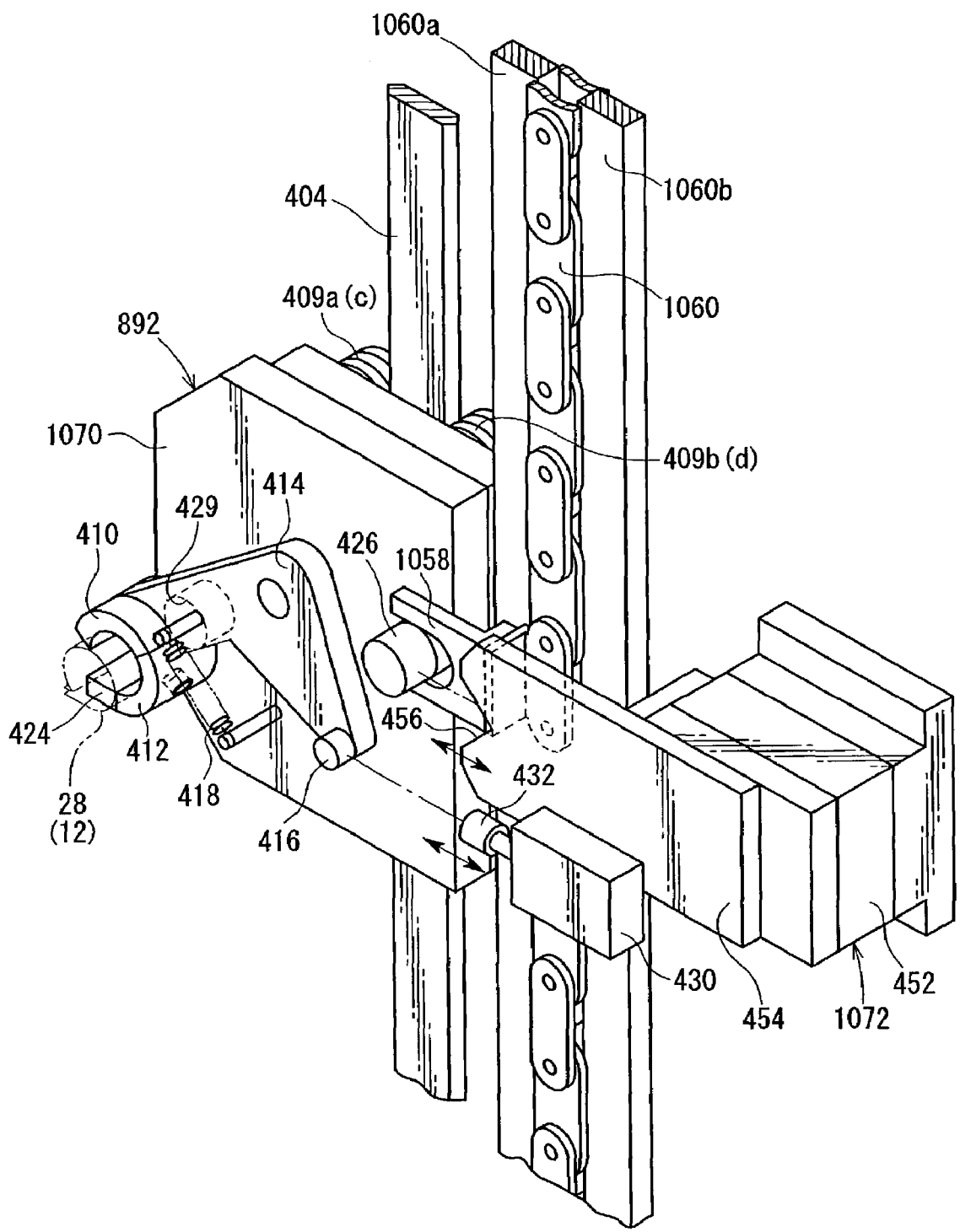
FIG. 82 is a perspective view of a pallet and a positioning mechanism therefor in the delivery mechanism according to the second embodiment.

FIG. 82 shows structural details of a pallet 892 and a positioning mechanism 1072 for positioning the pallet 892. The pallet 892 has a base 1070 instead of the base 408 in the pallet 92 according to the first embodiment. Since the pallets 892 are delivered by the chain belt 1060 through the links 1058, the base 1070 does not have the hole 428 for receiving therein the engaging pin 448 and the positioning pin 436 of the drive mechanism according to the first embodiment, and the links 402 interconnecting the pallets 92.

A positioning mechanism 1072 for the pallet 892 has a cylinder 452 and a movable plate 454 having a V-shaped notch 456 as with the first embodiment. To the movable plate 454, there is fixed a cylinder 430 for opening the movable holder 410 of the pallet 892 to a certain angular extent. When the tip end of the rod 432 of the cylinder 430 presses the cam follower 416, the arm 414 is turned to open the movable holder 410 (see FIG. 58).

The positioning mechanism 1072 is located in at least each of regions corresponding to the cartridge supply mechanism 90, the loading mechanism 96, the mounting mechanism 902, the crimping mechanism 104, the inspecting mechanism 106, the removing mechanism 108, and the discharge mechanism 900. The cylinder 430 with the rod 432 is located in at least each of regions corresponding to the cartridge supply mechanism 90, the loading mechanism 96, the inspecting mechanism 106, the removing mechanism 108, and the discharge mechanism 900 (see FIG. 81).

The delivery mechanism 894 operates as follows: The rotational drive power of the motor 1068 is transmitted through the chain belt 1060 and the links 1058 to the cam followers 426 of the pallets 892, causing the pallets 892 to circulate along the guide rail 404. If the motor 1068 comprises a servomotor, for example, and the pallets 892 are delivered intermittently, then shocks applied to the pallets 892 when they start and stop moving are smaller than with the delivery mechanism 94 according to the first embodiment. As a result, the delivery mechanism 94 may operate at a higher speed.

When each of the pallets 892 reaches one of the regions corresponding to the mechanisms 90, 96, 902, 104, 106, 108, 900, the cylinder 452 disposed in the region is actuated to cause the notch 456 in the movable plate 454 to engage the cam follower 426 mounted on the pallet 892, thereby positioning the pallet 892. The cylinder 430 disposed in each of the regions corresponding to the mechanisms 90, 96, 106, 108, 900 is actuated to cause the rod 432 to press the cam follower 416 of arm 414. Therefore, the arm 414 is turned to space the movable holder 410 disposed on the distal end thereof away from the fixed holder 412 by a predetermined distance (see FIG. 58).

The transfer mechanism 895, the mounting mechanism 902, the discharge mechanism 900, and the wound-film-loaded cartridge unloader 860 disposed in the assembling unit 836 will be described below.

Figure 83:
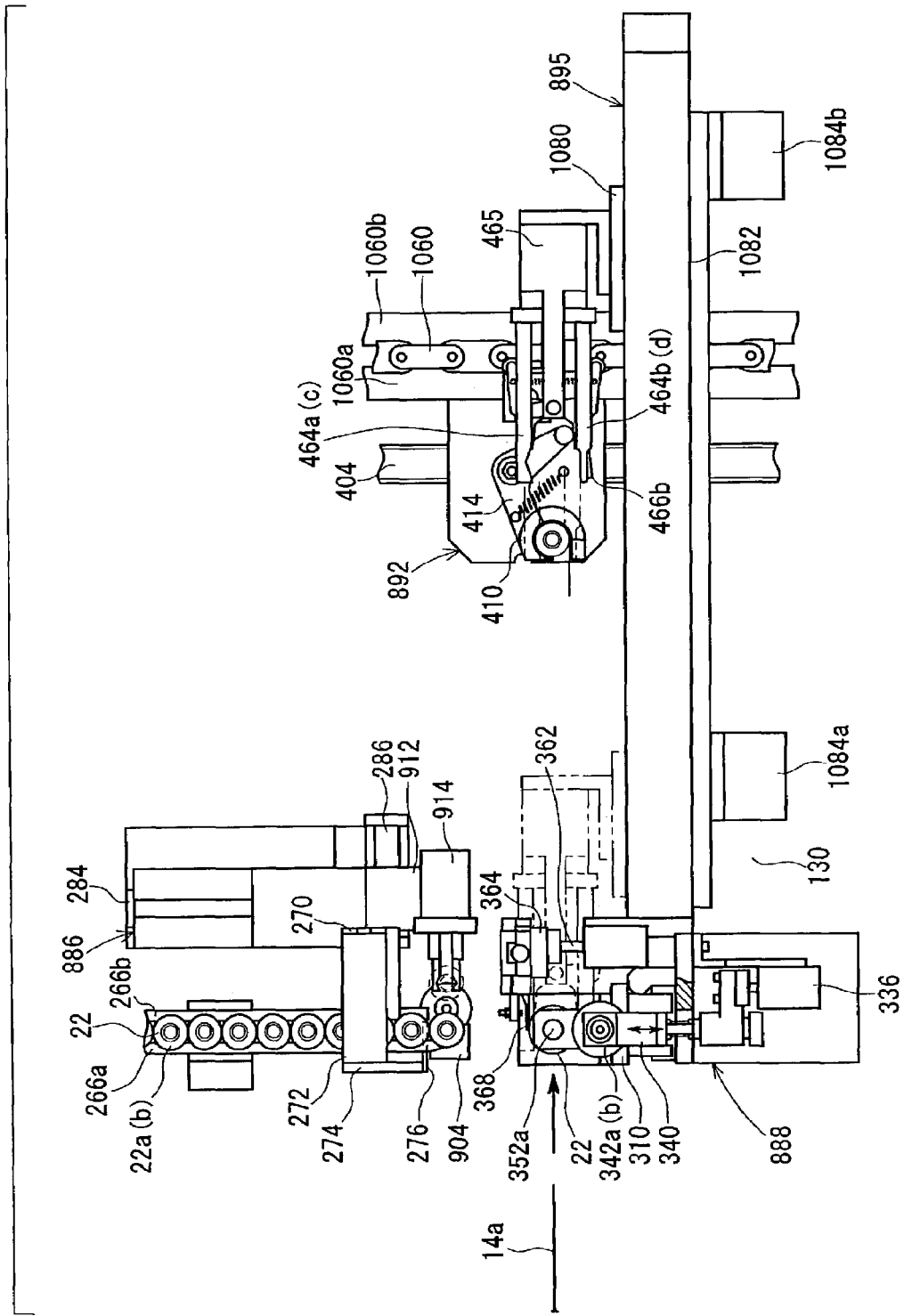
FIG. 83 is a side elevational view of a transfer mechanism according to the second embodiment.
Figure 84:
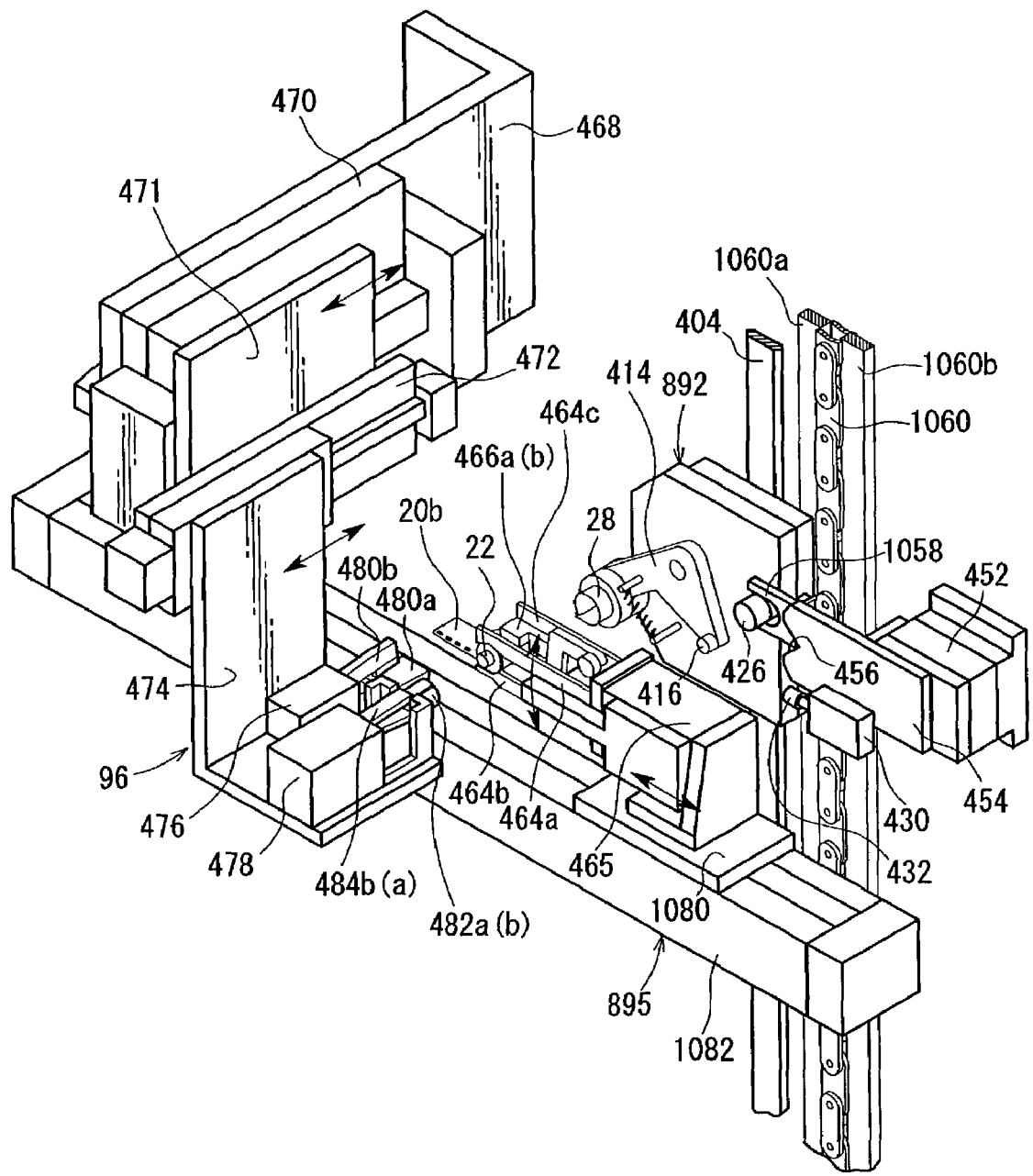
FIG. 84 is a perspective view of the transfer mechanism and an assembling mechanism according to the second embodiment.
Figure 85:
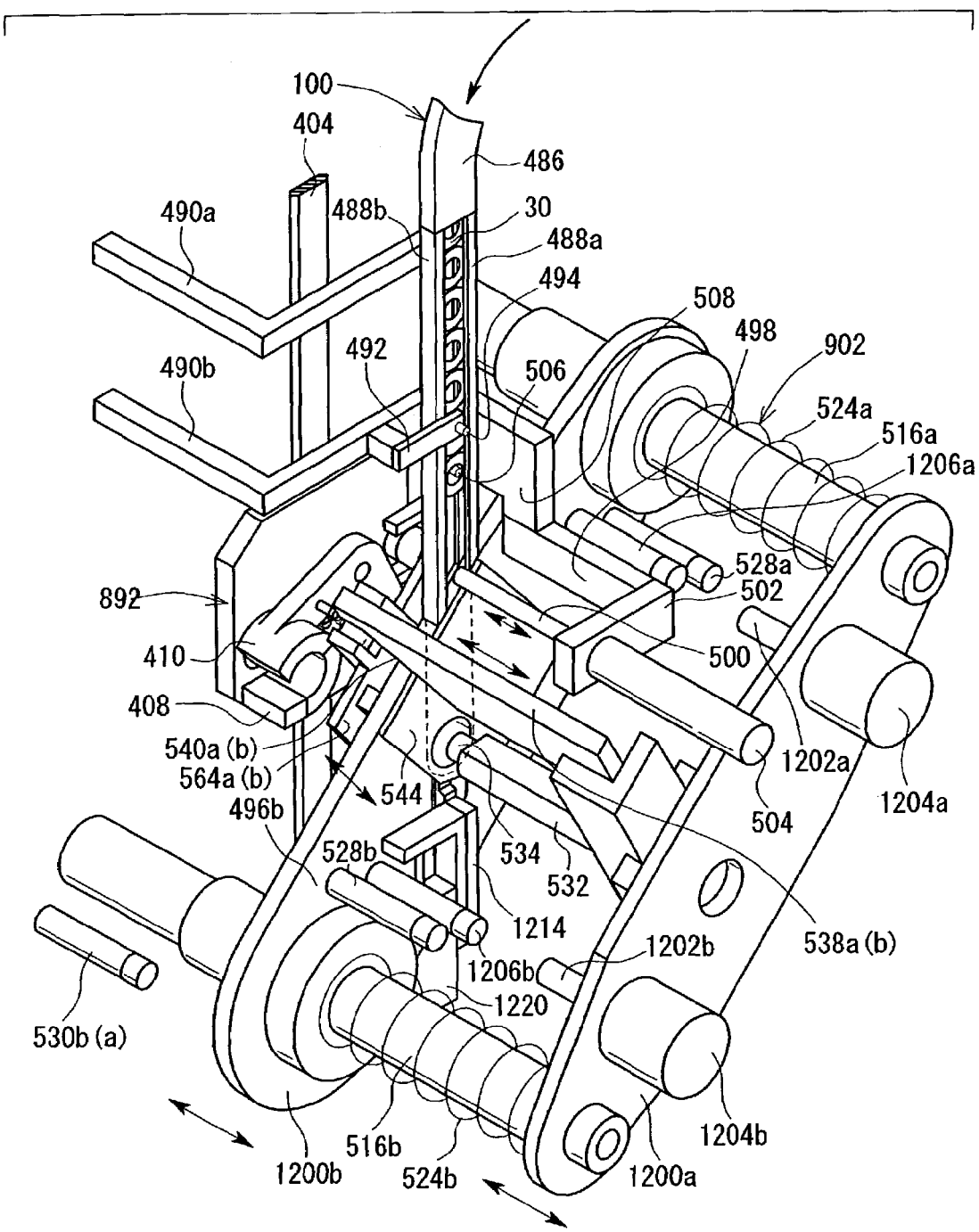
FIG. 85 is a perspective view of a cap supply mechanism and a mounting mechanism according to the second embodiment.

As shown in FIGS. 83 and 84, the transfer mechanism 895 receives a wound-film assembly 24 with a fixed-length film 20 wound therein from the winding mechanism 888 and transfers the wound-film assembly 24 to the delivery mechanism 894.

The transfer mechanism 895 includes an elongate actuator 1082 having a movable plate 1080. The actuator 1082 is arranged to move the movable plate 1080 with a servomotor having a position detecting mechanism (encoder or the like) for the detecting the position of the movable plate 1080. The cylinder 465 for opening and closing the two pairs of clamps 464a through 464d for gripping the flanges 22a, 22b of a spool 22 is fixed to the movable plate 1080. The actuator 1082 is supported on the partition wall 130 by brackets 1084a, 1084b.

The clamps 464a through 464d, 466a, 466b for clamping a wound-film assembly 24 are moved to a forward stroke end (left end in FIG. 83) near the winding mechanism 888 by the actuator 1082, where they receive a wound-film assembly 24. Then, the clamps 464a through 464d, 466a, 466b are retracted by the actuator 1082, transfers the wound-film assembly 24 to a loading mechanism 96, which is identical to the loading mechanism 96 according to the first embodiment, at a position (shown in FIG. 84) where the loading mechanism 96 is located, and then releases the wound-film assembly 24. The wound-film assembly 24 is then inserted into a one-open-sided cartridge 28 held by a pallet 892 by the loading mechanism 96. The one-open-sided cartridge 28 with the wound-film assembly 24 inserted therein is delivered to the mounting mechanism 902 while being held by the pallet 892.

Since the transfer mechanism 895 has the actuator 1082 comprising the servomotor, the transfer mechanism 895 can transfer the wound-film assembly 24 at a high speed and position and stop the movable plate 1080 at any desired position.

FIGS. 85 through 88 show structural details of the mounting mechanism 902.

The mounting mechanism 902 has two support plates 1200a, 1200b. The presser 532 is mounted centrally on the support plate 1200a, which supports cylinders 1204a, 1204b capable of moving respective rods 1202a, 1202b toward and away from the support plate 1200b. Stops 528a, 258b and 1206a, 1206b for limiting the displacement of the support plate 1200a with respect to the support plate 1200b are disposed on the support plate 1200b. The stops 528a, 258b limit the displacement by directly engaging the support plate 1200a, and the stops 1206a, 1206b limit the displacement by engaging the distal ends of the rods 1202a, 1202b of the cylinders 1204a, 1204b.

Figure 86:
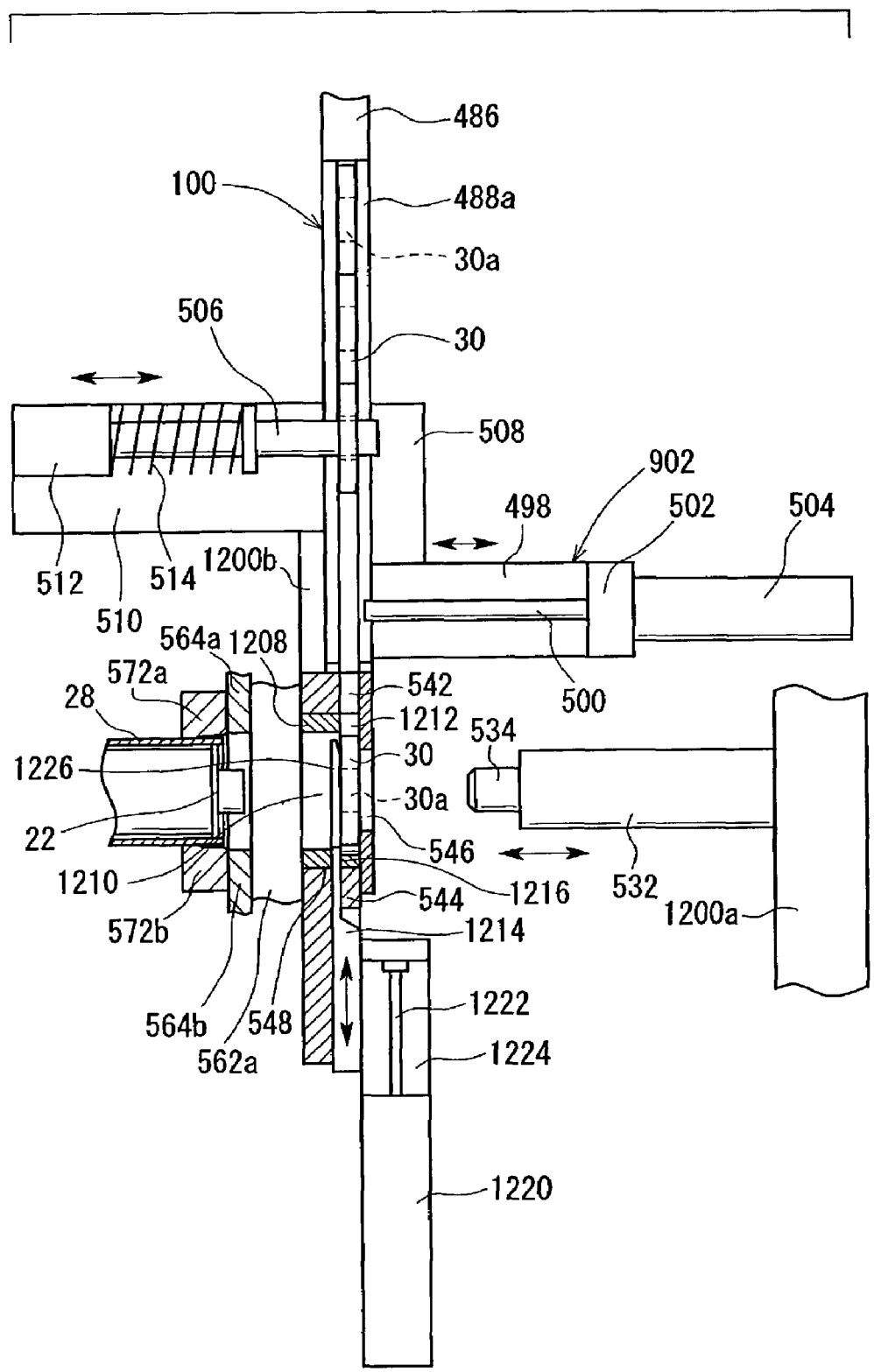
FIG. 86 is a fragmentary elevational view, partly in cross section, of the cap supply mechanism and the mounting mechanism according to the second embodiment.
Figure 87:
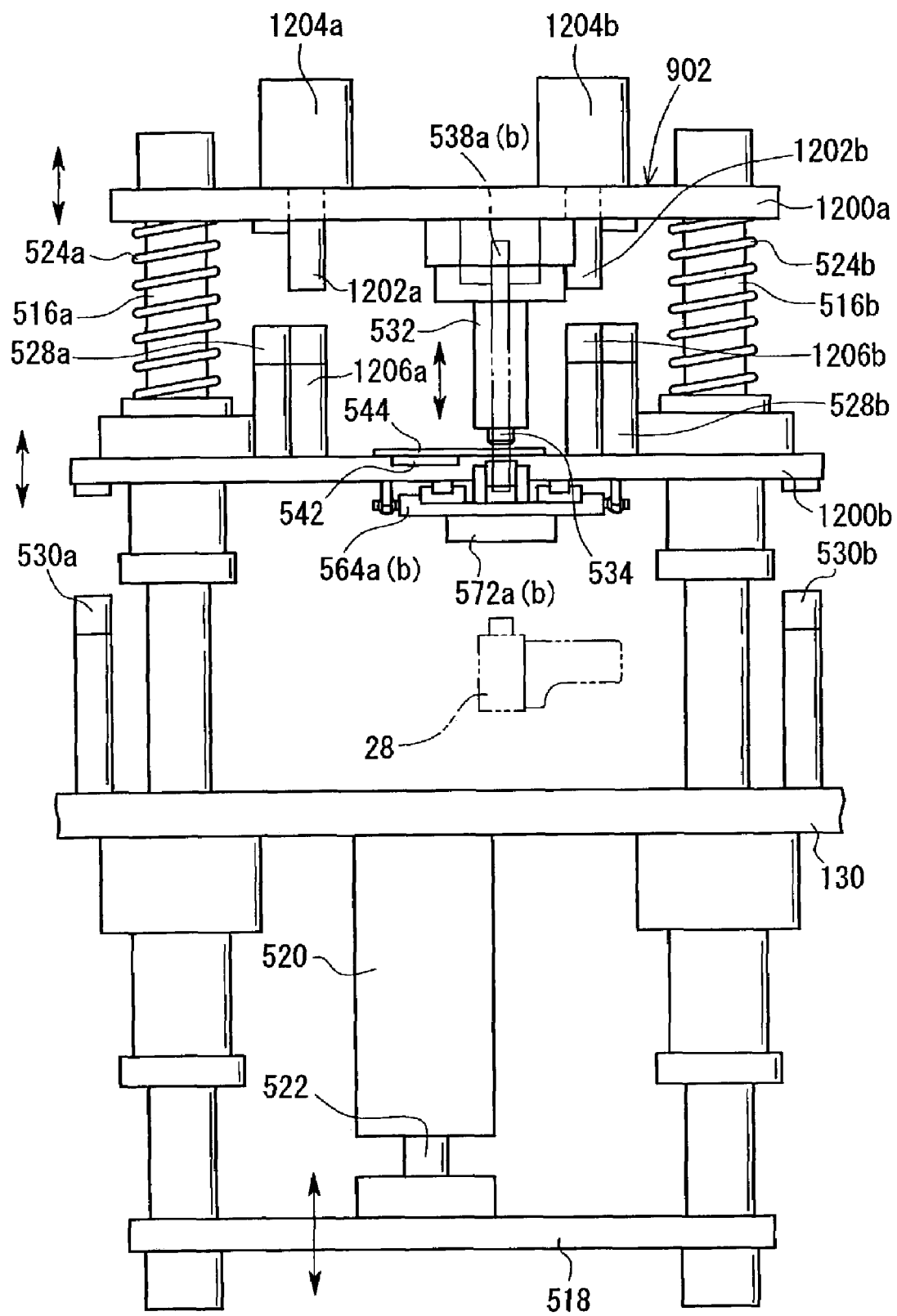
FIG. 87 is a plan view of the mounting mechanism according to the second embodiment.

As shown in FIG. 86 the support plate 1200b to which caps 30 are supplied has the hole 546 defined therein which is held in communication with the slot 542 as the passage of caps 30. A cap holder 1208 corresponding to the cap holder 550 (see FIG. 25) according to the first embodiment is mounted in the slot 542.

Figure 88:
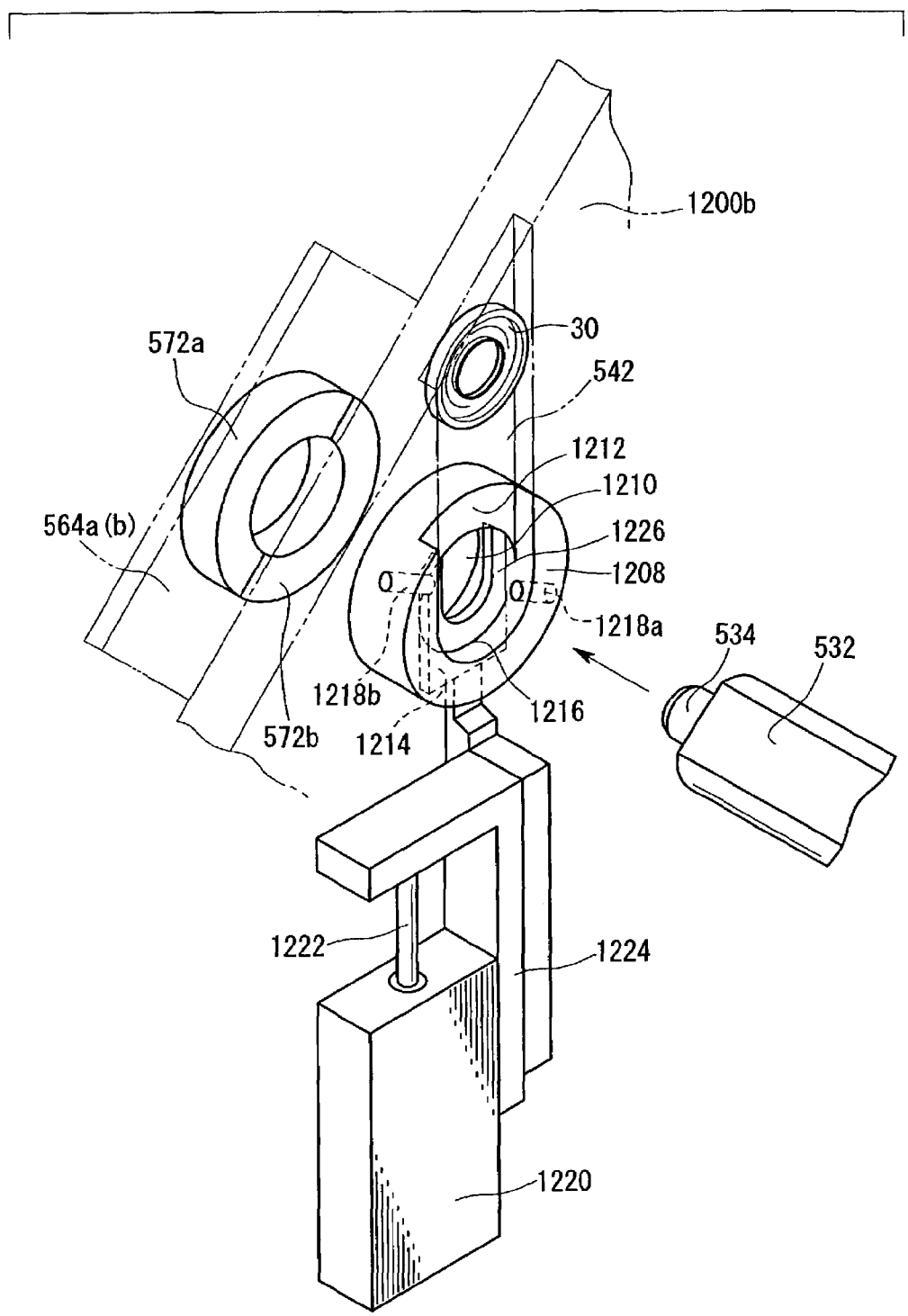
FIG. 88 is a fragmentary perspective view of the mounting mechanism according to the second embodiment.

As shown in FIG. 88, the cap holder 1208 has a hole 1210 defined centrally therein for insertion of a cap 30 therein. The cap holder 1208 also has a slot 1212 defined in an upper portion thereof which is held in communication with the slot 542 defined in the support plate 1200b for introducing a cap 30 therein, and a slit 1216 defined in a lower portion thereof for insertion of a cap support 1214 therein. The cap holder 1208 also has holes 1218a, 1218b receiving therein ends of a sensor for detecting whether there is a cap 30 in the cap holder 1208 or not. For example, optical fibers connected respectively to a light-emitting unit and a light-detecting unit of the sensor may be inserted into the holes 1218a, 1218b.

A cylinder 1220 is mounted on the support plate 1200b and has a rod 1222 coupled to the cap support 1214 by a bracket 1224. The cap support 1214 has a U-shaped holder 1226 to be inserted into the slit 1216 in the cap holder 1208.

Before the mounting mechanism 902 is supplied with caps 30, the holder 1226 is inserted into the slit 1216 by the cylinder 1220, and the rods 1202a, 1202b of the cylinders 1204a, 1204b mounted on the support plate 1200a project a given distance toward the support plate 1200b.

When a cap 30 is supplied from the cap supply mechanism 100, the cap 30 is introduced from the slot 542 in the support plate 1200b into the cap holder 1208, and held between the plate 544 mounted on the support plate 1200b and the holder 1226 of the cap support 1214 (see FIG. 86).

Then, the cylinder 520 is actuated to cause the rods 516a, 516b to displace the support plates 1200a, 1200b toward the partition wall 130. When the support plate 1200b is brought into abutment against the stops 530a, 530b and stops its displacement, only the support plate 1200a continues to be displaced. When the rods 1202a, 1202b of the cylinders 1204a, 1204b mounted on the support plate 1200a abut against the respective stops 1206a, 1206b, the support plate 1200a stops its displacement. At this time, the pin 534 of the presser 532 mounted on the support plate 1200a is inserted through the hole 546 defined in the plate 544 into the hole 30a in the cap 30, thus positioning and holding the cap 30.

When the cap 30 is positioned, the cylinder 1220 is actuated to lower the cap support 1214 away from the cap holder 1208.

Then, the cylinders 1204a, 1204b are actuated to retract the rods 1202a, 1202b toward the support plate 1200a, which is further displaced toward the support plate 1200b by the cylinder 520. Therefore, the cap 30 held by the pin 534 of the presser 532 is displaced from the cap holder 1208 toward the guide blocks 572a, 572b and mounted on the end of the one-open-sided cartridge 28.

Thereafter, the one-open-sided cartridge 28 including the would-film assembly 24 with the cap 30 temporarily mounted on its end, i.e., the wound-film-loaded cartridge 12, is delivered while being held on the pallet 892, processed by a crimping mechanism 104 and an inspecting mechanism 106, which are identical to those according to the first embodiment, and delivered to the removing mechanism 108, which removes the wound-film-loaded cartridge 12 from the pallet 892.

Figure 89:
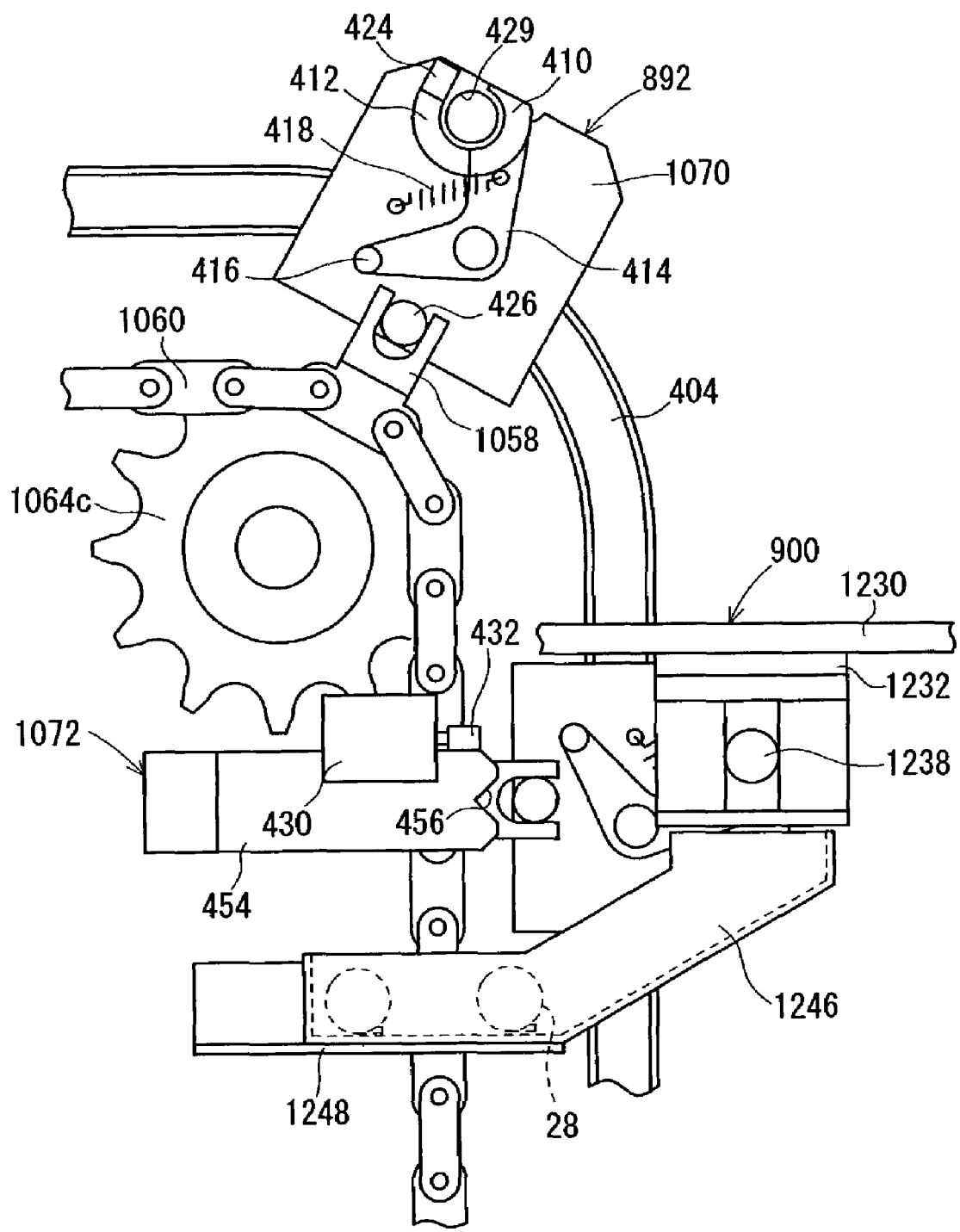
FIG. 89 is a side elevational view of a discharge mechanism according to the second embodiment.
Figure 90:
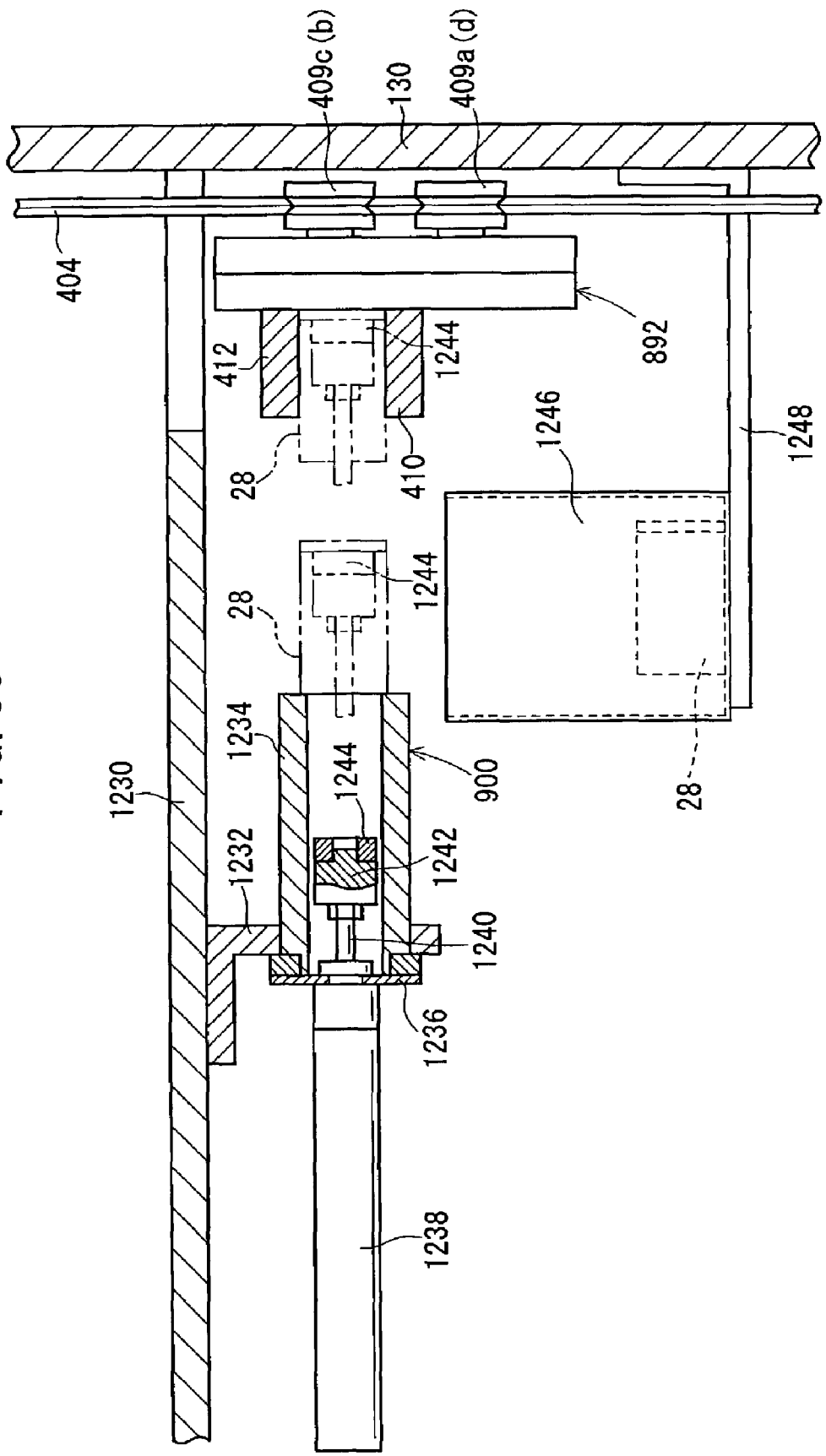
FIG. 90 is a cross-sectional view of the discharge mechanism according to the second embodiment.

The pallet 892 from which the wound-film-loaded cartridge 12 has been removed is circulated through the discharge mechanism 900 to the cartridge supply mechanism 90. FIGS. 89 and 90 show structural details of the discharge mechanism 900 which discharges any unwanted one-open-sided cartridge 28, etc. remaining on the pallet 892.

The discharge mechanism 900 has a cylindrical sleeve 1234 mounted on a bracket 1230 fixed to the partition wall 130 by a connector 1232. A cylinder 1238 is mounted on an end of the sleeve 1234 by a joint 1236. The cylinder 1238 has a rod 1240 supporting a magnet 1244 with a block 1242. The block 1242 and the magnet 1244 can move toward and away from the distal end of the sleeve 1234. A waste tray 1246 is disposed in the vicinity of the distal end of the sleeve 1234. The waste tray 1246 is mounted on a bracket 1248 fixed to the partition wall 130.

The discharge mechanism 900 operates as follows: After a pallet 892 delivered through the removing mechanism 108 is positioned, the cylinder 430 is actuated to space the movable holder 410 from the fixed holder 412 by a given distance (see FIG. 58). Then, the cylinder 1238 is actuated to move the block 1242 and the magnet 1244 on the distal end of the rod 1240 out of the sleeve 1234 toward the pallet 892, and insert the block 1242 and the magnet 1244 into a position between the movable holder 410 and the fixed holder 412. If any unwanted one-open-sided cartridge 28 remains on the pallet 892, the magnet 1244 attracts the one-open-sided cartridge 28 and removes it from the pallet 892. The magnet 1244 which has attracted the one-open-sided cartridge 28 is retracted toward the sleeve 1234 by the cylinder 1238. The one-open-sided cartridge 28 attracted by the magnet 1244 abuts against the end of the sleeve 1234. When the magnet 1244 is further retracted, the attracted one-open-sided cartridge 28 is released from the magnet 1244, and falls into the waste tray 1246 disposed below the sleeve 1234. After the unwanted one-open-sided cartridge 28 or the like remaining on the pallet 892 is discharged, the empty pallet 892 is delivered again to the cartridge supply mechanism 90.

The wound-film-loaded cartridge 12 removed by the removing mechanism 108 is checked to see if its height falls in a predetermined range or not in the same manner as with the first embodiment, and then supplied to the wound-film-loaded cartridge unloader 860.

Figure 91:
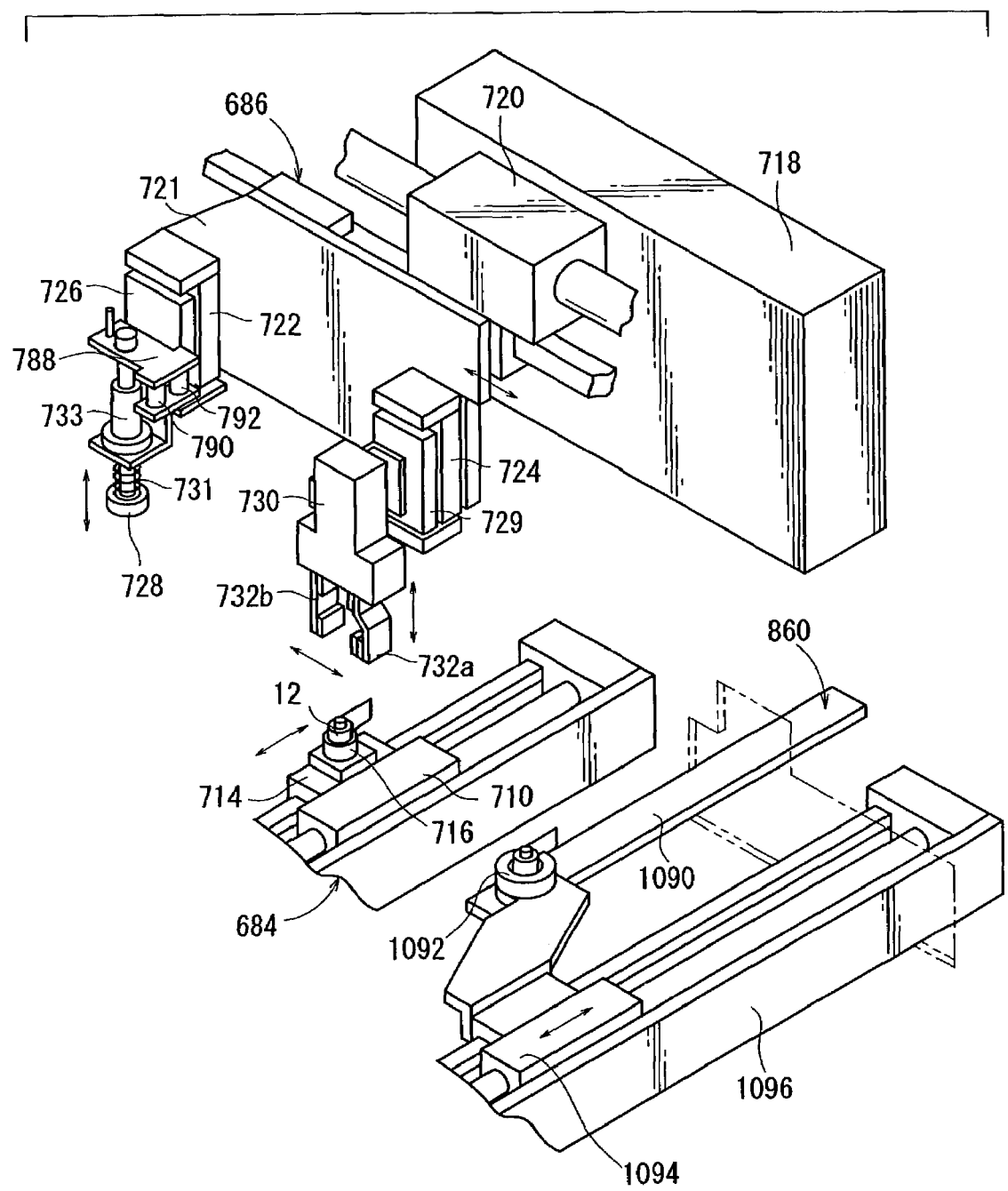
FIG. 91 is a perspective view of a first transfer device, a second transfer device, and a wound-film-loaded cartridge unloader in a removing mechanism according to the second embodiment.

As shown in FIG. 91, the wound-film-loaded cartridge unloader 860 has, instead of the feeder conveyor 734 according to the first embodiment, an elongate unloading plate 1090 for supporting a wound-film-loaded cartridge 12 placed thereon by the clamps 732a, 732b, a guide 1092 for holding the wound-film-loaded cartridge 12 placed on the unloading plate 1090 and guiding the wound-film-loaded cartridge 12 in a feeding direction, a movable block 1094 to which the guide 1092 is fixed, and a cylinder 1096 for moving the movable block 1094.

The wound-film-loaded cartridge unloader 860 operates as follows: A wound-film-loaded cartridge 12 placed on the unloading plate 1090 is delivered toward the packaged product assembling unit 808 by the guide 1092 which is moved by the cylinder 1096. Since the wound-film-loaded cartridge 12 is positioned by the guide 1092 on an end of the unloading plate 1090 near the packaged product assembling unit 808, the wound-film-loaded cartridge 12 can reliably and easily be transferred to the packaged product assembling unit 808.

The case supply unit 816 and the packaged product assembling unit 808 will be described in detail below.

Figure 92:
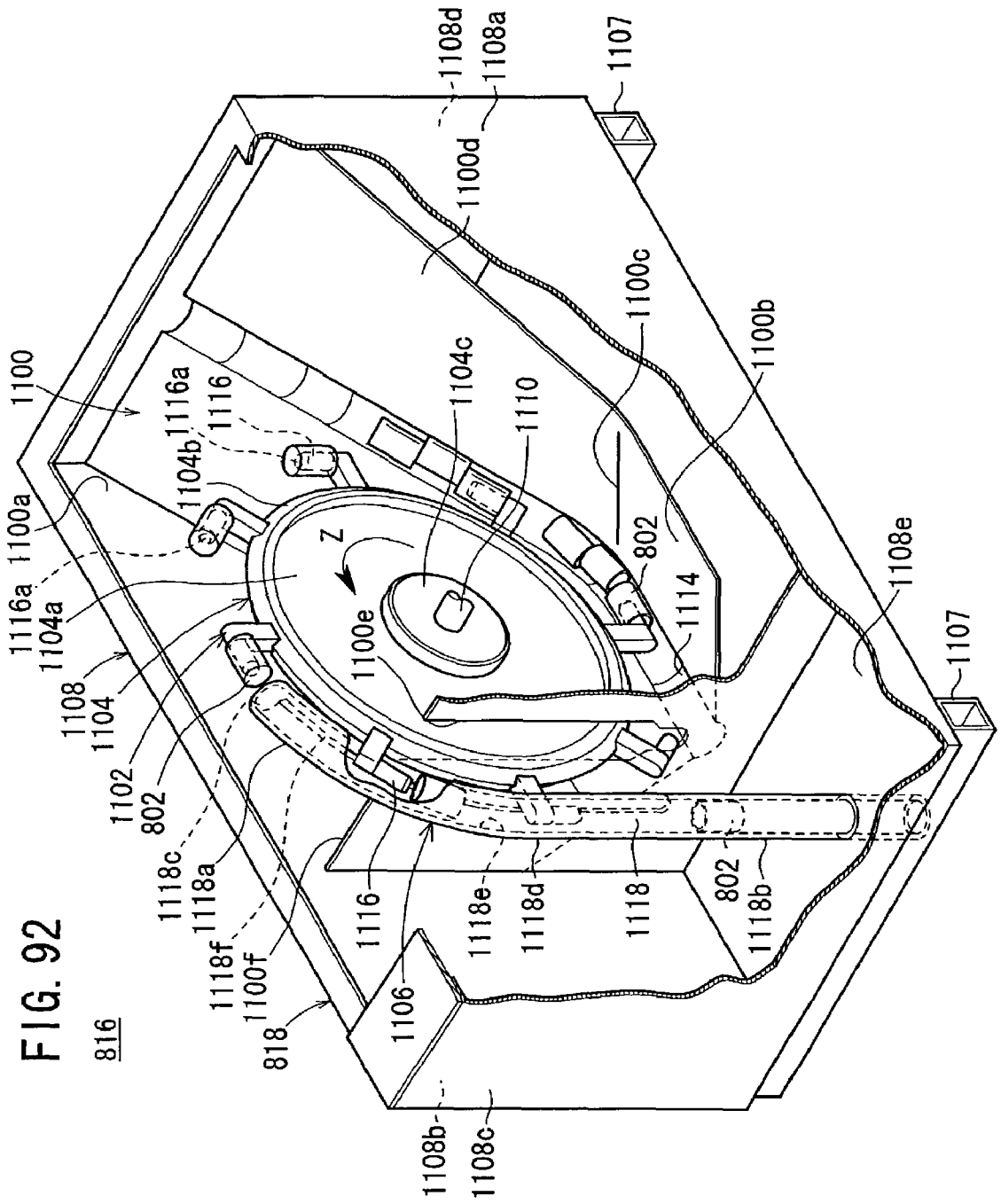
FIG. 92 is a perspective view, partly cut away, of a case supply unit according to the second embodiment.

FIG. 92 shows structural details of the case supply unit 816. The case supply unit 816 comprises the case feeder 818 for storing cases 802 and supplying cases 802 with their openings 802a oriented in a given direction to the packaged product assembling unit 808.

The case feeder 818 comprises a cup-shaped hopper 1100 for being charged with and storing a plurality of cases 802, a plurality of arms 1102 for picking up cases 802, a rotor 1104 on which the arms 1102 are mounted at equal intervals, a feed passage 1106 for feeding cases 802 picked up from the hopper 1100 to the packaged product assembling unit 808, and an open-box-shaped casing 1108 including support frames 1107 and supporting the case feeder 818.

The case feeder 818 also has an actuating mechanism 1109 for rotating the rotor 1104, the actuating mechanism 1109 including a rotary actuator such as a motor or the like and a clutch for limiting the drive torque from the motor, and a cover 1112 covering the rotor 1104 from above and mounted on the casing 1108, the cover 1112 being made of transparent synthetic resin sheet, for example (see FIGS. 61 and 62). The cover 1112 is omitted from illustration in FIG. 92.

The hopper 1100 comprises side walls 1100a, which serve as part of the casing 1108, a bottom panel 1100b inclined downwardly substantially perpendicularly to the direction (indicated by the arrow Z in FIG. 92) in which the rotor 1104 rotates, a slanted panel 1100d joined to the bottom panel 1100b through a curved portion 1100c and extending obliquely upwardly, and an end wall 1100f disposed in confronting relation to the slanted panel 1100d and having a recess 1100e through which the rotor 1104 passes. The hopper 1100 also has a groove 1114 of arcuate cross section extending along the direction in which the rotor 1104 rotates, from the bottom panel 1100b through the curved portion 1100c to the slanted panel 1100d. Cases 802 charged into the hopper 1100 are arranged in an array in the groove 1114.

The rotor 1104 comprises a circular barrel 1104a having an outer circumferential edge 1104b extending therearound, and a hub 1104c fixed to a rotatable shaft 1110 and joined to the barrel 1104a at its center.

The outer circumferential edge 1104b is tapered off radially outwardly of the rotor 1104 for preventing cases 802 from being oriented transversely or longitudinally away from a desired direction on the rotor 1104 thereby to prevent the case feeder 818 from stopping its operation due to clogging of cases 802.

The hub 1104c has a key slot fitted over a key (not shown) on the rotatable shaft 1110 for thereby reliably transmitting the rotational drive power from the rotatable shaft 1110 to the hub 1104c.

The arms 1102 are mounted at equal spaced intervals on the outer circumferential edge 1104b of the rotor 1104. The arms 1102 have respective pins 1116 movable in a circular pattern along the groove 1114 from the bottom panel 1100b across the curved portion 1100c to the slanted panel 1100d. Each of the pins 1116 is in the form of a cylindrical rod having a beveled tip end 1116a. The pins 1116 are oriented such that the tip ends 1116a project in the direction in which the rotor 1104 rotates. Stated otherwise, the pins 1116 extend tangentially to the rotor 1104.

The arcuate cross section of the groove 1114 has a diameter greater than the outside diameter of cases 802. The groove 1114 thus dimensioned allows cases 802 to be arrayed easily in the groove 1114 and also allows the cases 802 which have been placed in the groove 1114, including those positioned in an incomplete attitude, to be picked up with a high probability.

The pins 1116 are spaced from the outer circumferential edge 1104b of the rotor 1104 by a distance greater than the outside diameter of cases 802. Therefore, cases 802 are prevented from being caught transversely between the pins 1116 and the outer circumferential edge 1104b, with the result that the case feeder 818 is prevented from stopping its operation due to clogging of cases 802. In the second embodiment, there are shown eight arms 1102 mounted on the outer circumferential edge 1104b. However, the number of arms 1102 mounted on the outer circumferential edge 1104b can be changed as desired.

The feed passage 1106 comprises a cylindrical feed pipe 1118 having an upper portion 1118a curved arcuately substantially along the direction in which the rotor 1104 rotates, and a lower portion 1118b extending linearly downwardly through a bottom wall 1108e of the casing 1108. The feed pipe 1118 is fixed to the casing 1108 by a plurality of brackets (not shown).

Figure 93:
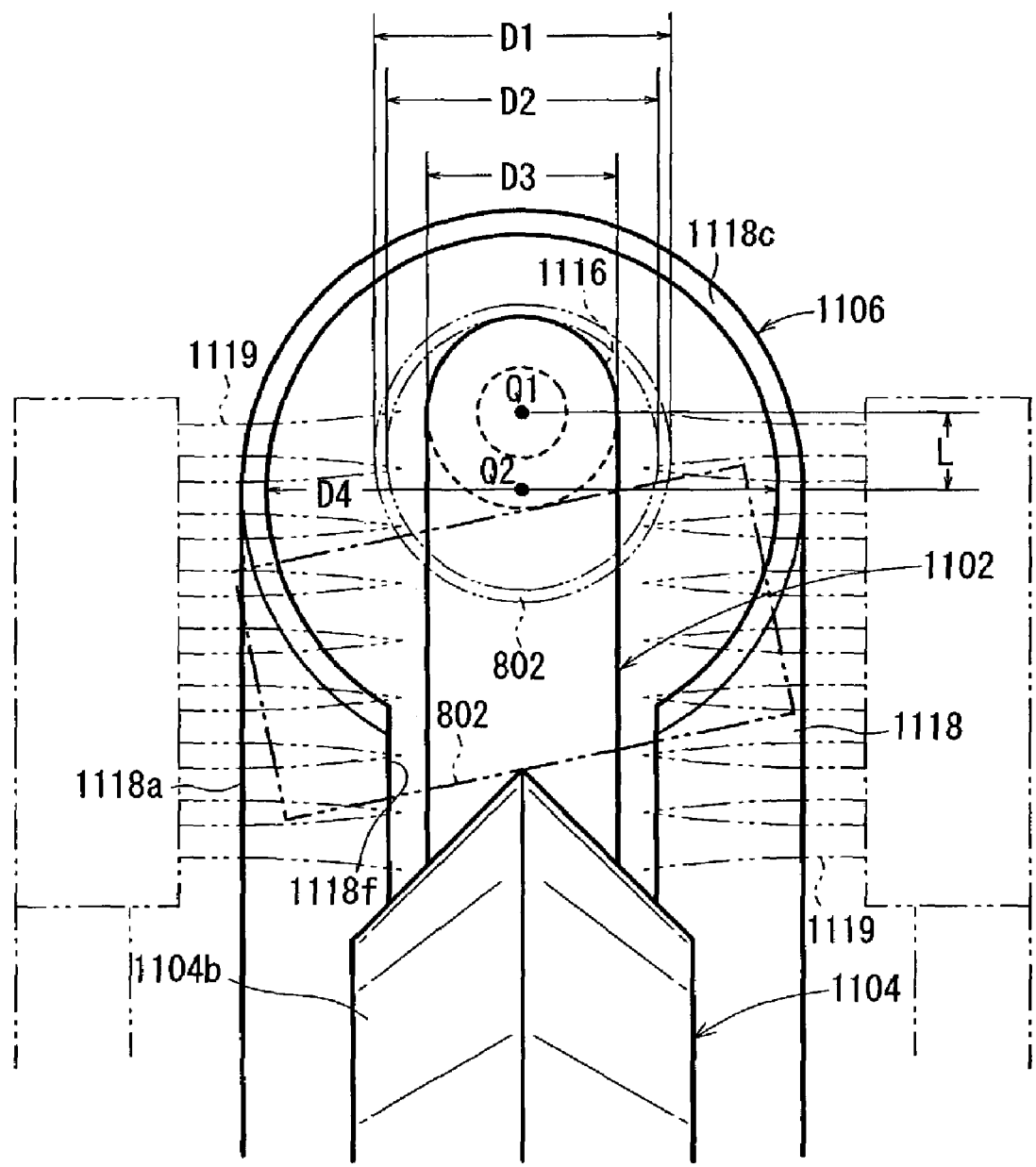
FIG. 93 is a fragmentary enlarged view of the case supply unit according to the second embodiment.

As shown in FIG. 93, the feed pipe 1118 has an inside diameter d4 set to such a value that cases 802 and arms 1102 will not contact with an inner surface 1118e of the feed pipe 1118, will not be clogged in the feed pipe 1118, and will not be inverted in the feed pipe 1118.

In the vicinity of an open end 1118c of the feed pipe 1118 in its upper portion 1118a, i.e., in a position where an arm 1102 on the rotor 1104 is directed substantially upwardly, since the case 802 supported on the pin 1116 is displaced downwardly by gravity, the center Q1 of the pin 1116 on its transverse cross section is offset upwardly from the center Q2 of the feed pipe 1118 on its transverse cross section by a distance L. The offset distance L is selected in view of the relationship between the outside and inside diameters D1, D2 of the case 802, the outside diameter D3 of the pin 1116, and the inside diameter D4 of the feed pipe 1118. For example, the offset distance L is set to about 5 [mm] in the second embodiment.

In the vicinity of an intermediate portion 1118d of the feed pipe 1118 between the upper portion 1118a and the lower portion 1118b thereof, i.e., in a position where an arm 1102 on the rotor 1104 is directed substantially horizontally, the centers Q1, A2 are aligned with each other on the transverse cross section. Therefore, while the upper portion 1118a of the feed pipe 1118 extends substantially along the direction in which the rotor 1104 rotates, i.e., along the path of movement of the arms 1102, it is curved into a composite arcuate shape in that the offset distance L is progressively reduced from the open end 1118c to the intermediate portion 1118d of the feed pipe 1118.

The feed pipe 1118 has a slit 1118f defined therein longitudinally therealong to allow the arms 1102 on the rotor 1104 to pass in the feed pipe 1118 through the slit 1118f. The slit 1118f is wider than the arms 1102 and narrower than the outside diameter D1 of the cases 802.

In this manner, when the arms 1102 together with the cases 802 pass in the feed pipe 1118, the cases 802 and the arms 1102 do not contact with the inner surface 1118e of the feed pipe 1118.

As shown by two-dot chain lines in FIG. 93, a prevention mechanism such as a brush 1119 may be disposed in front of the open end 1118c of the feed pipe 1118. Even if the case 802 is misplaced and oriented transversely or obliquely between the pin 1116 of the arm 1102 and the outer circumferential edge 1104b of the rotor 1104, the brush 1119 can reliably remove the misplaced case 802.

The casing 1108 comprises a pair of side walls 1108a, 1108b, a pair of end walls 1108c, 1108d, and a bottom wall 1108e, and is in the form of an open box. The casing 1108 includes the support frames 1107 by which the case feeder 818 is placed on top of the packaged product assembling unit 808. In the second embodiment, the end wall 1108d of the casing 1108 faces the front side (the door 52e) of the housing 39 of the film manufacturing apparatus 810.

The case supply unit 816 operates as follows: Cases 802 stored in the hopper 1100 of the case feeder 818 are stirred by the rotating rotor 1104 and progressively moved as an array into the groove 1114 of the hopper 1100. Of the cases 802 placed in the groove 1114, only those cases 802 whose openings 802a are oriented toward the pin 1116 of the arms 1102 are picked up by the pins 1116. Therefore, the cases 802 which are oriented in one direction are always fed into the feed passage 1106.

A case 802 fed into the feed passage 1106 is inserted together with the arm 1102 into the feed pipe 1118 from the open end 1118c thereof. As the arm 1102 is turned with the rotor 1104, the opening 802a of the case 802 is oriented progressively upwardly. Until the case 802 reaches the intermediate portion 1118d between the upper portion 1118a and the lower portion 1118b of the feed pipe 1118, the case 802 is released from the pin 1116 of the arm 1102 and then drops freely through the lower portion 1118b. The case 802 with its opening 802a reliably oriented in one direction is supplied to the packaged product assembling unit 808 disposed below the case feeder 818.

Figure 94:
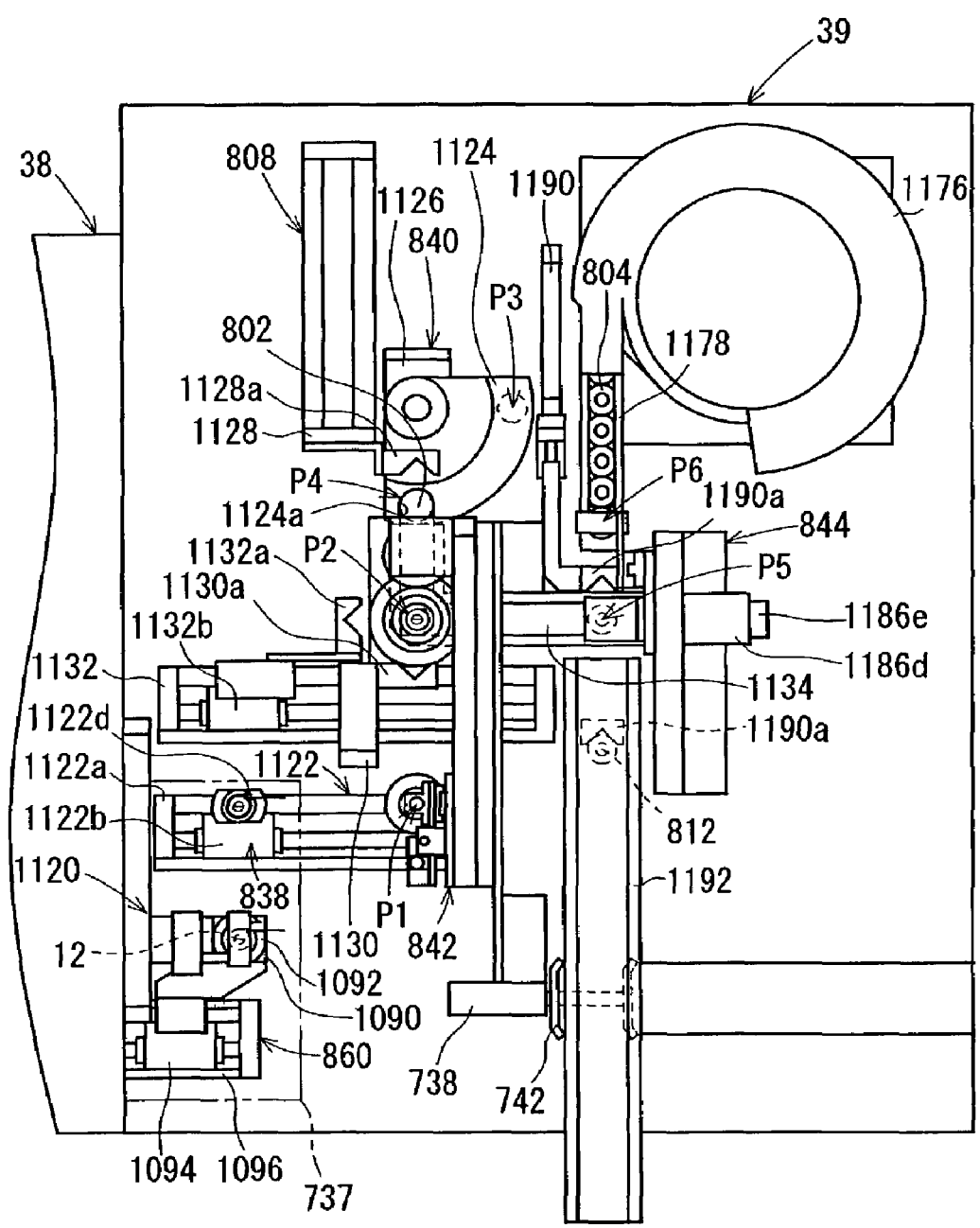
FIG. 94 is a plan view of a packaged product assembling unit according to the second embodiment.
Figure 95:
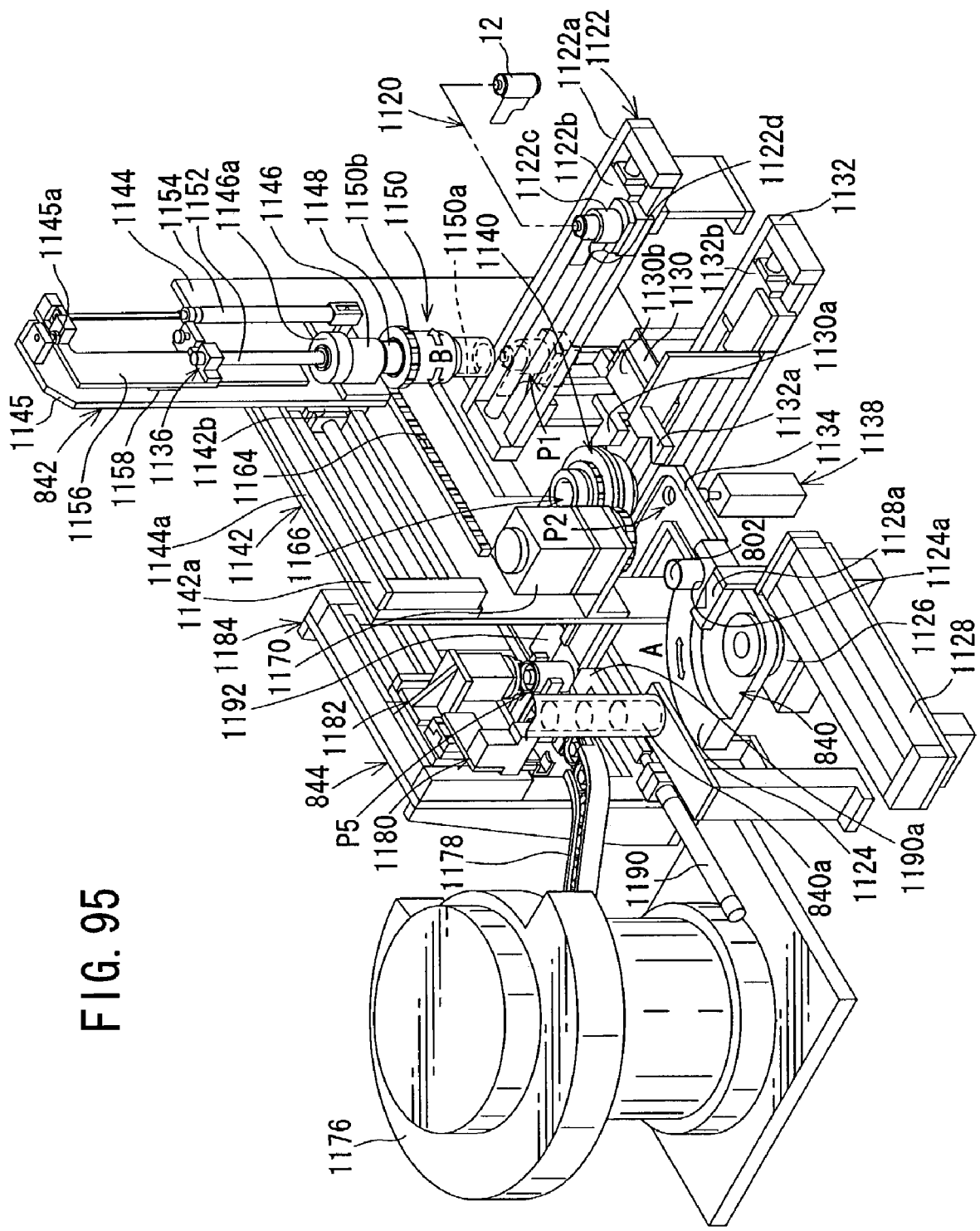
FIG. 95 is a perspective view of the packaged product assembling unit according to the second embodiment.

FIGS. 94 and 95 show structural details of the packaged product assembling unit 808. The packaged product assembling unit 808 has the cartridge delivery mechanism 838 for transferring a would-film-loaded cartridge 12 delivered by the unloading plate 1090 while being guided by the guide 1092 of the wound-film-loaded cartridge unloader 860 and delivering the would-film-loaded cartridge 12 to a cartridge removing position P1, the case delivery mechanism 840 for supplying a case 802 to be loaded with a would-film-loaded cartridge 12 to a loading position P2 and delivering a case cap 804 to a cap mounting position P5, the cartridge loading mechanism 842 for holding and transferring a would-film-loaded cartridge 12 to the loading position P2, winding the trailing end 20b of the fixed-length film 20 projecting from the would-film-loaded cartridge 12 around the would-film-loaded cartridge 12, and inserting the would-film-loaded cartridge 12 into the case 802, and the case cap mounting mechanism 844 for mounting a case cap 804 on an opening 802a in a case 802 loaded with a would-film-loaded cartridge 12 thereby to produce a packaged product 812.

The cartridge delivery mechanism 838 has a cartridge transfer device 1120 for transferring a would-film-loaded cartridge 12 delivered by the unloading plate 1090, and a cartridge delivery device 1122 for delivering a would-film-loaded cartridge 12 to the cartridge loading mechanism 842, the cartridge delivery device 1122 having a receiver 1122c for placing thereon a would-film-loaded cartridge 12 transferred from the cartridge transfer device 1120.

The cartridge transfer device 1120 has a plurality of cylinders reciprocally movable horizontally and a plurality of cylinders reciprocally movable vertically for picking up a would-film-loaded cartridge 12 and transferring the would-film-loaded cartridge 12 to the cartridge transfer device 1120, movable plates and blocks reciprocally movable vertically and reciprocally movable horizontally by those cylinders, and a pair of clamps for gripping a would-film-loaded cartridge 12.

The cartridge delivery device 1122 comprises a cylinder 1122a reciprocally movable between a position below the stroke end of the cartridge transfer device 1120 and the cartridge removing position P1, a movable block 1122b reciprocally movable by the cylinder 1122a, and a receiver 1122c disposed on the movable block 1122b. The receiver 1122c has a slit 1122d defined therein for holding a would-film-loaded cartridge 12 with the trailing end 20b of the fixed-length film 20 being oriented in a predetermined direction (see FIG. 95).

The case delivery mechanism 840 comprises a turntable 1124 for placing a case 802 supplied through a feed passage 840a connected to the feed passage 1106 of the case feeder 818 in a case supply position P3 and delivering the case 802 to a case unloading position P4, a rotary actuator 1126 for reciprocally moving the turntable 1124 along an arcuate path in the direction indicated by the arrow A in FIG. 95, a cylinder 1128 having a pusher 1128a for unloading a case 802 from the case unloading position P4 to the loading position P2, a receiver 1130a disposed in confronting relation to the pusher 1128a for receiving an unloaded case 802 in the loading position P2, and a cylinder 1130 having a movable plate 1130b on which the receiver 1130a is mounted.

The turntable 1124 has a recess 1124a defined therein which is open radially outwardly for receiving therein a case 802 in a vertical orientation. An extracting mechanism (not shown) for intermittently extracting cases 802 at given timings is disposed at the lower end of the feed passage 840a.

The case delivery mechanism 840 also has a cylinder 1132 reciprocally movable between the loading position P2 and the cap mounting position P5, a movable block 1132b reciprocally movable by the cylinder 1132 and supporting a pusher 1132a coupled thereto for delivering a case 802 to the cap mounting position P5, and a case delivery path 1134 having a concave cross section for guiding a case 802 in a vertical attitude from the case unloading position P4 to the cap mounting position P5.

The cartridge loading mechanism 842 comprises a cartridge holder 1136 for picking up a would-film-loaded cartridge 12 from the cartridge removing position P1, transferring the would-film-loaded cartridge 12 to the loading position P2, holding the would-film-loaded cartridge 12 nonrotatably, and inserting the would-film-loaded cartridge 12 into a case 802, a case holder 1138 for holding a case 802 in the loading position P2, and a guide 1140 for guiding a would-film-loaded cartridge 12 while winding the projecting trailing end 20b of the fixed-length film 20 when the would-film-loaded cartridge 12 is loaded into a case 802.

The cartridge loading mechanism 842 also has a transfer device 1142 for reciprocally moving the cartridge holder 1136 between the cartridge removing position P1 and the loading position P2. The transfer device 1142 comprises a cylinder 1142a fixed to an upright support 1144 by an auxiliary plate 1144a, and a movable block 1142b reciprocally movable by the cylinder 1142a. The cartridge holder 1136 is fixedly mounted on the movable block 1142b by a plate 1145.

Figure 96:
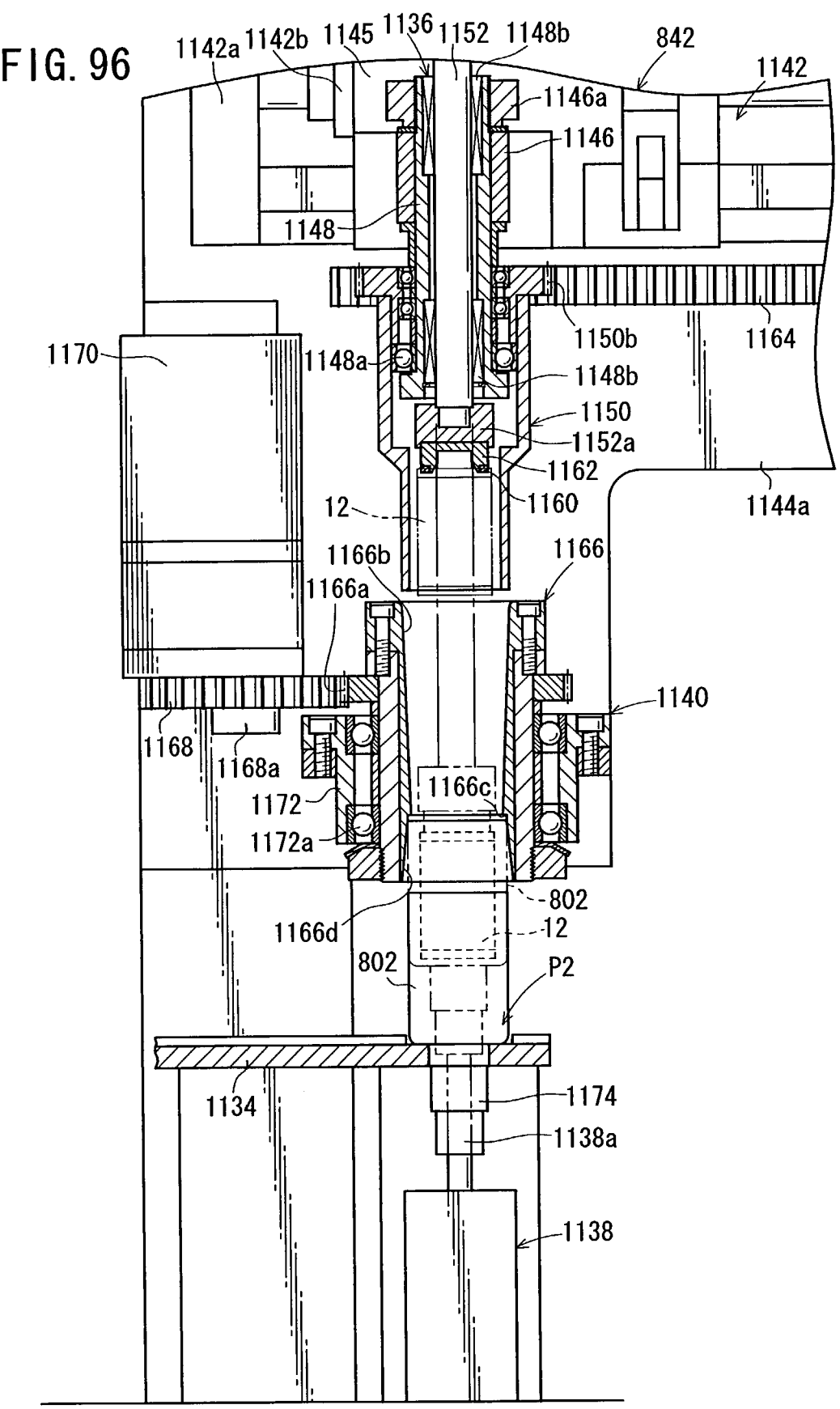
FIG. 96 is a fragmentary vertical cross-sectional view of a cartridge loading mechanism in the packaged product assembling unit according to the second embodiment.

As shown in FIG. 96, the cartridge holder 1136 has a bearing member 1148 supported on a support bracket 1146 by a fastening member 1146a and including a rolling member 1148a such as a bearing or the like, and a tube 1150 rotatably supported by the bearing member 1148 for rotation in the direction indicated by the arrow B in FIG. 95. The tube 1150 has a slit-like opening 1150a defined in a lower end thereof which has a predetermined width in the circumferential direction and extends axially. A gear 1150b extending in the circumferential direction is disposed on the upper end of the tube 1150. The support bracket 1146 is fixed to the plate 1145.

The cartridge holder 1136 has a vertically movable shaft 1152 which is vertically movably housed in the tube 1150. The vertically movable shaft 1152 is vertically movably supported by a pair of bushings 1148b disposed in the bore of the bearing member 1148. The vertically movable shaft 1152 has an upper end fixed to a joint plate 1156 which is connected to a vertically moving cylinder 1154. The joint plate 1156 is vertically moved by the cylinder 1154 while being guided by a linear guide 1158. To a lower end of the vertically movable shaft 1152, there is fixed by a joint 1152a a holder 1162 including a magnet (first magnet) 1160 for picking up a would-film-loaded cartridge 12, which is generally made of a ferromagnetic material, e.g., iron, and holding the would-film-loaded cartridge 12 thus picked up. The cartridge holder 1136 has its vertical movement limited to its upper limit position when a portion thereof near an upper portion of the joint plate 1156 engages a stop 1145a mounted on the plate 1145. The stop 1145a is positionally adjustable.

A rack 1164 is mounted on the auxiliary plate 1144a along the direction in which the cartridge holder 1136 is reciprocally movable. The gear 1150b mounted on the tube 1150 is held in mesh with the rack 1164.

The guide 1140 comprises a guide tube 1166 rotatable to hold and guide the trailing end 20b of the fixed-length film 20 projecting from a would-film-loaded cartridge 12, against the outer circumferential surface of the would-film-loaded cartridge 12 when the would-film-loaded cartridge 12 is loaded into the case 802, and a motor 1170 for rotating the guide tube 1166 though a gear 1168. The gear 1168 has its shaft rotatably coupled to the drive shaft (not shown) of the motor 1170.

As shown in FIG. 96, the guide tube 1166 has a gear 1166a held in mesh with the gear 1168, and is rotatably supported by a bearing member 1172 including a rolling member 1172a such as a bearing or the like. The bearing member 1172 is fixed to the auxiliary plate 1144a. The guide tube 1166 has a tapered inner circumferential surface 1166b for guiding the trailing end 20b of the fixed-length film 20 wound around the would-film-loaded cartridge 12 along the outer circumferential surface of the would-film-loaded cartridge 12. The tapered inner circumferential surface 1166b has a lower end connected to a tapered opening 1166d which is progressively spread beyond a step 1166c toward the lower end of the guide tube 1166.

When a case 802 is lifted by the case holder 1138 and placed in the tapered opening 1166d in the loading position P2, a certain clearance is created between the upper end of the case 802 and the step 1166c. The clearance should preferably be set in a range from 0.5 to 1.5 [mm] and more preferably in a range from 0.5 to 1.0 [mm]. The tapered inner circumferential surface 1166b of the guide tube 1166 is slanted at an angle ranging from 1° to 11°. The diameter of the lower end of the tapered inner circumferential surface 1166b is greater than the inside diameter of the case 802 and smaller than the outside diameter of the case 802.

As shown in FIG. 96, the case holder 1138 has a vertically movable base 1138a for holding a case 802 and vertically moving the case 802 between the case delivery path 1134 and the tapered opening 1166d. The vertically movable base 1138a is vertically movable by an actuator (not shown). A magnet (second magnet) 1174 is mounted on the upper end of the vertically movable base 1138a. The magnet 1174 has stronger magnetism than the magnet 1160.

The case cap mounting mechanism 844 comprises a case cap feeder 1176 in the form of a general parts feeder for arraying case caps 804 in a given direction, a chute 1178 for successively feeding case caps 804 from the case cap feeder 1176 to a cap removing position P6 (see FIG. 94), a cap transfer device 1180 for gripping and picking up a case cap 804 delivered to the cap removing position P6, and transferring the case cap 804 to the opening 802a of a case 802 which is delivered to the cap mounting position P5, a cap presser 1182 for pressing and mounting the case cap 804 on the opening 802a of the case 802, and a reciprocal actuator 1184 for reciprocally moving the cap transfer device 1180 and the cap presser 1182.

The reciprocal actuator 1184 is fixed to an upright support 1185. A case cap hopper (not shown) is disposed behind the case cap feeder 1176 for storing case caps 804 and supplying case caps 804 to the case cap feeder 1176 in timed relation to the supply of case caps 804 from the case cap feeder 1176.

The case cap mounting mechanism 844 also has a case gripper 1186 (see FIG. 97) for receiving a case 802 delivered to the cap mounting position P5 and gripping the case 802 when a case cap 804 is mounted on the case 802. In FIGS. 94 and 95, a cylinder 1190 and a pusher 1190a deliver a packaged product 812 including a case cap 804 mounted in the cap mounting position P5 to an unloading conveyor 1192.

Figure 97:
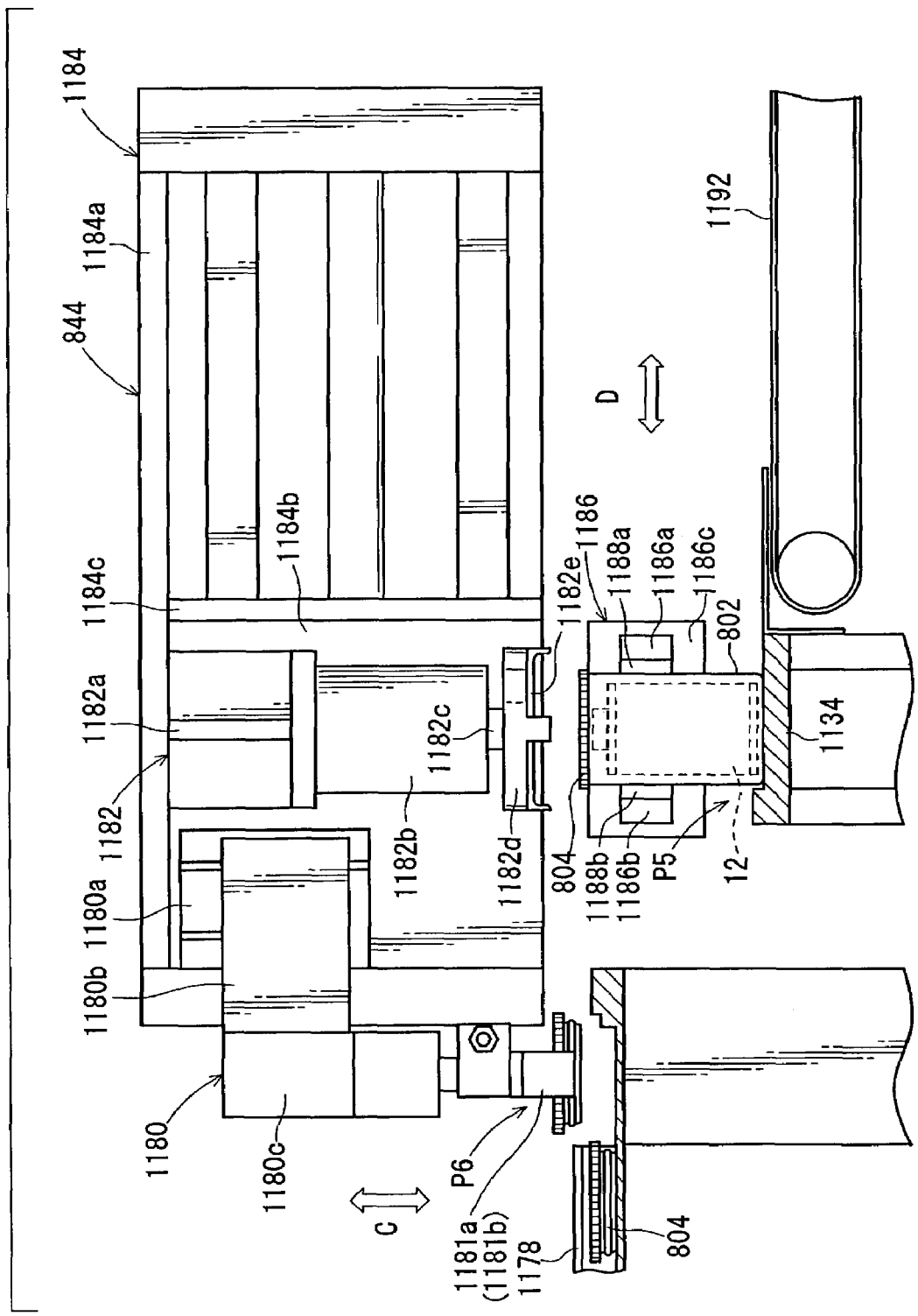
FIG. 97 is a front elevational view, partly in cross section, of a case cap mounting mechanism in the packaged product assembling unit according to the second embodiment.

As shown in FIG. 97, the cap transfer device 1180 comprises a cylinder 1180a fixed to an auxiliary plate 1184b, a movable block 1180b vertically movable in the direction indicated by the arrow C by the cylinder 1180a, a cylinder 1180c fixed to the movable block 1180b, and a pair of clamps 1181a, 1181b openable and closable by the cylinder 1180c. The clamps 1181a, 1181b grip and pick up a case cap 804.

Figure 98:
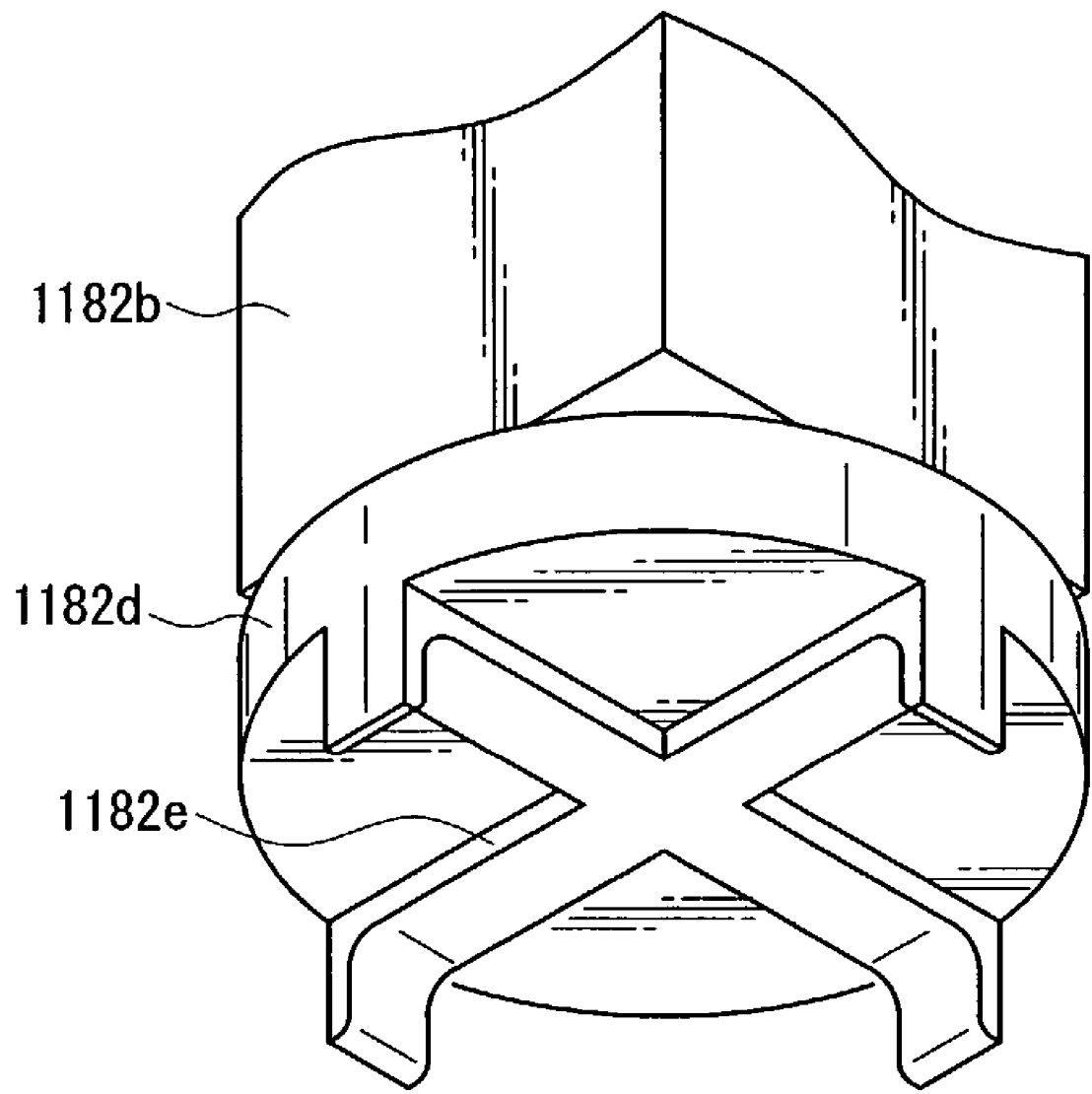
FIG. 98 is a fragmentary perspective view of a portion of the case cap mounting mechanism in the packaged product assembling unit according to the second embodiment.

The cap presser 1182 comprises a cylinder 1182b supported by a bracket 1182a fixed to the auxiliary plate 1184b for producing vertical movement in the direction indicated by the arrow C, and a presser 1182d mounted on the lower end of a rod 1182c of the cylinder 1182b. The presser 1182d has a pressing element 1182e (see FIG. 98) having a substantially criss-cross shape and having a peripheral edge curved and extending axially, the pressing element 1182e facing the upper surface of a case cap 804 placed on the opening 802a of the case 802. The pressing element 1182e causes the presser 1182d to abut partially against the upper surface of a case cap 804 for thereby pressing the case cap 804.

In the second embodiment, the pressing element 1182e has a substantially criss-cross shape. However, the pressing element 1182e is not limited to such a shape, but may be of any shape capable of abutting partially against the upper surface of a case cap 804, e.g., a substantially Y or I shape having a peripheral edge curved and extending axially.

The reciprocal actuator 1184 comprises a cylinder 1184a reciprocally movable between the cap mounting position P5 and the cap removing position P6 in the direction indicated by the arrow D, and a movable block 1184c reciprocally movable by the cylinder 1184a. The cap transfer device 1180 and the cap presser 1182 are fixed to the movable block 1184c by the auxiliary plate 1184b.

The case gripper 1186 has openable and closable chucks 1186a, 1186b for gripping a case 802 by sandwiching the case 802 from its opposite sides. The openable and closable chucks 1186a, 1186b have barrels 1188a, 1188b for receiving the case 802 which is delivered from the cap mounting position P5.

The openable and closable chucks 1186a, 1186b are reciprocally movable between the cap mounting position P5 and a retracted position, to which they are retracted while a case 802 is being loaded, by a cylinder 1186e which reciprocally moves a movable plate 1186d to which a cylinder 1186c is fixed (see FIG. 94).

In the second embodiment, the cylinder 738 and the pusher 742 (see FIG. 35) for rejecting a wound-film-loaded cartridge 12, which is detected as a defective product, are positioned somewhere along the unloading conveyor 1192.

The packaged product assembling unit 808 operates as follows: After a case 802 is supplied from the case feeder 818 to the case supply position P3, the case delivery mechanism 840 delivers the case 802 to the loading position P2. A wound-film-loaded cartridge 12 is transferred by the cartridge transfer device 1120 and the cartridge delivery device 1122 of the cartridge delivery mechanism 838 and the cartridge holder 1136 of the cartridge loading mechanism 842 to the loading position P2, where the wound-film-loaded cartridge 12 is loaded into the delivered case 802.

While the case 802 is being held by the case holder 1138 with the magnet 1174, the wound-film-loaded cartridge 12 is nonrotatably held and moved downwardly by the holder 1162 including the magnet 1160 of the cartridge holder 1136, and the guide tube 1166 for guiding the wound-film-loaded cartridge 12 is rotated clockwise. Since the trailing end 20b of the fixed-length film 20 which is wound around the wound-film-loaded cartridge 12 is reliably held against the outer circumferential surface of the wound-film-loaded cartridge 12 by being guided by the tapered inner circumferential surface 1166b of the guide tube 1166, the wound-film-loaded cartridge 12 can smoothly and reliably be loaded into the case 802 (see FIG. 96).

As the wound-film-loaded cartridge 12 is transferred based on the difference between magnetic forces from the magnets 1160, 1174, it is not necessary to use a source of compressed air, which would otherwise be required to apply a jet of compressed air to transfer the wound-film-loaded cartridge 12, and a source of negative-pressure air, which would otherwise be required to attract the wound-film-loaded cartridge 12. As a result, the film manufacturing apparatus 810 may be reduced in size and may be of a simpler structure.

The case 802 with the wound-film-loaded cartridge 12 housed therein is delivered to the cap mounting position P5 by the case delivery mechanism 840. A case cap 804 is supplied from the case cap feeder 1176 down the chute 1178 to the cap removing position P6. The case cap 804 is then gripped and picked up by the cap transfer device 1180 of the case cap mounting mechanism 844, and transferred to the opening 802a of the case 802 which has been delivered to the cap mounting position P5 (see FIG. 97).

In the cap mounting position P5, the cap presser 1182 of the case cap mounting mechanism 844 operates to cause the presser 1182d to press the case cap 802 placed on the opening 802a of the case 802. Since the presser 1182d has the pressing element 1182e of a substantially criss-cross shape, the presser 1182 is brought into partial abutment against the upper surface of the case cap 804. Therefore, the case cap 804 is mounted on the opening 802a of the case 802 while the case cap 804 is being slightly deformed because the case cap 804 has portions which are held against the pressing element 1182e and portions which are not held against the pressing element 1182e. The case cap 804 can thus be mounted on the case 802 easily and reliably.

As the presser 1182 is brought into partial abutment against the upper surface of the case cap 804, the force required to be applied from the presser 1182 to the case cap 804 may be smaller than if the entire surface of the case cap 804 were pressed. As a result, the case cap 804 and the case 802 are prevented from being damaged.

Then, the case 802 with the wound-film-loaded cartridge 12 housed therein and the case cap 804 mounted thereon is unloaded as a packaged product 812 from the cap loading position P5 onto the unloading conveyor 1192 by the pusher 1190a operated by the cylinder 1190 (see FIG. 94).

Although certain preferred embodiments of the present invention have been shown and described in detail, it should be understood that various changes and modifications may be made therein without departing from the scope of the appended claims.

What is claimed is:

1. An apparatus for manufacturing a film, comprising:
a supply unit for supplying a film strip from a film roll;
a winding unit for cutting the film strip supplied from said film roll into a fixed-length film and winding the fixed-length film around a spool to produce a wound-film assembly;
an assembling unit for introducing the wound-film assembly into a cartridge and mounting a cap on said cartridge to produce a wound-film-loaded cartridge; and
a housing for holding said supply unit, said winding unit, and said assembling unit in a light-shielded manner, said housing being movable,
wherein said winding unit comprises a buffer mechanism for adjusting a rate at which said film strip is supplied, a cutting mechanism for cutting the film strip into said fixed-length film, a spool supply mechanism for supplying said spool, and a winding mechanism for winding said fixed-length film around said spool to produce said wound-film assembly, and
further comprising a spool feeder for supplying said spool from outside said housing, said spool feeder being connected to said spool supply mechanism, and
an air-conditioning facility that air conditions said housing by air supplied and discharged through supply ducts connected to said housing, said air-conditioning facility configured to maintain the inside of said housing at a constant temperature and a constant humidity.

2. An apparatus according to claim 1, wherein said assembling unit comprises a cartridge supply mechanism for supplying said cartridge, a conveyance mechanism for conveying said cartridge and said wound-film-loaded cartridge, a loading mechanism for loading said wound-film assembly into said cartridge, a cap supply mechanism for supplying said cap, a mounting mechanism for mounting said cap on said cartridge, and a removing mechanism for removing said wound-film-loaded cartridge with said cap from said conveyance mechanism.

3. An apparatus according to claim 2, further comprising a pullout resistance inspecting unit disposed downstream of said mounting mechanism for inspecting a pullout resistance of said fixed-length film wound in said wound-film-loaded cartridge.

4. An apparatus according to claim 2, further comprising a length inspecting unit disposed downstream of said mounting mechanism for inspecting a length of said fixed-length film which protrudes from said wound-film-loaded cartridge.

5. An apparatus according to claim 2, further comprising a height inspecting mechanism disposed downstream of said mounting mechanism for inspecting a height of said wound-film-loaded cartridge.

6. An apparatus according to claim 1, further comprising a wound-film assembly moving mechanism for moving said wound-film assembly from said winding unit to said assembling unit.

7. An apparatus according to claim 1, wherein said housing has holes defined therein for providing access to mechanisms in said housing and light-shielding bag means mounted on said housing around said holes.

8. An apparatus according to claim 1, further comprising a light-shielded magazine having an opening for feeding out said film strip therethrough and light-shielding means for selectively opening and closing said opening in a light-shielded manner, said film roll being housed in said light-shielded magazine.

9. An apparatus according to claim 1, further comprising a packaged product assembling unit for loading said wound-film-loaded cartridge into a cartridge case and mounting a case cap on an opening of said cartridge case thereby to produce a packaged product.

10. An apparatus for manufacturing a film, comprising:
a supply unit for supplying a film strip from a film roll;
a winding unit for cutting the film strip supplied from said film roll into a fixed-length film and winding the fixed-length film around a spool to produce a wound-film assembly;
an assembling unit for introducing the wound-film assembly into a cartridge and mounting a cap on said cartridge to produce a wound-film-loaded cartridge; and
a housing for holding said supply unit, said winding unit, and said assembling unit in a light-shielded manner, said housing being movable,
wherein said assembling unit comprises a cartridge supply mechanism for supplying said cartridge, a conveyance mechanism for conveying said cartridge and said wound-film-loaded cartridge, a loading mechanism for loading said wound-film assembly into said cartridge, a cap supply mechanism for supplying said cap, a mounting mechanism for mounting said cap on said cartridge, and a removing mechanism for removing said wound-film-loaded cartridge with said cap from said conveyance mechanism, and wherein said conveyance mechanism comprises a plurality of pallets each for positioning and holding said cartridge and said wound-film-loaded cartridge, and a chain belt for circulating said pallets.

11. An apparatus for manufacturing a film, comprising:
a supply unit for supplying a film strip from a film roll;
a winding unit for cutting the film strip supplied from said film roll into a fixed-length film and winding the fixed-length film around a spool to produce a wound-film assembly;
an assembling unit for introducing the wound-film assembly into a cartridge and mounting a cap on said cartridge to produce a wound-film-loaded cartridge; and
a housing for holding said supply unit, said winding unit, and said assembling unit in a light-shielded manner, said housing being movable,
wherein said assembling unit comprises a cartridge supply mechanism for supplying said cartridge, a conveyance mechanism for conveying said cartridge and said wound-film-loaded cartridge, a loading mechanism for loading said wound-film assembly into said cartridge, a cap supply mechanism for supplying said cap, a mounting mechanism for mounting said cap on said cartridge, and a removing mechanism for removing said wound-film-loaded cartridge with said cap from said conveyance mechanism, and further comprising an air-conditioning facility that air conditions said housing by air supplied and discharged through supply ducts connected to said housing, said air-conditioning facility configured to maintain the inside of said housing at a constant temperature and a constant humidity.

12. An apparatus for manufacturing a film, comprising:
a supply unit for supplying a film strip from a film roll;
a winding unit for cutting the film strip supplied from said film roll into a fixed-length film and winding the fixed-length film around a spool to produce a wound-film assembly;
an assembling unit for introducing the wound-film assembly into a cartridge and mounting a cap on said cartridge to produce a wound-film-loaded cartridge; and
a housing for holding said supply unit, said winding unit, and said assembling unit in a light-shielded manner, said housing being movable,
wherein said assembling unit comprises a cartridge supply mechanism for supplying said cartridge, a conveyance mechanism for conveying said cartridge and said wound-film-loaded cartridge, a loading mechanism for loading said wound-film assembly into said cartridge, a cap supply mechanism for supplying said cap, a mounting mechanism for mounting said cap on said cartridge, and a removing mechanism for removing said wound-film-loaded cartridge with said cap from said conveyance mechanism, and
further comprising a cartridge feeder for supplying said cartridge from outside said housing, said cartridge feeder being connected to said cartridge supply mechanism, and
an air-conditioning facility that air conditions said housing by air supplied and discharged through supply ducts connected to said housing, said air-conditioning facility configured to maintain the inside of said housing at a constant temperature and a constant humidity.

13. An apparatus for manufacturing a film, comprising:
a supply unit for supplying a film strip from a film roll;
a winding unit for cutting the film strip supplied from said film roll into a fixed-length film and winding the fixed-length film around a spool to produce a wound-film assembly;
an assembling unit for introducing the wound-film assembly into a cartridge and mounting a cap on said cartridge to produce a wound-film-loaded cartridge; and
a housing for holding said supply unit, said winding unit, and said assembling unit in a light-shielded manner, said housing being movable,
wherein said assembling unit comprises a cartridge supply mechanism for supplying said cartridge, a conveyance mechanism for conveying said cartridge and said wound-film-loaded cartridge, a loading mechanism for loading said wound-film assembly into said cartridge, a cap supply mechanism for supplying said cap, a mounting mechanism for mounting said cap on said cartridge, and a removing mechanism for removing said wound-film-loaded cartridge with said cap from said conveyance mechanism, and
further comprising a cap feeder for supplying said cap from outside said housing, said cap feeder being connected to said cap supply mechanism, and
an air-conditioning facility that air conditions said housing by air supplied and discharged through supply ducts connected to said housing, said air-conditioning facility configured to maintain the inside of said housing at a constant temperature and a constant humidity.

14. A method of manufacturing a film, comprising the steps of:
winding a film strip fed from an unexposed film roll around a spool supplied by a spool supply mechanism;
cutting a trailing end of said film strip wound around said spool to produce a fixed-length film;
housing a wound-film assembly, which comprises said fixed-length film wound around said spool, into a cartridge supplied by a cartridge supply mechanism; and
mounting a cap supplied by a cap supply mechanism on said cartridge housing said wound-film assembly therein to produce a wound-film-loaded cartridge;
said steps being carried out in a movable light-shielded housing,
wherein, a rate at which said film strip is supplied is adjusted, and
wherein, said spool is supplied to the spool supply mechanism from outside said housing by a spool feeder, and
further comprising air-conditioning said housing by air supplied and discharged through supply ducts connected to said housing, and maintaining the inside of said housing at a constant temperature and a constant humidity via said air-conditioning.

15. A method according to claim 14, wherein said film roll is housed in a light-shielded magazine and supplied into said housing.

16. The method of manufacturing a film according to claim 14, further comprising:
pressing an upper surface of said cap with a presser having a portion abutting partially against said upper surface of said cap when said cap is mounted on said cartridge housing.

17. The method of manufacturing a film according to claim 14, further comprising:
applying a light beam to a flange of said spool for inspecting said flange by detecting a change of said light beam at said flange when said fixed-length film is wound around said spool.

18. A method of manufacturing a film by winding and loading a fixed-length film into a wound-film-loaded cartridge, loading said wound-film-loaded cartridge into a cartridge case, and mounting a case cap on an opening of said cartridge case thereby to produce a packaged product, said method comprising the steps of:
holding said wound-film-loaded cartridge with a first magnet and winding an end of said fixed-length film protruding from said wound-film-loaded cartridge around an outer circumferential surface of said wound-film-loaded cartridge; and
moving said wound-film-loaded cartridge to said cartridge case while said end of said fixed-length film which is wound around said wound-film-loaded cartridge is held against said outer circumferential surface of said wound-film-loaded cartridge, and loading said wound-film-loaded cartridge into said cartridge case by attracting said wound-film-loaded cartridge with a second magnet having stronger magnetism than said first magnet.

19. An apparatus for manufacturing a film, comprising a packaged product assembling unit for loading a wound-film-loaded cartridge into a cartridge ease and mounting a case cap on an opening of said cartridge case thereby to produce a packaged product, a fixed-length film wound and loaded into said wound-film-loaded cartridge, said packaged product assembling unit including a cartridge loading mechanism, said cartridge loading mechanism comprising:

cartridge holding means for holding said wound-film-loaded cartridge with a first magnet and inserting said wound-film-loaded cartridge into said cartridge case;

case holding means including a second magnet for holding said cartridge case, said second magnet having stronger magnetism than said first magnet; and guiding means including a guide tube for guiding said wound-film-loaded cartridge to said cartridge case, said guide tube holding an end of said fixed-length film protruding from said wound-film-loaded cartridge against an outer circumferential surface of said wound-film-loaded cartridge.

20. The apparatus for manufacturing a film according to claim 19, further comprising:

said packaged product assembling unit including a case cap mounting mechanism having a presser for pressing an upper surface of said case cap, said presser having a portion abutting partially against said upper surface of said case cap when said case cap is mounted on said opening of said cartridge case.

21. A method of manufacturing a film by winding a fixed-length film around a spool to make a wound-film assembly, loading said wound-film assembly into a cartridge, and mounting a cap on said cartridge for producing a wound-film-loaded cartridge, said method comprising the steps of:

supplying a pallet with said cartridge for positioning said cartridge, said pallet being conveyed along a circulatory path;

loading said wound-film assembly into an opening of said cartridge positioned and held in said pallet while an end of said fixed-length film is positioned with said end protruding from said spool by a predetermined length;

mounting said cap on said opening of said cartridge positioned and held in said pallet, said wound-film assembly being loaded into said cartridge;

fixing said cap on said opening of said cartridge positioned and held in said pallet;

inspecting a winding condition of said fixed-length film in said cartridge positioned and held in said pallet with said cap fixed on said cartridge; and removing said wound-film-loaded cartridge from said pallet after said winding condition of said fixed-length film in said cartridge is inspected.

22. An apparatus for manufacturing a film, said apparatus including a case supply unit, said case supply unit comprising:

a hopper for storing a plurality of cartridge cases, said hopper having a groove for arranging said cartridge cases in an array along a circumferential line;

an arm angularly movable along said circumferential line and having a pin insertable into an opening of one of said cartridge cases;

a rotor for angularly moving said arm; and a feed passage for feeding said cartridge case with said pin inserted therein.

23. A method of manufacturing a film by winding a fixed-length film around a spool and loading said wound film into a cartridge to produce a wound-film-loaded cartridge, comprising the steps of:

gripping a trailing end of said fixed-length film using clamps, said trailing end protruding from said wound-film-loaded cartridge;

moving a bracket at a substantially constant speed such that said clamps connected to said bracket through a spring are displaced for pulling said trailing end of said fixed-length film away from said wound-film-loaded cartridge; and inspecting a winding condition of said fixed-length film based on a positional relationship between said bracket and said clamps.

24. A method according to 23, wherein a spring constant of said spring is selected such that said spring extends by at least a predetermined length when a force which is larger than an allowable maximum pullout resistance in pulling said fixed-length film from said wound-film-loaded cartridge is applied to said spring, and a pullout resistance in pulling said fixed-length film is inspected based on said positional relationship between said bracket and said clamps, said positional relationship being related to extension of said spring.

25. A method according to 23, further comprising the step of inspecting a position of said trailing end of said fixed-length film gripped by said clamps when said bracket moves away from said wound-film-loaded cartridge by a predetermined distance.

26. An apparatus for manufacturing a film by winding a fixed-length film around a spool and loading said wound film into a cartridge to produce a wound-film-loaded cartridge, said apparatus comprising:

clamps for gripping a trailing end of said fixed-length film, said trailing end protruding from said wound-film-loaded cartridge;

a bracket coupled to said clamps through a spring;

means for moving said bracket at a substantially constant speed such that said clamps connected said bracket through said spring are displaced for pulling said trailing end of said fixed-length film away from said wound-film-loaded cartridge; and means for detecting positional relationship between said bracket and said clamps.

27. A method of manufacturing a film, comprising the steps of:

calculating an amount r of rotation of a file roll measuring a number N of perforations formed in a film strap fed out by the rotation of said film roll, said film strip having a length corresponding to said amount r of rotation of said film roll; and calculating a diameter D of said film roll based on a following equation:

$$(\pi \cdot D) \cdot r = n \cdot N$$

wherein n represents a pitch of said perforations.

28. An apparatus for manufacturing a film, said apparatus comprising:

means for calculating an amount r of rotation of a film roll;

means for measuring a number N of perforations formed in a film strip fed out by the rotation of said film roll, said film strip having a length corresponding to said amount r of rotation of said film roll; and means for calculating a diameter D of said film roll based on a following equation:

$$(\pi \cdot D) \cdot r = n \cdot N$$

wherein n represents a pitch of said perforations.

* * * * *